(12) United States Patent
Morioka et al.

(10) Patent No.: US 10,795,312 B2
(45) Date of Patent: Oct. 6, 2020

(54) ELECTROPHOTOGRAPHIC IMAGE FORMING APPARATUS, DEVELOPING APPARATUS, AND COUPLING MEMBER

(71) Applicant: CANON KABUSHIKI KAISHA, Tokyo (JP)

(72) Inventors: Masanari Morioka, Numazu (JP); Shiego Miyabe, Numazu (JP); Takahito Ueno, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/845,164

(22) Filed: Apr. 10, 2020

(65) Prior Publication Data

US 2020/0241464 A1 Jul. 30, 2020

Related U.S. Application Data

(62) Division of application No. 16/574,488, filed on Sep. 18, 2019, now Pat. No. 10,656,595, which is a
(Continued)

(30) Foreign Application Priority Data

Mar. 23, 2007 (JP) .................................. 2007-076771
Mar. 21, 2008 (JP) .................................. 2008-073685

(51) Int. Cl.
*G03G 21/18* (2006.01)
*G03G 15/01* (2006.01)
(Continued)

(52) U.S. Cl.
CPC ............. *G03G 21/186* (2013.01); *F16D 1/10* (2013.01); *F16D 1/101* (2013.01); *F16D 3/04* (2013.01);
(Continued)

(58) Field of Classification Search
CPC ............. G03G 21/186; G03G 15/0815; G03G 15/0121; G03G 21/1676; G03G 15/0865;
(Continued)

(56) References Cited

U.S. PATENT DOCUMENTS

| 899,913 A | 9/1908 | Shaw |
|---|---|---|
| 2,292,676 A | 8/1942 | Thiry |

(Continued)

FOREIGN PATENT DOCUMENTS

| CN | 1205459 | 1/1999 |
|---|---|---|
| CN | 1346077 | 4/2002 |

(Continued)

OTHER PUBLICATIONS

English Translation of Jan. 17, 2011 Office Action in Korean Patent Applicaton No. 10-2009-7015430.
(Continued)

*Primary Examiner* — Francis C Gray
(74) *Attorney, Agent, or Firm* — Venable LLP

(57) ABSTRACT

A developing device usable with an electrophotographic image forming apparatus, the apparatus including a driving shaft rotatable by a motor and having a rotating force applying portion, and a movable member, the developing device being mountable to the movable member, and the developing device being movable in a direction substantially perpendicular to an axial direction of the driving shaft in response to movement of the movable member in one direction with the developing device mounted to the movable member, the developing device includes i) a developing roller for developing an electrostatic latent image formed on an electrophotographic photosensitive drum, the developing roller being rotatable about an axis; and ii) a coupling member for transmitting a rotating force to the developing
(Continued)

roller, the coupling member including, a rotating force receiving portion engageable with the rotating force applying portion to receive a rotating force from the driving shaft, and a rotating force transmitting portion for transmitting the rotating force received through the rotating force receiving portion to the developing roller, the coupling member being capable of taking a rotational force transmitting angular position for transmitting the rotational force for rotating the developing roller to the developing roller, a pre-engagement angular position which is taken before the coupling member is engaged with the rotating force applying portion and in which the coupling member is inclined away from the rotational force transmitting angular position, and a disengaging angular position which is taken for the coupling member to disengage from the driving shaft and in which the coupling member is inclined away from the rotational force transmitting angular position in a direction opposite to the pre-engagement angular position; wherein in response to a movement of the developing device when the movable member moves in the one direction, the coupling member moves from the pre-engagement angular position to the rotational force transmitting angular position to be opposed to the driving shaft, and wherein when the movable member makes a further movement in the one direction from a position where the coupling member is opposed to the driving shaft, in response to the further movement, the coupling member is disengaged from the driving shaft by moving from the rotational force transmitting angular position to the disengaging angular position.

42 Claims, 75 Drawing Sheets

Related U.S. Application Data division of application No. 16/413,924, filed on May 16, 2019, which is a division of application No. 15/849,867, filed on Dec. 21, 2017, now Pat. No. 10,520,887, which is a division of application No. 15/377,447, filed on Dec. 13, 2016, now Pat. No. 9,886,002, which is a division of application No. 14/169,348, filed on Jan. 31, 2014, now Pat. No. 9,703,257, which is a division of application No. 13/764,073, filed on Feb. 11, 2013, now Pat. No. 8,688,008, which is a division of application No. 12/053,982, filed on Mar. 24, 2008, now Pat. No. 8,437,669.

(51) Int. Cl.
*F16D 1/10* (2006.01)
*F16D 3/04* (2006.01)
*G03G 15/08* (2006.01)
*G03G 21/16* (2006.01)

(52) U.S. Cl.
CPC ..... *G03G 15/0121* (2013.01); *G03G 15/0173* (2013.01); *G03G 15/08* (2013.01); *G03G 15/081* (2013.01); *G03G 15/0815* (2013.01); *G03G 15/0865* (2013.01); *G03G 15/0896* (2013.01); *G03G 21/1647* (2013.01); *G03G 21/1676* (2013.01); *G03G 2215/0177* (2013.01); *G03G 2221/1657* (2013.01)

(58) Field of Classification Search
CPC ... G03G 2215/0177; G03G 2221/1657; G03G 21/185; G03G 21/1857; G03G 21/1814; G03G 21/1842; G03G 2221/1861; G03G 2221/1884; G03G 15/0896; G03G 15/08; G03G 15/121; G03G 15/0173; F16D 1/10; F16D 3/04
See application file for complete search history.

(56) References Cited

U.S. PATENT DOCUMENTS

| | | |
|---|---|---|
| 2,300,514 A | 11/1942 | Mailman |
| 3,381,497 A | 5/1968 | Allen |
| 3,390,546 A | 7/1968 | Jewell |
| 3,406,534 A | 10/1968 | Chapper |
| 3,490,841 A | 1/1970 | Celry, Jr. et al. |
| 3,512,375 A | 5/1970 | Madarasz et al. |
| 3,537,275 A | 11/1970 | Smith |
| 3,747,368 A | 7/1973 | Morin |
| 3,815,380 A | 6/1974 | Esmay |
| 3,818,380 A | 6/1974 | Tyre |
| 3,922,883 A | 12/1975 | Bevacqua |
| 3,996,821 A | 12/1976 | Murray |
| 4,065,941 A | 1/1978 | Aoki |
| 4,106,611 A | 8/1978 | Suzuki et al. |
| 4,167,321 A | 9/1979 | Miyashita et al. |
| 4,320,429 A | 3/1982 | Knerich et al. |
| 4,433,767 A | 2/1984 | Thor |
| 4,439,257 A | 3/1984 | Santo et al. |
| 4,451,117 A | 5/1984 | Goode' |
| 4,457,738 A | 7/1984 | Gross et al. |
| 4,607,734 A | 8/1986 | Watashi et al. |
| 4,692,127 A | 9/1987 | Wagner |
| 4,753,626 A | 6/1988 | Hazebrook et al. |
| 4,829,335 A | 5/1989 | Kanemitsu et al. |
| 4,833,502 A | 5/1989 | Azuma |
| 4,835,565 A | 5/1989 | Nagatsuna et al. |
| 4,839,690 A | 6/1989 | Onoda et al. |
| 4,873,549 A | 10/1989 | Tada et al. |
| 4,941,862 A | 7/1990 | Hazenbrook et al. |
| 5,009,446 A | 4/1991 | Davis |
| 5,019,867 A | 5/1991 | Yamakawa et al. |
| 5,023,660 A | 6/1991 | Ebata et al. |
| 5,036,369 A | 7/1991 | Toda et al. |
| 5,106,224 A | 4/1992 | van Gelderen |
| 5,128,715 A | 7/1992 | Furyama et al. |
| 5,132,728 A | 7/1992 | Suzaki et al. |
| 5,168,319 A | 12/1992 | Kimura et al. |
| 5,177,854 A | 1/1993 | Herbert, Jr. et al. |
| 5,210,574 A | 5/1993 | Kita |
| 5,235,383 A | 8/1993 | Tada et al. |
| 5,247,847 A | 9/1993 | Gu |
| 5,277,659 A | 1/1994 | Cornay |
| 5,290,203 A | 3/1994 | Krude |
| 5,331,373 A | 7/1994 | Nomura et al. |
| 5,452,056 A | 9/1995 | Nomura et al. |
| 5,463,446 A | 10/1995 | Watanabe et al. |
| 5,562,357 A | 10/1996 | Sandell |
| 5,579,085 A | 11/1996 | Miyabe et al. |
| 5,583,618 A | 12/1996 | Takeuchi et al. |
| 5,583,630 A | 12/1996 | Kimura et al. |
| 5,585,889 A | 12/1996 | Shishido et al. |
| 5,640,650 A | 6/1997 | Watanabe et al. |
| 5,738,586 A | 4/1998 | Arriaga |
| 5,740,500 A | 4/1998 | Hashimoto |
| 5,749,028 A | 5/1998 | Damji et al. |
| 5,766,081 A | 6/1998 | Desmarais |
| 5,809,380 A | 9/1998 | Katakabe et al. |
| 5,815,782 A | 9/1998 | Yokomori et al. |
| 5,839,028 A | 11/1998 | Nomura et al. |
| 5,845,175 A | 12/1998 | Kumar et al. |
| 5,848,334 A | 12/1998 | Kamola |
| 5,855,519 A | 1/1999 | Kadota |
| 5,878,309 A | 3/1999 | Nomura et al. |
| 5,878,310 A | 3/1999 | Noda et al. |
| 5,878,492 A | 3/1999 | Gleasman et al. |
| 5,903,802 A | 5/1999 | Watanabe et al. |
| 5,903,803 A | 5/1999 | Kawai et al. |
| 5,907,750 A | 5/1999 | Yamada et al. |
| 5,920,753 A | 7/1999 | Sasaki et al. |

(56) References Cited

U.S. PATENT DOCUMENTS

| | | |
|---|---|---|
| 5,926,666 A | 7/1999 | Miura et al. |
| 5,926,672 A | 7/1999 | Nishibata et al. |
| 5,930,562 A | 7/1999 | Noda et al. |
| 5,943,529 A | 8/1999 | Miyabe et al. |
| 5,946,531 A | 8/1999 | Miura et al. |
| 5,950,047 A | 9/1999 | Miyabe et al. |
| 5,953,562 A | 9/1999 | Kawaguchi et al. |
| 5,966,567 A | 10/1999 | Matsuzaki et al. |
| 5,983,055 A | 11/1999 | Bito et al. |
| 5,987,287 A | 11/1999 | Huang |
| 5,991,571 A | 11/1999 | Yamada et al. |
| 5,993,101 A | 11/1999 | Kohno et al. |
| 6,011,942 A | 1/2000 | Taniguchi et al. |
| 6,029,027 A | 2/2000 | Yokomori et al. |
| 6,029,031 A | 2/2000 | Yokomori et al. |
| 6,032,002 A | 2/2000 | Yokomori et al. |
| 6,032,008 A | 2/2000 | Kolodziej |
| 6,041,203 A | 3/2000 | Suzuki et al. |
| 6,058,280 A | 5/2000 | Kumar et al. |
| 6,061,535 A | 5/2000 | Yokomori et al. |
| 6,064,843 A | 5/2000 | Isobe et al. |
| 6,070,028 A | 5/2000 | Odagawa et al. |
| 6,072,968 A | 6/2000 | Nomura et al. |
| 6,072,969 A | 6/2000 | Yokomori et al. |
| 6,081,676 A | 6/2000 | Inomata |
| 6,074,304 A | 7/2000 | Olbrich et al. |
| 6,101,350 A | 8/2000 | Suzuki et al. |
| 6,115,569 A | 9/2000 | Akutsu |
| 6,118,962 A | 9/2000 | Casper et al. |
| 6,128,452 A | 10/2000 | Miyabe et al. |
| 6,137,970 A | 10/2000 | Sasago |
| 6,152,826 A | 11/2000 | Profeta et al. |
| 6,154,623 A | 11/2000 | Suzuki et al. |
| 6,157,799 A * | 12/2000 | Asakura ............... G03G 21/186 399/121 |
| 6,167,219 A | 12/2000 | Miyamoto et al. |
| 6,169,865 B1 | 1/2001 | Miyabe et al. |
| 6,173,140 B1 | 1/2001 | Suzuki et al. |
| 6,173,145 B1 | 1/2001 | Chadani et al. |
| 6,175,705 B1 | 1/2001 | Harada et al. |
| 6,198,891 B1 | 3/2001 | Ishida et al. |
| 6,215,969 B1 | 4/2001 | Nomura et al. |
| 6,226,476 B1 | 5/2001 | Miyabe et al. |
| 6,226,478 B1 | 5/2001 | Watanabe et al. |
| 6,240,266 B1 | 5/2001 | Watanabe et al. |
| 6,249,663 B1 | 6/2001 | Aizawa et al. |
| 6,257,798 B1 | 6/2001 | Wormsbaecher |
| 6,256,467 B1 | 7/2001 | Yokomori et al. |
| 6,282,390 B1 | 8/2001 | Miyabe et al. |
| 6,301,458 B1 | 10/2001 | Mori et al. |
| 6,317,572 B1 | 11/2001 | Miyabe et al. |
| 6,336,012 B1 | 1/2002 | Noda et al. |
| 6,336,017 B1 | 1/2002 | Miyamoto et al. |
| 6,336,018 B1 | 1/2002 | Kawai et al. |
| 6,343,192 B1 | 1/2002 | Miyabe et al. |
| 6,438,347 B2 | 1/2002 | Nittani et al. |
| 6,349,191 B1 | 2/2002 | Willis |
| 6,351,620 B1 | 2/2002 | Miyabe et al. |
| 6,366,748 B1 | 4/2002 | Takeuchi et al. |
| 6,385,416 B1 | 5/2002 | Horikawa et al. |
| 6,385,420 B1 | 5/2002 | Morioka |
| 6,397,029 B1 | 5/2002 | Portig |
| 6,400,914 B1 | 6/2002 | Noda et al. |
| 6,415,121 B1 | 7/2002 | Suzuki et al. |
| 6,418,296 B1 | 7/2002 | Aizawa et al. |
| 6,452,826 B1 | 9/2002 | Kim et al. |
| 6,463,242 B1 | 10/2002 | Kojima et al. |
| 6,473,578 B2 | 10/2002 | Miyabe et al. |
| 6,473,580 B1 | 10/2002 | Inomata |
| 6,490,426 B1 | 12/2002 | Zaman |
| 6,501,926 B1 | 12/2002 | Watanabe et al. |
| 6,517,439 B1 | 2/2003 | Sears |
| 6,519,431 B1 | 2/2003 | Toba et al. |
| 6,542,706 B2 | 4/2003 | Toba et al. |
| 6,546,220 B1 | 4/2003 | Asakura et al. |
| 6,549,736 B2 | 4/2003 | Miyabe et al. |
| 6,549,738 B2 | 4/2003 | Otani et al. |
| 6,556,799 B2 | 4/2003 | Saito |
| 6,572,480 B1 | 6/2003 | Huang |
| 6,574,446 B2 | 6/2003 | Kitayama |
| 6,577,831 B1 | 6/2003 | Kojima et al. |
| 6,587,660 B2 | 7/2003 | Ueno et al. |
| 6,603,939 B1 | 8/2003 | Toba et al. |
| 6,608,980 B2 | 8/2003 | Murayama et al. |
| 6,654,580 B2 | 11/2003 | Yamaguchi et al. |
| 6,671,473 B2 | 12/2003 | Miyabe |
| 6,678,488 B2 | 1/2004 | Toba et al. |
| 6,699,550 B2 | 3/2004 | Suzuki et al. |
| 6,704,522 B2 | 3/2004 | Sasago et al. |
| 6,708,010 B2 | 3/2004 | Miyabe et al. |
| 6,714,746 B2 | 3/2004 | Morioka et al. |
| 6,714,752 B2 | 3/2004 | Ueno et al. |
| 6,725,004 B2 | 4/2004 | Ahn et al. |
| 6,768,890 B2 | 7/2004 | Cho et al. |
| 6,795,666 B2 | 9/2004 | Miyabe et al. |
| 6,823,153 B2 | 11/2004 | Ueno et al. |
| 6,823,160 B2 | 11/2004 | Okabe |
| 6,827,206 B2 | 12/2004 | Brase et al. |
| 6,829,455 B2 | 12/2004 | Yasumoto et al. |
| 6,834,175 B2 | 12/2004 | Murayama et al. |
| 6,836,629 B2 | 12/2004 | Miyabe et al. |
| 6,868,144 B2 | 3/2005 | Skladman et al. |
| 6,898,391 B2 | 5/2005 | Numagami et al. |
| 6,898,399 B2 | 5/2005 | Morioka et al. |
| 6,912,365 B2 | 6/2005 | Ueno et al. |
| 6,931,226 B2 | 8/2005 | Chadani et al. |
| 6,934,485 B2 | 8/2005 | Miyabe et al. |
| 6,937,832 B2 | 8/2005 | Sato et al. |
| 6,947,677 B2 | 9/2005 | Uyama et al. |
| 6,950,621 B2 | 9/2005 | Himes |
| 6,954,600 B2 | 10/2005 | Fujita et al. |
| 6,954,601 B2 | 10/2005 | Numagami et al. |
| 6,963,706 B2 | 11/2005 | Morioka et al. |
| 6,968,141 B2 | 11/2005 | Fujita et al. |
| 6,968,146 B1 | 11/2005 | Fujita et al. |
| 6,970,668 B2 | 11/2005 | Ueno et al. |
| 6,978,099 B2 | 12/2005 | Ueno et al. |
| 6,980,758 B2 | 12/2005 | Murayama et al. |
| 7,003,247 B2 | 2/2006 | Koishi et al. |
| 7,016,626 B2 | 3/2006 | Yokomori et al. |
| 7,020,410 B2 | 3/2006 | Zogg et al. |
| 7,024,131 B2 | 4/2006 | Komatsu et al. |
| 7,035,573 B2 | 4/2006 | Yamaguchi et al. |
| 7,062,200 B2 | 6/2006 | Ueno et al. |
| 7,079,783 B2 | 7/2006 | Yokoi |
| 7,079,787 B2 | 7/2006 | Ogino et al. |
| 7,092,658 B2 | 8/2006 | Yasumoto et al. |
| 7,121,205 B2 | 10/2006 | Ono et al. |
| 7,127,192 B2 | 10/2006 | Baton et al. |
| 7,136,604 B2 | 11/2006 | Chadani et al. |
| 7,139,502 B2 | 11/2006 | Koishi et al. |
| 7,147,457 B2 | 12/2006 | Iten |
| 7,149,457 B2 | 12/2006 | Miyabe et al. |
| 7,155,141 B2 | 12/2006 | Sato et al. |
| 7,158,735 B2 | 1/2007 | Murayama et al. |
| 7,158,736 B2 | 1/2007 | Sato et al. |
| 7,164,875 B2 | 1/2007 | Miyabe et al. |
| 7,174,122 B2 | 2/2007 | Fujita et al. |
| 7,184,690 B2 | 2/2007 | Ueno et al. |
| 7,200,349 B2 | 4/2007 | Sato et al. |
| 7,209,682 B2 | 4/2007 | Numagami et al. |
| 7,212,768 B2 | 5/2007 | Numagami et al. |
| 7,212,773 B2 | 5/2007 | Sudo et al. |
| 7,224,925 B2 | 5/2007 | Sato et al. |
| 7,228,090 B2 | 6/2007 | Toso et al. |
| 7,236,722 B2 | 6/2007 | Portig |
| 7,242,890 B2 | 7/2007 | Yokota |
| 7,242,893 B2 | 7/2007 | Murakami et al. |
| 7,248,810 B2 | 7/2007 | Miyabe et al. |
| 7,289,752 B2 | 10/2007 | Yamazaki et al. |
| 7,315,710 B2 | 1/2008 | Ueno et al. |
| 7,349,657 B2 | 3/2008 | Sato et al. |
| 7,366,443 B2 | 4/2008 | Ohashi et al. |
| 7,366,445 B2 | 4/2008 | Hoashi et al. |

(56) References Cited

U.S. PATENT DOCUMENTS

| | | | |
|---|---|---|---|
| 7,366,452 B2 | 4/2008 | Fujita et al. |
| 7,403,733 B2 | 7/2008 | Watanabe et al. |
| 7,421,235 B2 | 9/2008 | Choi |
| 7,424,244 B2 | 9/2008 | Williams et al. |
| 7,424,247 B2 | 9/2008 | Iwasaki |
| 7,433,622 B2 | 10/2008 | Chadani et al. |
| 7,433,628 B2 | 10/2008 | Kweon et al. |
| 7,491,161 B2 | 2/2009 | Taguchi |
| 7,509,075 B2 | 3/2009 | Hayakawa |
| 7,526,228 B2 | 4/2009 | Shiraki |
| 7,529,507 B2 | 5/2009 | Ohashi et al. |
| 7,537,410 B2 | 5/2009 | Parisi et al. |
| 7,603,059 B2 | 10/2009 | Marumoto |
| 7,623,811 B2 | 11/2009 | Sato |
| 7,630,667 B2 | 12/2009 | Huang et al. |
| 7,651,436 B2 | 1/2010 | Sugitani |
| 7,672,611 B2 | 3/2010 | Nakaya |
| 7,684,729 B2 | 3/2010 | Soda |
| 7,720,405 B2 | 5/2010 | Okabe |
| 7,756,443 B2 | 7/2010 | Okabe et al. |
| 7,817,938 B2 | 10/2010 | Igarashi |
| 7,869,735 B2 | 1/2011 | Hattori |
| 7,899,364 B2 | 3/2011 | Chadani et al. |
| 7,942,426 B2 | 5/2011 | Peters |
| 7,953,330 B2 | 5/2011 | Ishikawa |
| 7,979,008 B2 | 7/2011 | Kim et al. |
| 8,417,154 B2 | 4/2013 | Nieda |
| 8,437,669 B2 | 5/2013 | Morioka et al. |
| 8,630,564 B2 | 1/2014 | Ueno et al. |
| 8,676,090 B1 | 3/2014 | Ueno et al. |
| 8,682,215 B1 | 3/2014 | Ueno et al. |
| 8,688,008 B2 | 4/2014 | Morioka et al. |
| 8,731,438 B2 | 5/2014 | Okabe |
| 9,733,614 B2 | 8/2017 | Ueno et al. |
| 9,746,826 B2 | 8/2017 | Ueno et al. |
| 9,817,333 B2 | 11/2017 | Morioka et al. |
| 9,836,015 B2 | 12/2017 | Morioka et al. |
| 9,836,021 B2 | 12/2017 | Ueno et al. |
| 9,841,724 B2 | 12/2017 | Morioka et al. |
| 9,841,727 B2 | 12/2017 | Ueno et al. |
| 9,841,728 B2 | 12/2017 | Ueno et al. |
| 9,841,729 B2 | 12/2017 | Ueno et al. |
| 9,846,408 B2 | 12/2017 | Ueno et al. |
| 9,851,685 B2 | 12/2017 | Morioka et al. |
| 9,851,688 B2 | 12/2017 | Morioka et al. |
| 9,857,764 B2 | 1/2018 | Ueno et al. |
| 9,857,765 B2 | 1/2018 | Ueno et al. |
| 9,857,766 B2 | 1/2018 | Morioka et al. |
| 9,864,331 B2 | 1/2018 | Ueno et al. |
| 9,864,333 B2 | 1/2018 | Ueno et al. |
| 9,869,960 B2 | 1/2018 | Ueno et al. |
| 9,874,846 B2 | 1/2018 | Ueno et al. |
| 9,874,854 B2 | 1/2018 | Ueno et al. |
| 9,886,002 B2 | 2/2018 | Morioka et al. |
| 2001/0041079 A1 | 11/2001 | Michlin et al. |
| 2001/0041080 A1 | 11/2001 | Higeta et al. |
| 2002/0018666 A1 | 2/2002 | Noda et al. |
| 2002/0025191 A1 | 2/2002 | Kitayama |
| 2002/0034398 A1 | 3/2002 | Higeta et al. |
| 2002/0044794 A1 | 4/2002 | Nishiuwatoko et al. |
| 2002/0057928 A1 | 5/2002 | Yasumoto et al. |
| 2002/0057932 A1 | 5/2002 | Aizawa et al. |
| 2002/0110385 A1 | 8/2002 | Terada et al. |
| 2002/0110388 A1 | 8/2002 | Yokomori et al. |
| 2003/0049051 A1 | 3/2003 | Takahashi et al. |
| 2003/0059233 A1 | 3/2003 | Jang et al. |
| 2003/0123904 A1 | 7/2003 | Maeshima et al. |
| 2003/0138270 A1 | 7/2003 | Matsuoka |
| 2003/0156848 A1 | 8/2003 | Kawai et al. |
| 2003/0235429 A1 | 12/2003 | Sato et al. |
| 2004/0086300 A1 | 5/2004 | Kawai et al. |
| 2004/0114977 A1 | 6/2004 | Bloemen et al. |
| 2004/0136746 A1 | 7/2004 | Komatsu et al. |
| 2004/0179862 A1 | 9/2004 | Ono et al. |
| 2004/0190937 A1 | 9/2004 | Mercer et al. |
| 2005/0031374 A1 | 2/2005 | Nagashima et al. |
| 2005/0105936 A1 | 5/2005 | Morioka et al. |
| 2005/0111881 A1 | 5/2005 | Arimitsu et al. |
| 2005/0111882 A1 | 5/2005 | Sudo et al. |
| 2005/0117934 A1 | 6/2005 | Murayama et al. |
| 2005/0143179 A1 | 6/2005 | Delaney et al. |
| 2005/0191092 A1 | 9/2005 | Toso et al. |
| 2005/0220481 A1 | 10/2005 | Yamaguchi et al. |
| 2005/0244858 A1 | 11/2005 | Numagami et al. |
| 2005/0281586 A1 | 12/2005 | Ohashi et al. |
| 2005/0286931 A1 | 12/2005 | Kim et al. |
| 2006/0002735 A1 | 1/2006 | Tamaru et al. |
| 2006/0008289 A1 | 1/2006 | Sato et al. |
| 2006/0029435 A1 | 2/2006 | Kasai et al. |
| 2006/0034637 A1 | 2/2006 | Kim et al. |
| 2006/0051133 A1 | 3/2006 | Koishi et al. |
| 2006/0056878 A1 | 3/2006 | Okabe et al. |
| 2006/0062488 A1 | 3/2006 | Smeijers |
| 2006/0067737 A1 | 3/2006 | Yamazaki et al. |
| 2006/0093398 A1 | 5/2006 | Hayakawa |
| 2006/0140672 A1 | 6/2006 | Taguchi |
| 2006/0146371 A1 | 7/2006 | Hoashi et al. |
| 2006/0182465 A1 | 8/2006 | Funamoto et al. |
| 2006/0228127 A1 | 10/2006 | Miyabe et al. |
| 2006/0240896 A1 | 10/2006 | Ohashi et al. |
| 2006/0257164 A1 | 11/2006 | Hoshi et al. |
| 2006/0269318 A1 | 11/2006 | Ueno et al. |
| 2007/0003321 A1* | 1/2007 | Hara ............... G03G 15/757 399/167 |
| 2007/0042826 A1 | 2/2007 | Furusawa |
| 2007/0059038 A1 | 3/2007 | Shiraki |
| 2007/0065183 A1 | 3/2007 | Tomita |
| 2007/0104510 A1 | 5/2007 | Kawai et al. |
| 2007/0110478 A1 | 5/2007 | Numagami et al. |
| 2007/0122188 A1 | 5/2007 | Igarashi |
| 2007/0196131 A1 | 8/2007 | Sato |
| 2007/0237545 A1 | 10/2007 | Cho et al. |
| 2007/0264048 A1 | 11/2007 | Kuroda |
| 2008/0025757 A1 | 1/2008 | Sato et al. |
| 2008/0102966 A1 | 5/2008 | Gleasman |
| 2008/0117482 A1 | 5/2008 | Kusumi |
| 2008/0138114 A1* | 6/2008 | Chadani ............... F16D 3/04 399/167 |
| 2008/0152338 A1 | 6/2008 | Kudo |
| 2008/0152388 A1 | 6/2008 | Ueno et al. |
| 2008/0159773 A1 | 7/2008 | Murayama et al. |
| 2008/0199212 A1 | 8/2008 | Tsui et al. |
| 2008/0240796 A1 | 10/2008 | Morioka et al. |
| 2008/0260428 A1 | 10/2008 | Ueno et al. |
| 2009/0196655 A1* | 8/2009 | Takigawa ............ G03G 21/186 399/167 |
| 2009/0290903 A1 | 11/2009 | Horikawa et al. |
| 2009/0317132 A1 | 12/2009 | Asanuma et al. |
| 2009/0317134 A1* | 12/2009 | Miyabe ............ G03G 21/1814 399/119 |
| 2010/0054778 A1* | 3/2010 | Adachi ............ G03G 15/0121 399/53 |
| 2010/0054823 A1* | 3/2010 | Takasaka ......... G03G 15/0173 399/286 |
| 2010/0142991 A1 | 6/2010 | Holmes et al. |
| 2010/0189462 A1 | 7/2010 | Kawashima et al. |
| 2011/0038649 A1 | 2/2011 | Miyabe et al. |
| 2013/0064569 A1 | 3/2013 | Ueno et al. |
| 2017/0227919 A1 | 8/2017 | Morioka et al. |

FOREIGN PATENT DOCUMENTS

| | | |
|---|---|---|
| CN | 1158583 | 7/2004 |
| CN | 1696839 | 11/2005 |
| CN | 1851282 | 10/2006 |
| EP | 0511203 | 11/1992 |
| EP | 0 827 049 A1 | 4/1998 |
| EP | 0 886 075 A1 | 12/1998 |
| EP | 1 178 370 | 2/2002 |
| EP | 1199610 | 4/2004 |
| EP | 1 628 165 | 2/2006 |
| EP | 1791034 | 5/2007 |
| GB | 2141520 | 12/1984 |

(56) References Cited

FOREIGN PATENT DOCUMENTS

| | | |
|---|---|---|
| JP | 57-153844 | 9/1982 |
| JP | S59228281 | 12/1984 |
| JP | 60-249729 | 12/1985 |
| JP | S60249729 | 12/1985 |
| JP | 61-092967 | 6/1986 |
| JP | 1-164818 | 6/1989 |
| JP | 03-125166 A | 5/1991 |
| JP | H03125166 | 5/1991 |
| JP | 03117249 U | 12/1991 |
| JP | 4-119363 | 4/1992 |
| JP | H04-119363 | 4/1992 |
| JP | 4-240870 | 8/1992 |
| JP | H04240870 | 8/1992 |
| JP | 05017656 U | 3/1993 |
| JP | U05-019658 | 3/1993 |
| JP | U05-030857 | 4/1993 |
| JP | H05172152 | 7/1993 |
| JP | 05073663 U | 10/1993 |
| JP | 5-341589 | 12/1993 |
| JP | Hei 7-33253 U | 7/1995 |
| JP | H07217655 | 8/1995 |
| JP | H07217665 | 8/1995 |
| JP | 8-030168 | 2/1996 |
| JP | H09160274 | 6/1997 |
| JP | H09-177807 A | 7/1997 |
| JP | H09177807 | 7/1997 |
| JP | H09230654 | 9/1997 |
| JP | U53-115630 | 7/1998 |
| JP | H10-326034 A | 12/1998 |
| JP | 11-15265 | 1/1999 |
| JP | 11-325097 | 11/1999 |
| JP | H11325097 | 11/1999 |
| JP | 2000-75732 | 3/2000 |
| JP | 2000075732 | 3/2000 |
| JP | 2000-120715 | 4/2000 |
| JP | 2000-137360 | 5/2000 |
| JP | 2000-170783 | 6/2000 |
| JP | 2000170783 | 6/2000 |
| JP | 2000257646 | 9/2000 |
| JP | 2000280348 | 10/2000 |
| JP | 2000-338842 A | 12/2000 |
| JP | 2001-083753 A | 3/2001 |
| JP | 2001194954 | 7/2001 |
| JP | 2007-218403 A | 8/2001 |
| JP | 2002-031153 | 1/2002 |
| JP | 2002-048148 | 2/2002 |
| JP | 2002217574 | 8/2002 |
| JP | 2002-250435 | 9/2002 |
| JP | 2003-162137 | 6/2003 |
| JP | 2003-202727 | 7/2003 |
| JP | 2003247535 | 9/2003 |
| JP | 2004-45603 | 2/2004 |
| JP | 2004-045603 | 2/2004 |
| JP | 2004045603 | 2/2004 |
| JP | 2004-85593 | 3/2004 |
| JP | 2004-085593 A | 3/2004 |
| JP | 2004144240 | 5/2004 |
| JP | 2004-198822 | 7/2004 |
| JP | 2004198822 | 7/2004 |
| JP | 2004246058 | 9/2004 |
| JP | 2004251401 | 9/2004 |
| JP | 2005076734 | 3/2005 |
| JP | 2005164684 | 6/2005 |
| JP | 2005-299788 A | 10/2005 |
| JP | 3728104 | 10/2005 |
| JP | 2005296235 | 10/2005 |
| JP | 3728104 | 12/2005 |
| JP | 2006039364 | 2/2006 |
| JP | 2006-72160 | 3/2006 |
| JP | 2006-072160 | 3/2006 |
| JP | 2006084935 | 3/2006 |
| JP | 2006106681 | 4/2006 |
| JP | 2006133436 | 5/2006 |
| JP | 2006139230 | 6/2006 |
| JP | 2006163232 | 6/2006 |
| JP | 2007032794 | 2/2007 |
| JP | 2007-052185 | 3/2007 |
| JP | 2007069868 | 3/2007 |
| JP | 2007121774 | 5/2007 |
| JP | 2007-218403 | 8/2007 |
| JP | 2007-240007 | 9/2007 |
| JP | 2007-256497 A | 10/2007 |
| JP | 2007-303615 A | 11/2007 |
| JP | 2009-104101 | 5/2009 |
| JP | 2009300516 | 12/2009 |
| KR | 10-0617433 B1 | 8/2006 |
| KR | 20090044054 | 5/2009 |
| RU | 2 289 835 C2 | 12/2006 |
| SU | 817658 A | 3/1981 |
| WO | 2006014821 | 2/2006 |
| WO | 2008/078836 A1 | 7/2008 |

OTHER PUBLICATIONS

Office Action in Korean Patent Application No. 10-2009-7015474, dated Jan. 17, 2011, with English translation.
Office Action in Korean Patent Application No. 10-2009-7022191, dated Feb. 17, 2011.
Office Action in Chinese Patent Application No. 200780047584.6, dated Nov. 1, 2010, with English translation.
Office Action in Korean Patent Application No. 10-2009-7015430, dated Jan. 17, 2011.
Office Action in Korean Patent Application No. 10-2009-7022510, dated Aug. 8, 2011.
Notice of Allowance in Korean Application No. 10-2009-7022191, dated Sep. 29, 2011.
Office Action in Japanese Patent Application No. 2007-330304, dated Nov. 22, 2011, with English translation.
Notice of Acceptance in Australian Patent Application No. 2008230339, dated Mar. 23, 2012.
Official Communication in Canadian Patent Application No. 2,671,325, dated Jan. 27, 2012.
Office Action in Taiwanese Patent Application No. 097110457, dated Nov. 1, 2012 (with English Translation).
Decision on Grant in Russian Patent Application No. 2009139091/28(055373), dated Oct. 5, 2012 (with English translation).
Office Action in Chinese Patent Application No. 201110393733.2, dated Jan. 14, 2013 (with English translation).
English Translation of Japanese Laid-open Application Hei No. 1-164818.
Japanese Office Action in Japanese Application No. 2007-330303, dated Mar. 16, 2010.
Singapore Search Report and Written Opinion in Singapore Application No. 200903015-6, dated Jan. 5, 2010.
International Search Report and Written Opinion of the International Searching Authority dated Dec. 25, 2007,in International Application No. PCT/JP2007/075364.
Office Action in Russian Patent Application No. 2009128196, dated Nov. 3, 2010, with English translation.
Singapore Search Report and Written Opinion in Singapore Patent Application No. 200903005-7, dated Jan. 5, 2010.
International Search Report and Written Opinion of the International Search Authority, dated Apr. 11, 2008, in International Patent Application No. PCT/JP2007/075366.
Australian Search Report dated Nov. 24, 2009, enclosed with an Invitation to Respond to Written Opinion dated Dec. 29, 2009, in counterpart Singapore Application No. 200903732-6.
International Search Report in PCT/JP2008/056259, dated Jun. 16, 2008.
Written Opinion in PCT/JP2008/056259, dated Jun. 16, 2008.
English translation of Japanese Patent Document No. 11-15265 A.
English translation of Japanese Patent Document No. 2002-202727 A.
Office Action in Korean Patent Application No. 10-2010-7023827, dated May 16, 2013.
Office Action in Korean Patent Application No. 10-2011-7019131, dated May 16, 2013.

(56) References Cited

OTHER PUBLICATIONS

Office Action in Korean Patent Application No. 10-2011-7019129, dated May 19, 2013.
English translation of Office Action in Korean Patent Application No. 10-2010-7023837, dated May 16, 2013.
English translation of Office Action in Korean Patent Application No. 10-2011-7019131, dated May 16, 2013.
English translation of Office Action in Korean Patent Application No. 10-2011-7019129, dated May 16, 2013.
Office Action in Chinese Patent Application No. 201110395018.2, dated Dec. 20, 2013 (with English translation).
Office Action in Chinese Patent Application No. 201110394589.4, dated Nov. 19, 2013 (with English translation).
Office Action in Chinse Patent Application No. 201110393651.8, dated Nov. 19, 2013 (with English translation).
Office Action in Chinese Patent Application No. 201110394614.9, dated Feb. 4, 2013 (with English translation).
English translation of Japanese Patent Laid-Open No. 4-119363 (laid-open date Apr. 20, 1992).
English translation of Japanese Patent Laid-Open No. 2003-162137 (laid-open date Jun. 6, 2003).
Aug. 11, 2017 Office Action in counterpart Taiwanese Patent Application No. 105104936 (with English translation).
English translation of Japanese Patent Laid-Open No. 2006-163232.
NTN Corporation Tri-Ball Joint Constant Velocity Joints (Small and Medium Size) Cat. No. 5602-IV/E (2005).
NTN Corporation Constant Velocity Joints for Industrial Machines Cat. No. 5603-V/E (2005).
Mar. 9, 2017 Office Action in U.S. Appl. No. 15/377,079.
Apr. 3, 2017 Office Action in U.S. Appl. No. 15/377,135.
Mar. 31, 2017 Office Action in U.S. Appl. No. 15/377,183.
Office Action in Russian Patent Application No. 2015142660, dated Feb. 17, 2017 (with English translation).
Smith Corona 5H Series Personal Word Processors Service Manuel, dated Sep. 1989.
John W. Weigl, "Electrophotography", 16 Angew. Chem. Int. Ed. Engl., 374-392 (Jun. 1977).
Kawamoto, "Vibration Induced in Driving Mechanism of Photoconductor Drum in Color Laser Printer", 48 Jour. of Image Sci. and Tech., 306-311 (Jul./Aug. 2004).
Knight et al., "Robust Control for Carriage Drum Printer", Control Applications, Proceedings of the Third IEEE International Conference on Control and Applications, 971-976 (Aug. 1994).
Pai et al., "Physics of Electrophotography", 65 Reviews of Mod. Physics, 163-211 (Jan. 1993).
Decision on Grant in Russian Patent Application No. 2015142660, dated Jun. 7, 2018 (with English translation).
Decision on Grant in Russian Patent Application No. 2018129750, dated Apr. 15, 2019 (with English translation).
Markman Order and Order Addressing Motions for Summary Determination and Prehearing Brief in U.S. International Trade Commission Investigation No. 337-TA-1106, issued Feb. 28, 2019.
Aug. 28, 2019 Office Action in Taiwanese Patent Application No. 107138931 (with English translation).
Aug. 28, 2019 Office Action in Taiwanese Patent Application No. 107138932 (with English translation).
Respondents' Ninestar Corporation, Ninestar Image Tech Limited, Ninestar Technology Company, Ltd., and Apex Mictrotech Ltd.'s Response to Canon's Interrogatory Nos. 20-30 in ITC Investigation No. 337-TA-1106, dated May 7, 2018 (including claim charts asserting invalidity of claims of U.S. Pat. Nos. 9,874,846; 9,869,960; 9,857,765; 9,836,021; 9,746,826).
Respondents' Ninestar Corporation, Ninestar Image Tech Limited, Ninestar Technology Company, Ltd., and Apex Mictrotech Ltd.'s Supplemental Response to Canon's Interrogatory Nos. 21 in ITC Investigation No. 337-TA-1106, dated May 25, 2018 (including claim charts asserting invalidity of claims of U.S. Pat. Nos. 9,874,846; 9,869,960; 9,857,765; 9,836,021; 9,746,826).
Respondents' Ninestar Corporation, Ninestar Image Tech Limited, Ninestar Technology Company, Ltd., and Apex Mictrotech Ltd.'s Second Supplemental Response to Canon's Interrogatory Nos. 21 in ITC Investigation No. 337-TA-1106, dated Jun. 22, 2018 (including claim charts asserting invalidity of claims of U.S. Pat. Nos. 9,874,846; 9,869,960; 9,857,765; 9,836,021; 9,746,826).
Respondents' Ninestar Corporation, Ninestar Image Tech Limited, Ninestar Technology Company, Ltd., and Apex Mictrotech Ltd.'s Third Supplemental Response to Canon's Interrogatory Nos. 21 in ITC Investigation No. 337-TA-1106, dated Jul. 11, 2018 (including claim charts asserting invalidity of claims of U.S. Pat. Nos. 9,874,846; 9,869,960; 9,857,765; 9,836,021; 9,746,826).
Respondents' Ninestar Corporation, Ninestar Image Tech Limited, Ninestar Technology Company, Ltd., and Apex Mictrotech Ltd.'s Fourth Supplemental Response to Canon's Interrogatory Nos. 21 in ITC Investigation No. 337-TA-1106, dated Aug. 13, 2018 (including claim charts asserting invalidity of claims of U.S. Pat. Nos. 9,874,846; 9,869,960; 9,857,765; 9,836,021; 9,746,826).
Respondent's Notice of Prior Art in ITC Investigation No. 337-TA-1106, dated Sep. 4, 2018.
Initial Expert Report of Alexander J. Solcum, Ph.D., on invalidity of U.S. Pat. Nos. 9,746,826; U.S. Pat. No. 9,836,021; U.S. Pat. No. 9,857,765; U.S. Pat. No. 9,869,960; and U.S. Pat. No. 9,874,846, in ITC Investigation No. 337-TA-1106, dated Oct. 1, 2018 (redacted).
Canon's Initial Markman Brief in ITC Investigation No. 337-TA-1106, dated Jul. 26, 2018.
Respondents' Initial Markman Brief in ITC Investigation No. 337-TA-1106, dated Jul. 26, 2018.
Commission Investigative Staff's Opening Markman Brief in ITC Investigation No. 337-TA-1106, dated Jul. 27, 2018.
Canon's Rebuttal Markman Brief in ITC Investigation No. 337-TA-1106, dated Aug. 16, 2018.
Respondents' Rebuttal Markman Brief in ITC Investigation No. 337-TA-1106, dated Aug. 16, 2018.
Commission Investigative Staff's Rebuttal Markman Brief in ITC Investigation No. 337-TA-1106, dated Aug. 16, 2018.
The Ninestar Respondent's Contingent Motion for Summary Determination of Invalidity for Failure to Satisfy the Written Description Requirement in ITC Investigation No. 337-TA-1106, dated Nov. 28, 2018.
Reply Memorandum of Points and Authorities in Support of the Ninestar Respondents' Contingent Motion for Summary Determination of Invalidity for Failure to Satisfy the Written Description Requirement (Motion 1106-022) in ITC Investigation No. 337-TA-1106, dated Dec. 13, 2018.
Markman Order and Order Addressing Motions for Summary Determination and Prehearing Briefs in ITC Investigation No. 337-TA-1106, dated Feb. 28, 2019.
Transcript of Nov. 9, 2018 Deposition of Alexander H. Slocumb, Ph.D. in ITC Investigation No. 337-TA-1106 (redacted).
Transcript of Nov. 1, 2018 Deposition of Richard A. Lux, Ph.D. in ITC Investigation No. 337-TA-1106 (redacted).
Initial Expert Report of Richard A. Lux, Ph.D. in ITC Investigation No. 337-TA-1106, dated Oct. 1, 2018 (redacted).
Contingent Direct Witness Statement of Richard A. Lux, Ph.D. Pursuant to Order No. 34 in ITC Investigation No. 337-TA-1106.
Direct Witness Statement of Richard A. Lux, Ph.D. in ITC Investigation No. 337-TA-1106 (redacted).
Rebuttal Witness Statement of Richard A. Lux, Ph.D. in ITC Investigation No. 337-TA-1106.
Rebuttal Report of Richard A. Lux, Ph.D. in ITC Investigation No. 337-TA-1106, dated Oct. 24, 2018.
Rebuttal Witness Statement of Alexander Slocum to the Witness Statement of Shigeo Miyabe (CX-0018C) and the Witness Statements of Richard Lux (CX-0161C and CX-0162) in ITC Investigation No. 337-TA-1106.
Witness Statement of Alexander Slocum in ITC Investigation No. 337-TA-1106 (redacted).
An Anti-Backlash Two-Part Shaft Coupling with Interlocking Elastically Averaged Teeth, Balasubramaniam et al., 26 J. of Int. Societies for Precision Eng. and Nanotech., 314-330 (2002).
Design of Three-Groove Kinematic Couplings, Alexander H. Slocum (1992).
Fundamentals of Design, Alexander H. Solcum (2008).

(56) References Cited

OTHER PUBLICATIONS

McGraw Hill Series in Mechanical Engineering: Design of Machinery, Norton, pp. 22-23 (2001).
Physics of Electrophotography, Damodar et al., pp. 163-211 (1993).
Decision to Grant in Russian Patent Application No. 2019119211, dated Nov. 25, 2019 (with English translation).
Office Action in Malaysian Patent Application No. PI 2015002754, dated Dec. 10, 2019.
Office Action in German Patent Application No. 112 008 000 214.2, dated Aug. 14, 2014 (with English translation).
Notice of Allowance in Korean Patent Application No. 10-2014-7016416, dated Sep. 15, 2014.
Notice of Allowance in Korean Patent Application No. 10-2014-7019129, dated Jul. 29, 2014.
Notice of Allowance in Korean Patent Application No. 10-2013-7030453, dated Nov. 20, 2014.
First Examination Report in Indian Patent Application No. 5578/CHENP/2009, dated Feb. 2, 2015.
Communication in European Patent Application No. 08 739 376.5, dated Mar. 13, 2015.
Decision on Grant in Russian Patent Application No. 2014116547, dated Jun. 1, 2015 (with English translation).
ITC Investigation No. 337-TA-918—Canon's Proposed Claim Constructions, dated Sep. 15, 2014.
ITC Investigation No. 337-TA-918—the Ninestar Respondents' Supplemental Objections and Responses to Complainants' Interrogatory Nos. 32-43, 45-47, and 49-51, dated Sep. 19, 2014.
ITC Investigation No. 337-TA-918—Respondents' Notice of Prior Art, dated Sep. 26, 2014.
ITC Investigation No. 337-TA-918—Canon's Supplemental Proposed Claim Constructions, dated Oct. 10, 2014.
ITC Investigation No. 337-TA-918—Canon's Objections and Supplemental Responses to ILG's Interrogatory Nos. 1, 5, 7, 10, 12, 43, 47, 60-65, 85, 87, and 120 to Complainants, dated Oct. 17, 2014.
ITC Investigation No. 337-TA-918—Respondent International Laser Group, Inc.'s Oct. 17, 2014 Supplemental Responses to Complainants, Canon, Inc., Canon U.S.A., Inc. and Canon Virginia, Inc.'s Interrogatories (Nos. 3346, 49, 58), dated Oct. 17, 2014.
ITC Investigation No. 337-TA-918—the Ninestar Star Respondents' Supplemental Objections and Responses to Complainants' Interrogatory Nos. 32-47 and 49-51, dated Oct. 17, 2014.
ITC Investigation No. 337-TA-918—Initial Expert Report of Charles M. Curley Regarding Invalidity of Certain Claims of U.S. Pat. Nos. 8,280,278; 8,630,564; 8,682,215; and 8,688,008, dated Oct. 21, 2014.
ITC Investigation No. 337-TA-918—Initial Expert Report of Richard A. Lux, Ph.D., dated Oct. 17, 2014.
ITC Investigation No. 337-TA-918—Expert Report of Dr. Alexander Slocum on the Invalidity of the Asserted Claims of Canon's Patents, dated Oct. 20, 2014.
ITC Investigation No. 337-TA-918—Supplemental Joint Chart Regarding Claim Construction, dated Oct. 23, 2014.
Petition for Inter Partes Review of U.S. Pat. No. 8,280,278, dated Oct. 27, 2014.
Declaration of Charles M. Curley in Support of Petition for Inter Partes Review of U.S. Pat. No. 8,280,278, dated Oct. 9, 2014.
ITC Investigation No. 337-TA-918—Rebuttal Expert Report of Richard A. Lux, Ph.D., dated Nov. 7, 2014.
ITC Investigation No. 337-TA-918—Rebuttal Expert Report of Alexander Slocum, dated Nov. 7, 2014.
ITC Investigation No. 337-TA-918—Deposition of Richard A. Lux, Ph.D. (vol. 1), dated Nov. 11, 2014.
ITC Investigation No. 337-TA-918—Deposition of Richard A. Lux, Ph.D. (vol. 2), dated Nov. 12, 2014.
ITC Investigation No. 337-TA-918—Deposition of Alexander Henry Slocum, Ph.D., dated Nov. 14, 2014.
ITC Investigation No. 337-TA-918—Deposition of Charles Michael Curley, dated Dec. 3, 2014.
ITC Investigation No. 337-TA-918—Canon's Prehearing Brief (redacted), dated Dec. 22, 2014.
ITC Investigation No. 337-TA-918—Commission Investigative Staff's Combined Prehearing Brief and Prehearing Statement (redacted), dated Jan. 14, 2015.
ITC Investigation No. 337-TA-918—Pre-hearing Statement and Brief of Respondents International Laser Group, the Nlinestar Respondents, and Katun Corp. (redacted), dated Dec. 22, 2014.
ITC Investigation No. 337-TA-918—Direct Witness Statement of Charles M. Curley, dated Dec. 22, 2014.
ITC Investigation No. 337-TA-918—Witness Statement of Alexander Slocum, dated Dec. 21, 2014.
ITC Investigation No. 337-TA-918—Rebuttal Witness Statement of Richard A. Lux, Ph.D., dated Jan. 9, 2015.
ITC Investigation No. 337-TA-918—Initial Determination Granting Complainants' Motion for Summary Determination of Violations by the Defaulting Respondents and Non-participating Respondents and Recommended Determination on Remedy and Bonding (public version), dated May 12, 2015.
Corrected Petition in IPR2015-00508 (Inter Partes Review of U.S. Pat. No. 8,688,008), dated Jan. 22, 2015.
Expert Declaration of Charles M. Curley in IPR 2015-00508 (Inter Partes Review of U.S. Pat. No. 8,280,278) dated Dec. 31, 2014.
Office Action in Taiwanese Patent Application No. 102113954, dated Jul. 13, 2015 (with English translation).
Office Action in Brazilian Patent Application No. 12201501397-2, dated Feb. 23, 2016 (with partial English translation).
Remanufacturing toner cartridges for Lexmark CRG, from Reciclamais Magazine 2003 (with English translation).
Extended Search Report in European Patent Application No. 16166811.6, dated Sep. 8, 2016.
Apr. 20, 2020 Judgment by the United States Court of Appeals for the Federal Circuit in Appeal from United States International Trade Commission Investigation No. 337-TA-1106.
May 21, 2020 Decision to Grant in Russian Patent Application No. 2020107444 (with English translation).
May 21, 2020 Decision to Grant in Russian Patent Application No. 2020107445 (with English translation).
May 21, 2020 Decision to Grant in Russian Patent Application No. 2020107446 (with English translation).
Apr. 27, 2020 Decision to Grant in Russian Patent Application No. 2020107447 (with English translation).

\* cited by examiner

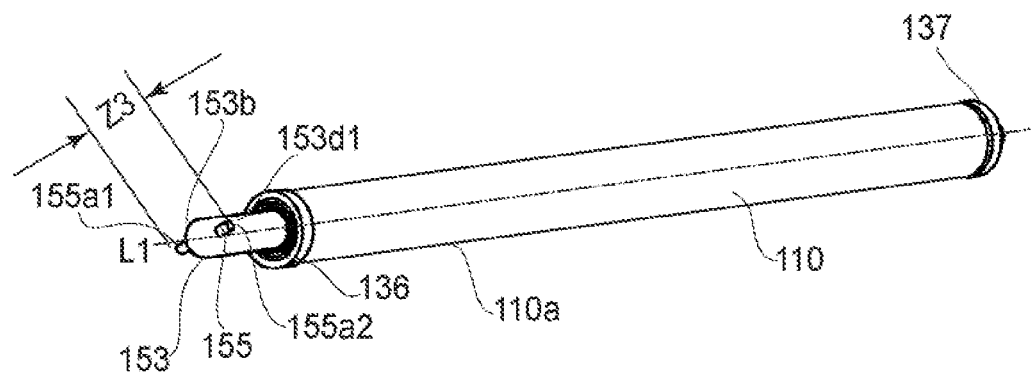
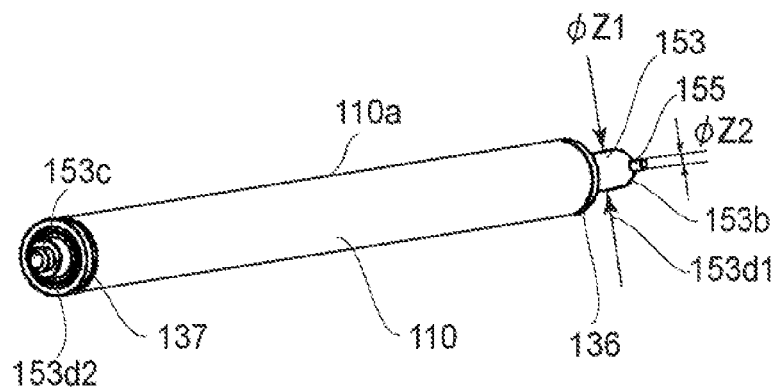
FIG.5

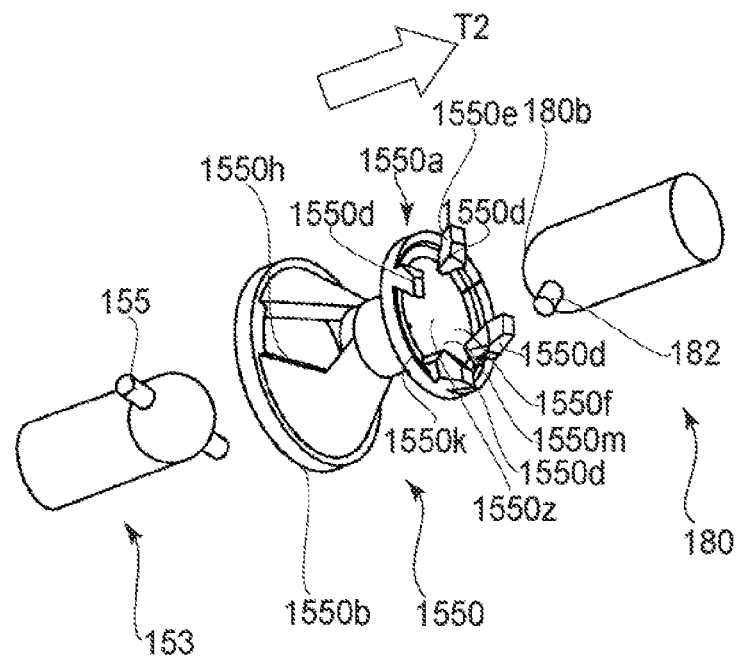
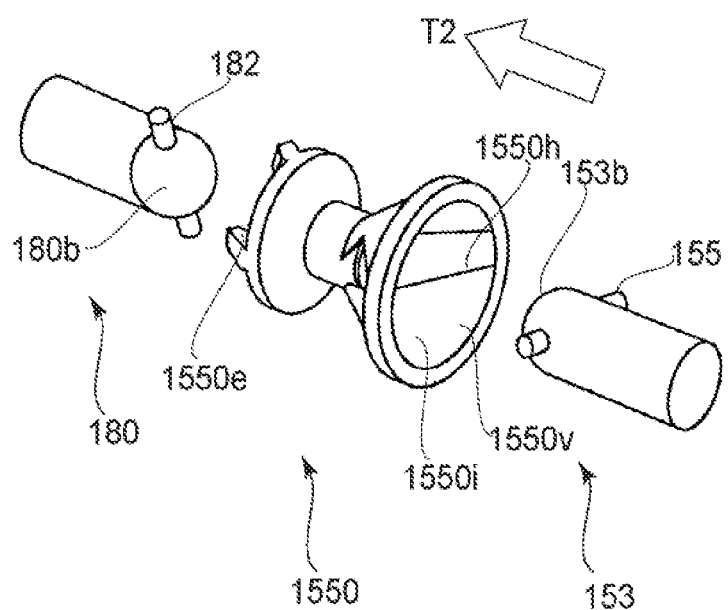
FIG.31

(a)
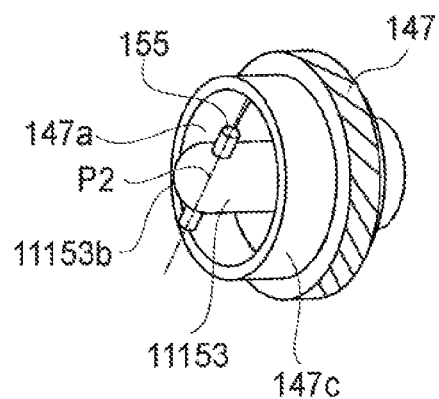
(b)
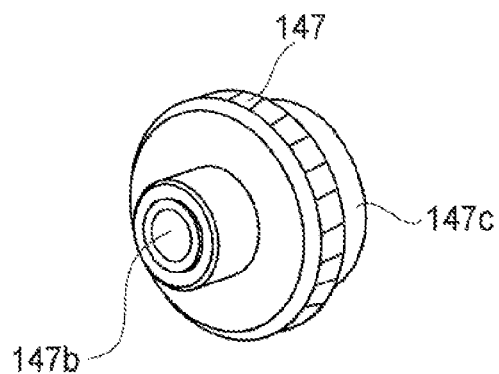
FIG.59

(a)
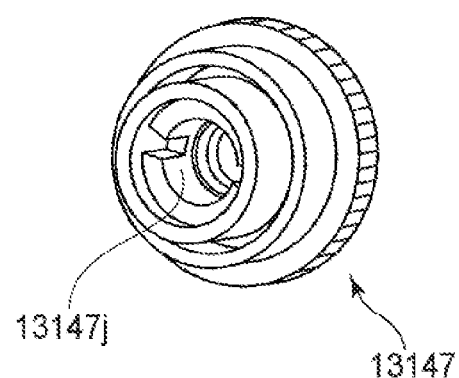
(b)
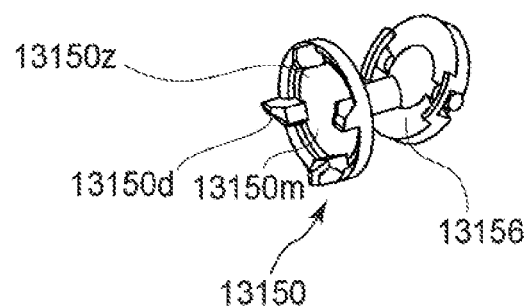
FIG.72

ELECTROPHOTOGRAPHIC IMAGE FORMING APPARATUS, DEVELOPING APPARATUS, AND COUPLING MEMBER

FIELD OF THE INVENTION AND RELATED ART

The present invention relates to an electrophotographic image forming apparatus, a developing apparatus used in the electrophotographic image forming apparatus, and a coupling member used in the electrophotographic image forming apparatus.

Examples of the electrophotographic image forming apparatus include an electrophotographic copying machine, an electrophotographic printer (a laser beam printer, an LED printer, etc.), and the like.

The developing apparatus (developing device) is mounted to a main assembly of the electrophotographic image forming apparatus and develops an electrostatic latent image formed on an electrophotographic photosensitive member.

The developing device includes a developing device of a fixed type used in a state in which it is mounted and fixed to a main assembly of the electrophotographic image forming apparatus and a developing device of a developing cartridge type in which a user can mount it to the main assembly and can demount it from the main assembly.

With respect to the developing device of the fixed type, maintenance is performed by a service person. On the other hand, with respect to the developing device of the developing cartridge type, maintenance is performed by the user by replacing a developing cartridge with another one.

In a conventional electrophotographic image forming apparatus, the following constitution is known when an electrostatic latent image formed on a drum-shaped electrophotographic photosensitive member (hereinafter referred to as a "photosensitive drum") is developed.

In a Japanese Laid-Open Patent Application (JP-A) 2003-202727, a gear (gear 42Y) is provided to a developing device and is engaged with a gear provided to a main assembly of the image forming apparatus. Then, a rotating force of a motor provided to the main assembly is transmitted to a developing roller through the gear provided to the main assembly and the gear provided to the main assembly. In this way, a method of rotating the developing roller is known.

Further, a color electrophotographic image forming apparatus in which a developing rotary rotatable in state in which a plurality of developing devices is mounted to the developing rotary is provided to a main assembly of the apparatus (JP-A Hei 11-015265). In this apparatus, the following cartridge for transmitting a rotating force from the apparatus main assembly to the developing devices is known. Specifically, a main assembly-side coupling (coupling 71) provided to the apparatus main assembly and a developing device-side coupling (coupling gear 65) of developing devices (developing devices 6Y, 6M, 6C) mounted to a developing rotary (multi-color developing device 6) are connected, whereby a rotating force is transmitted from the apparatus main assembly to the developing devices. When the main assembly-side coupling and the developing device-side coupling are connected, the main assembly-side coupling is once retracted into the apparatus (by spring 74) so as not to hinder movement of the developing rotary. Then, the developing rotary is moved, so that a predetermined developing device is moved in a direction in which the main assembly-side coupling is provided. Thereafter, the retracted main assembly-side coupling is moved toward the developing device-side coupling by using a moving mechanism such as a solenoid and the like (solenoid 75, arm 76). In this manner, both of the couplings are connected to each other. Then, a rotating force of a motor provided to the main assembly is transmitted to a developing roller through the main assembly-side coupling and the developing device-side coupling. As a result, the developing roller is rotated. Such a method is known.

However, in the conventional cartridge described in JP-A 2003-202727, a driving connection portion between the main assembly and the developing device constitutes an engaging portion for a gear (gear 35) and a gear (gear 42Y). For this reason, it is difficult to prevent rotation non-uniformity of the developing roller.

In the conventional cartridge described in JP-A Hei 11-015265, as described above, the main assembly-side coupling (coupling 71) is once retracted into the apparatus so as not to hinder the movement of the developing device. Further, during the transmission of the rotating force, it is necessary to move the retracted main assembly-side coupling toward the developing device-side coupling. Thus, it is necessary to provide a mechanism for moving the main assembly-side coupling toward the developing device-side to the apparatus main assembly. Further, for image formation, a time required for movement of the main assembly-side coupling must be considered.

SUMMARY OF THE INVENTION

A principal object of the present invention is to provide a developing apparatus (developing cartridge) capable of solving the above-described problems of the conventional cartridges, an electrophotographic image forming apparatus using the developing apparatus, and a coupling member used in the developing apparatus.

Another object of the present invention is to provide a developing apparatus (developing cartridge) capable of engaging a coupling member provided to the developing apparatus (developing cartridge) with a driving shaft by moving the developing apparatus in a direction substantially perpendicular to an axial direction of the driving shaft even in the case where a main assembly is not provided with a mechanism for moving a main assembly-side coupling member in the axial direction by a solenoid. The object of the present invention is also to provide an electrophotographic image forming apparatus using the developing apparatus and the coupling member used in the developing apparatus.

Another object of the present invention is to provide a developing apparatus (developing cartridge) capable of engaging a driving shaft provided to a main assembly of an electrophotographic image forming apparatus from a direction substantially perpendicular to an axial direction of the driving shaft. The object of the present invention is also to provide the electrophotographic image forming apparatus using the developing apparatus and a coupling member used in the developing apparatus.

Another object of the present invention is to provide a developing apparatus (developing cartridge) capable of smoothly rotating a developing roller compared with the case where driving connection of a main assembly and the developing apparatus is performed through gears. The object of the present invention is also to provide an electrophotographic image forming apparatus using the developing apparatus and a coupling member used in the developing apparatus.

Another object of the present invention is to provide a developing apparatus (developing cartridge) capable of engaging with a driving shaft provided to a main assembly of an electrophotographic image forming apparatus from a direction substantially perpendicular to an axial direction of the driving shaft and capable of smoothly rotating a developing roller. The object of the present invention is also to provide the electrophotographic image forming apparatus using the developing apparatus and a coupling member used in the developing apparatus.

Another object of the present invention is to provide a developing apparatus capable of mounting with and demounting from a driving shaft provided to a main assembly of an electrophotographic image forming apparatus from a direction substantially perpendicular to an axial direction of the driving shaft by movement of a moving member in one direction. The object of the present invention is also to provide the electrophotographic image forming apparatus using the developing apparatus and a coupling member used in the developing apparatus.

Another object of the present invention is to provide a developing apparatus capable of mounting with and demounting from a driving shaft provided to a main assembly of an electrophotographic image forming apparatus from a direction substantially perpendicular to an axial direction of the driving shaft by movement of a moving member in one direction and capable of smoothly rotating a developing roller. The object of the present invention is also to provide the electrophotographic image forming apparatus using the developing apparatus and a coupling member used in the developing apparatus.

Another object of the present invention is to provide a developing apparatus including a coupling member capable of taking a rotating force transmitting angular position for transmitting a rotating force from a main assembly of an electrophotographic image forming apparatus to a developing roller, a pre-engagement angular position at which the coupling member is inclined from the rotating force transmitting angular position and is in a state before being engaged with a rotating force applying portion, and a disengagement angular position at which the coupling member is inclined from the rotating force transmitting angular position in a direction opposite from the pre-engagement angular position to be disengaged from the driving shaft. The object of the present invention is to provide the electrophotographic image forming apparatus using the developing apparatus and the coupling member used in the developing apparatus.

According to the present invention, it is possible to provide a developing apparatus capable of engaging a coupling member provided to the developing apparatus (developing cartridge) with a driving shaft by moving the developing apparatus (developing cartridge) in a direction substantially perpendicular to an axial direction of the driving shaft even in the case where a main assembly is not provided with a mechanism for moving a main assembly-side coupling member in the axial direction by a solenoid. According to the present invention, it is also possible to provide an electrophotographic image forming apparatus using the developing apparatus and the coupling member used in the developing apparatus.

Further, according to the present invention, it is possible to provide a developing apparatus capable of engaging a driving shaft provided to a main assembly of an electrophotographic image forming apparatus from a direction substantially perpendicular to an axial direction of the driving shaft. According to the present invention, it is also possible to provide the electrophotographic image forming apparatus using the developing apparatus and a coupling member used in the developing apparatus.

Further, according to the present invention, it is possible to smoothly rotate a developing roller compared with the case where driving connection of an apparatus main assembly and the developing apparatus is performed through gears.

Further, according to the present invention, it is possible to provide a developing apparatus capable of engaging with a driving shaft provided to a main assembly of an electrophotographic image forming apparatus from a direction substantially perpendicular to an axial direction of the driving shaft and capable of smoothly rotating a developing roller. According to the present invention, it is also possible to provide the electrophotographic image forming apparatus using the developing apparatus and a coupling member used in the developing apparatus.

Further, according to the present invention, it is possible to provide a developing apparatus capable of mounting with and demounting from a driving shaft provided to the apparatus main assembly from a direction substantially perpendicular to an axial direction of the driving shaft by movement of a moving member in one direction. According to the present invention, it is also possible to provide the electrophotographic image forming apparatus using the developing apparatus and a coupling member used in the developing apparatus.

Further, according to the present invention, it is possible to provide a developing apparatus capable of mounting with and demounting from a driving shaft provided to the apparatus main assembly from a direction substantially perpendicular to an axial direction of the driving shaft by movement of a moving member in one direction and capable of smoothly rotating a developing roller. According to the present invention, it is also possible to provide the electrophotographic image forming apparatus using the developing apparatus and a coupling member used in the developing apparatus.

Further, according to the present invention, it is possible to provide a developing apparatus including a coupling member capable of taking a rotating force transmitting angular position for transmitting a rotating force from the apparatus main assembly to a developing roller, a pre-engagement angular position at which the coupling member is inclined from the rotating force transmitting angular position and is in a state before being engaged with a rotating force applying portion, and a disengagement angular position at which the coupling member is inclined from the rotating force transmitting angular position in a direction opposite from the pre-engagement angular position to be disengaged from the driving shaft.

Further, according to the present invention, it is possible to engage and disengage a coupling member provided to a developing apparatus with respect to a driving shaft provided to an apparatus main assembly from a direction substantially perpendicular to an axial direction of the driving shaft by movement of a moving member in one direction.

Further, according to the present invention, it is possible to engage and disengage a coupling member provided to a developing apparatus with respect to a driving shaft provided to an apparatus main assembly from a direction substantially perpendicular to an axial direction of the driving shaft by movement of a moving member in one direction and also possible to smoothly rotate a developing roller.

Further, according to the present invention, even when a main assembly is not provided with a mechanism for moving a main assembly-side coupling member for transmitting a rotational force to a developing roller in an axial direction of the coupling member by a solenoid, it is possible to engage a coupling member provided to a developing apparatus with a driving shaft by movement of a moving member. As a result, according to the present invention, it is possible to realize an improvement in image forming speed.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 5 is a perspective view of a developing roller according to an embodiment of the present invention.

FIG. 31 is a perspective view of the coupling according to the embodiment of the present invention.

FIG. 59 is a perspective view illustrating a driving input gear according to an embodiment of the present invention.

FIG. 72 is a perspective view illustrating a driving input gear according to an embodiment of the present invention.

DETAILED DESCRIPTION OF THE PREFERRED EMBODIMENTS

Hereinbelow, a developing cartridge, an electrophotographic image forming apparatus, and a coupling member according to the present invention will be described with reference to the drawings.

In the following embodiments, a developing cartridge of the type in which a user can mount and demount the developing cartridge with respect to an apparatus main assembly. However, the present invention is also applicable to a developing device which is used in a state in which it is mounted and fixed to the main assembly.

Figure 6:
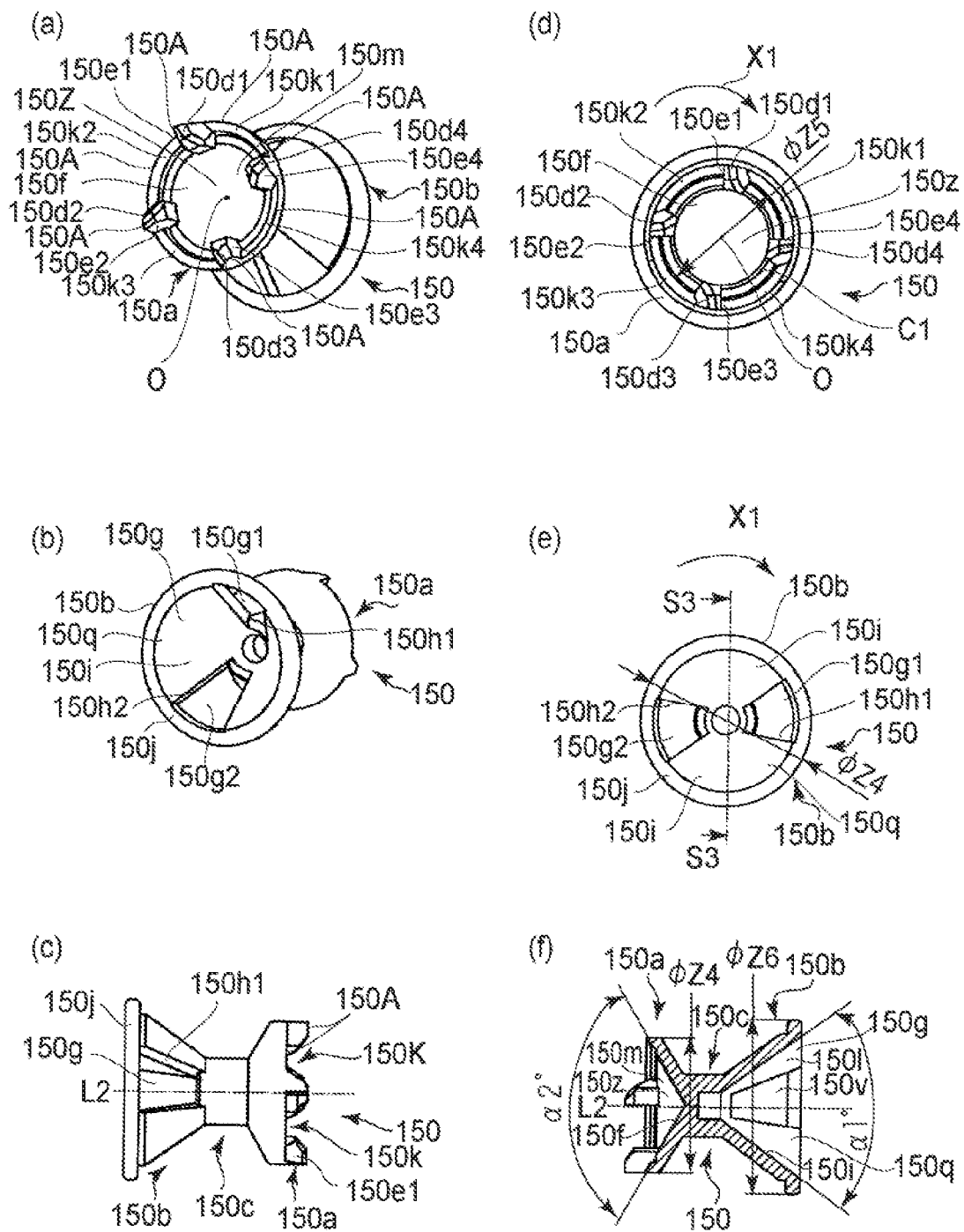
FIG. 6 is a perspective view and a longitudinal sectional view of a coupling according to an embodiment of the present invention.
Figure 75:
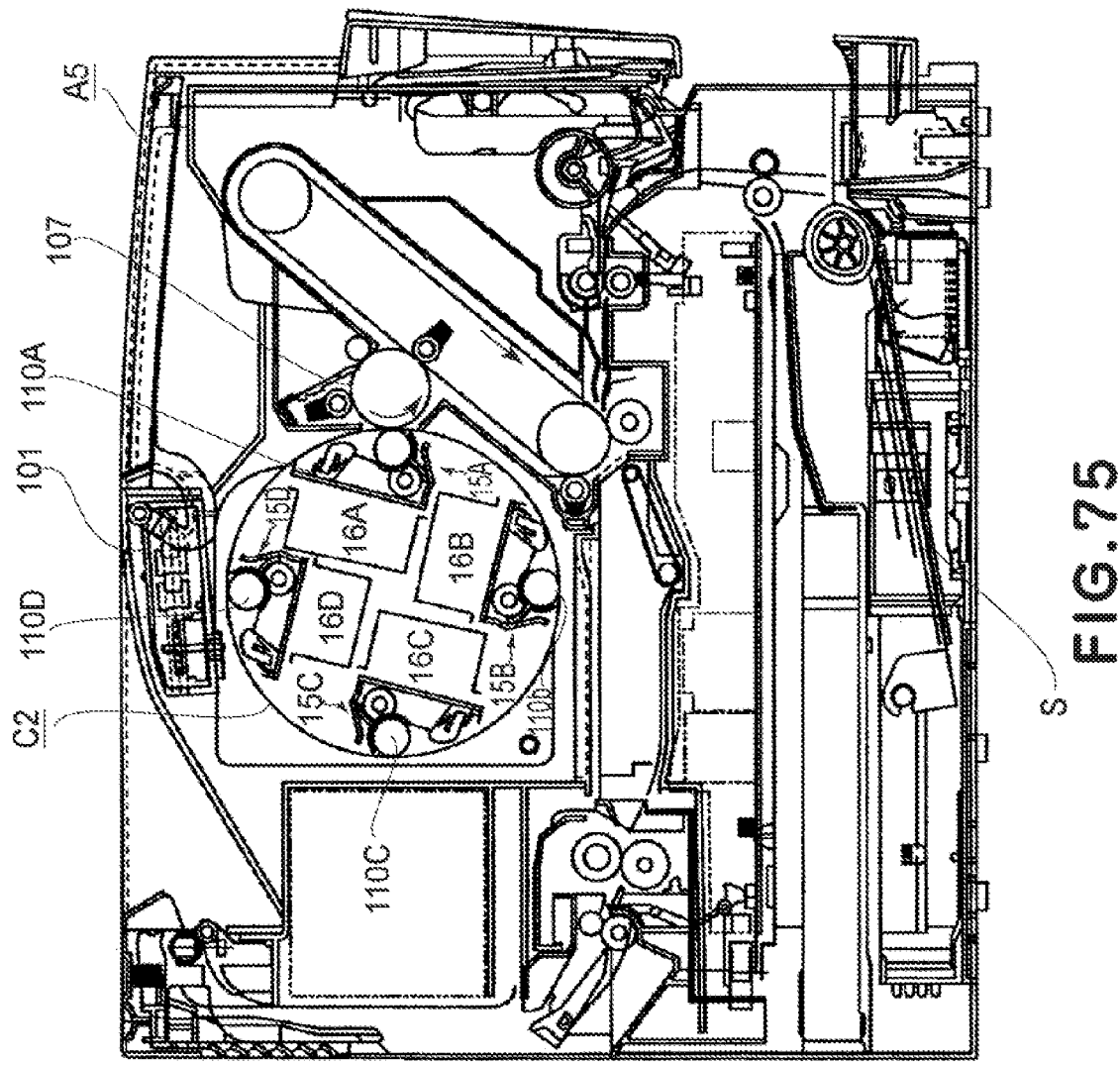
FIG. 75 is a sectional view of the apparatus main assembly according to the embodiment of the present invention.

Further, the present invention is specifically applicable to a single coupling member (e.g., those shown in FIG. 6(*a*), 14(*a*3), 28(*c*), 30 and 77(*b*)), a developing device (developing cartridge) (e.g., those shown in FIGS. 2, 57 and 60), and an electrophotographic image forming apparatus (e.g., those shown in FIGS. 5 and 75).

Embodiment 1

(1) Brief Description of Developing Cartridge (Developing Device)

Figure 1:
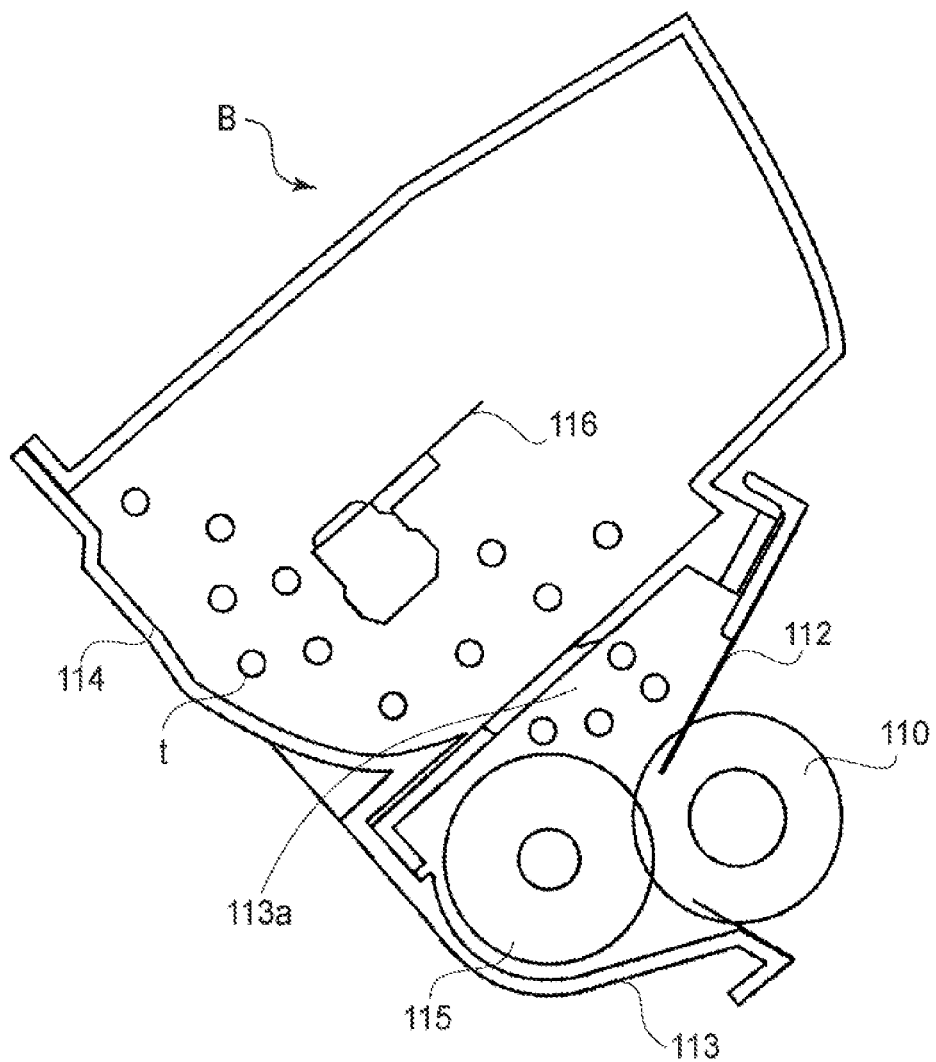
FIG. 1 is a side sectional view of a developing cartridge according to an embodiment of the present invention.
Figure 2:
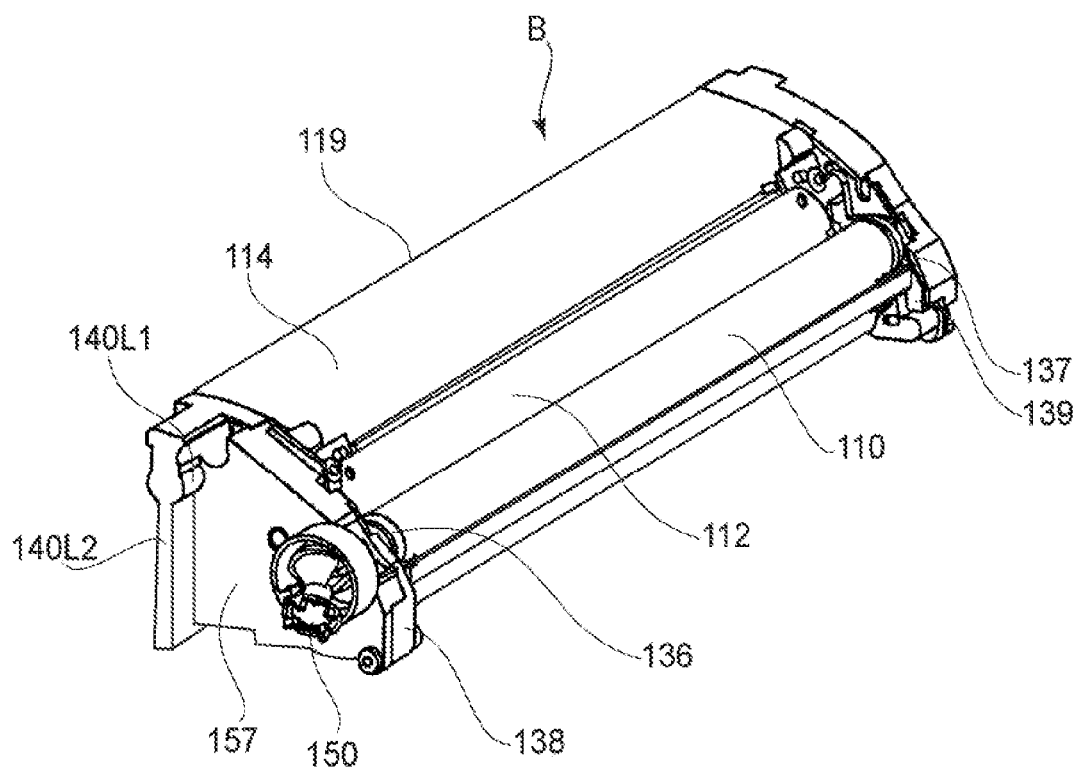
FIG. 2 is a perspective view of the developing cartridge according to the embodiment of the present invention.
Figure 3:
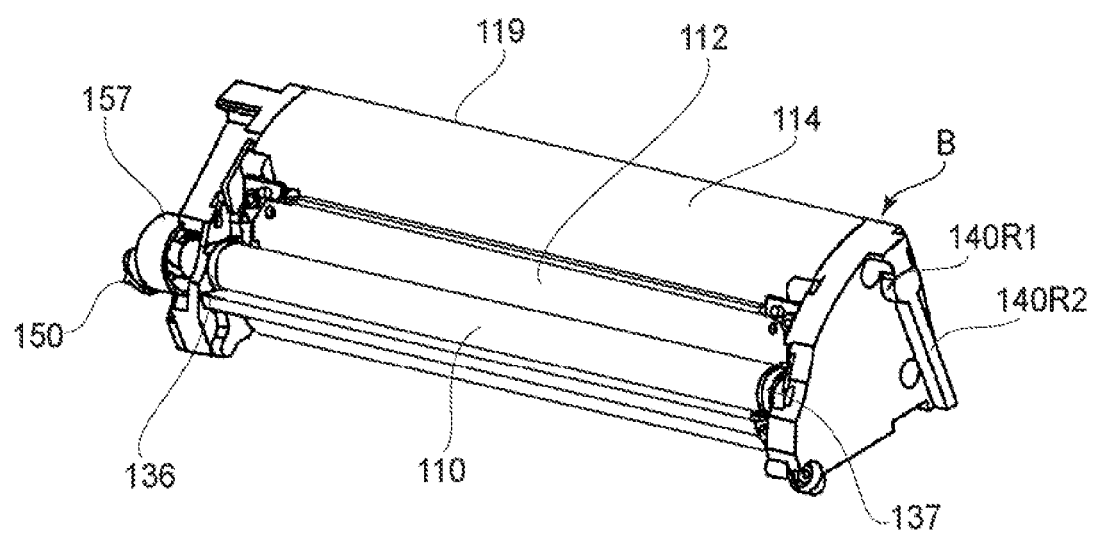
FIG. 3 is a perspective view of the developing cartridge according to the embodiment of the present invention.
Figure 4:
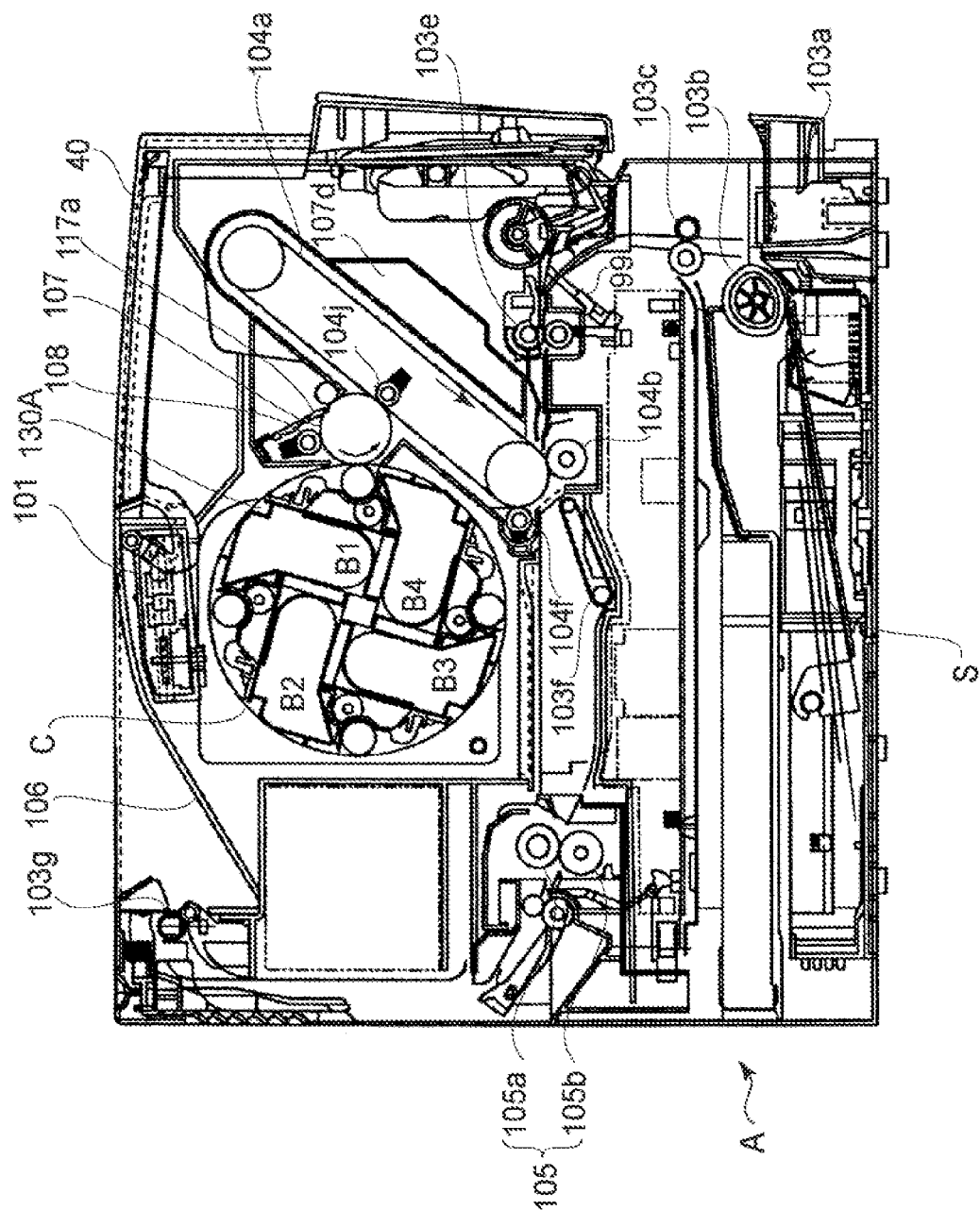
FIG. 4 is a side sectional view of a main assembly of an electrophotographic image forming apparatus according to an embodiment of the present invention.

First, with reference to FIGS. 1 to 4, a developing cartridge B as a developing device to which an embodiment of the present invention is applied (hereinafter simply referred to as a "cartridge") will be described. FIG. 1 is a sectional view of the cartridge B. FIGS. 2 and 3 are perspective views of the cartridge B. FIG. 4 is a sectional view of a color electrophotographic image forming apparatus main assembly A (hereinafter referred to as an "apparatus main assembly").

This cartridge B can be mounted to and demounted from a rotary C provided to the apparatus main assembly A by a user.

Referring to FIGS. 1 to 3, the cartridge B includes a developing roller 110. The developing roller is rotated by receiving a rotating force from the apparatus main assembly A through a coupling mechanism described later during a developing function. In a developer accommodating frame 114, a developer t of a predetermined color is accommodated. This developer is fed to a developer chamber 113a in a predetermined amount by rotation of a stirring member 116. The fed developer is supplied to a surface of the developing roller by rotation of a sponge-like developer supplying roller 115 in the developer chamber 113a. This developer is formed in a thin layer by being supplied with electric charges by triboelectric charge between a thin plate-like developing blade 112 and the developing roller 110.

The developer formed in the thin layer on the developing roller 110 is fed to a developing position by rotation. By applying a predetermined developing bias to the developing roller 110, an electrostatic latent image formed on an electrophotographic photosensitive member (hereinafter referred to as a "photosensitive drum") 107 is developed. That is, the electrostatic latent image is developed by the developing roller 110.

Further, developer which does not contribute to the development of the electrostatic latent image, i.e., residual developer removing on the surface of the developing roller 110 is removed by the developer supplying roller 115. At the same time, a fresh developer is supplied to the surface of the developing roller 110 by the developer supplying roller 115. In this manner, a developing operation is successively performed.

The cartridge B includes a developing unit 119. The developing unit 119 includes a developing device frame 113 and the developer accommodating frame 114. The developing unit 119 further includes the developing roller 110, the developing blade 112, the developer supplying roller 115, the developer chamber 113a, the developer accommodating frame 14, and the stirring member 116.

The developing roller 110 is rotatable about an axial line L1.

Here, the developing cartridge B is mounted by the user to a developing cartridge accommodating portion 130A provided to a rotation selecting mechanism (developing rotary) C of the apparatus main assembly A. At this time, as described later, a driving shaft of the apparatus main assembly A and a coupling member as a rotating driving force transmitting part of the cartridge B are connected to each other in interrelation with such an operation that the cartridge B is positioned at a predetermined position (opposing portion to the photosensitive drum) by the developing rotary (rotation selecting mechanism) C. Thus, the developing roller 110 and the like are rotated by receiving a driving force from the apparatus main assembly A.

(2) Description of Electrophotographic Image Forming Apparatus

With respect to FIG. 4, a color electrophotographic image forming apparatus using the developing cartridge B described will be described. In the following, description will be made by taking a color laser beam printer as an example of the color electrophotographic image forming apparatus.

As shown in FIG. 4, a plurality of cartridges B (B1, B2, B3, B4) accommodating developers (toners) different in color is mounted to the rotary C. The mounting and demounting of the cartridge B with respect to the rotary C are performed by the user. By rotating the rotary C, a cartridge B accommodating a developer of a predetermined color is disposed opposite to the photosensitive drum 107.

Then, an electrostatic latent image formed on the photosensitive drum 107 is developed. The developed image is transferred onto a recording material S. This developing and transferring operation is performed for each of the colors. As a result, a color image is obtained. Hereinbelow, specific description will be made. The recording material S is a material on which an image can be formed and include, e.g., paper, an OHP sheet, and the like.

Referring to FIG. 4, the photosensitive drum 107 is irradiated with light based on image information from an optical means 101. By this irradiation, an electrostatic latent image is formed on the photosensitive drum 107. The electrostatic latent image is developed with a developer by the developing roller 110. The developer image formed on the photosensitive drum 107 is transferred onto an intermediary transfer member.

Next, the developer image transferred onto an intermediary transfer belt 104a as the intermediary transfer member is transferred onto the recording material S by a second transfer means. Then, the recording material S onto which the developer image is transferred is conveyed to a fixing means 105 including a pressing roller 105a and a heating roller 105b. The developer image transferred onto the recording material S is fixed on the recording material S. After the fixation, the recording material S is discharged on a tray 106.

An image forming step will be described more specifically.

In synchronism with rotation of the intermediary transfer belt 104a, the photosensitive drum 107 is rotated counterclockwisely (FIG. 4). Then, a surface of the photosensitive drum 107 is electrically charged uniformly by a charging roller 108. The surface of the photosensitive drum 107 is irradiated with light depending on image information, e.g., about a yellow image by the optical (exposure) means 101. Thus, a yellow electrostatic latent image is formed on the photosensitive drum 107.

The exposure means 101 is constituted as follows. The exposure means 101 irradiates the photosensitive drum 107 with high on the basis of the image information read from an external device (not shown). As a result, the electrostatic latent image is formed on the photosensitive drum 107. The exposure means 101 includes a laser diode, a polygon mirror, a scanner motor, an imaging lens, and a reflection mirror.

From the unshown external device, an image signal is sent. By this operation, the laser diode emits light depending on the image signal and the polygon mirror is irradiated with the light (as image light). The polygon mirror is rotated at a high speed by the scanner motor to reflect the image light, so that the surface of the photosensitive drum 107 is selectively exposed to the image light through the imaging lens and the reflection mirror. As a result, the electrostatic latent image depending on the image information is formed on the photosensitive drum 107.

Simultaneously with this electrostatic latent image formation, the rotary C is rotated, whereby a yellow cartridge B1 is moved to a developing position. Then, a predetermined developing bias is applied to the developing roller 110. As a result, a yellow developer is deposited on the electrostatic latent image, so that the electrostatic latent image is developed with the yellow developer. Thereafter, a bias voltage of an opposite polarity to that of the developer is applied to a pressing roller (a primary transfer roller) 104j for the intermediary transfer belt 104a, so that the yellow developer image on the photosensitive drum 107 is primary-transferred onto the intermediary transfer belt 104a.

As described above, after the primary transfer of the yellow developer image is completed, the rotary C is rotated. As a result, a subsequent cartridge B2 is moved to be located at a position opposite to the photosensitive drum 107. The above-described process is performed with respect to a magenta cartridge B2, a cyan cartridge B3, and a black cartridge B4. In this way, by repeating the process for each of magenta, cyan, and black, four color developer images are superposed on the intermediary transfer belt 104a.

Incidentally, the yellow cartridge B1 accommodates the yellow developer and forms the yellow developer image. The magenta cartridge B2 accommodates a magenta developer and forms a magenta developer image. The cyan cartridge B3 accommodates a cyan developer and forms a cyan developer image. The black cartridge B4 accommodates a black developer and forms a black developer image.

During the image formation described above, a secondary transfer roller 104b is in a noncontact state with the intermediary transfer belt 104a. A cleaning charging roller 104f is also in a noncontact state with the intermediary transfer belt 104a.

After the four color developer images are formed on the intermediary transfer belt 104a, the secondary transfer roller 104b is pressed against the intermediary transfer belt 104a (FIG. 4). In synchronism with the press contact of the secondary transfer roller 104b, the recording material S waiting at a position in the neighborhood of a registration roller pair 103e is sent to a nip between the transfer belt 104a and the transfer roller 104b. At the same time, a recording material S is fed from a cassette 103a by a feeding roller 103b and a conveying roller pair 103c as a feeding (conveying) means 103.

Immediately before the registration roller pair 103e, a sensor 99 is disposed. The sensor 99 detects a leading end of the recording material S and stops the rotation of the registration roller pair 103e, thus placing the recording material S in a standby state at a predetermined position.

To the transfer roller 104b, a bias voltage of an opposite polarity to that of the developer is applied, so that the developer images on the transfer belt 104a are simultaneously secondary-transferred onto the conveyed recording material S.

The recording material S onto which the developer images are transferred and conveyed to the fixing means 105 through a conveying belt unit 103f. By the fixing means 105, fixation of the developer images is performed. The recording material S subjected to the fixation is discharged on a discharging tray 106 disposed at an upper portion of the apparatus main assembly by a discharging roller pair 103g. In this way, formation of an image o the recording material S is completed.

After completion of the secondary transfer, the charging roller 104f is pressed against the transfer belt 104a, so that the surface of the belt 104a and the developer remaining on the surface of the belt 104a are supplied with the predetermined bias voltage. As a result, a residual electric charge is removed.

The residual developer subjected to the charge removal is electrostatically re-transferred from the belt 104a onto the photosensitive drum 107 through a primary transfer nip. As a result, the surface of the belt 104a is cleaned. The residual developer re-transferred onto the photosensitive drum 107 after the secondary transfer is removed by a cleaning blade 117a contacting the photosensitive drum 107. The removed developer is collected din a residual developer box 107d through a conveying passage (not shown).

Incidentally, an accommodating portion 130a is a chamber in which the above-descried cartridge B is accommodated and is provided to the rotary C at a plurality of positions. The rotary C is rotated in one direction in a state in which the cartridge B is mounted in the chamber. As a result, a coupling member (described later) of the cartridge B is connected to a driving shaft 180 provided to the apparatus main assembly A and disconnected from the driving shaft 180. The cartridge B (developing roller 110) is moved in a direction substantially perpendicular to an axial line L3 direction of the driving shaft 180 depending on the movement of the rotary C in one direction.

(3) Constitution of Developing Roller

Next, with reference to FIGS. 5(a) and 5(b), a constitution of the developing roller 110 will be described. FIG. 5(a) is a perspective view of the developing roller 110 as seen from a receiving side of a driving force from the main assembly A to the developing roller 110 (hereinafter simply referred to as a "driving side"). FIG. 5(b) is a perspective view of the developing roller 110 as seen from a side opposite from the driving side with respect to the axial direction of the developing roller 110 (hereinafter referred to as a "non-driving side").

The developing roller 110 includes a developing shaft 153 and a rubber portion 110a. The developing shaft 153 is formed of an electroconductive material such as iron or the like in an elongated shaft shape and is covered with the rubber portion 110a at a portion except for both end portions with respect to the axial direction. The developing shaft 153 is rotatably supported by the developing device frame 113 through bearings (not shown) at both end engaging portions 153d1 and 153d2. Further, a cartridge 150 described later is positioned at an end portion 153b on the driving side. The cartridge 150 is engaged with a rotating force transmitting pin 155 described later to transmit a driving force. The rubber portion 110 coaxially covers the developing shaft 153. The rubber portion 110 carries the developer and develops the electrostatic latent image by application of a bias to the developing shaft 153.

Nip width regulating members 136 and 137 are members for regulating a nip width of the developing roller 110 with respect to the photosensitive drum 107 at a constant value.

The unshown bearings are disposed at the both end portions 153d1 and 153d2 of the developing roller 110 so as to support rotatably the developing roller 110 on the developing device frame 113 (FIG. 1).

A developing gear (not shown) is disposed at the driving-side end portion 153d1 of the developing roller 110 and fixed to the developing shaft 153. The unshown developing gear transmits the rotating force received from the apparatus main assembly A to the developing roller 110 to other rotating members (e.g., the developer supplying roller 115, the stirring member, and the like) of the developing cartridge B.

Next, the driving-side end portion of the developing shaft 153 at which the cartridge 150 is movably (pivotably, swingably) mounted will be described more specifically. The end portion 153b has a spherical shape so that the axial line L2 of the cartridge 150 (described later) can be inclined smoothly. In the neighborhood of an end of the developing shaft 153, the driving force transmitting pin 155 for receiving the rotating force from the cartridge 150 is disposed in a direction crossing the axial line L1 of the developing shaft 153.

The pin 155 as the rotating force transmitting portion is formed of metal and fixed to the developing shaft 153 by a method such as press fitting, bonding, or the like. The fixing position may be any position at which a driving force (rotating force) can be transmitted, i.e., a direction crossing the axial line L1 of the developing shaft (developing roller). It is desirable that the pin 155 passes through a spherical center P2 (FIG. 10b) of the end portion 153b of the developing shaft 153. This is because a transmission diameter of the rotating force is always kept at a constant level even in the case where the axial line L1 of the developing shaft 153 and the axial line L2 of the cartridge 150 are somewhat deviated from each other. For this reason, it is possible to realize stable rotating force transmission. The rotating force transmitting point may be provided at any positions. However, in order to transmit a driving torque (rotating force) with reliability and improve an assembly property, a single pin 155 is employed in this embodiment. The pin 155 is passed through the center P2 of the end spherical surface 153b. As a result, the pin 155 (155a1 and 155a2) is disposed so as to be projected at positions 180-degree opposite from each other at a peripheral surface of the driving shaft. That is, the rotating force is transmitted a two points. In this embodiment, the pin 155 is fixed at the end portion side within 5 mm from the end of the drum shaft 153. However, the present invention is not limited thereto.

Incidentally, a main assembly-side developing electric contact (not shown) is disposed in the apparatus main assembly A so as to contact a non-driving-side end portion 153c of the electroconductive developing shaft 153. An electric contact (not shown) of the developing cartridge and the main assembly-side developing electric contact are brought into contact with each other. In this way, a high-voltage bias is supplied from the apparatus main assembly A to the developing roller 110.

(4) Description of Rotating Driving Force Transmitting Part (Coupling, Coupling Member)

An embodiment of the coupling (coupling member) which is a rotating driving force transmitting part as a principal constituent-element of the present invention will be described with reference to FIGS. 6(a) to 6(f). FIG. 6(a) is a perspective view of the coupling as seen from the apparatus main assembly side and FIG. 6(b) is a perspective view of the coupling as seen from the photosensitive drum side. FIG. 6(c) is a view of the coupling as seen from a direction perpendicular to a direction of a coupling rotating axis L2. FIG. 6(d) is a side view of the coupling as seen from the apparatus main assembly side and FIG. 6(e) is a view of the coupling as seen from the photosensitive drum side. FIG. 6(f) is a sectional view of the coupling taken along S3-S3 line shown in FIG. 6(d).

The developing cartridge B is detachably mounted to the cartridge accommodating portion 130a in the rotary C provided in the apparatus main assembly A. This mounting is performed by the user. The rotary C is rotationally driven and stopped at a position at which the cartridge B reaches a predetermined position (developing position at which the cartridge B is located opposite to the photosensitive drum 107). By this operation, the coupling (coupling member) 150 is engaged with a driving shaft 180 provided to the apparatus main assembly A. Further, the rotary C is rotated in one direction to move the cartridge B from the predetermined position (developing position). That is, the cartridge B is retracted from the predetermined position. As a result, the coupling 150 is moved apart from the driving shaft 180. The coupling 150 receives the rotating force from a motor 64 (FIG. 17) provided to the apparatus main assembly A in a state of engagement with the driving shaft 180. The coupling 150 transmits the rotating force to the developing roller 110.

As a result, the developing roller 110 is rotated by the rotating force received from the apparatus main assembly A.

As described above, the driving shaft 180 has a pin 182 (rotating force applying portion) and is rotated by the motor 64.

A material for the coupling 150 is a resin material such as polyacetal, polycarbonate, or the like. In order to enhance rigidity of the coupling 150, it is also possible to enhance the rigidity by incorporating glass fiber or the like into the resin material depending on a load torque. Further, it is also possible to employ a metal material. Thus, the material for the coupling 150 may be appropriately selectable. However, the resin-made coupling can be easily processed, so that the respective cartridges in this embodiment are formed of the resin material.

The coupling 150 mainly comprises three portions.

The first portion is engageable with the drive shaft 180 (which will be described hereinafter) as shown in FIG. 6(c), and it is a driven portion 150a for receiving the rotational force from the rotational force transmitting pin 182 which is a rotational force applying portion (main assembly side rotational force transmitting portion) provided on the drive shaft 180. In addition, the second portion is engageable with the pin 155 provided to the developing device shaft 153, and it is a driving portion 150b for transmitting the rotational force to the developing roller 110. In addition, the third portion is an intermediate portion 150c for connecting the driven portion 150a and the driving portion 150b with each other (FIG. 8 (c) and (f)).

As shown in FIG. 6(f) the driven portion 150a is provided with a drive shaft insertion opening portion 150m which expands toward the rotation axis L2. The driving portion 150b has a developing device shaft insertion opening portion 150l.

The opening 150m is defined by a conical driving shaft receiving surface 150f which expands toward the drive shaft 180 (FIGS. 9 to 13) side. The receiving surface 150f constitutes a recess 150z as shown in FIG. 6 (f). The recess 150z includes the opening 150m at a position opposite from the developing roller 110 with respect to the direction of the axis L2.

By this, regardless of rotation phase of the developing roller 110 in the cartridge B, the coupling 150 can move (pivot) among a pre-engagement angular position (FIG. 22(a)), a rotational force transmitting angular position (FIG. 22(d)), and a disengaging angular position (FIGS. 25(a) (d)) relative to the axis L3 of the drive shaft 180 without being prevented by the free end portion 182a of the drive shaft 180. The details thereof will be described hereinafter.

A plurality of projections (the engaging portions) 150d (150d1-150d4) are provided at equal intervals on a circumference about the axis L2 on an end surface of the recess 150z. Between the adjacent projections 150d, entrance portions 150k (150k1, 150k2, 150k3, 150k4) are provided. An interval between the adjacent projections 150d1-150d4 is larger than the outer diameter of the pin 182, so that the rotational force transmitting pins provided to the drive shaft 180 (rotational force applying portions) 182 are received. The pins are the rotational force applying portions. The recesses between the adjacent projections are the entrance portions 150k1-150k4. When the rotational force is transmitted to the coupling 150 from the drive shaft 180, the pins 182 are received by any of the entrance portions 150k1-150k4. In addition, in FIG. 6 (d), the rotational force reception surfaces (rotational force receiving portions) 150e (150e1-150e4) are provided in the upstream with respect to the clockwise direction (X1) of each projection 150d. The receiving surface 150e1-150e4 is extended in the direction crossing with the rotational direction of the coupling 150. More particularly, the projection 150d1 has a receiving surface 150e1, the projection 150d2 has a receiving surface 150e2, the projection 150d3 has a receiving surface 150e3, and, a projection 150d4 has a receiving surface 150e4. In the state where the drive shaft 180 rotates, the pin 182a1, 182a2 contacts to any of the receiving surfaces 150e. By doing so, the receiving surface 150e contacted by the pin 182a1, 182a2 is pushed by the pin 182. By this, the coupling 150 rotates about the axis L2.

In order to stabilize the transmission torque transmitted to the coupling 150 as much as possible, it is desirable to dispose the rotational force receiving surfaces 150e on a phantom circle (the same circumference) that has a center O on the axis L2(FIG. 6(d)). By this, the rotational force transmission radius is constant and the torque transmitted to the coupling 150 is stabilized. In addition, as for the projections 150d, it is preferable that the position of the coupling 150 is stabilized by the balance of the forces which the coupling 150 receives. For that reason, in this embodiment, the receiving surfaces 150e are disposed at the diametrically opposed positions (180 degrees). More particularly, in this embodiment, the receiving surface 150e1 and the receiving surface 150e3 are diametrically opposed relative to each other, and the receiving surface 150e2 and the surface 150e4 are diametrically opposed relative to each other. By this arrangement, the forces which the coupling 150 receives constitute a force couple. Therefore, the coupling 150 can continue rotary motion only by receiving the force couple. For this reason, the coupling 150 can rotate without the necessity of being specified in the position of the rotation axis L2 thereof. In addition, as for the number thereof, as long as the pins 182 of the drive shaft 180 (the rotational force applying portion) can enter the entrance portions 150k(150k1-150k2), it is possible to select suitably. In this embodiment, as shown in FIG. 6, the four receiving surfaces are provided. This embodiment is not limited to this example. For example, the receiving surfaces 150e (projections 150d1-150d4) do not need to be disposed on the same circumference (the phantom circle C1 and FIG. 6(d)). Or, it is not necessary to dispose at the diametrically opposed positions. However, the effects described above can be provided by disposing the receiving surfaces 150e as described above.

Here, in this embodiment, the diameter of the pin is approximately 2 mm, and a circumferential length of the entrance portion 150k is approximately 8 mm. The circumferential length of the entrance portion 150k is an interval between adjacent projections 150d (on the phantom circle). The dimensions are not limiting to the present invention.

Similarly to the opening 150m, a developing device shaft insertion opening portion 150l has a conical rotational force receiving surface 150i of an as an expanded part which expands toward the developing device shaft 153. The receiving surface 150i constitutes a recess 150q, as shown in FIG. 6 (f).

By this, irrespective of the rotation phase of the developing roller 110 in the cartridge B, the coupling 150 can move (pivot, swing) among a rotational force transmitting angular position, a pre-engagement angular position, and a disengaging angular position to the axis L1 without being prevented by the free end portion of the developing device shaft 153. The recess 150q is constituted in the illustrated example by a conical receiving surface 150i which it has centering on the axis L2. The standby openings 150g 1 or 150g2 ("opening") are provided in the receiving surface 150i (FIG. 6(b)). As for the coupling 150, the pins 155 can be inserted into the inside of this opening 150g 1 or 150g2 so that it may be mounted to the developing device shaft 153. And, the size of the openings 150g 1 or 150g2 is larger than the outer diameter of the pin 155. By doing so, irrespective of the rotation phase of the developing roller 110 in the cartridge B, the coupling 150 is movable (pivotable, swingable) among the rotational force transmitting angular position and the pre-engagement angular position (or disengaging angular position) as will be described hereinafter without being prevented by the pin 155.

More particularly, the projection 150d is provided adjacent to the free end of the recess 150z. And, the projections (projection portions) 150d project in the intersection direction crossing with the rotational direction in which the coupling 150 rotates, and are provided with the intervals along the rotational direction. And, in the state where the cartridge B is mounted to the rotary C, the receiving surfaces 150e engage to or abutted to the pin 182, and are pushed by the pin 182 receiving the force from the rotating drive shaft.

By this, the receiving surfaces 150e receive the rotational force from the drive shaft 180. In addition, the receiving surfaces 150e are disposed in equidistant from the axis L2, and constitute a pair interposing the axis L2 they are constituted by the surface in the intersection direction in the projections 150d. In addition, the entrance portions (recesses) 150k are provided along the rotational direction, and they are depressed in the direction of the axis L2.

The entrance portion 150k is formed as a space between the adjacent projections 150d. In the state where the cartridge B is mounted to the rotary C in the case where the drive axis stops its rotation, the pin 182 enters the entrance portion 150k when the coupling engages with the drive shaft 180. And, the pin 182 of the rotating drive shaft 180 pushes the receiving surface 150e. Or, in the case where the drive shaft 180 has already rotated when the coupling engages with the drive shaft 180, the pin 182 enters the entrance portion 150k and pushes the receiving portion 150e.

By this, the coupling 150 rotates.

The rotational force receiving surface (rotational force receiving member (portion)) 150e may be disposed inside of the driving shaft receiving surface 150f. Or, the receiving surface 150e may be provided in the portion outwardly projected from the receiving surface 150f with respect to the direction of the axis L2. When the receiving surface 150e is disposed inside of the receiving surface 150f, the entrance portion 150k is disposed inside of the receiving surface 150f.

More particularly, the entrance portion 150k is the recess provided between the projections 150d in the inside of the arc part of the receiving surface 150f. In addition, when the receiving surface 150e is disposed at the position which outwardly projects, the entrance portion 150k is the recess positioned between the projections 150d. Here, the recess may be a through hole extended in the direction of the axis L2, or it may be closed at one end thereof. More particularly, the recess is provided by the space region provided between the projection 150d. And, what is necessary is just to be able to enter the pin 182 into the region in the state where the cartridge B is mounted to the rotary C.

These structures of the standing-by portion apply similarly to the embodiments as will be described hereinafter.

In FIG. 6 (e), the rotational force transmission surfaces (the rotational force transmitting portions) 150h and (150h 1 or 150h2) are provided in the upstream, with respect to the counterclockwise direction (X2), of the opening 150g 1 or 150g2. And, the rotational force is transmitted to the developing roller 110 from the coupling 150 by the convection sections 150*h* 1 or 150*h*2 contacting to the pins 155*a*1, 155*a*2. More particularly, the transmitting surfaces 150*h* 1 or 150*h*2 push the side surface of the pin 155. By this, the coupling 150 rotates with the center thereof aligned with the axis L2. The transmitting surface 150*h*1 or 150*h*2 is extended in the direction crossing with the rotational direction of the coupling 150.

Similarly to the projection 150*d*, it is desirable to dispose the transmitting surfaces 150*h*1 or 150*h*2 diametrically opposed relative to each other on the same circumference.

At the time of manufacturing the drum coupling member 150 with an injection molding, the intermediate portion 150*c* may become thin. This is because the coupling is manufactured so that the driving force receiving portion 150*a*, the driving portion 150*b* and the intermediate portion 150*c* have a substantially uniform thickness. When the rigidity of the intermediate portion 150*c* is insufficient, therefore, it is possible to make the intermediate portion 150*c* thick so that driven portion 150*a*, the driving portion 150*b*, and the intermediate portion 150*c* have the substantially equivalent thickness.

(6) Shape of Supporting Member

Figure 7:
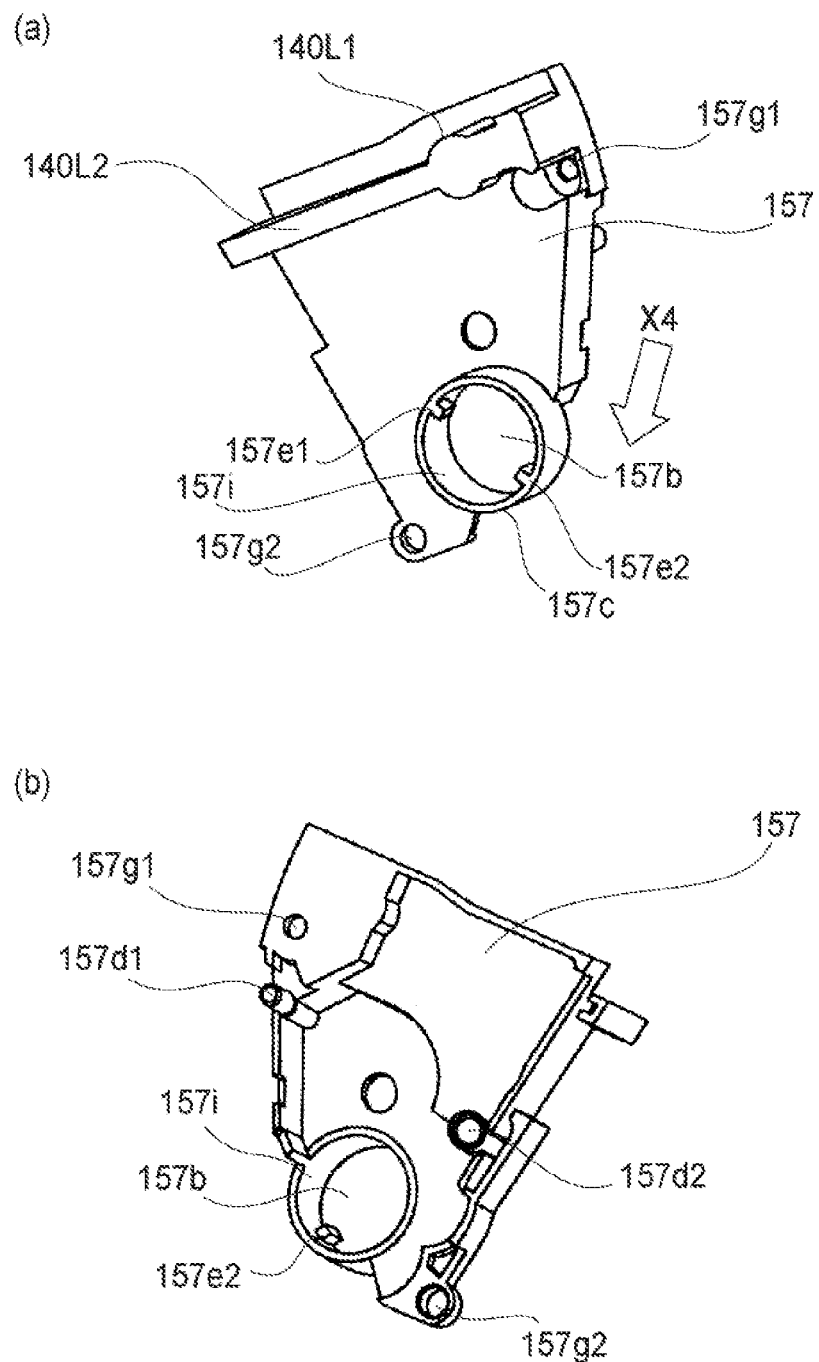
FIG. 7 is a perspective view of a development supporting member according to an embodiment of the present invention.

The description will be made, referring to FIG. 7, about a supporting member (mounting member) 157. FIG. 7 (*a*) is a perspective view, as seen from a drive shaft side, and FIG. 7 (*b*) is a perspective view, as seen from the developing roller side.

The supporting member 157 has functions of holding the coupling 150 and positioning the cartridge B in the rotary C. Further, it has the function of supporting the coupling 150 so that the rotational force can be transmitted to the developing roller 110.

More particularly, the supporting member 157 mounts the cartridge 150 to the cartridge 150.

As shown in FIG. 7 the supporting member includes a guide 140L2 during mounting and demounting of the cartridge B with respect to an accommodating portion 130*a* provided to the rotary C and a cylinder 140L1 for positioning the cartridge B in the accommodating portion 130*a*. And, the coupling 150 described above is disposed in an inner space 157*b* of a cylinder portion 157*c* provided coaxially with the developing roller (not shown). At an inner peripheral surface 157*i* constituting the space 157*b*, ribs 157*e*1 and 157*e*2 for retaining the coupling 150 in the cartridge B are provided. The ribs 157*e*1 and 157*e*2 are provided opposite to each other with respect to a movement direction X4 of the cartridge B (rotational direction of the rotary C). The supporting member 157 is provided with positioning portions 157*d*1 and 157*d*2 for fixing it to the developing device frame 113 and provided with holes 157*g*1 or 157*g*2 which penetrate the fixing screw.

(6) Supporting Constitution of Coupling with Respect to Cartridge Frame

Figure 8:
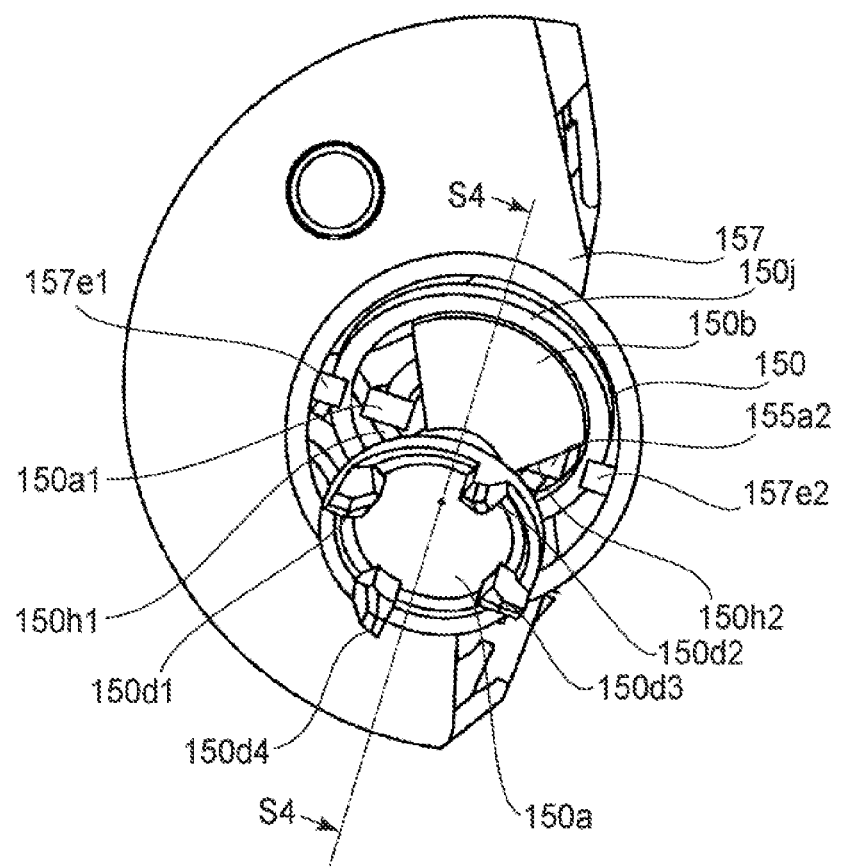
FIG. 8 is a perspective view of a coupling according to an embodiment of the present invention.
Figure 9:
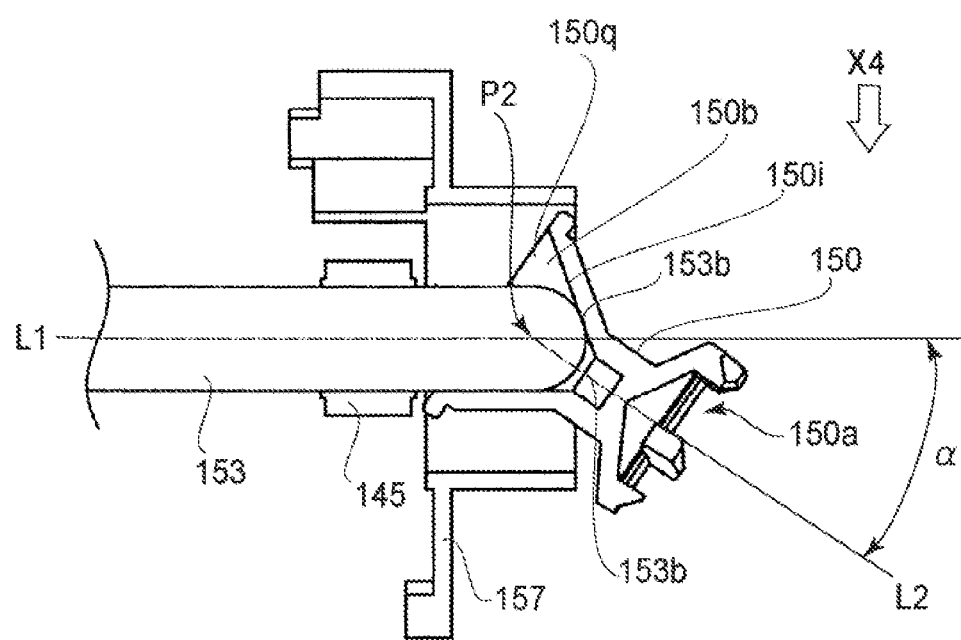
FIG. 9 is a sectional view of a side of the developing cartridge according to an embodiment of the present invention.
Figure 10:
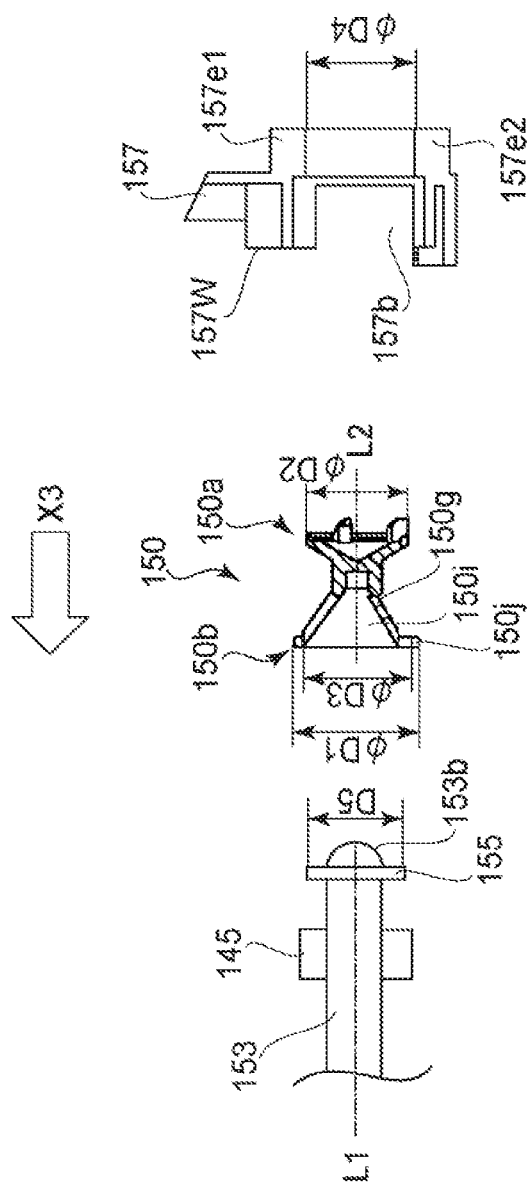
FIG. 10 is an exploded view of a coupling member according to an embodiment of the present invention.
Figure 11:
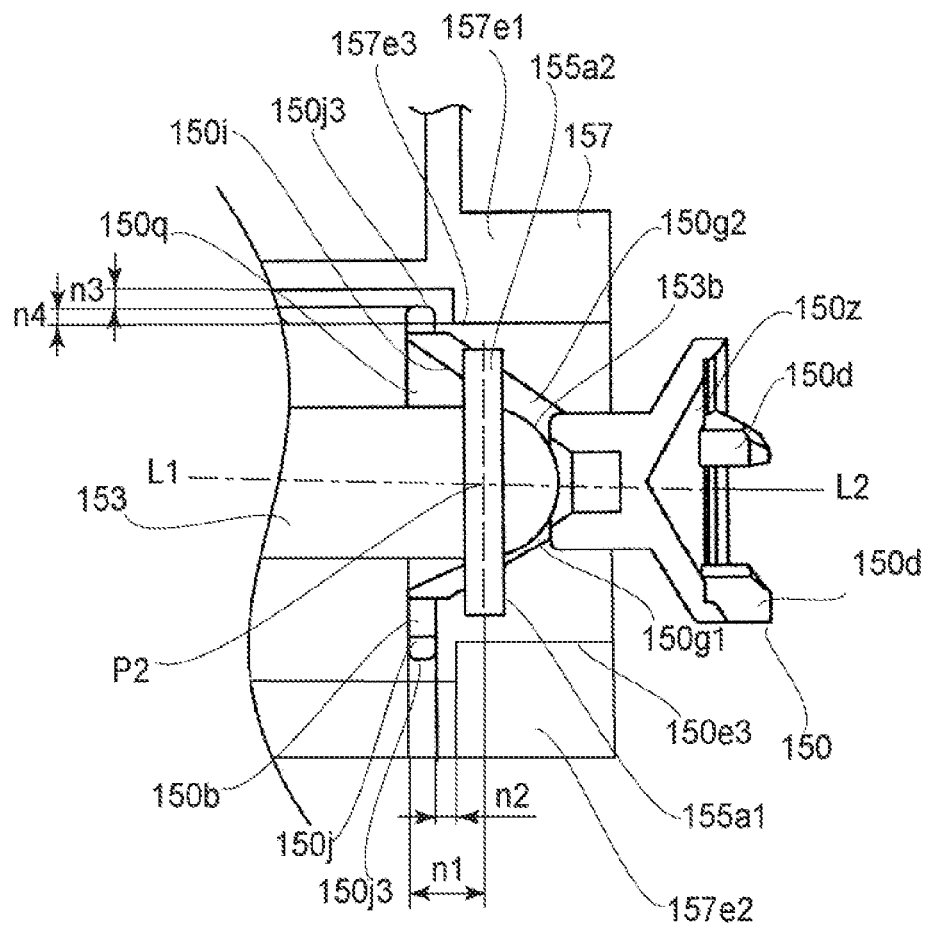
FIG. 11 is a longitudinal sectional view of the developing cartridge according to an embodiment of the present invention.
Figure 12:
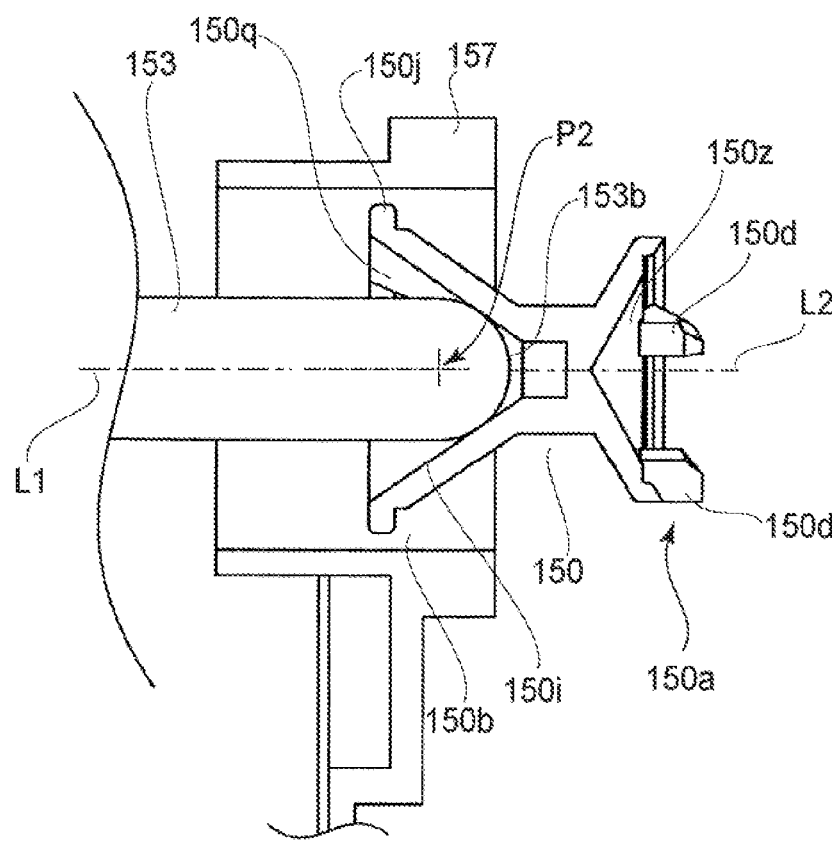
FIG. 12 is a longitudinal sectional view of the developing cartridge according to the embodiment of the present invention.
Figure 13:
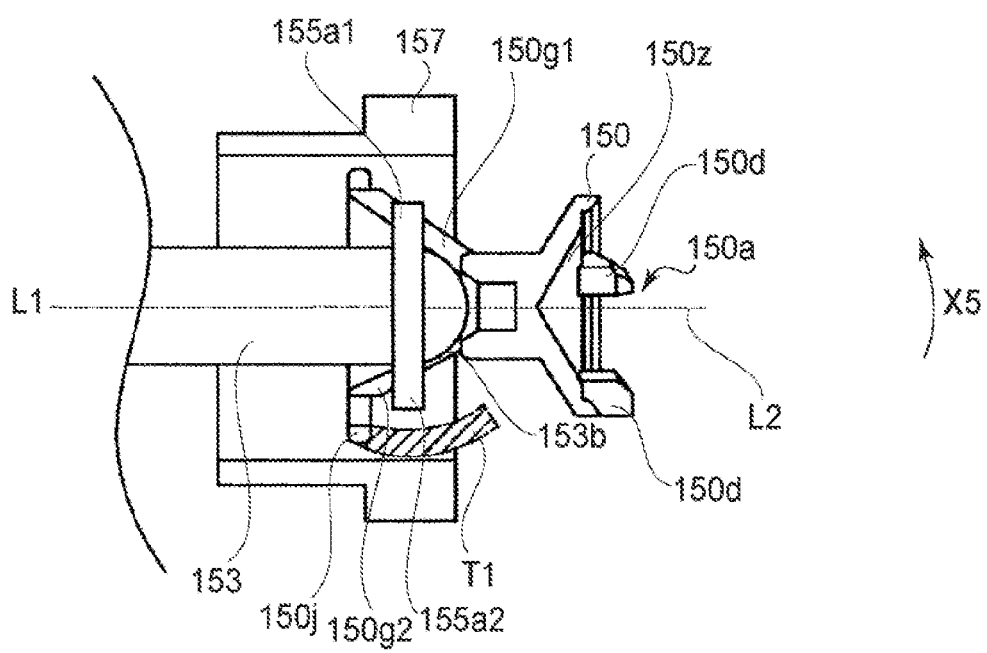
FIG. 13 is a longitudinal sectional view of the developing cartridge according to the embodiment of the present invention.
Figure 14:
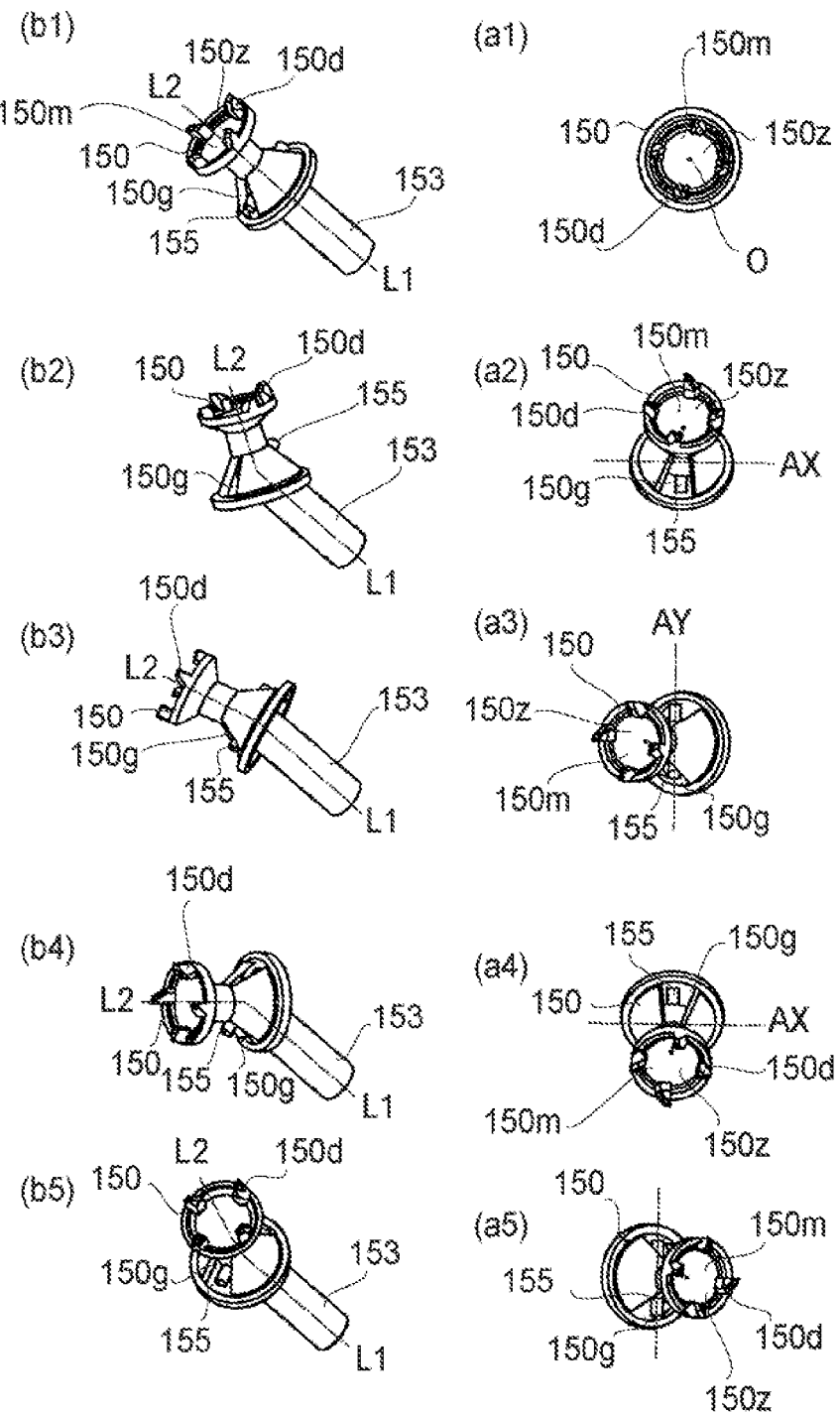
FIG. 14 is a perspective view of a coupling according to the embodiment of the present invention.

Referring to FIG. 8-FIG. 13, the description will be made as to the supporting constitution (mounting constitution) of the developing roller 110 and the coupling 150 with respect to the developing device frame (cartridge frame) 113. FIG. 8 is an enlarged view, as seen from the driving side, of the major part around the developing roller of the cartridge. FIG. 9 is a sectional view taken along S4-S4 of FIG. 8. FIG. 10 is a sectional view, taken along a developing axis L1, which illustrate the state before mounting of the coupling and supporting member. FIG. 11 is a sectional view which illustrates a state after the mounting. FIG. 12 is a sectional view when the axis L2 of the coupling is substantially coaxially aligned with the axis L1 of the developing roller. FIG. 13 is a sectional view which illustrates a state after rotating the coupling through 90 degrees from the state of FIG. 12. FIG. 14 is a perspective view which illustrates the combined state of the developing roller shaft and the coupling. FIG. 14(*b*1)-(b5) are perspective views, and FIG. 15(*a*1)-(a5) are views as seen from the axis L1 direction.

As shown in FIG. 14 the coupling 150 is mounted so that the axis L2 thereof can incline in any direction relative to the axis L1 of the developing roller shaft 153 (developing roller).

In FIG. 14 (*a*1) and FIG. 14 (*b*1), the axis L2 of the coupling 150 is co-axial with the axis L1 of the developing roller 153. The state when the coupling 150 is inclined upward from this state is illustrated in FIG. 14 (*a*2) and FIG. 14 (*b*2). As shown in these figures, when the axis L2 is inclined toward the opening 150*g* side, the pin moves within the opening 150*g* when these members are relatively viewed on the basis of the coupling. As a result, the coupling 150 is inclined about an axis AX (FIG. 12 (*a*2)) perpendicular to the opening 150*a*.

In FIG. 14 (*b*3), the state where the coupling 150 is inclined rightward is shown. As shown in this Figure, when the axis L2 inclines in the orthogonality direction of the opening 150*g*, the pin rotates within the opening 150*g* when these members are relatively viewed on the basis of the coupling. The axis of rotation is the axis AY (FIG. 14(*a*3)) of the transmission pin 155.

The states where the coupling 150 is inclined downward and leftward are shown in FIGS. 14(*a*4) and (*b*4) and FIGS. 14 (*a*5) and (*b*5), respectively. The coupling 150 inclined about each of the axes AX and AY.

In the directions different from the inclining direction described in the foregoing, for example, at an intermediate position in the inclination direction in FIGS. 14 (*a*2) and 14 (*a*3), and at each of intermediate positions in the inclination directions in FIGS. 14 (*a*3) and 14 (*a*4) and FIGS. 14 (*a*5) and 14 (*a*2), the inclination is made by combining the rotations in the directions of the rotational axes AX and AY. Thus, the axis L2 can be pivoted in any direction relative to the axis L1. At this time, the pin 155 is provided to the developing roller shaft 153. More particularly, the pin 155 projects from a peripheral surface of the developing roller shaft 153. The coupling 150 disposed opposite to the pin 155 is provided with the opening 150*g*. A size of the opening 150*g* is set so that the pin does not interfere with the pin when the axis L2 inclined relative to the axis L1.

More particularly, the transmitting surface (rotational force transmitting portion) 150*h* is movable relative to the pin (rotational force receiving portion) 155 (FIG. 14). The pin 155 has the transmitting surface 150 in the movable condition. And, the transmitting surface 150*h* and the pin 155 are engaged to each other in the rotational direction of the coupling 150. Further, the gap is provided between the transmitting surface 150*h* and the pin 155. By this, the coupling 150 is movable (pivotable, swingable) in all directions substantially relative to the axis L1.

It has been mentioned that the axis L2 is slantable or inclinable in any direction relative to the axis L1. However, the axis L2 does not necessarily need to be linearly slantable to the predetermined angle in the full range of 360-degree direction in the coupling 150. For example, the opening 150*g* can be selected to be slightly wider in the circumferential direction. By doing so, the time of the axis L2 inclining relative to the axis L1, even if it is the case where it cannot incline to the predetermined angle linearly, the coupling 150 can rotate to a slight degree around the axis L2. Therefore, it can be inclined to the predetermined angle. In other words, the amount of the play in the rotational direction of the opening 150g is selected properly if necessary.

In this manner, the coupling 150 is revolvable or swingable over the full-circumference substantially relative to the axis L1 of the developing roller 110. More particularly, the coupling 150 is pivotable over the full-circumference thereof substantially relative to the drum shaft 153.

Furthermore, as will be understood from the foregoing explanation, the coupling 150 is capable of whirling in and substantially over the circumferential direction of the drum shaft 153. Here, the whirling motion is not a motion with which the coupling itself rotates about the axis L2, but the inclined axis L2 rotates about the axis L1 of the developing roller although the whirling here does not preclude the rotation of the coupling per se about the axis L2 of the coupling 150.

It has been mentioned that the axis L2 is slantable or inclinable in any direction relative to the axis L1. However, the axis L2 does not necessarily need to be linearly slantable to the predetermined angle in the full range of 360-degree direction in the coupling 150. For example and the opening 150g can be selected to be slightly wider in the circumferential direction. By doing so, the time of the axis L2 inclining relative to the axis L1, even if it is the case where it cannot incline to the < > predetermined angle linearly and the coupling 150 can rotate to a slight degree around the axis L2. Therefore, it can be inclined to the predetermined angle. In other words, the amount of the play in the rotational direction of the opening 150g is selected properly if necessary, in this manner and the coupling 150 is revolvable or swingable over the full-circumference substantially relative to drum shaft (rotational force receiving member) 153. More particularly and the coupling 150 is pivotable over the full-circumference thereof substantially relative to the drum shaft 153, furthermore and as will be understood from the foregoing explanation, the coupling 150 is capable of whirling in and substantially over the circumferential direction of the drum shaft 153. Here and the whirling motion is not a motion with which the coupling itself rotates about the axis 12 and but the inclined axis L2 rotates about the axis L1 of the photosensitive drum and although the whirling here does not preclude the rotation of the coupling per se about the axis L2 of the coupling 150.

In addition, the range movable in all directions substantially is the range in which when the user mounts the cartridge B to the apparatus main assembly A, the coupling can move to the rotational force transmitting angular position irrespective of the phase of the drive shaft having the rotational force applying portion. In addition, it is the range in which, in disengaging the coupling from the drive shaft, the coupling can move to the disengaging angular position irrespective of the stop angle phase of the drive shaft.

In addition, the coupling is provided with a gap between the rotational force transmitting portion (rotational force transmitting surface 150h, for example), and the rotational force transmitting portion and the rotational force receiving portion (pin 155, for example) to engage, so that it is pivotable in all directions substantially relative to the axis L1. In this manner, the coupling is mounted to the end of the cartridge B. For this reason, the coupling is the movable substantially in all directions relative to the axis L1.

This structure is similar in the embodiments of the coupling as will be described hereinafter.

The assemblying processes will be described.

After mounting the developing roller 110 rotatably to the developing device frame 113, the pin 155 is mounted to the development shaft 153. Thereafter, the development gear 145 is assembled to the development shaft 153.

Thereafter, as shown in FIG. 10, the coupling 150 and the supporting member 157 are inserted in the direction X3. First, the driving portion 150b is inserted toward the direction X3 downstream, while maintaining the axis L2 of the coupling 150 in parallel with X3. At this time, the phase of the pin 155 of the development shaft 153 and the phase of the opening 150g of the coupling 150 are matched with each other, and the pin 155 is made inserted into the openings 150g1 or 150g2. And, the free end portion 153b of the development shaft 153 is abutted to the receiving surface 150i the coupling 150. The free end portion 153b of the development shaft 153 is the spherical surface and the receiving surface 150i the coupling 150 is a conic surface. Therefore, the driving portion 150b side of the coupling 150 is positioned to the center (the center of the spherical surface) of the free end portion 153b of the development shaft 153. As will be described hereinafter, when the coupling 150 rotates by the transmission of the driving force (rotational force) from the apparatus main assembly A, the pin 155 positioned in the opening 150g will be contacted to the rotational force transmission surfaces 150h1 or 150h2 and (FIG. 6b). By this, the rotational force can be transmitted. Thereafter, one 157w of the end of surfaces of the supporting member 157 is inserted downstream with respect to the direction X3. By this, a part of coupling 150 is received in the space portion 157b of the supporting member 157. And, the supporting member 157 is fixed in the developing frame 113, thus, an integral developing cartridge B is established.

The dimensions of the various portions of the coupling 150 will be described. As shown in FIG. 10 (c), a maximum outer diameter of the driven portion 150a of the coupling 150 is ΦD2, a maximum outer diameter of the driving portion 150b is ΦD1, and a small diameter of the opening 150g is ΦD3. In addition, a maximum outer diameter of the pin 155 is ΦD5, and an inner diameter of the retention rib 157e of the supporting member 157 is ΦD4. Here, the maximum outer diameter is the outer diameter of a maximum rotation locus about the rotational axis L1 of the developing roller 110. The maximum outer diameters ΦD1, and ΦD3 relating to the coupling 150 are the outer diameter of maximum rotation locus about the axis L2. At this time, since ΦD5<ΦD3 is satisfied, the coupling 150 can be assembled to the predetermined position by the straight mounting operation in the direction X3 therefore, the assembling property is high. The diameter of the inner surface ΦD4 of the retention rib 157e of the bearing member 157 is larger than ΦD2 of the coupling 150, and smaller than ΦD1 (ΦD2<ΦD4<ΦD1). By this, just the step attached to the direction X3 straight is sufficient to assemble the supporting member 157 to the predetermined position. For this reason, the assembling property can be improved (the state after the assembly is shown in FIG. 11).

As shown in FIG. 11, the retention rib 157e of the supporting member 157 is disposed closely to a flange portion 150j of the coupling 150 in the direction of the axis L1. More specifically, in the direction of the axis L1, the distance from an end surface 150j1 of the flange portion 150j to the axis of the pin 155 is n1. In addition, the distance from an end surface 157e1 of the rib 157e to the other end surface 157j2 of the flange portion 150j is n2. The distance n2<distance n1 is satisfied.

In addition, with respect to the direction perpendicular to the axis L1, the flange portion 150j and the ribs 157e1, 157e2 are disposed so that they are overlapped relative to each other. More specifically, the distance n4 (amount of the overlapping) from the inner surface 157e3 of the rib 157e to the outer surface 150j3 of the flange portion 150j is the overlap amount n4 with respect to the orthogonality direction of the axis L1.

By such settings, the pin 155 is prevented from disengaging from the opening 150g. That is, the movement of the coupling 150 is limited by the bearing member 157. Thus, the coupling 150 does not disengage from the cartridge. The prevention of disengagement can be accomplished without additional parts. The dimensions described above are desirable from the standpoint of reduction of manufacturing and assemblying costs. However, the present invention is not limited to these dimensions.

Figure 17:
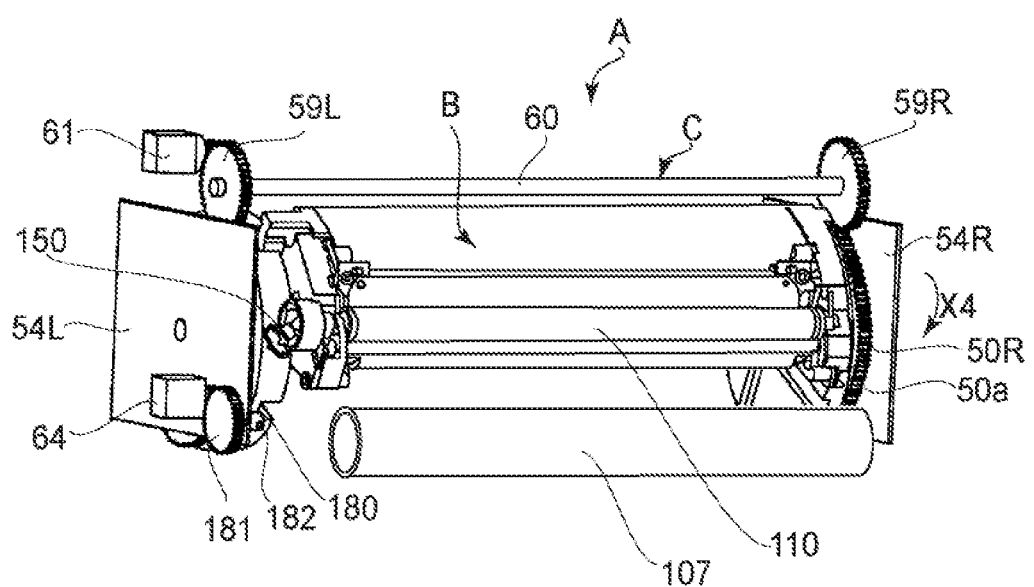
FIG. 17 is a perspective view of the rotary according to the embodiment of the present invention.

As described above FIGS. 9, 11 and 12, the receiving surface 150i which is the recess 150q of the coupling 150 is in contact with the free end surface 153b of the development shaft 153 which is the projection. Therefore, the coupling 150 is swung along the free end portion (the spherical surface) 153b about the center P2 of the free end portion (the spherical surface) 153b in other words, the axis L2 is movable substantially in all directions irrespective of the phase of the drum shaft 153. The axis L2 of the coupling 150 is movable (pivotable, revolvable, movable) in all directions substantially. As will be described hereinafter, in order that the coupling 150 may engage with the drive shaft 180, the axis L2 is inclined toward the downstream with respect to the rotating direction of the rotary C relative to the axis L1, just before the engagement. In other words, as shown in FIG. 17, the axis L2 inclines so that the driven portion 150a of the coupling 150 positions at the downstream side with respect to the rotational direction X4 of the rotary.

The still more detailed description will be made.

As shown in FIG. 12, a distance n3 between a maximum outer diameter part and supporting member 157 of the driving portion 150b the coupling 150 is selected so that a slight gap is provided between them. By this, the coupling 150 is pivotable.

As shown in FIG. 7, the ribs 157e1 and 157e2 are semi-circular ribs extending in parallel with the axis L1. The ribs 157e1 and 157e2 are perpendicular to the rotational direction X4.

In addition, a distance n2 (FIG. 11) in the direction of the axis L1 from the rib 157e to the flange portion 150j is shorter than a distance n1 from the center of the pin 155 to the driving portion 150b side edge. By this, the pin 155 does not disengage from the openings 150g1 and 150g1. Therefore, as shown in FIG. 9, the driven portion 150a is greatly pivotable in the direction X4 relative to the axis L2 the coupling 150. In other words, the driving portion 150b is greatly pivotable toward the side not provided with the rib 150e (perpendicular to the sheet of the drawing). FIG. 9 illustrates the state after the axis L2 is inclined. In addition, the coupling 150 can also be movable to the state substantially parallel to the axis L1 as shown In FIG. 12 from the state of the inclined axis L2 as shown in FIG. 9. In this manner, the ribs 157e1 and 157e2 are disposed. By doing so, the axis L2 of the coupling 150 can be made pivotable relative to the axis L1, and in addition, the developing frame and 13 can be prevented from disengaging from the coupling 150. Both of the effects can be provided.

The coupling 150 has a play (the distance n2) in the direction of the axis L1 relative to the development shaft 153. Therefore, the receiving surface 150i (the conic surface) may not always contact snuggly the drum shaft free end portion 153b (the spherical surface). In other words, the center of the pivoting may deviate from the center of curvature P2 of the spherical surface. However, even in such a case, the axis L2 is rotatable or pivotable relative to the axis L1. For this reason, the purpose of this embodiment can be accomplished.

In addition, maximum possible inclination angle α (FIG. 9) between the axis L1 and the axis L2 is limited to one half of the taper angle (α1, FIG. 6(f)) between the axis L2 and the receiving surface 150i. The apex angle of the conical shape of the receiving surface 150i the coupling 150 can be properly selected. By doing so, the inclination angle α 4 of the coupling 150 are set to the optimal value. The shape of the columnar portion 153a of the development shaft 153 may be simply cylindrical. By this, the manufacturing cost can be saved.

The width of the opening 150g in the standby state is selected so that the pin 155 may not interfere when the axis L2 inclines, as described hereinbefore.

The locus of the flange portion 150j when the driven portion 150a side inclines in the direction X5 is illustrated by the region T1 in FIG. 13. As shown in the Figure, even if the coupling 150 inclines, the interference with the pin 155 does not occur, and therefore, the flange portion 150j can be provided over the full-circumference of the coupling 150 (FIG. 6(b)). In other words, the shaft receiving surface 150i has conical shape, and therefore, when the coupling 150 inclines, the pin 155 does not enter in the region T1. For this reason, the cutting away range of the coupling 150 is minimized. Therefore, the rigidity of the coupling 150 can be assured.

Figure 15:
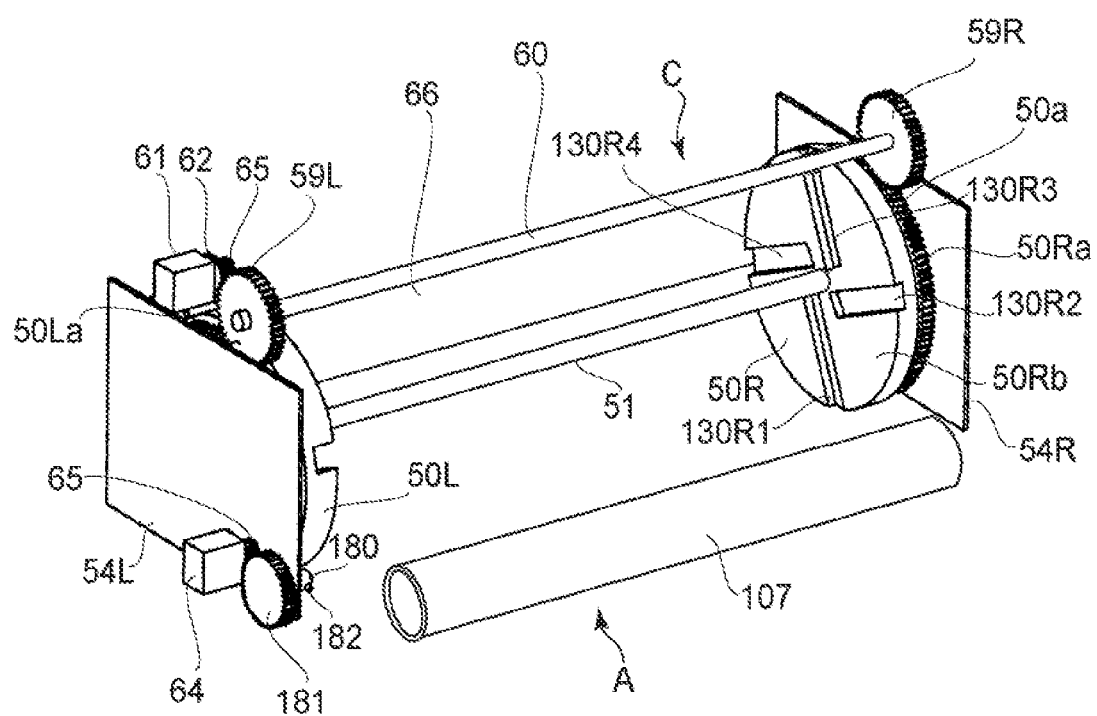
FIG. 15 is a perspective view of a rotary member (hereinafter called "rotary") according to the embodiment of the present invention.
Figure 16:
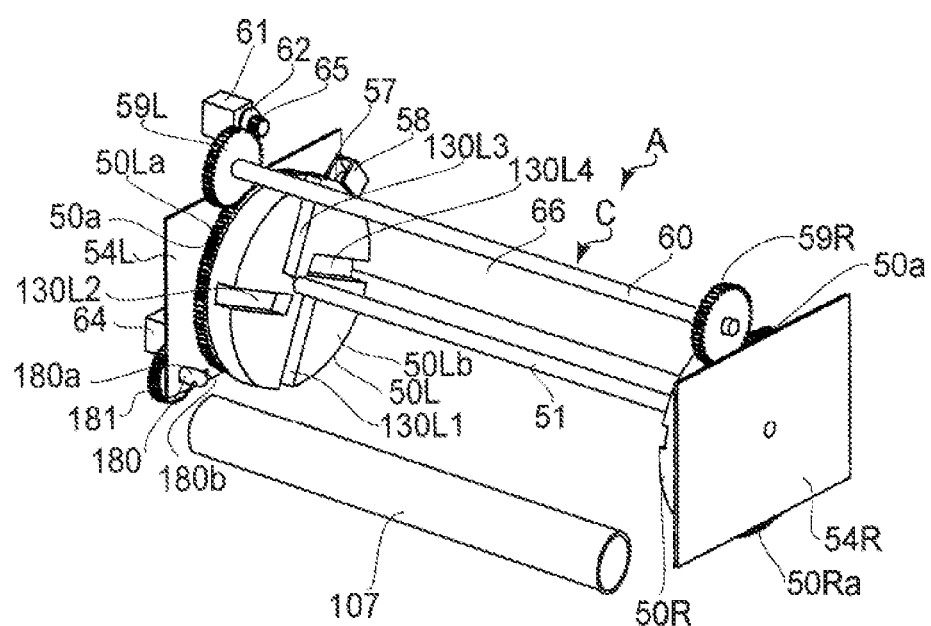
FIG. 16 is a perspective view of the rotary according to the embodiment of the present invention.

(7) Description of Constitution of Rotary (Moving Member, Rotation Selecting Mechanism) of Apparatus Main Assembly Next, with reference to FIGS. 15 to 21, a constitution of the rotary C as the moving member will be described. FIGS. 15 and 16 are perspective views of the rotary C in a state in which the developing cartridge B is not mounted. FIG. 17A is a perspective view showing a state in which a single developing cartridge B is mounted to the rotary C. FIGS. 18 to 21 are side views showing the rotary C, the photosensitive drum 107, a driving train, and the developing cartridge B.

In the axial line L1 direction, rotary flanges 50L and 50R are provided at both end portions. Outside the rotary flanges 50L and 50R in the axial line L1 direction, rotary side plates 54L and 54R are provided, respectively. The rotary flanges 50L and 50R and a central shaft 51 thereof are rotatably supported by the side plates 54L and 54R located outermostly in the axial line L1 direction.

At opposing surfaces 50Lb and 50Rb of the pair of flanges 50L and 50R, groove-like main assembly guides 130L1, 130L2, 130L3, 130L4, 130R1, 130R2, 130R3, and 130R4 used during mounting and demounting of the cartridge B with respect to the rotary C (accommodating portion 130A) are provided. Along these main assembly guides provided to the apparatus main assembly A, cartridge-side guides 140R1, 140R2, 140L1, and 140L2 (FIGS. 2 and 3) of the cartridge B are inserted. That is, the cartridge B is mountable to and demountable from the rotary C. The cartridge B is detachably mounted to the rotary C by the user.

More specifically, at one end of the cartridge B (B1) with respect to a longitudinal direction of the cartridge B (B1), the guides 140R1 and 140R2 are provided. Further, at the other longitudinal end of the cartridge B (B1), the guides 140L1 and 140L2 are provided. The user holds the cartridge B and inserts the guides 140R1 and 140R2 into the guide 130R1 provided to the rotary C. Similarly, the user inserts the guides 140L1 and 140L2 into the guide 130L1 provided to the rotary C. In this way, the cartridge B is detachably mounted to the accommodating portion 130A provided to the rotary C by the user. That is, the cartridge B is guided by the above-described guides and is mounted to and demounted from the accommodating portion 130A with respect to a direction crossing the longitudinal direction of the cartridge B (developing roller 110). The cartridge B is mounted in a direction in which the longitudinal direction intersects a rotational direction X4 of the rotary C. Therefore, the cartridge B (coupling) provided at one longitudinal end of the cartridge B is moved in a direction substantially perpendicular to the driving shaft 180 by rotation of the rotary C. The cartridge B mounted to the rotary C is liable to rotate about arcuate guides 140R1 and 140L1 when a rotating force is transmitted from the apparatus main assembly A to the cartridge B. However, elongated guides 140R2 and 140L2 contact inner surfaces of grooves of the guides 130R1 and 130 L1, so that the cartridge B is positional with respect to the rotary C. That is, the cartridge B is detachably accommodated in the accommodating portion 130A.

Similarly, the cartridge B (B2) is guided by the guides 130R2 and 130L2 provided to the rotary C and detachably mounted to the accommodating portion 130A. The cartridge B (B3) is guided by the guides 130R3 and 130L3 provided to the rotary C and detachably mounted to the accommodating portion 130A. The cartridge B (B4) is guided by the guides 130R4 and 130L4 provided to the rotary C and detachably mounted to the accommodating portion 130A.

That is, the cartridge B is detachably accommodated by the user in the accommodating portion 130A provided to the rotary C.

FIG. 17 shows a state in which the developing cartridge B is mounted in the apparatus main assembly 4 (rotary C).

Each of the developing cartridges B is positioned with respect to the rotary C and is rotated by rotation of the rotary C. At this time, the developing cartridge B is fixed to the rotary C by an urging spring, a lock, or the like (not shown) so that a position of the developing cartridge B is not deviated by the rotation of the rotary C.

To the other rotary side plate 54L, a driving mechanism for rotating the developing roller (not shown) is provided. That is, a developing device driving gear 181 engages with a pinion 65 fixed to a motor shaft of the motor 64. When the motor starts rotation, a rotating force is transmitted to the gear 181. The driving shaft 180 coaxially disposed with the gear 181 starts rotation. As a result, the rotating force of the driving shaft 180 is transmitted to the developing roller 110 and the like through the coupling 150. Incidentally, in this embodiment, the driving shaft 180 has started rotation before the engagement of the coupling 150. However, timing of the start of rotation of the driving shaft 180 can be appropriately selectable.

The cartridge B rotates together with the pair of rotary flanges 50L and 50R. That is, the rotary C stops its rotation when it is rotated a predetermined angle. As a result, the cartridge B is positioned at a position (developing position) opposite to the photosensitive drum 107 provided to the apparatus main assembly A. The coupling 150 engages with the driving shaft 180 substantially simultaneously with the positioning and stop of the cartridge B. That is, a recess 1502 covers an end of an end portion 180b of the driving shaft 180.

The driving shaft 180 has the substantially same constitution as the above-described developing shaft. That is, the driving shaft 180 includes a spherical end portion 180b and a pin 182 penetrating an almost center of a principal portion 180a of its cylindrical shape. By this pin 182, a rotating force (driving force) is transmitted to the cartridge B through the coupling 150.

To the rotary C, the four color cartridges B are mounted. Here, pressure application of the cartridges B to the photosensitive drum 107 is performed in the following manner.

As described above, the flanges 50L and 50R are rotatably supported by the rotary side plates 54L and 54R. The rotary side plates 54L and 54R at both ends are positioned and fixed to side plates (not shown of the apparatus main assembly A through a swingable shaft 60 rotatably disposed above the rotary side plates 54L and 54R. In other words, the cartridge B, the rotary flanges 50, and the rotary side plates 54 are integrally swung about the swingable shaft 60. That is, integral swinging movement of the cartridge B and the rotary C is performed. As a result, the cartridge B is pressed against or separated from the photosensitive drum 107.

This pressing and separating operation performed by pressing up a rotary stay 66 disposed between the rotary side plates 54L and 54R by rotation of a cam (not shown).

Further, as described with reference to FIG. 15, the driving shaft 180 is positioned and mounted at a predetermined position of the apparatus main assembly A with respect to a radial direction and an axial substantially. Further, the cartridge B is also positioned at a predetermined position of the apparatus main assembly A by stop of the rotation of the rotary C. These positioned driving shaft 180 and cartridge B are connected by the coupling 150. The coupling 150 is swingable (pivotable, movable) with respect to the cartridge B (frame). Accordingly, even between the driving shaft 180 positioned at the predetermined position and the cartridge B positioned at the predetermined position, the coupling 150 is capable of transmitting the rotating force smoothly. That is, even when there is some shaft (axis) deviation between the driving shaft 180 and the cartridge 150, the coupling 150 can smoothly transmit the rotating force.

This is one of remarkable effects of the embodiment of the coupling to which the present invention is applied.

(8) Switching Constitution of Developing Cartridge (Developing Device)

At each of the outer peripheral surfaces of the flanges 50L and 50R, a gear 50a is integrally provided as shown in FIGS. 15 to 17. A pair of idler gears 59L and 59R engaged with these gears 50a is disposed at both longitudinal end portions. These idler gears 59L and 59R are connected by the swingable shaft 60. When the flange 50L disposed at one of the longitudinal ends is rotated, the other flange 50R is rotated in phase through the gears 59L and 59R. By employing such a driving constitution, during the rotation of the rotary C or the rotation of the developing roller 110, torsion of either one of the flanges 50L and 50R is prevented.

With the gears 59L and 59R connected to the swinging center of the rotary side plates 54L and 54R, i.e., the swingable shaft 60, a rotary driving gear 65 engages. This gear 65 is connected to the motor 61. To a rotating shaft of the motor 61, an encoder 62 is mounted. The encoder 62 detects an amount of rotation of the motor 61 and controls the number of rotation. Further, at an outer peripheral surface of one flange 50L, a flag 57 projected from the flange 50L in a radial direction is provided (FIG. 16). The flange 50L and the flag 57 are rotated so as to pass through a photo-interruptor 58 fixed to the side plate 58. By detecting blocking of the photo-interruptor with the flag 57, the rotary C is controlled so as to rotate every predetermined angle. That is, after the rotary C rotates a predetermined angle from the time when the flag 57 blocks the photo-interruptor, the first developing cartridge stops at a position opposite to the photosensitive drum 107. The rotary C is further rotated a predetermined angle in one direction and thereafter the second developing cartridge stops at a position opposite to the photosensitive drum 107. By repeating this operation four times in total (stops of the four color developing cartridges), a color image is formed.

That is, the cartridge B is moved in a direction perpendicular to the axial line L3 of the driving shaft 180 by the rotate of the rotary C in one direction in a state in which the cartridge B is mounted to the rotary C.

At an upper surface of the apparatus main assembly A, an opening for mounting and demounting the developing cartridge B by the user and an openable/closable cover 40 (FIG. 4) for covering the opening are provided. Further, a door switch (not shown) for detecting the open/close of the cover 40 is provided. A rotation operation of the rotary C is started during electric power on and when the cover 40 is closed (when the door switch is turned on).

(9) Positioning Constitution of Developing Cartridge (Developing Device) During Switching Operation Operations of the rotary C and the cartridge B will be described step by step with reference to FIGS. 18 to 21. For ease of description, only one cartridge in the rotary is shown.

Figure 18:
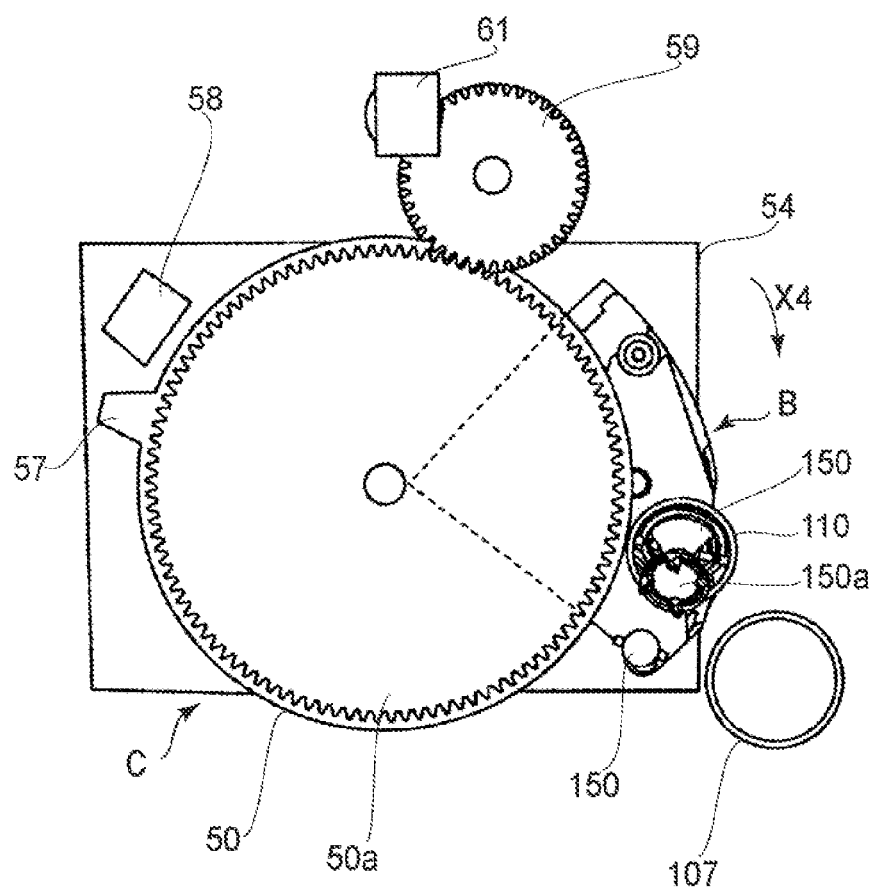
FIG. 18 shows a view, as seen from a side, of an apparatus main assembly according to an embodiment of the present invention.
Figure 19:
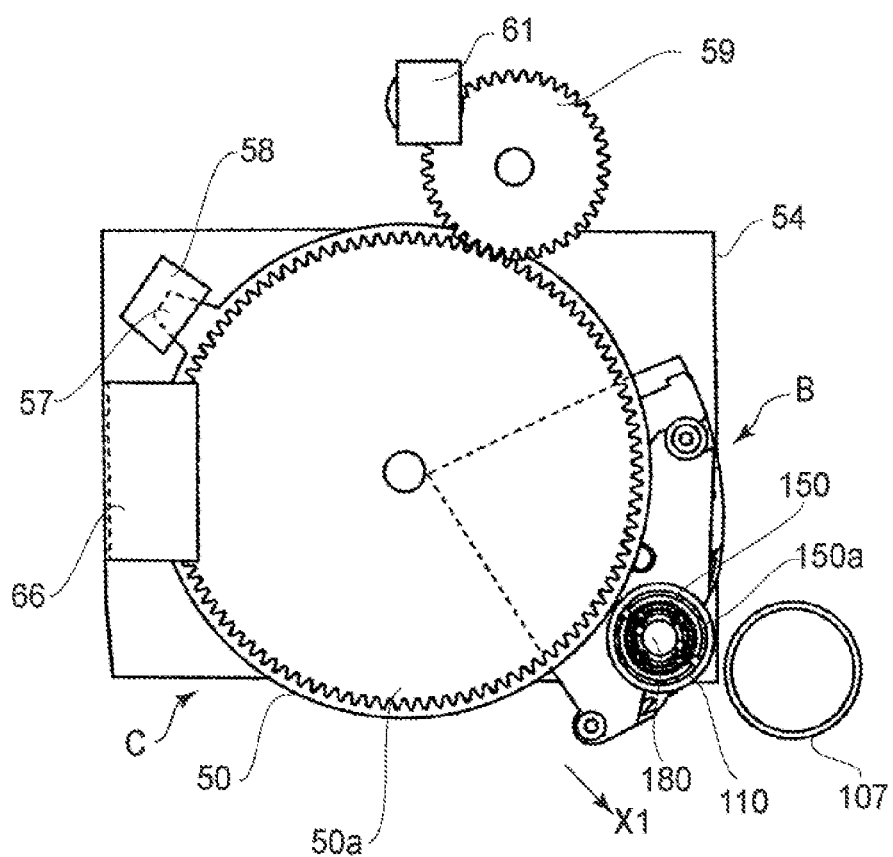
FIG. 19 shows a view of the apparatus main assembly according to the embodiment of the present invention, as seen from a side.
Figure 20:
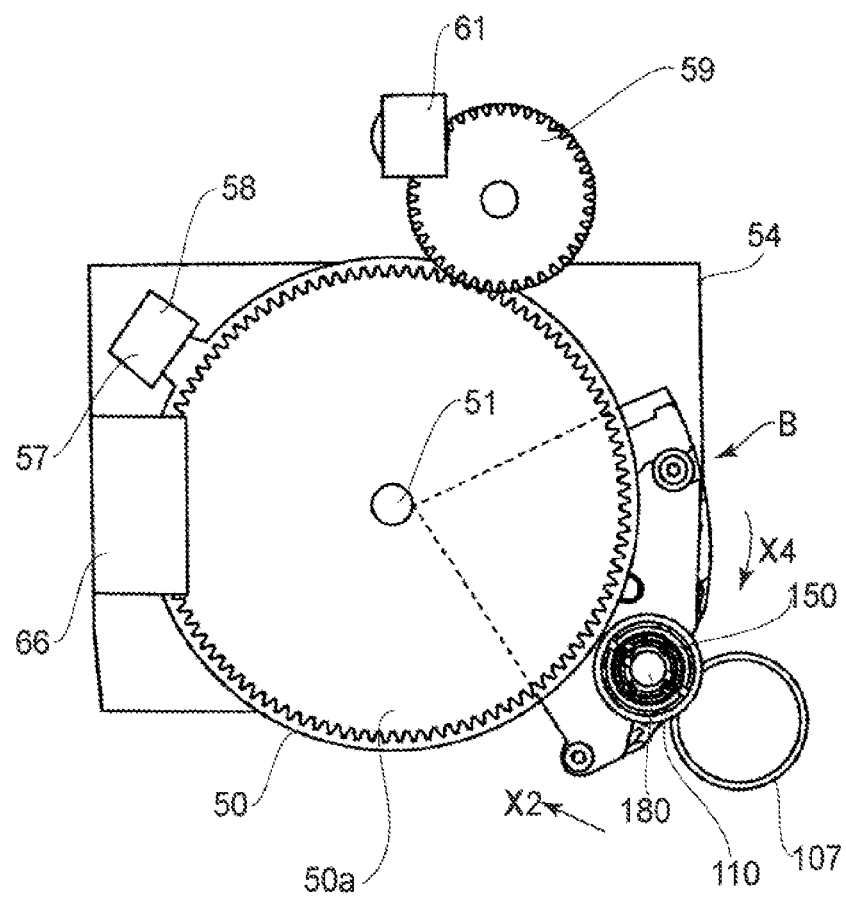
FIG. 20 shows a view of the apparatus main assembly according to the embodiment of the present invention, as seen from the side.

First, in a state shown in FIG. 18, the cartridge B does not reach a predetermined position (the coupling member 150 is located at a pre-rotation angular position). When the rotary C (is revolved in a direction of X4, the flag 57 partially projected from the outer peripheral surface of the rotary flange 50 described above reaches the photo-interruptor 58, so that the rotary C stops at a predetermined position (a state shown in FIG. 19). At this time, the driving shaft 180 and the coupling 150 of the cartridge B are connected to each other (the coupling member 150 is located at a rotating force transmitting angular position). The developing roller 110 is placed in a rotatable state. In this embodiment, the driving shaft 180 has already been rotated in a state in which the coupling 150 starts engagement with the driving shaft 180. For this reason, the developing roller 110 is rotated. However, in the case where the driving shaft 180 is stopped in a state in which the coupling 150 is engaged with the driving shaft 180, the coupling 150 waits in the rotatable state. The engagement (connection) of the coupling 150 with the driving shaft 180 will be described later in detail.

Then, as described above, the cam (not shown) is actuated to contact the rotary stay 66, so that the rotary C is moved counterclockwisely about the swingable shaft 60. That is the developing roller 110 contacts the photosensitive drum 107 by being moved in an X1 direction (a state of FIG. 20). Then, a predetermined image forming operation is performed.

When the image forming operation is completed, the rotary C is rotated in a clockwise direction about the swingable shaft 60 by a force of a spring (not shown). Thus, the rotary C is restored to the state shown in FIG. 19. That is, the developing roller 110 is moved apart from the photosensitive drum 107 (the coupling member 150 is located at a disengagement angular position).

Figure 21:
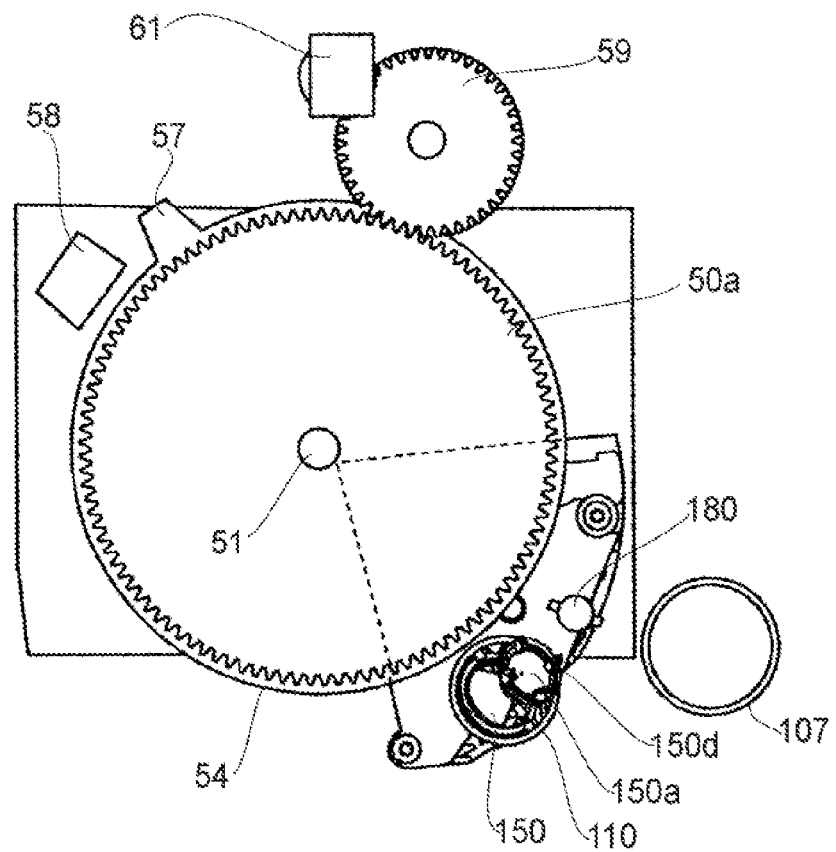
FIG. 21 is the Figure of the apparatus main assembly according to the embodiment of the present invention, as seen from the side.

Then, the rotary C is rotated about the central shaft 51 in the X4 direction so that a subsequent cartridge B can reach the developing position (a state of FIG. 21). At this time, the connection between the driving shaft 180 and the coupling 150 is released. That is, the coupling 150 is disconnected from the driving shaft 180. The operation at this time will be specifically described later.

The above-described operations from the operation described with reference to FIG. 18 to the operation described with reference to FIG. 21 are repeated four times in total for four colors, so that color image formation is effected.

(10) Engaging Operation/Rotational Force Transmission/Disengaging Operation, of the Coupling.

As has been described in the foregoing, immediately before the cartridge B stops at the predetermined position of the apparatus main assembly A, or substantially simultaneously therewith, the coupling 150 is engaged with the drive shaft 180. (From FIG. 18 to FIG. 19). And, when the cartridge B moves from the predetermined position of the apparatus main assembly after the rotation during the predetermined period, the coupling 150 is disengaged from the drive shaft 180 (from FIG. 20 to FIG. 21).

Figure 22:
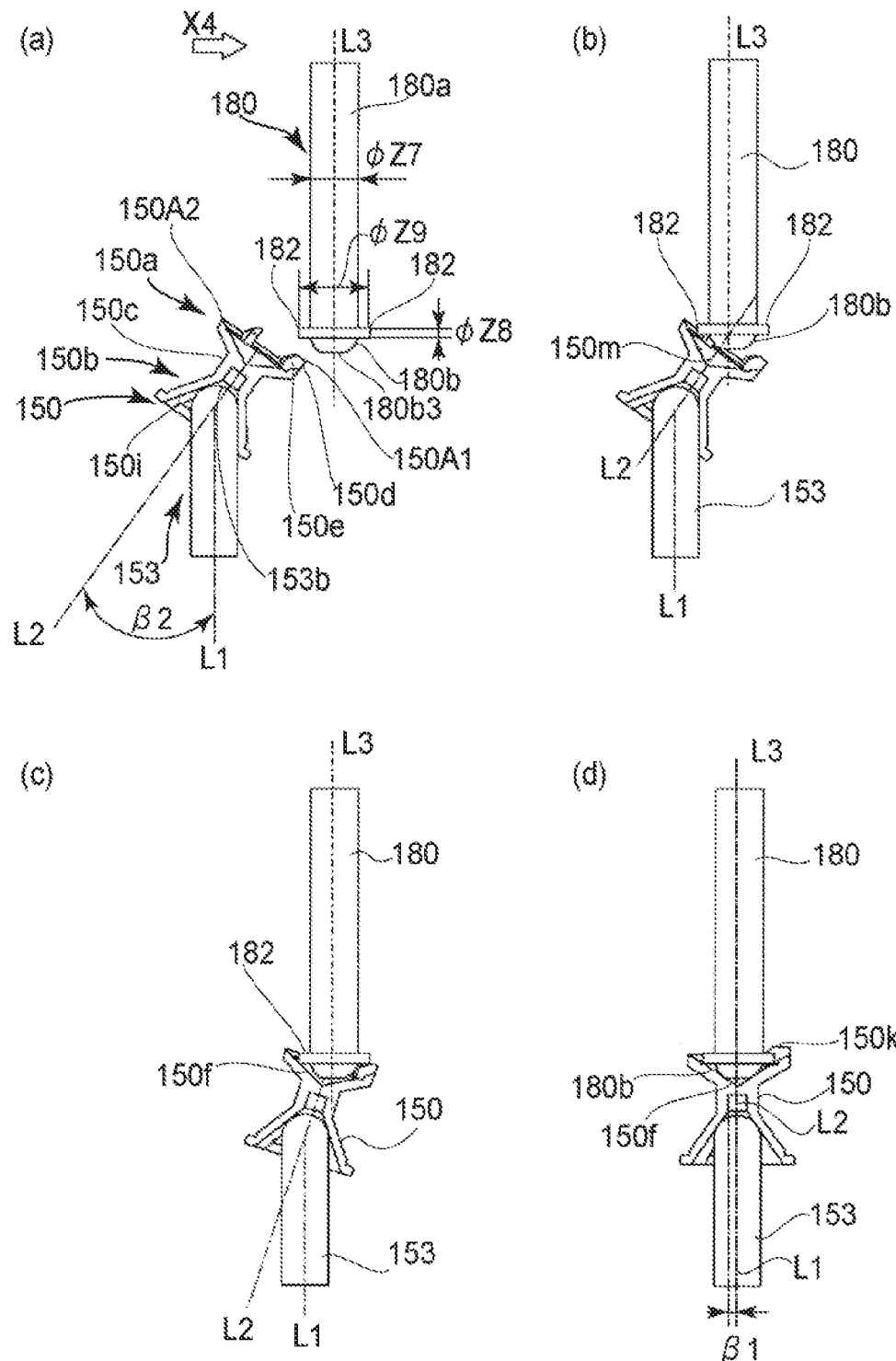
FIG. 22 is a longitudinal sectional view showing the process of engagement between the drive shaft and the coupling according to an embodiment of the present invention.
Figure 23:
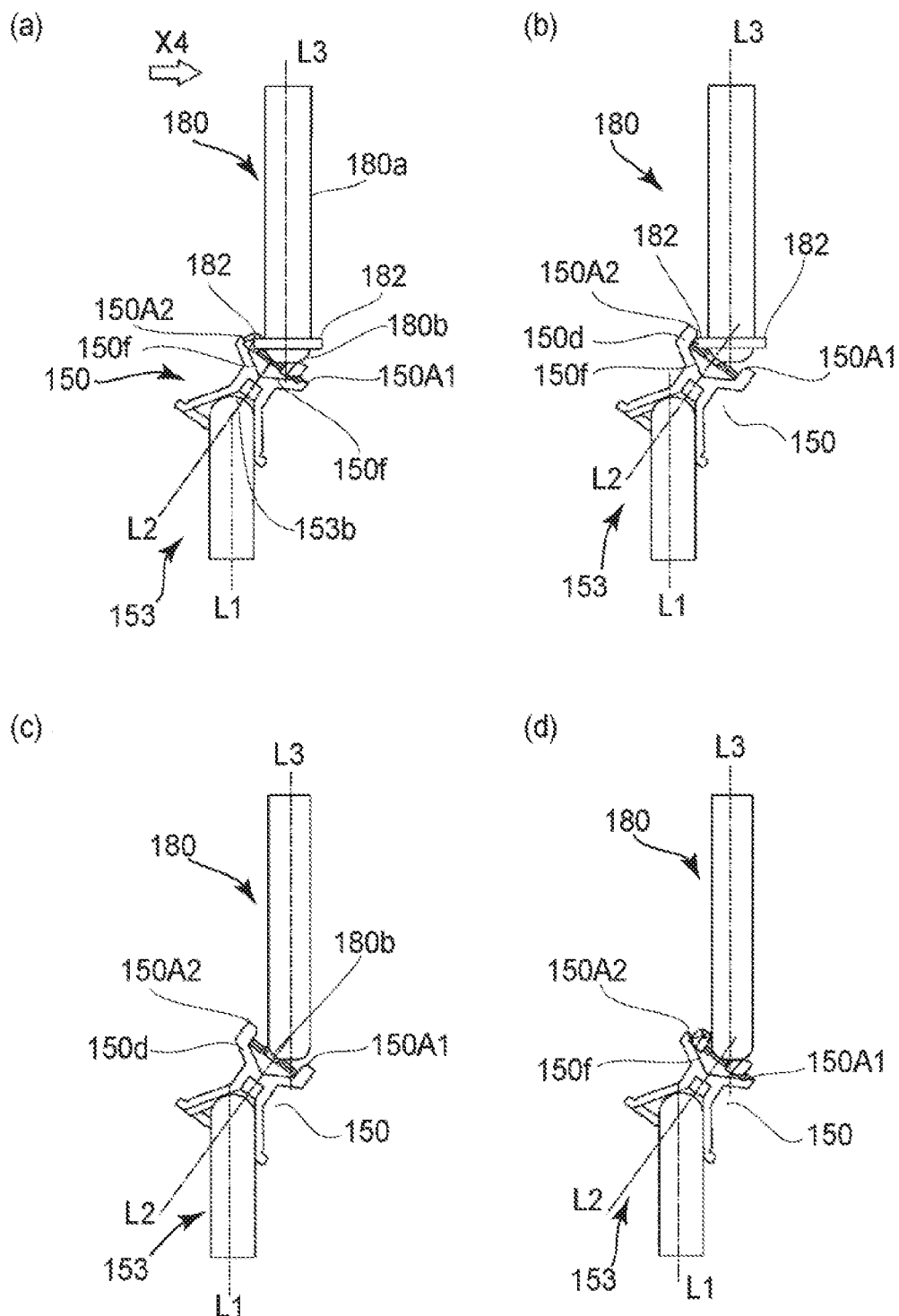
FIG. 23 is an exploded perspective view of the drive shaft and the coupling according to the embodiment of the present invention.
Figure 24:
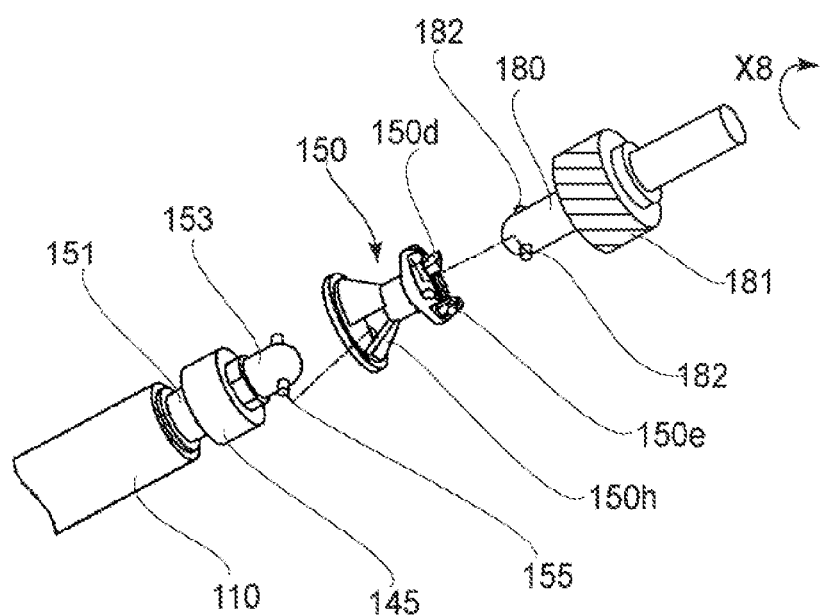
FIG. 24 is an exploded perspective view of the drive shaft and the coupling according to the embodiment of the present invention.
Figure 25:
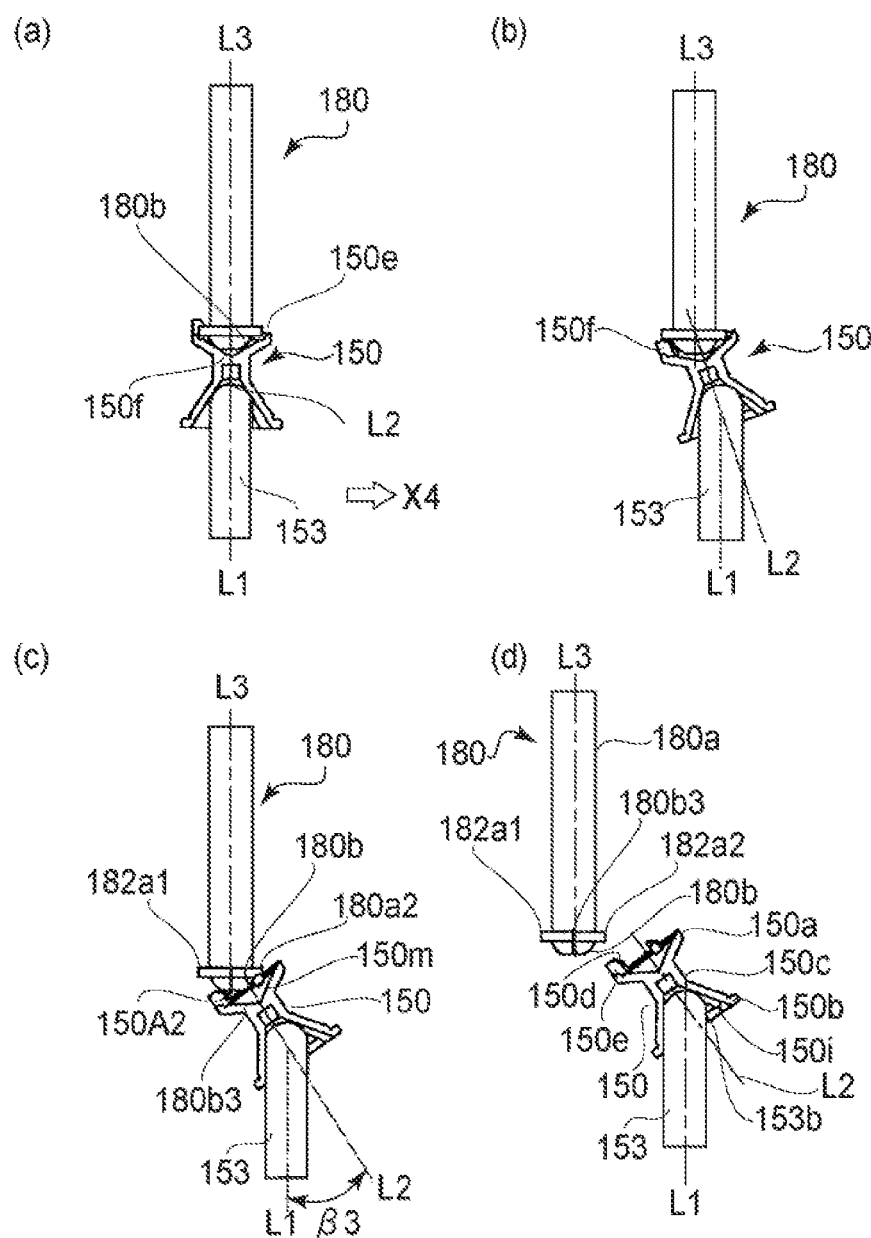
FIG. 25 is a perspective view showing the process of disengagement of the coupling from drive shaft according to the embodiment of the present invention.

Referring to FIG. 22-FIG. 25, the description will be made with respect to the engaging operation, the rotational force transmitting operation and the disengaging operation of the coupling. FIG. 22 is a longitudinal sectional view illustrating the drive shaft, the coupling, and the development shaft. FIG. 23 is a longitudinal sectional view illustrating the phase difference among the drive shaft, the coupling, and the development shaft. FIG. 25 is a longitudinal sectional view illustrating the drive shaft, the coupling, and the development shaft.

In the process in which the cartridge B moves to the developing position by the rotation of the rotary C, the coupling 150 is positioned at the pre-engagement angular position. More particularly, the axis L2 of the coupling is beforehand inclined relative to the axis L1 of the development shaft 153 so that the driven portion 150a positions downstream of the rotary rotational direction X4. By this inclination of the coupling 150, a downstream free end position 150A1 of the rotary C with respect to the rotational direction X4 thereof is positioned at the development shaft 153 side beyond a drive shaft free-end 180b3 with respect to the direction of the axis L1. In addition, an upstream free end position 150A2 with respect to the direction X4 is positioned at the pin 182 side beyond the drive shaft free-end 180b3 in the direction of the axis L1 (FIG. 22 (a), (b)). Here, the free end position is the position nearest to the drive shaft with respect to the direction of the axis L2 of the driven portion 150a of the coupling 150 shown in FIGS. 6 (a) and (c), and it is the remotest position from the axis L2. In other words, it is an edge line of the driven portion 150a of the coupling 150, or an edge line of the driven projection 150d depending on the rotation phase of the coupling (150A in FIGS. 6 (a) and (c)).

First, the downstream free end position 150A1 with respect to the rotary rotational direction (X4) passes by the shaft free-end 180b3. And, after the coupling 150 passes the drive shaft 180, the receiving surface 150f or the projection 150d of conical shape of the coupling 150 contacts to the free end portion 180b or the pin 182 of the drive shaft 180. And, it inclines in response to the rotation of the rotary C so that the axis L2 becomes parallel to the axis L1 (FIG. 22 (c)). And, finally, the position of the cartridge B is determined relative to the apparatus main assembly A. More particularly, the rotary C stops. Under the present circumstances, the drive shaft 180 and the development shaft 153 are substantially co-axial with each other. More particularly, the coupling 150 is moved from the pre-engagement angular position to the rotational force transmitting angular position so as to permit the free end position 150A1 thereof to circumvent the drive shaft 180 (pivoting and swinging). And, the coupling 150 is inclined from the pre-engagement angular position toward the rotational force transmitting angular position where the axis L2 is substantially co-axial with the axis L1. And, the coupling 150 and the drive shaft 180 are engaged with each other (FIG. 22 (*d*)). More particularly, the recess 150*z* covers the free end portion 180*b*. By this, the rotational force is enabled to be stably transmitted from the drive shaft 180 to the coupling 150. In addition, at this time, the pin 152 is in the opening 150*g* (FIG. 6 (*b*)), and the pin 182 is in the entrance portion 150*k*.

In this embodiment, when the coupling 150 starts the engagement with the drive shaft 180, the drive shaft 180 is already rotating. For this reason, the coupling 150 begins the rotation immediately. However, when the drive shaft 180 is at rest at the time of the engagement with the drive shaft 180 of the coupling 150, the coupling member 150 stands by with the rotatable state, when the pin 182 is present in the entrance portion 150*k*.

As has been described hereinbefore, according to this embodiment, the coupling 150 is pivotable relative to the axis L1. Therefore, the coupling 150 can be engaged relative to the drive shaft 180 correspondingly to the rotation of the rotary C by the coupling 150 per se inclining, without interfering with the drive shaft 180 (coupling).

Furthermore, the engaging operation of the coupling 150 described above is possible regardless of the phase difference between the drive shaft 180 and the coupling 150. Referring to FIG. 14 and FIG. 23, the description will be made as to the phase difference between the coupling and the drive shaft. FIG. 23 illustrates the phases of the coupling and the drive shaft. In FIG. 23 (*a*), the pin 182 and the driving shaft receiving surface 150*f* of the coupling 150 oppose relative to each other in the upstream with respect to the rotational direction X4 of the rotary. In FIG. 23 (*b*), the pin 182 and the projection 150*d* of the coupling 150 oppose relative to each other. In FIG. 23 (*c*), the free end portion 180*b* of the drive shaft and the projection 150*d* of the coupling 150 oppose relative to each other. In FIG. 23 (*d*), the free end portion 180*b* and the receiving surface 150*f* of the coupling oppose relative to each other. As shown in FIG. 14, the coupling 150 is mounted pivotably in all the directions relative to the development shaft 153. For this reason, as shown in FIG. 23, the coupling 150 is pivotable in the mounting direction X4 irrespective of the phase of the development shaft 153 with respect to the rotational direction X4. In addition, the downstream free end position 150A1 is positioned in the developing roller 110 side from the drive shaft free-end 180*b*3 in the rotational direction not related irrespective of the phase difference between the drive shaft 180 and the coupling 150. In addition, the inclination angle of the coupling 150 is set so that the upstream free end position 150A2 positions in the pin 182 side beyond the drive shaft free-end 180*b*3 in the rotational direction X4. With such a setting, the downstream free end position 150A1 in the rotational direction X4 passes by the drive shaft free-end 180*b*3 in response to the rotating operation of the rotary C. And, in the case of FIG. 23 (*a*), the driving shaft receiving surface 150*f* contacts to the pin 182. In the case of FIG. 23 (*b*), the projection 150*d* contacts to the pin 182. In the case of FIG. 23 (*c*), the projection 150*d* contacts to the free end portion 180*b*. In the case of FIG. 23 (*d*), the receiving surface 150*f* contacts to the free end portion 180*b*. In addition, the axis L2 approaches to the position in parallel with the axis L1 by the contact force (urging force) produced when the rotary C rotates, and they engage with each other (coupling). For this reason, irrespective of the phase difference between the drive shaft 180 and the coupling 150 or between the coupling 150 and the development shaft 153, they can engage with each other.

Referring to FIG. 24, the rotational force transmitting operation in the case of the rotation of the developing roller 110 will be described. The drive shaft 180 rotates together with the gear (helical gear) 181 in the direction of X8 in the Figure by the rotational force received from the motor 64. And, the pins 182 integral with the drive shaft 180 contact to any of the rotational force receiving surfaces 150*e*1-150*e*4 of the coupling 150. By this, the coupling 150 rotates. The coupling 150 further rotates. By this, the rotational force transmitting surface 150*h*1 or 150*h*2 of the coupling 150 contacts to the pin 155 integral with the development shaft 153. Then, the rotational force of the drive shaft 180 rotates the developing roller 110 through the coupling 150 and the development shaft 153.

In addition, the free end portion 153*b* of the development shaft 153 is contacted to the receiving surface 150*i*. The free end portion 180*b* of the drive shaft 180 is contacted to the receiving surface 150*f*. By this, the coupling 150 is positioned correctly (FIG. 22*d*). More particularly, the coupling 150 is positioned to the drive shaft 180 by the recess 150*z* covering the free end portion 180. At this time, even if the axis L3 and the axis L1 are somewhat non-coaxial with each other, the coupling 150 can rotate without applying the large load to the development shaft 153 and the drive shaft 180 by the small inclination of the coupling 150. For this reason, even if the drive shaft 180 and the development shaft 153 deviate from each other by slight position deviation of the cartridge B due to the rotation of the rotary C, the coupling 150 can transmit the rotational force smoothly.

This is one of the remarkable effects according to an embodiment of the coupling of the present invention.

Referring to FIG. 25, the description will be made about the disengaging operation of the coupling 150 from the drive shaft 180 in response to the movement of the cartridge B from the predetermined position (developing position) by the rotary C rotating in the one direction.

First, the position of each of the pin 182 at the time of the cartridge (B) moving from the predetermined position will be described. After the image formation finishes, as will be apparent from the foregoing description, the pin 182 is positioned at any two of the entering or entrance portions 150*k*1-150*k*4 (FIG. 6). And, the pin 155 is positioned in the opening 150*g*1 or 150*g*2.

The description will be made with respect to the operation of disengaging the coupling 150 from the drive shaft 180 in interrelation with the operation of switching to the next developing cartridge B after the image forming operation using the cartridge is completed.

In the state where the rotation for the development shaft 153 has stopped, the axis L2 is substantially co-axial relative to the axis L1 in the coupling 150 (rotational force transmitting angular position). And, the development shaft 153 moves in the dismounting direction X6 with the cartridge (B), and the receiving surface 150*f* or the projection 150*d* in the upstream with respect to the rotational direction of the rotary is brought into contact to the free end portion 180*b* of the drive shaft 180 or the pin 182 (FIG. 25*a*). And, the axis L2 begins to incline toward the upstream with respect to the rotational direction X4 (FIG. 25 (*b*)). This direction of inclination is the opposite from that of the inclination of the coupling 150 at the time of the engagement of the coupling 150 with the drive shaft 180, with respect to the development axis 153. It moves, while the upstream free end portion 150A2 with respect to the rotational direction X4 is kept in contact with the free end portion 180*b* by the rotational operation of the rotary C. And, in the axis L2, the upstream free end portion 150 A3 inclines to the free end 180*b*3 of the drive shaft (FIG. 25 (c)). And, in this state, the coupling 150 is passed by the drive shaft 180, contacting to the free end 180b3 (FIG. 25 (d)).

Thus, the coupling 150 moves from the rotation of for transmitting angular position to the disengagement of angular position, so that a part (upstream free-end portion 150A2) of the coupling 150 positioned upstream of the drive shaft 180 with respect to the rotational direction X4 is permitted to circumvent the drive shaft 180. Therefore, the cartridge B moves in accordance with the rotation of the rotary C to the position of shown in FIG. 21. In addition, before the completion of the one-full rotation of the rotary C, the coupling 150 (the axis L1) inclines toward downstream with respect to a rotational direction X4 by an unshown means. In other words, the coupling 150 moves from the disengagement angular position to the pre-engagement angular position. By this, after the rotary C completes its one-full rotation, the coupling 150 is in the state engageable with the drive shaft 180.

As will be apparent from the foregoing description, the angle of the pre-engagement angular position the coupling 150 relative to the axis L1 is larger than the angle of the disengaging angular position. This is because it is preferable that the pre-engagement angular position is set beforehand such that during the engagement operation of the coupling, the distance between the upstream free-end the position 150A1 with respect to the rotational direction X4 and the free-end 180b3 of the drive shaft is relatively longer (FIG. 22b). This is done in consideration of the dimensional tolerance of the parts. On the contrary, at the time of the coupling disengagement, the axis L2 inclines in interrelation with the rotation of the rotary C position. Therefore, the downstream pre-end portion 150A2 of the coupling 150 A3 moves along the free end portion 180b3 the drive shaft. In other words, the downstream free-end position 180A2 with respect to the rotational direction X4 and the free end portion 180b3 are substantially aligned with each other in a direction of the axis L1 (FIG. 25 (c)). In addition, when the coupling 150 disengages from the drive shaft 180, the disengagement is possible irrespective of the phase difference between the coupling 150 and the pin 182.

As shown in FIG. 22, in the rotational force transmitting angular position of the coupling 150, the angle relative to the axis L1 of the coupling 150 is such that in the state where the cartridge (B) is mounted to the predetermined position of the apparatus main assembly (A) (the position opposed to the photosensitive drum), the coupling 150 receives the transmission of the rotational force from the drive shaft 180, and it rotates.

In addition, the pre-engagement angular position of the coupling 150 is the angular position immediately before the coupling 150 is brought into engagement with the drive shaft 180 in the process of mounting operation to the predetermined position in accordance with the rotation of the rotary C.

In addition, the disengaging angular position of the coupling 150 is the angular position relative to the axis L1 of the coupling 150 at the time of the disengagement of the cartridge (B) from the drive shaft 180, in the process of the cartridge B moving from the predetermined position in accordance with the rotation of the rotary C.

In the pre-engagement angular position or the disengaging angular position, the angles beta2 and beta3 which the axis L2 makes with the axis L1 are larger than the angle beta1 which the axis L2 makes with the axis L1 in the rotational force transmitting angular position. As for the angle theta 1, 0 degree is preferable. However, in this embodiment, if the angle beta1 is less than about 15 degrees, the smooth transmission of the rotational force is accomplished. This is also one of the effects of this embodiment. As for the angles beta2 and beta3, the range of about 20-60 degrees is preferable.

As has been described hereinbefore, the coupling is pivotably mounted to the axis L1. And, the coupling 150 inclines in accordance with the rotation of the rotary C without interfering with the drive shaft.

Here, according to the above-described embodiment of the present invention, even if the cartridge B (developing roller 110) moves in response to the movement of the rotary C in one direction which is substantially perpendicular to the direction of the axis L3 of the drive shaft 180, the drum coupling member 150 can accomplish the coupling (engagement) and the disengagement relative to the drive shaft 180. This is because the drum coupling member 150 according to an embodiment of the present invention can take the rotational force transmitting angular position, the pre-engagement angular position, and the disengaging angular position.

Here, as has been described hereinbefore, the rotational force transmitting angular position is the angular position of the drum coupling member 150 for transmitting the rotational force for rotating the developing roller 110 to the developing roller 110.

The pre-engagement angular position is the position inclined from the rotational force transmitting angular position, and which is the angular position of the drum coupling member 150 before the drum coupling member 150 engages with the rotational force applying portion.

The disengaging angular position is the position which is inclined away from the pre-engagement angular position from the rotational force transmitting angular position and which is the angular position of the drum coupling member 150 for the drum coupling member 150 to disengage from the drive shaft 180.

In the above described description, at the time of the disengagement, the upstream receiving surface 150f or the upstream projection 150d contacts with the free end portion 180b of the drive shaft 180 in interrelation with the rotation of the rotary C. By this, it has been described that the axis L2 inclines toward the upstream in the rotational direction X4. However, in this embodiment, this is not inevitable. For example, a toggle spring (elastic material) is provided adjacent to the rotary fulcrum of the coupling. And, the structure is such that at the time of the coupling engagement, the urging force produces toward the downstream in the rotational direction X4 relative to the coupling. At the time of the disengagement of the coupling, corresponding to the rotation of the rotary C, the urging force is produced toward the upstream in the rotational direction X4 to the coupling contrarily to the case of the engagement by the function of this toggle spring. Therefore, at the time of the coupling disengagement, the upstream receiving surface 150f or the projection 150d in the rotational direction X4, and the free end portion 180b of the drive shaft 180 are not contacted to each other, and the coupling disengages from the drive shaft. In other words, as long as the axis L2 of the coupling 150 inclines in response to the rotation of the rotary C, any means is usable. In addition, by the time immediately before the coupling 150 engages with the drive shaft 180, the coupling is inclined so that the driven portion 150a of the coupling faces toward the downstream in the rotational direction X4. In other words, the coupling is beforehand placed in the state of the pre-engagement angular position. For this purpose, any means in Embodiment 2 et seqq is usable.

Figure 26:
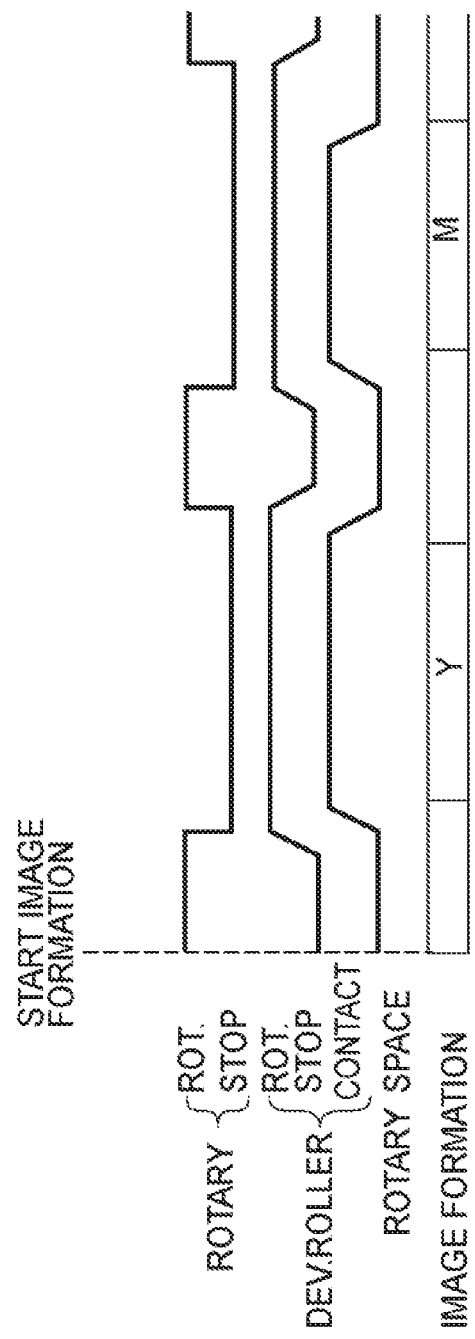
FIG. 26 is the timing chart of the operations of an embodiment of the present invention.

Here, referring to FIG. 26, the description will be made about reduction of the time which the image formation (development) requires in the present embodiment. FIG. 26 is a timing chart showing the rotation of the developing roller and so on.

Here, with reference to FIG. 26, reduction in time required for image formation (development) in this embodiment will be described. FIG. 26 is a timing chart for illustrating rotation of the developing roller and the like.

In FIG. 26, timings of rotation and stop of the developing roller from a state in which the developing apparatus (cartridge) is in a home position until the developing roller receives an image formation start signal to effect development for first color (yellow image formation) and development for a second color (magenta image formation). With respect to subsequent developments for third and fourth colors (cyan image formation and black image formation), illustration is omitted due to redundant explanation.

In this embodiment, as described above, the engaging operation between the driving shaft 180 and the coupling 150 is completed during the rotation of the rotary C or immediately after the stop of the rotation of the rotary C. During or immediately after the stop of the rotation of the rotary C, the engaging operation of the coupling 150 with the driving shaft 180 is completed. Then, the developing roller 110 is placed in a rotatable state or is rotated.

That is, in the case where the driving shaft 180 has already been rotated before the coupling 150 goes into an engaging operation with the driving shaft 180, the coupling 150 starts rotation simultaneously with the engagement with the driving shaft 180. Then, the developing roller 110 starts rotation. Further, in the case where the driving shaft 180 is stopped, the coupling 150 is stopped without being rotated even when the engagement of the coupling 150 with the driving shaft 180 is completed. When the driving shaft 180 starts rotation, the coupling 150 starts rotation. Then, the developing roller 110 starts rotation.

In either case, according to this embodiment, a main assembly-side rotating force transmitting member (e.g., the main assembly-side coupling) is not required to be moved forward and back in the axial line direction.

In this embodiment, the driving shaft 180 has already been rotated before the coupling 150 goes into the engaging operation with the driving shaft 180. Accordingly, image formation can be started quickly. Therefore, compared with the case where the driving shaft 180 is stopped, the time required for image formation can be further reduced.

Further, in this embodiment, in the rotating state of the driving shaft 180, the coupling 150 can be disconnected from the driving shaft 180.

Accordingly, in this embodiment, the driving shaft 180 may also not be rotated or stopped in order that the coupling 150 is engaged with or disengaged from the driving shaft.

That is, according to the coupling 150 in this embodiment, the coupling 150 can be engaged with and disengaged from the driving shaft 180, irrespective of the rotation or stop of the driving shaft 180. This is also one of the remarkable effects of this embodiment.

Thereafter, steps of rotary (developing roller) contact, yellow image formation, rotary (developing roller) separation, and developing roller rotation stop are performed in this order. Simultaneously with the start of rotation of the rotary, a disengaging operation of the coupling of the cartridge from the driving shaft of the apparatus main assembly is performed to prepare for a developing operation for the second color.

That is, in this embodiment, the engaging and disengaging operation of the coupling can be performed in interrelation with the rotation of the rotary. Accordingly, it is possible to shorten a necessary time interval between the first color development and the second color development. Similarly, time intervals between the second color development and the third color development, between the third color development and the fourth color development, between the home position and the first color development, and between the fourth color development and the home position can also be reduced. Accordingly, a time required for obtaining a color image on a sheet can be reduced. This is also one of the remarkable effects of this embodiment.

Figure 27:
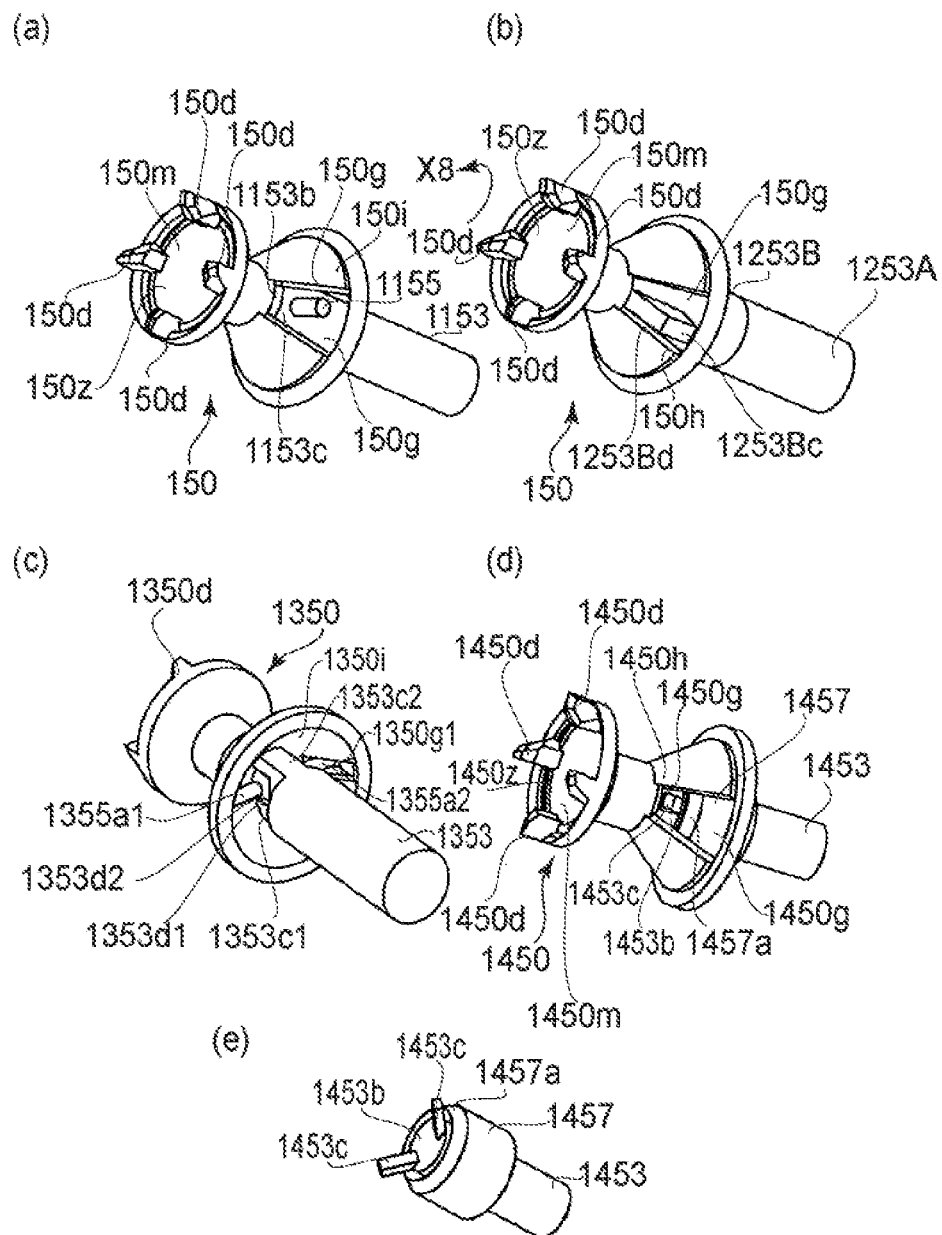
FIG. 27 is a perspective view of a coupling according to an embodiment of the present invention.
Figure 28:
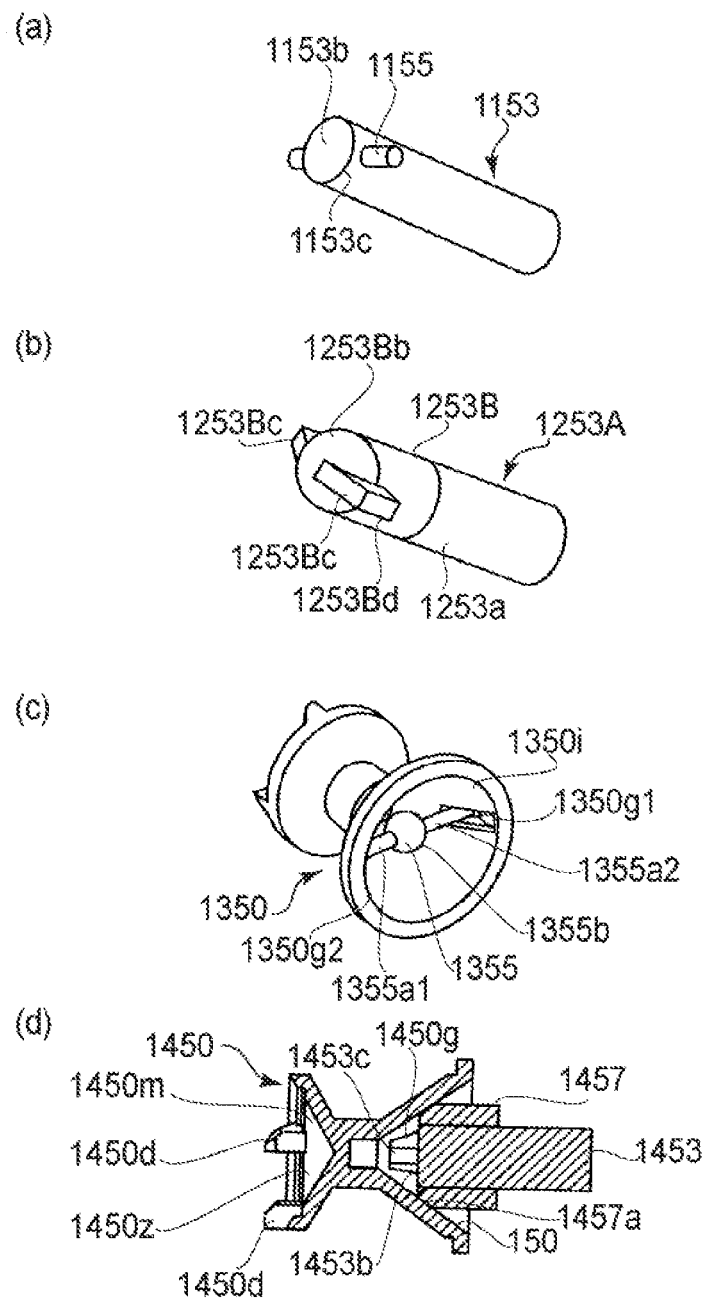
FIG. 28 is a perspective view of the coupling according to the embodiment of the present invention.

Referring to FIG. 27 and FIG. 28, a modified example of the development shaft will be described. FIG. 27 is a perspective view of members around the development shaft. FIG. 28 illustrates a characteristic portion in FIG. 27.

In the foregoing description, the free end of the development shaft is a spherical surface, and the coupling is contacted to the spherical surface thereof. However, as shown in FIGS. 27 (a) and 28 (a), the free end 1153b of the development shaft 1153 may be planate. An edge portion 1153c of a peripheral surface thereof contacts to the coupling 150 to rotate the coupling 150. Even with such a structure, the axis L2 is assuredly pivotable relative to the axis L1. In addition, the processing to the spherical surface is unnecessary. For this reason, the cost can be reduced.

In the foregoing description, another drive transmission pin is fixed to the development shaft. However, as shown in FIGS. 27 (b) and 28 (b), it may be separate member from the elongated development shaft. A first development shaft 1253A is a member for supporting a rubber portion of the developing roller (unshown). In addition, a second development shaft 1253B is provided co-axially with the first development shaft 1253A, and has integrally a rib for the drive transmissions for engaging with the coupling 150 1253Bc. In this case, geometrical latitude is enhanced by an integral moldings using injection molding and so on. For this reason, the rib part 1253Bc can be enlarged. Therefore, the area of the drive transmitting portion 1253Bd can be increased. Even if it is a development shaft made of resin material, it can transmit the torque assuredly. In the Figure, when the coupling 150 rotates in the direction of X8, the drive transmission surface 150h of the coupling contacts to the drive transmitting portion 1253Bd of the second drive shaft. When the contact area is wide at this time, a stress applied on the rib 1253Bc is small. Therefore, the liability of the damage of the coupling and so on is mitigable. In addition, the first development shaft may be the simple metal shaft, and the second development shaft may be an integrally molded product of the resin material. In this case, the cost reduction is accomplished.

As shown in FIGS. 27 (c) and 28 (c), the opposite ends 1355a1, 1355a2 of the rotational force transmitting pin (rotational force receiving portion) 1355 are fixed by press-fitting and so on beforehand into the drive transmission holes 1350g 1 or 1350g2 of the coupling 1350. Thereafter, the development shaft 1353 which has the free end portion 1353c1, 1353c2 formed into the shape of a slot may be inserted. At this time, it is preferable that, the engaging portion 1355b of the pin 1355 relative to the free end portion (unshown) of the development shaft 1353 is formed into a spherical shape so that the coupling 1350 is pivotable. By fixing the pin 1355 in this manner beforehand, it is not necessary to increase the size of the standby hole 1350g of the coupling 1350 more than needed. Therefore, the rigidity of the coupling is enhanced.

In addition, in the foregoing description, the inclination of the axis of the coupling follows the development shaft free-end. However, as shown in FIGS. 27 (*d*), 27 (*e*), and 28 (*d*), it may follow the contact surface 1457*a* of the bearing member 1457 co-axially with the development shaft 1453. In this case, the free end surface 1453*b* of the development shaft 1453 is at the level comparable as the end surface of the bearing member. And, the rotational force transmitting pin (rotational force receiving portion) 1453*c* projected from the free end surface 1453*b* is inserted into the inside of the opening 1450*g* of the coupling 1450. The rotational force is transmitted by this pin 1453*c* contacting to the rotational force transmitting surface (rotational force transmitting portion) 1450*h* of the coupling. In this manner, the contact surface 1457*a* at the time of the inclination of the coupling 1450 is provided on the supporting member 1457. By this, there is no necessity of processing the development shaft directly, and the machining cost can be reduced.

In addition, similarly, the spherical surface at the free end may be a molded resin part which is a separate member. In this case, the machining cost of the shaft can be reduced. This is because the configuration of the shaft processed by cutting and so on can be simplified. In addition, a range of the spherical surface of the shaft free-end may be narrowed, and the machining cost may be reduced by limiting the range which requires highly precise processing.

Figure 29:
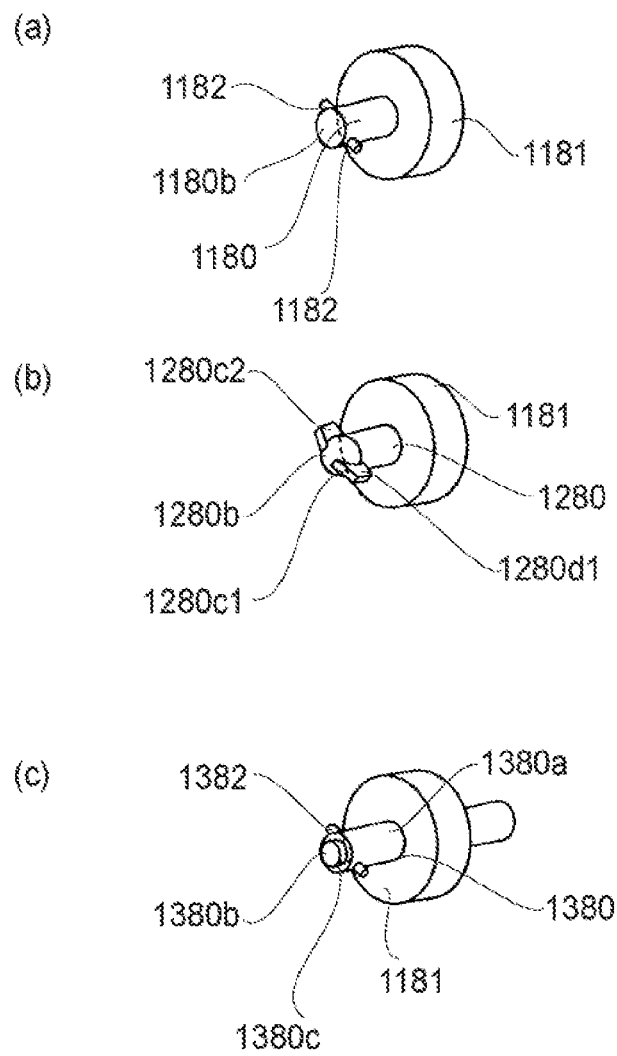
FIG. 29 is a perspective view of a drive shaft according to an embodiment of the present invention.

Referring to FIG. 29, the description will be made about a modified example of the drive shaft. FIG. 29 is a perspective view of drive shaft and development driving gear.

Similarly to the development shaft, it is possible to form the free end of the drive shaft 1180 into a flat surface 1180*b* as shown in FIG. 29 (*a*). By this, the configuration of the shaft is simple, and the machining cost can be reduced. A pin (rotational force applying portion) is designated by the reference numeral 1182.

In addition, similarly to the development shaft, the drive transmitting portion 1280*c*1, 1280*c*2 may be integrally molded with the drive shaft 1280 as shown in FIG. 29 (*b*). When the drive shaft is a molded resin part, the drive transmitting portion can be molded as an integral part. Therefore, the cost reduction can be accomplished.

As shown in FIG. 29 (*c*), in order to narrow the range of the free end portion 1380*b* of the drive shaft 1380, an outer diameter of the shaft free end 1380*c* may be decreased than the outer diameter of a main part 1380*a*. The free end portion 1380*b* requires degree of accuracy, in order to determine the position of the coupling (unshown) as described above. For this reason, the surface which requires high degree of accuracy can be reduced by limiting the spherical range only to the contact portion of the coupling. By this, the machining cost can be lowered. In addition, the unnecessary free end of the spherical surface may be cut similarly.

Figure 30:
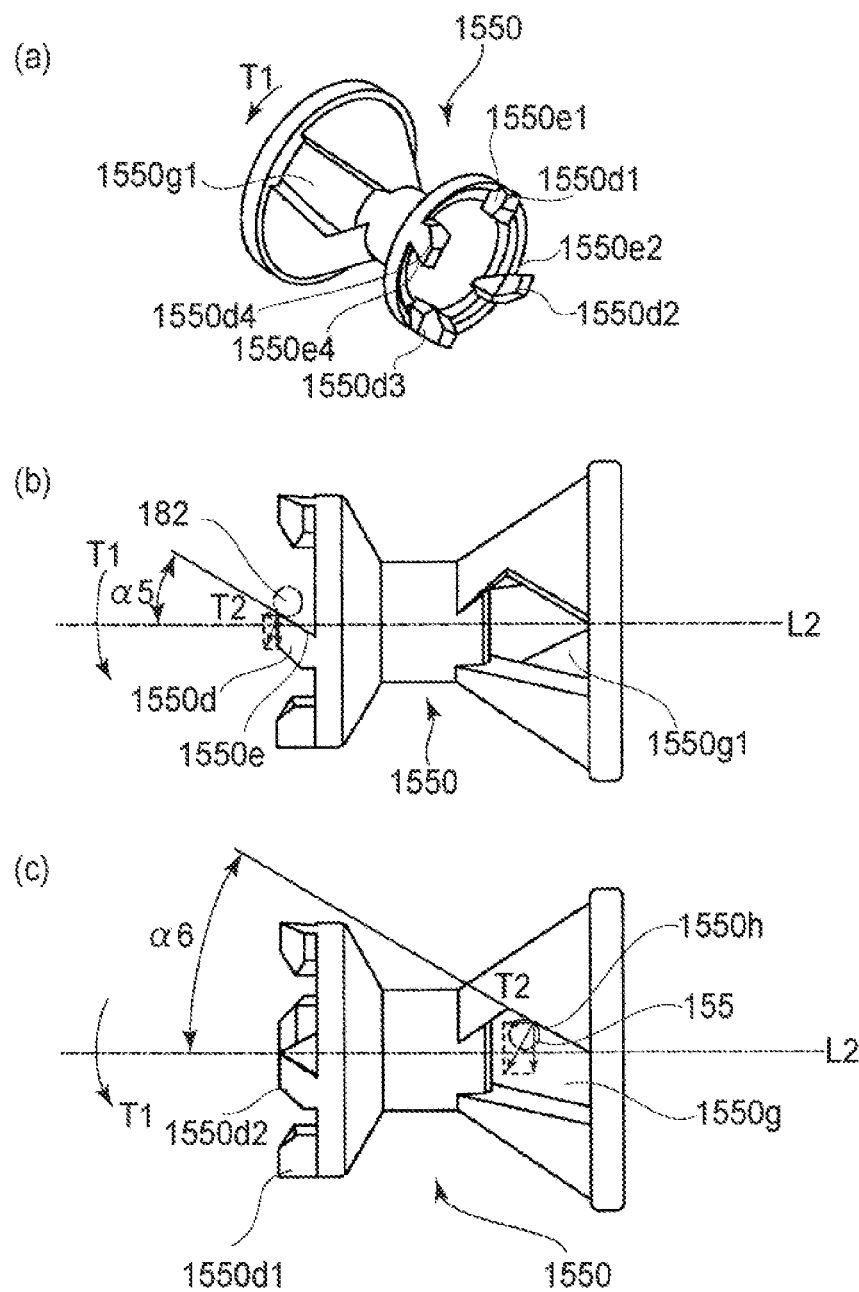
FIG. 30 is a perspective view of a coupling according to the embodiment of the present invention.

In addition, in the foregoing embodiments, in the direction of the axis L1, there is no play between the developing roller and the apparatus main assembly. Here, the positioning method of the developing roller will be described with respect to the direction of the axis L1 as to, when play exists. In other words, the coupling 1550 is provided with a tapered surface 1550*e*, 1550*h*. As for the drive shaft, a force is produced in a thrust direction by the rotation. By this, the coupling and the developing roller are positioned with respect to the direction of the axis L1. Referring to FIG. 30 and FIG. 31, this will be described in detail. FIG. 30 is a perspective view and a top plan view of the coupling alone. FIG. 31 is an exploded perspective view of the drive shaft, the development shaft, and the coupling.

As shown in FIG. 30 (*b*), the rotational force receiving surface 1550*e* forms an angle alpha 5 relative to the axis L2. When the drive shaft 180 rotates in the T1 direction, the pin 182 and the receiving surface 1550*e* contact to each other. Then, a component force is applied in the T2 direction to the coupling 1550, and the coupling is moved in the T2 direction. In more detail, the coupling 1550 moves until the driving shaft receiving surface 1550*f* (FIG. 31*a*) of the coupling 1550 contacts to the free end 180*b* of the drive shaft 180. By this, the position with respect to the direction of the axis L2 of the coupling 1550 is determined. In addition, the free end 180*b* is a spherical surface, and the driving shaft receiving surface 1550*f* of the coupling 1550 is a conic surface. For this reason, in the direction perpendicular to the axis L2, the position of the driven portion 1550*a* of the coupling 1550 relative to the drive shaft 180 is determined.

In addition, as shown in FIG. 30 (*c*), the rotational force transmitting surface (rotational force transmitting portion) 1550*h* forms the angle alpha 6 relative to the axis L2. When the coupling 1550 rotates in the T1 direction, the transmitting surface 1550*h* and the pin 155 contact to each other. Then, a component force is applied in the T2 direction to the pin 155, and the pin is moved in the T2 direction. And, the development shaft 153 moves until the free end 153*b* of the development shaft 153 contacts to the development bearing surface 1550*i* (FIG. 31*b*) of the coupling 1550. By this, the position of the development shaft 153 (developing roller) with respect to the direction of the axis L2 is determined.

In addition, the development bearing surface 1550*i* of the coupling 1550 is a conic surface, and the free end 153*b* of the development shaft 153 is the spherical surface. For this reason, with respect to the direction perpendicular to the axis L2, the position of the driving portion 1550*b* of the coupling 1550 relative to development shaft 153 is determined.

The taper angles alpha 5 and alpha 6 are selected so as to be sufficient for producing the force for moving the coupling and the developing roller in the thrust direction. And, the angles differ depending on the load. However, if other means for determining the position of the thrust direction is provided, the taper angles alpha 5 and alpha 6 may be small.

For this reason, as has been described hereinbefore, the coupling is provided with the taper for producing the retracting force in the direction of the axis L2, and with the conic surface for determining the position in the direction perpendicular to the axis L2. By this, the position in the direction of the axis L2 of the coupling and the position in the direction perpendicular to the axis can be determined simultaneously. In addition, further assured transmission of the rotational force can be accomplished. This will be described. When the rotational force receiving surface or the rotational force transmitting surface of the coupling is not given the taper angle which has been described above, the rotational force transmitting surface or the rotational force receiving surface of the coupling inclines due to influence and so on of dimensional tolerance, and the component force is produced in the direction (opposite direction to T2 of FIG. 30) of the axis L2. By this, the contact between the rotational force receiving surface and the rotational force transmitting surface of the drive transmission pin and the coupling is disturbed. However, with the above described structure, such the problem is avoidable.

However, it is not inevitable that the coupling is provided with both such the retracting taper and the positioning conic surface. For example, in place of the taper for pulling in the direction of the axis L2, a part for urging in the direction of the axis L2 may be added. From now on, as long as there is no particular description, the case where both the tapered surface and the conic surface are formed will be described.

Figure 32:
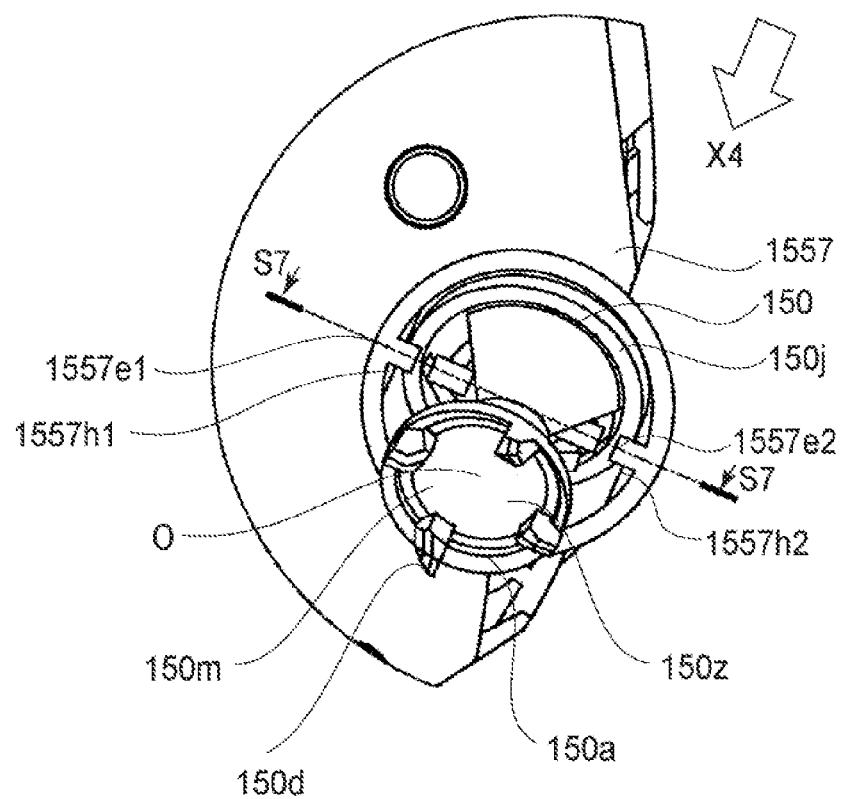
FIG. 32 is a perspective view of a side of a developing cartridge according to an embodiment of the present invention.
Figure 33:
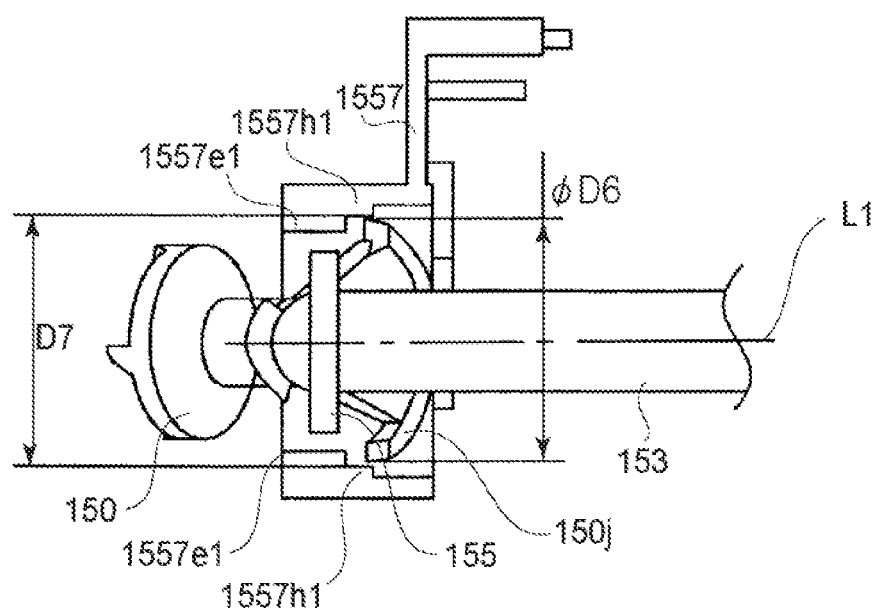
FIG. 33 is a partly sectional view of the developing cartridge and a development shaft according to the embodiment of the present invention.

Referring to FIG. 32, the description will be made about the means for regulating the direction of the inclination of the coupling relative to the cartridge for the engagement between the coupling, and the drive shaft of the apparatus main assembly. FIG. 32 is a side view illustrating a major part of the driving side of the cartridge, and FIG. 33 is a sectional view taken along S7-S7 of FIG. 32.

Here, in order to regulate the inclining direction of the coupling 150 relative to the cartridge B, the supporting member (mounting member) 1557 is provided with a regulating portion 1557h 1 or 1557h2. This regulating portion 1557h 1 or 1557h2 is provided so that it becomes substantially parallel to the rotational direction X4 immediately before the coupling engages with the drive shaft 180. In addition, the intervals D7 thereof is slightly larger than outer diameter of the driving portion 150b of the coupling 150 phi D6. By this, the coupling 150 is pivotable in the rotational direction X4. In addition, the coupling is pivotable in all the directions relative to the development shaft. For this reason, irrespective of the phase of the development shaft, the coupling can be inclined in the regulated direction. Therefore, it becomes easy to insert the drive shaft (unshown) into the insertion opening 150m for the drive shaft of the coupling 150 much more assuredly. Therefore, they are more assuredly engageable.

Figure 34:
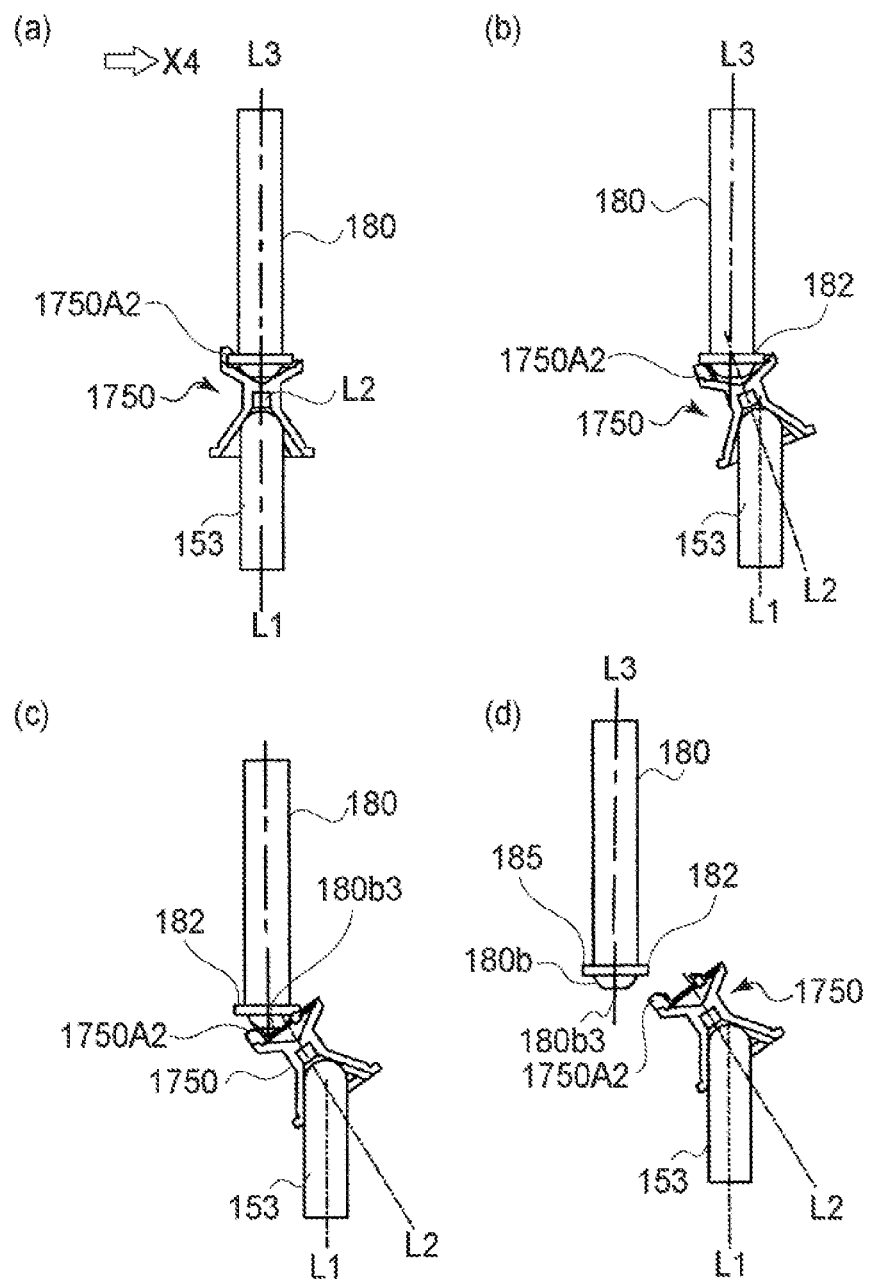
FIG. 34 is a longitudinal sectional view illustrating the take-out process of the developing cartridge according to the embodiment of the present invention.

In addition, in the foregoing description, the angle in the pre-engagement angular position of the coupling 150 relative to the axis L1 is larger than the angle of the disengaging angular position (FIG. 22, FIG. 25). However, this is not inevitable. Referring to FIG. 34, the description will be made.

Figure 35:
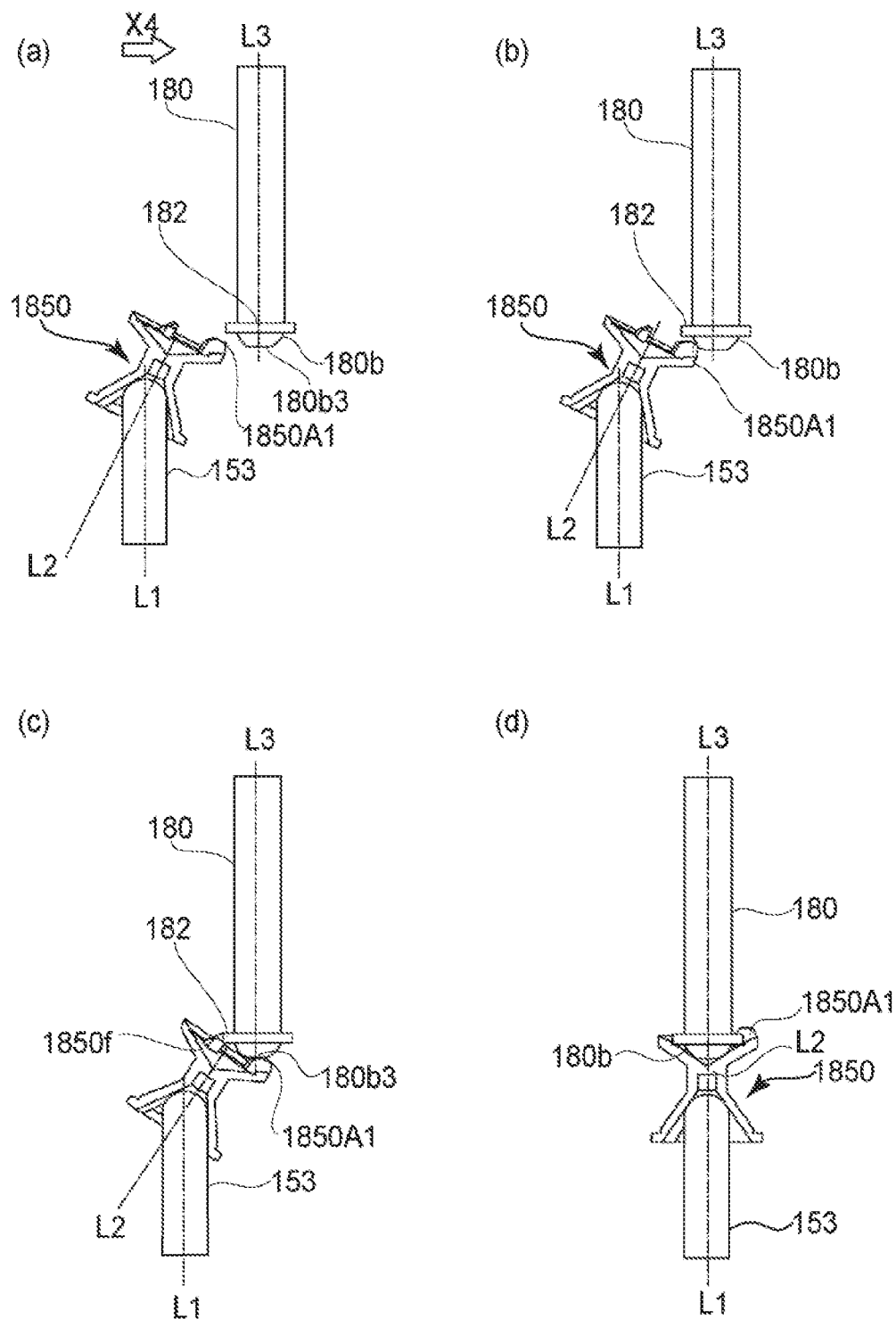
FIG. 35 is a longitudinal sectional view illustrating the process of engagement between the drive shaft and the coupling according to the embodiment of the present invention.

FIG. 34 is a longitudinal sectional view for illustrating the mounting process of the coupling. As shown in FIG. 35, in the state of (a) the mounting process of the coupling in the direction of the axis L1, the downstream free end position 1850A1 with respect to the rotational direction X4 is closer to the direction of the driving shaft 182 (the rotational force applying portion) than the drive shaft free end 180b3. In the state of (b), the free end position 1850A1 is contacted to the free end portion 180b. At this time, the free end position 1850A1 moves toward the development shaft 153 along the downstream free end portion 180b of the drive shaft 180 with respect to the rotational direction X4 of the rotary. And, the free end position 1850A1 passes by the free end portion 180b3 of the drive shaft 180 at this position, the coupling 150 takes the pre-engagement angular position (FIG. 34 (c)). And, finally the engagement between the coupling 1850 and the drive shaft 180 is established ((rotational force transmitting angular position) FIG. 34 (d)). When the free end portion 1850A1 passes by the free end 180b3, the free end position 1850A1 is contacted to the free end 180b3, or is positioned in the development shaft (153) or developing roller side An example of this embodiment will be described.

First, as shown in FIG. 5, the shaft diameter of the development shaft 153 is ΦZ1, the shaft diameter of the pin 155 is ΦZ2, and the length is Z3. As shown in FIGS. 6 (d), (e) and (f), the maximum outer diameter of the driven portion 150a of the coupling 150 is ΦZ4 the diameter of a phantom circle C1 (FIG. 6(d)) which forms the inner ends of the projections 150d 1 or 150d 2 or 150d3, 150d4 is ΦZ5, and the maximum outer diameter of the driving portion 150b is ΦZ6. Referring to FIGS. 22 and 25, the angle formed between the coupling 150 and the conic drive shaft receiving surface 150f is α2, and the angle formed between the coupling 150 and the shaft receiving surface 150i is α1. A shaft diameter of the drive shaft 180 is ΦZ7, the shaft diameter of the pin 182 is ΦZ8, and the length is Z9). In addition, the angle relative to the axis L1 in the rotational force transmitting angular position is β1, the angle in the pre-engagement angular position is β2, and the angle in the disengaging angular position is β3. In this example, Z1=8 mm; Z2=2 mm; Z3=12 mm; Z4=15 mm; Z5=10 mm; Z6=19 mm; Z7=8 mm; Z8=2 mm; Z9=14 mm; α1=70 degrees; α2=120 degrees; β1=0 degree; β2=35 degrees; β3=30 degrees.

It has been confirmed with these settings, the devices of this embodiment works satisfactorily. However, these settings do not limit the present invention.

Embodiment 2

Figure 36:
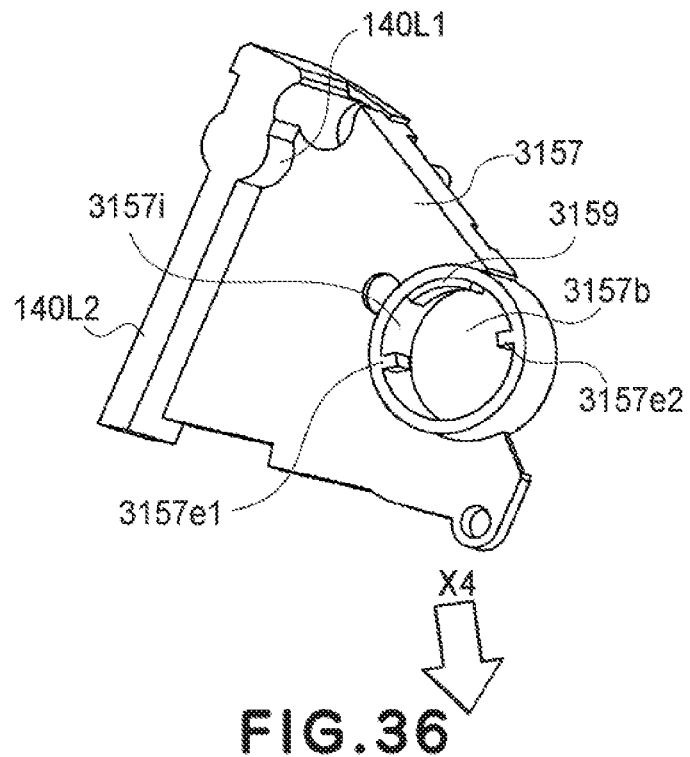
FIG. 36 is a perspective view of a development supporting member according to an embodiment of the present invention.
Figure 37:
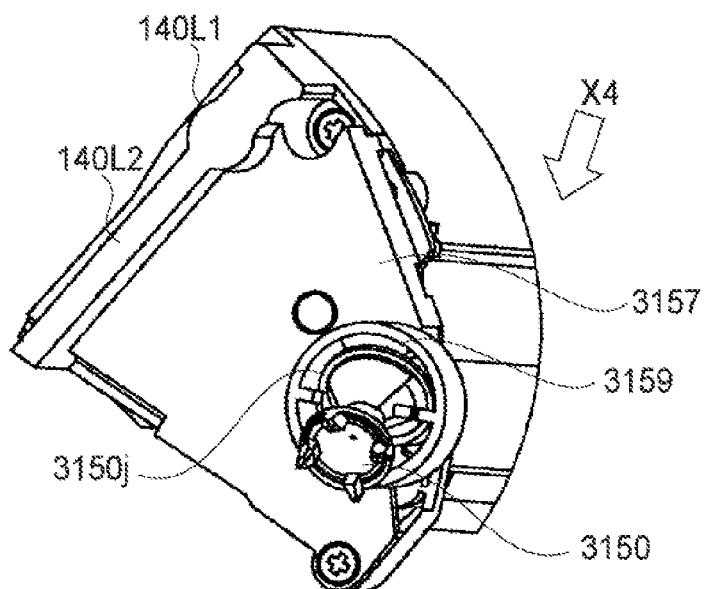
FIG. 37 is a perspective view of a side of a developing cartridge according to an embodiment of the present invention.
Figure 38:
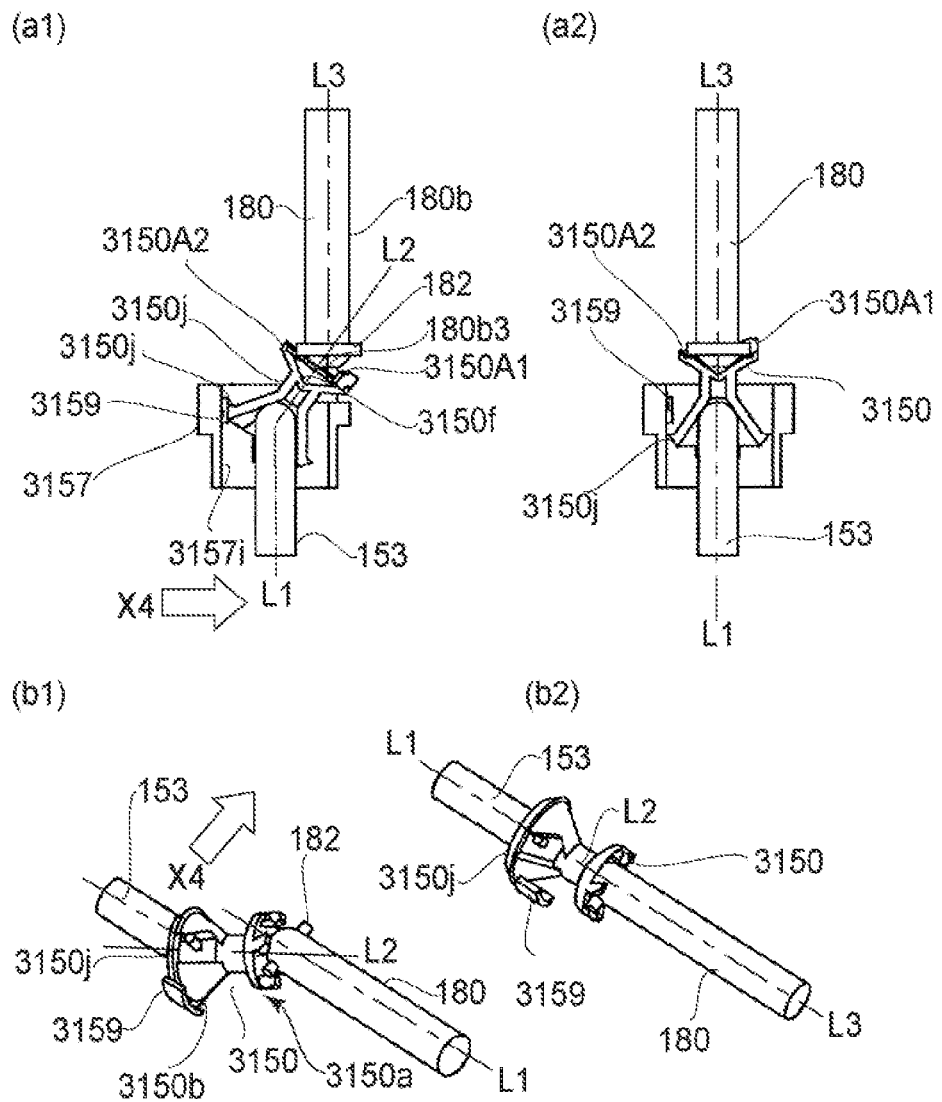
FIG. 38 is a perspective view illustrating the state of the engagement between the drive shaft and the coupling according to the embodiment of the present invention, and a longitudinal sectional view.

Referring to FIG. 36-FIG. 38, the second embodiment to which applied the present invention will be described.

In this embodiment, a means for inclining the axis of the coupling relative to the axis of the developing roller.

In the description of this embodiment, the same reference numerals as in Embodiment 1 are assigned to the elements having the corresponding functions in this embodiment, and the detailed description thereof is omitted for simplicity. This applies also about the other embodiment described in the below.

FIG. 36 is a perspective view which illustrates a coupling locking member (this is peculiar to the present embodiment) pasted on the supporting member. FIG. 37 is an enlarged perspective view of a major part of the driving side of the cartridge. FIG. 38 is a perspective view and a longitudinal sectional view which illustrate an engaged state between the drive shaft and the coupling.

Figure 46:
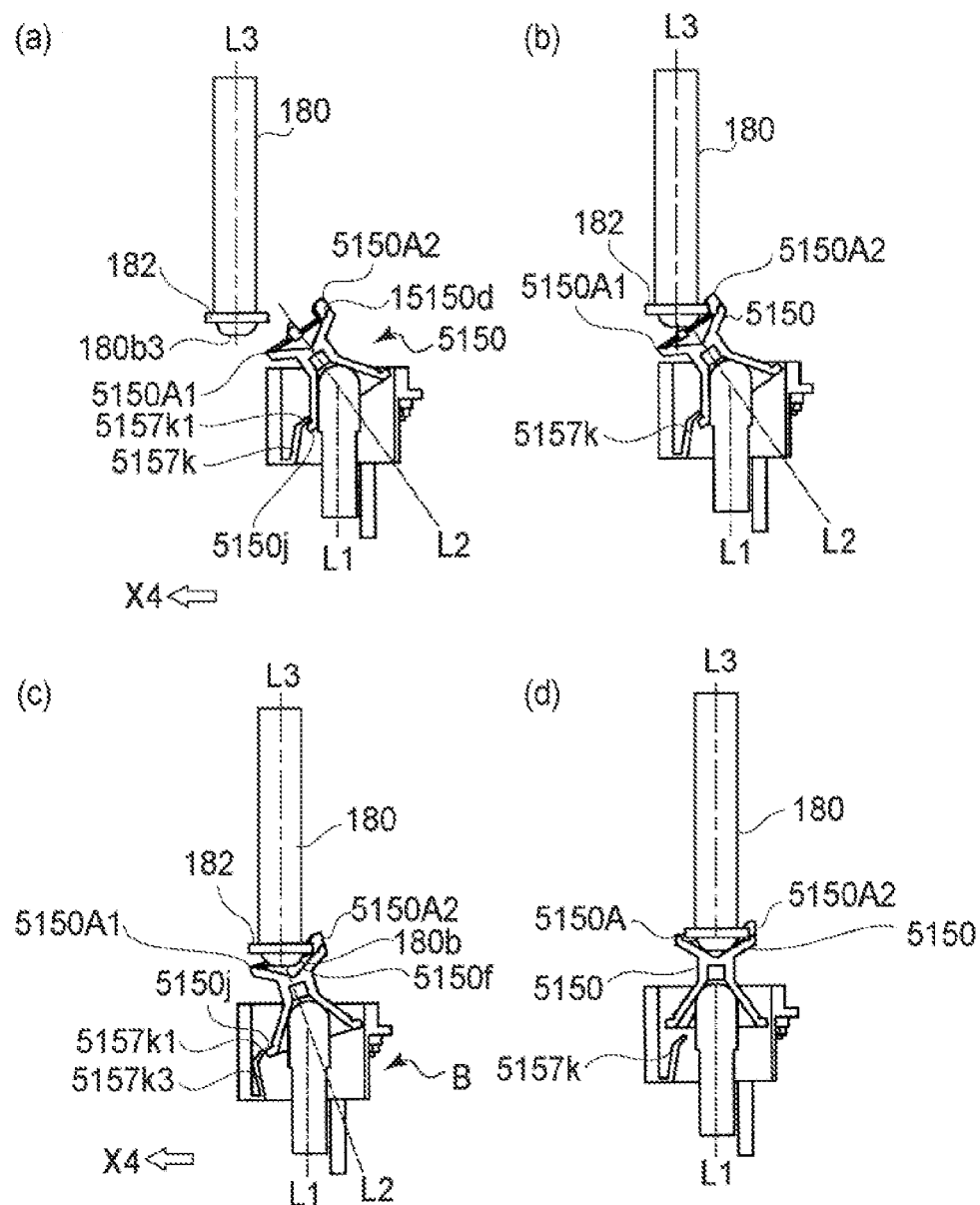
FIG. 46 is a longitudinal sectional view showing an engaged state between the drive shaft and the coupling according to the embodiment of the present invention.

As shown in FIG. 36, the supporting member 3157 has a space 3157b which surrounds a part of coupling. A coupling locking member 3159 as a maintaining member for maintaining the inclination of the coupling 3150 is pasted on a cylinder surface 3157i which constitutes the space thereof. As will be described hereinafter, this locking member 3159 is a member for maintaining temporarily the state where the axis L2 inclines relative to the axis L1. In other words, as shown in FIG. 36, the flange portion 3150j of the coupling 3150 contacts to this locking member 3159. By this, the axis L2 maintains the state of inclining toward the downstream with respect to the rotational direction (X4) of the cartridge relative to the axis L1. Therefore, as shown in FIG. 46, the locking member 3159 is disposed on the upstream cylinder surface 3157i of the bearing member 3157 with respect to the rotational direction X4. As the material of the locking member 3159, the material which has a relatively high coefficient of friction, such as the rubber and the elastomer, or the elastic materials, such as the sponge and the flat spring, are suitable. This is because, the inclination of the axis L2 can be maintained by the frictional force, the elastic force, and so on.

Referring to FIG. 38, the engaging operation (a part of mounting and dismounting operation of the cartridge) for engaging the coupling 3150 with the drive shaft 180 will be described. FIGS. 38 (a1) and (b1) illustrate the state immediately before the engagement, and FIGS. 38 (a2) and (b2) illustrate the state of the completion of the engagement.

As shown in FIG. 38 (a1) and FIG. 38 (b1), the axis L2 of the coupling 3150 inclines toward the downstream (retracted position) with respect to the rotational direction X4 relative to the axis L1 beforehand by the force of the locking member 3159 (pre-engagement angular position). By this inclination of the coupling 3150, by, in the direction of the axis L1, the downstream (with respect to the mounting direction) free end portion 3150A1 is closer to the cartridge (developing roller) side than the drive shaft free end 180b3. And, the upstream (with respect to the mounting direction) free end portion 3150A2 is closer to the pin 182 than the free end 180b3 of the drive shaft 180. In addition, at this time, as has been described in the foregoing, the flange portion 3150j of the coupling 150 is contacted to the locking member 3159. And, the inclined state of the axis L2 is maintained by the frictional force thereof.

Thereafter, the cartridge B moves to the rotational direction X4. By this, the free end surface 180b or the free end of the pin 182 contacts to the driving shaft receiving surface 3150f of the coupling 3150. And, the axis L2 approaches to the direction in parallel with the axis L1 by the contact force (force revolving the rotary) thereof. At this time, the flange portion 3150j is departed from the locking member 3159, and becomes into the non-contact state.

And, finally, the axis L1 and the axis L2 are substantially co-axial with each other.

And, the coupling 3150 is in the waiting (stand-by) state for transmitting the rotational force (FIG. 38 (a2), (b2)) (rotational force transmitting angular position).

Similarly to embodiment 1, the rotary C swings about a swing center axis and contacts the developing roller 110 to the photosensitive drum 107. And, the rotational force of the motor 64 is transmitted to the coupling 3150, the pin 155, the development shaft 153, and the developing roller 110 through the drive shaft 180. The axis L2 is substantially co-axial with the axis L1 during the rotation. For this reason, the locking member 3159 is not contacted with the coupling 3150 and does not influence on the drive of the coupling 3150.

After the image formation finishes, the rotary C swings in the opposite direction and the developing roller 110 spaces from the photosensitive drum 107. And then, in order to carry out the image formation for the next color, the rotary C begins the revolution. In that case, the coupling 3150 disengages from the drive shaft 180. In other words, the coupling 3150 is moved to the disengaging angular position from the rotational force transmitting angular position. Since the operation in that case is the same as that of Embodiment 1 (FIG. 25), the description is omitted for simplicity.

In addition, by the time the rotary C carries out one full revolution, the axis L2 of the coupling 3150 inclines toward the downstream in the rotational direction X4 by unshown means. In other words, the coupling 3150 is moved from the disengaging angular position to the pre-engagement angular position by way of the rotational force transmitting angular position. By doing so, the flange portion 3150j contacts to the locking member 3159, and the inclined state of the coupling is maintained again.

As has been described hereinbefore, the inclined state of the axis L2 is maintained by the locking member 3159 pasted on the supporting member 3157. By this, the engagement between the coupling and the drive shaft is established much more assuredly.

In the present embodiment, the locking member 3159 is pasted at the upstreammost side of the inner surface 3157i of the supporting member with respect to the rotational direction X4. However, this is not inevitable. For example, what is necessary is the position where the inclined state thereof can be maintained when the axis L2 is inclined.

The locking member 3159 has been described as contacting with the flange portion (FIG. 38b1) 3150j (FIG. 38b1). However, the contact position may be the driven portion 3150a (FIG. 38b1).

In this embodiment, although it has been described that the locking member is a separate member, this is not inevitable. For example, it may be molded integrally with the supporting member 3157 (2 color molding, for example), and the supporting member 3157 may be directly contacted to the coupling 3150 in place of the locking member 3159. Or, the surface of the coupling may be roughened for the increase of the coefficient of friction.

In addition, although it has been described that the locking member 3159 is pasted on the development supporting member 3157, it may be anything if it is a member fixed on the cartridge B.

Embodiment 3

Referring to FIG. 39-FIG. 42, a third embodiment of the present invention will be described.

The description will be made as to means for inclining the axis L2 relative to the axis L1.

Figure 39:
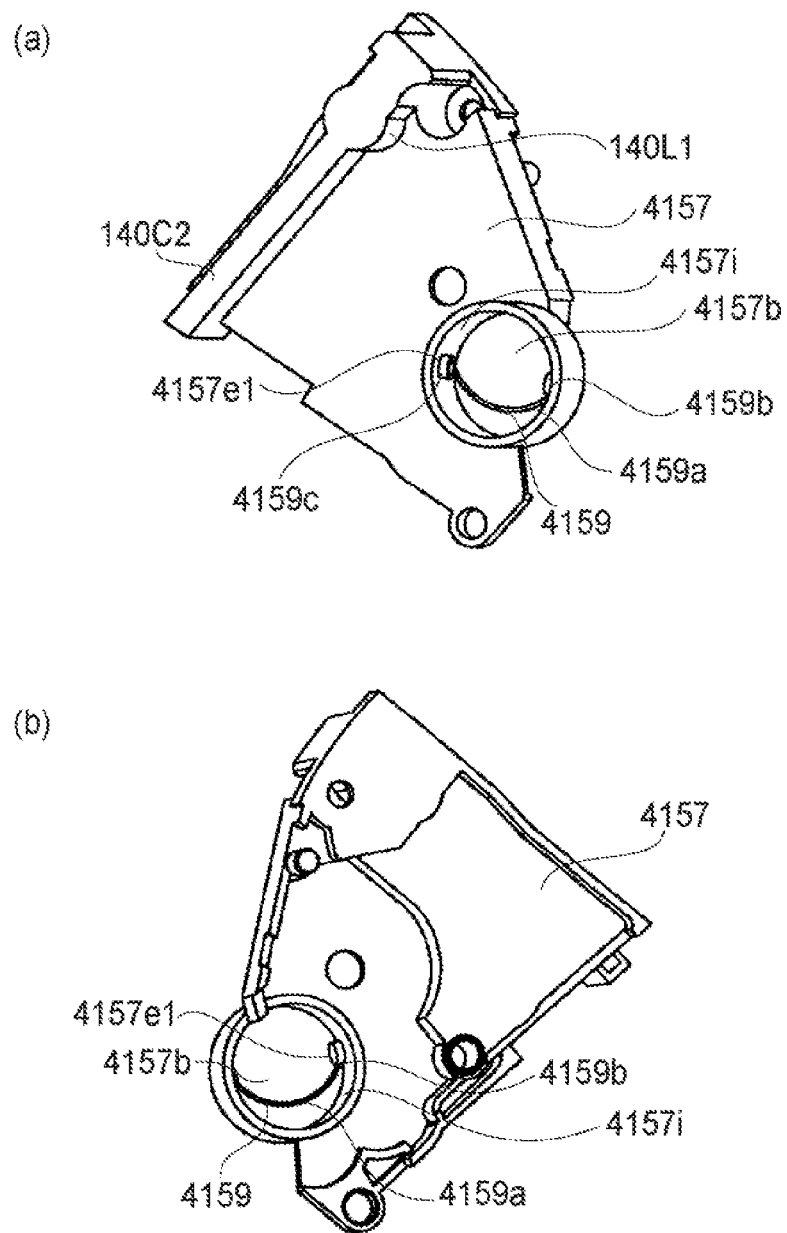
FIG. 39 is a perspective view of a development supporting member according to the embodiment of the present invention.
Figure 40:
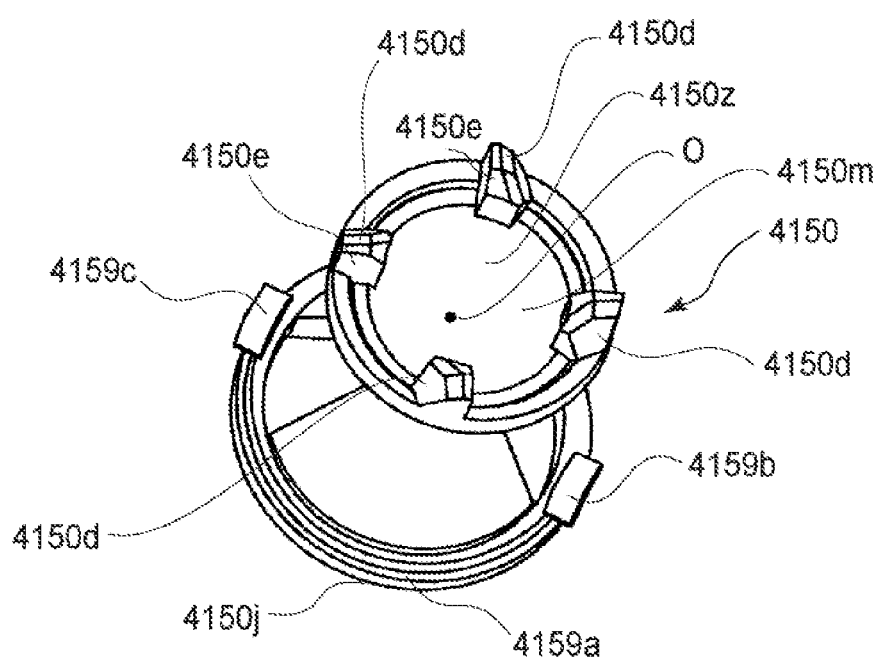
FIG. 40 is a perspective view of a coupling according to an embodiment of the present invention.
Figure 41:
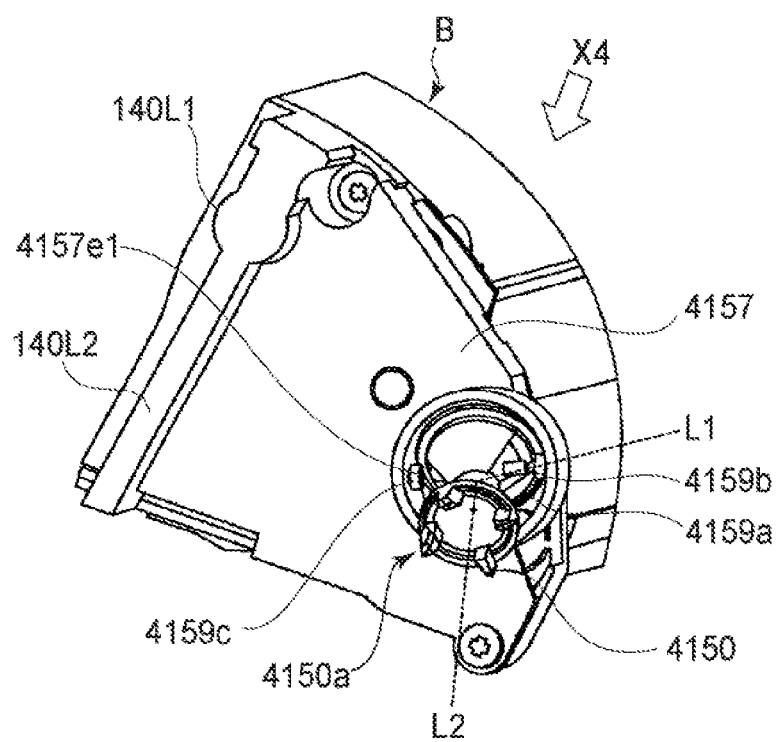
FIG. 41 is a perspective view of a side of a developing cartridge according to an embodiment of the present invention.
Figure 42:
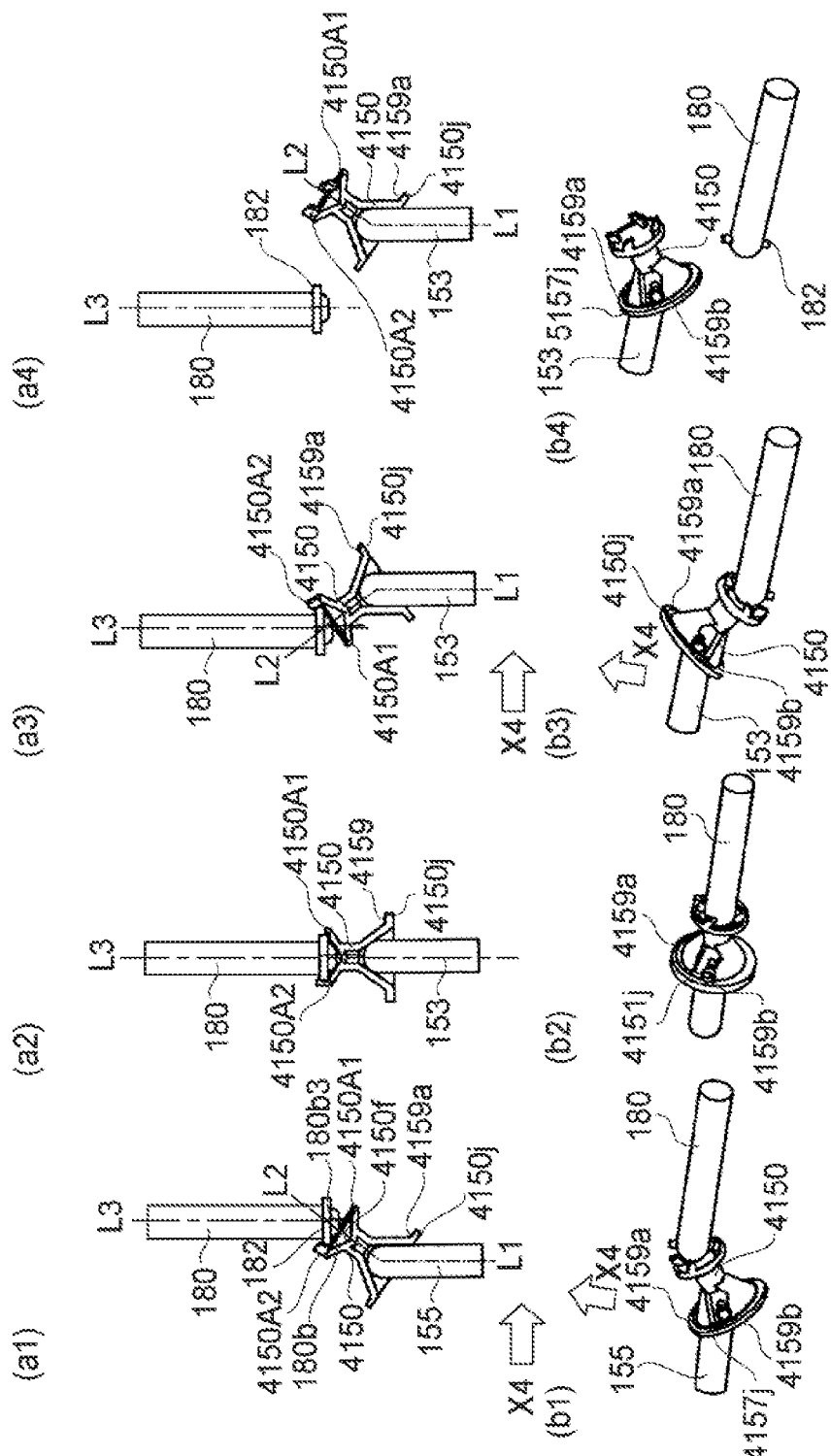
FIG. 42 is a perspective view and a longitudinal sectional view illustrating a state of the engagement between the drive shaft and the coupling in the embodiment of the present invention.

As shown in FIG. 39 (perspective view), a coupling pressing member peculiar to the present embodiment is mounted to the supporting member. FIG. 40 is a perspective view illustrating the coupling pressing member. FIG. 41 is an enlarged perspective view of the major part of the driving side of the cartridge. FIG. 42 is a perspective view illustrating the engaging operation and a longitudinal sectional view of the coupling.

As shown in FIG. 39, spring supporting portions 4157e1, 4157e2 are provided on the inner surface 4157i of the supporting member (mounting member) 4157. In addition, the coil parts 4159b, 4159c of torsion coil springs (coupling urging members) 4159 are mounted to the supporting portions 4157e1, 4157e2. And, as shown in FIG. 40, a contact portion 4159a of the urging member 4159 contacts to the driven portion 4150a side of a flange portion 4150j of the coupling 4150. The spring 4159 is twisted to produce an elastic force. By this, the axis L2 of the coupling 4150 is inclined relative to the axis L1 (FIG. 41, pre-engagement angular position). The contact position of the urging member 4159 to the flange portion 4150j is set downstream of the center of the development shaft 153 with respect to the rotational direction X4. For this reason, the axis (L2) is inclined relative to the axis (L1) so that the driven portion 4150a side is directed to the downstream with respect to the rotational direction (X4).

In the present embodiment, although the torsion coil spring is used as the urging member (elastic material), this is not inevitable. The any means which can produce the elastic forces, such as for example, leaf springs, rubber, and sponge, is usable. However, in order to incline the axis L2, a certain amount of stroke is required. Therefore, a member which can provide the stroke is desirable. In addition, the spring supporting portions 4157e1, 4157e2 of the supporting member 4157 and the coil parts 4159b, 4159c function as the retention rib for the coupling described with respect to Embodiment 1 (FIG. 9, FIG. 12).

Referring to FIG. 42, the engaging operation (a part of rotating operation of the rotary) between the coupling 4150 and the drive shaft 180 will be described. (a1) and (b1) in FIG. 42 are views immediately before the engagement, and (a2) and (b2) in FIG. 42 illustrate the state where the engagement has completed. (a3) and (b3) in FIG. 42 are views in the state where the engagement has been released, and (a4) and (b4) in FIG. 42 are views in the state where the axis L2 inclines toward the downstream with respect to the rotational direction X4 again.

In the state (retreating position of the coupling 4150) of FIGS. 42 (a1) and 42 (b1), the axis L2 thereof is beforehand inclined toward the downstream with respect to the rotational direction X4 relative to the axis L1 (pre-engagement angular position). Thus, the coupling 4150 is inclined. By this, in the direction of the axis L1, the downstream free end position 4150A1 with respect to the rotational direction X4 is positioned in the cartridge (developing roller) side beyond the drive shaft free-end 180b3. In addition, the upstream free end position 4150A2 with respect to the rotational direction X4 is positioned beyond the pin 182 side from the drive shaft free-end 180b3. In other words, as has been described hereinbefore, the flange portion 4150j is pressed by the urging member 4159. For this reason, the axis L2 is inclined relative to the axis L1 by the urging force.

Thereafter, the cartridge B moves in the rotational direction X4. By this, the free end surface 180b or the free end of the pin 182 contacts to the driving shaft receiving surface 4150f of the coupling 4150. And, the axis L2 approaches to the angle in parallel with the axis L1 by the contact force (force of rotating the rotary).

Simultaneously, the flange portion 4150j and the urging spring 4159 contact with each other. By this, the spring 4159 is twisted to increase the moment. Finally, the axis L1 and the axis L2 become substantially co-axial with each other, and the coupling 4150 is in the rotation latency state (FIG. 42 (a2), (b2)). (rotational force transmitting angular position).

Similarly to embodiment 1, the rotational force is transmitted to the coupling 4150, the pin 155, the development shaft 153, and the developing roller 110 through the drive shaft 180 from the motor 64. The urging force of the urging member 4159 applies to the coupling 4150 at the time of the rotation. However, if the driving torque of the motor 64 has a sufficient margin, the coupling 4150 will rotate with high precision.

When the rotary further revolves, the coupling 4150 will separate from the drive shaft 180 as shown in FIGS. 42 (a3) and (b3). In other words, the free end spherical surface 180b of the drive shaft 180 pushes the driving shaft receiving surface 4150f of the coupling. By this, the axis L2 inclines toward the opposite direction (opposite direction from the rotational direction X4) with respect to the axis L1 (disengaging angular position). By doing so, the urging member 4159 is further twisted so that the urging force (elastic force) further increases. For this reason, after the coupling 4150 disengages from the drive shaft 180, the axis L2 is again inclined in the rotational direction X4 relative to the axis L1 by the urging force of the urging member 4159 (pre-engagement angular position, FIG. 42 (a4), (b4)). By this, even if the means for inclining the axis L2 toward the pre-engagement angular position by the time the drive shaft 180 and the coupling 4150 are again coupled by the revolution of the rotary C with each other is not provided particularly, the drive shaft 180 and the coupling 4150 are connectable (engageable) with each other.

As has been described hereinbefore, the urging is effected by the urging member 4159 provided on the supporting member 4157. By this, the axis L2 is inclined relative to the axis L1. Therefore, the inclined state of the coupling 4150 is maintained assuredly and the engagement (coupling) between the coupling 4150 and the drive shaft 180 is ensured.

The position of the urging member in the present embodiment is not restrictive. For example, it may be another position on the supporting member 4157, or may be a member other than such a member.

In addition, the urging direction of the urging member 4159 is the same as the direction of the axis L1, but if the axis L2 inclines in the predetermined direction, it may be any direction.

In addition, the energizing position of the urging member 4159 is the position of the flange portion 4150j, but if the axis L2 inclines toward the predetermined direction, it may be any position of the coupling.

Embodiment 4

Referring to FIG. 43-FIG. 46, the fourth embodiment of the present invention will be described.

The means for inclining the axis L2 with respect to the axis L1 will be described.

Figure 43:
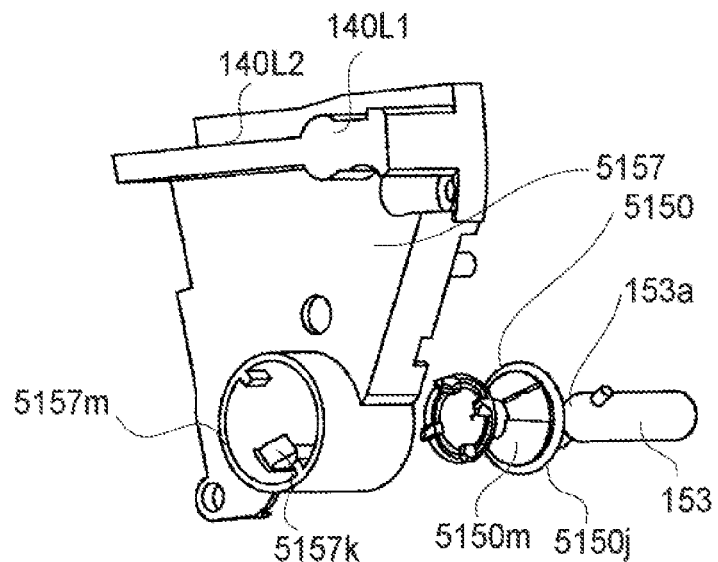
FIG. 43 is an exploded perspective view illustrating a state of mounting the coupling to the development supporting member, in the embodiment of the present invention.
Figure 44:
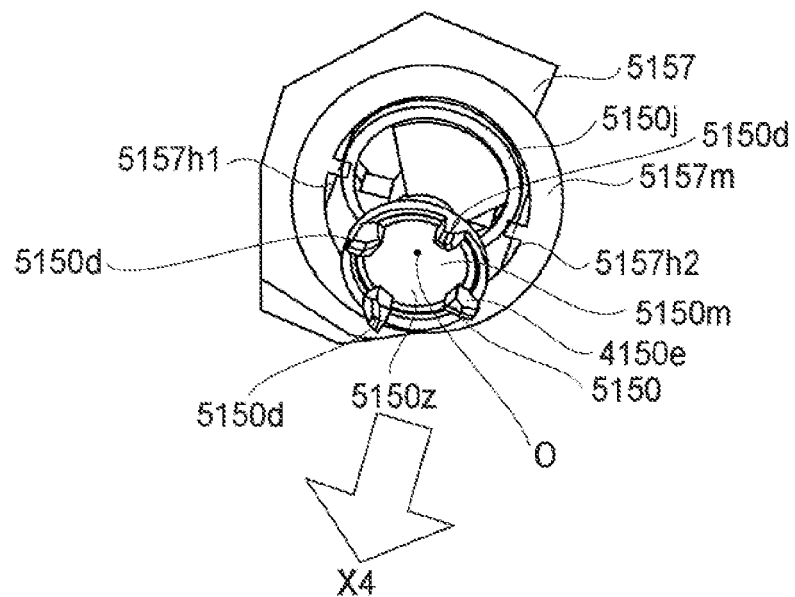
FIG. 44 is a perspective view of a coupling according to an embodiment of the present invention.
Figure 45:
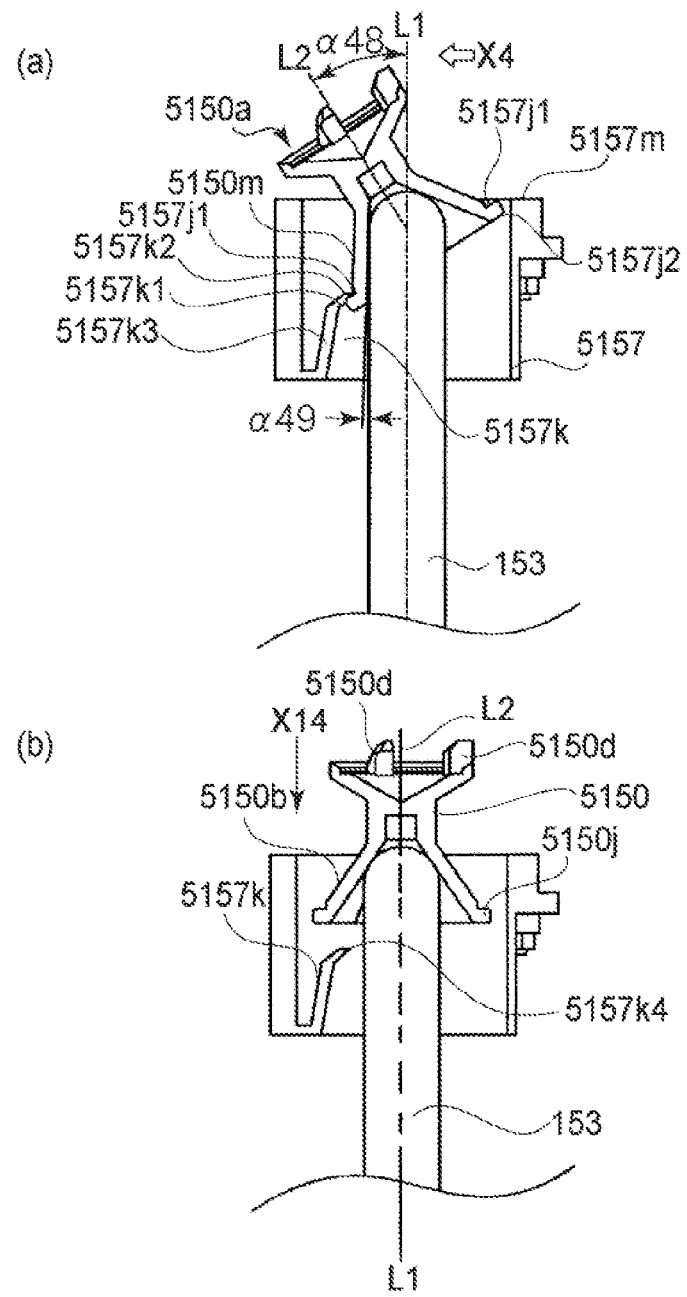
FIG. 45 is a longitudinal sectional view illustrating an engaged state between the development shaft and the coupling according to the embodiment of the present invention.

FIG. 43 is an exploded perspective view illustrating the state before the assembly of the major members of the developing cartridge. FIG. 44 is an enlarged side view of the driving side of the cartridge. FIG. 45 is a longitudinal sectional view which schematically illustrates the structure for the axis L2 to incline. FIG. 46 is the drive shaft and a longitudinal sectional view illustrating the engaging operation between the coupling.

As shown in FIG. 43 and FIG. 45, a coupling locking member 5157k is provided on the supporting member (mounting member) 5157. When the supporting member 5157 is assembled in the direction of the axis L1, while a part of a locking surface 5157k1 of an of the locking member 5157k contacts with the inclined surface 5150m of the coupling 5150, the part engages with the upper surface 5150j1 of a flange portion 5150j. At this time, the flange portion 5150j is mounted with play (angle alpha 49) between locking surface 5157k1 and circular column portion of the development shaft 153 153a. Even when the dimensional tolerances of the coupling 5150, the bearing member 5157, and the development shaft 153 vary, the flange portion 5150j1 can lock assuredly to the locking portion 5157k1 of the bearing member 5157 by providing this play (angle alpha 49).

And, as shown in FIG. 45 (a), the axis L2 is inclined so that the driven portion 5150a side faces the downstream with respect to the rotational direction X4 relative to the axis L1. In addition, since the flange portion 5150j extends over the full-circumference, it can be mounted regardless of the phase of the coupling 5150. Furthermore, as has been described with respect to Embodiment 1, the coupling is pivotable in the rotational direction X4 by the regulating portion 5157h 1 or 5157h2. In addition, in this embodiment, the locking member 5157k is provided at the downstream-most position in the rotational direction X4.

As will be described hereinafter, as shown in FIG. 45 (b), in the state of being in engagement with the drive shaft 180, the flange portion 5150j is released from the locking member 5157k. In addition, the coupling 5150 is free from the locking portion 5157k. In assembling the supporting member 5157, when the coupling 5150 is not able to be retained in the inclined state, the driving portion 5150b of the coupling is pushed by tool and so on (the direction of an arrow X14 of FIG. 45 (b)). By this, the coupling 5150 will mount easily (FIG. 45 (a)).

Referring to FIG. 46, the engaging operation (a part of rotary rotating operation) between the coupling 5150 and the drive shaft 180 will be described. FIG. 46 (a) shows a view immediately before the engagement, and (b) is a view after a part of coupling 5150 passes the drive shaft 180. In addition, (c) illustrates the state where the inclination of the coupling 5150 is released by the drive shaft 180, and (d) illustrates the engaged state.

In the state of FIGS. 46 (*a*) and (*b*), the coupling 5150 takes a retreating position, where the axis L2 thereof is inclined beforehand to the rotational direction X4 relative to the axis L1 (pre-engagement angular position). The downstream free end position 5150A1 with respect to the rotational direction X4 takes a position closer to the cartridge B (developing roller) than the drive shaft free-end 180*b*3 by the inclination of the coupling 5150. In addition, the upstream free end position 5150A2 with respect to the rotational direction X4 is positioned in the pin 182 side from the drive shaft free-end 180*b*3. At this time, as has been described hereinbefore, the flange portion 5150*j* is contacted to the locking surface 5157*k*1 of the locking portion 5157*k*, and, as for the coupling, the inclined state is maintained.

Thereafter, as shown in (c), the cartridge B moves in the rotational direction X4. By this, tapered driving shaft receiving surface 5150*f* of the coupling 5150 or driven projection 5150*d* contacts to the free end portion 180*b* of the drive shaft 180, or the pin 182. The flange portion 5150*j* separates from the locking surface 5157*k*1 by the force by the contact. By this, the lock relative to the supporting member 5157 of the coupling 5150 is released. And, in response to the rotation of the rotary C, the coupling is inclined so that the axis L2 becomes parallel to the axis L1. After the passage of the flange portion 5150*j*, the locking member 5157*k* returns to the previous position by the restoring force. Then, the coupling 5150 becomes free from the locking portion 5157*k*. And, finally, as shown in (d), the axis L1 and the axis L2 become substantially co-axial, and the rotation latency state is established (rotational force transmitting angular position).

And, after the image forming operation finishes, the next cartridge B reaches the developing position. For this purpose, the rotary C rotates again. In that case, the coupling 5150 disengages from the drive shaft 180. In other words, the coupling 5150 is moved to the disengaging angular position from the rotational force transmitting angular position. Since the detail of the operation in that case is the same as Embodiment 1 (FIG. 25), the description is omitted for simplicity.

In addition, by the time the rotary C carries out one-full revolution, the axis L2 of the coupling 5150 inclines to the downstream with respect to the rotational direction X4 by an unshown means. In other words, the coupling 5150 is moved from the disengaging angular position to the pre-engagement angular position by way of the rotational force transmitting angular position. By doing so, the flange portion 5150*j* contacts to the locking member 3157*k*, and the inclined state of the coupling is maintained again.

As has been described hereinbefore, the inclining direction of the coupling 5150 is regulated by the locking portion 5157*k* of the supporting member 5157. By this, the inclined state of the coupling 5150 is maintained even more assuredly. And, the engagement between the coupling 5150 and the drive shaft 180 is established assuredly. Furthermore, at the time of the rotation, the structure that the locking portion 5157*k* does not contact to the coupling 5150 also contributes to the stabilized transmission of the rotational force.

In this embodiment, the locking portion 5157*k* has an elastic portion. However, the locking portion 5157*k* may not have the elastic portion and it may be formed in the shape of a rib by which the flange portion of the coupling is made to deform. By this, the similar effects are provided.

In addition, the locking portion 5157*k* is provided at the downstreammost side with respect to the rotational direction X4. However, the locking portion 5157*k* may be any position if the axis L2 can maintain the state of inclining to the predetermined direction.

In this embodiment, the locking portion 5157*k* is constituted by a part of supporting members. However, the locking portion 5157*k* may be provided in another position of the supporting member, or it may be a member other than the supporting member. In addition, the locking portion may be a separate member.

In addition, the present embodiment, and Embodiment 2 or Embodiment 3 may be implemented simultaneously, and the engagement and the disengaging operations of the coupling relative to the drive shaft are carried out even more assuredly in this case.

Embodiment 5

Referring to FIG. 47-FIG. 51, the fifth embodiment of the present invention will be described.

The means for inclining the axis L2 relative to the axis L1 will be described.

Figure 47:
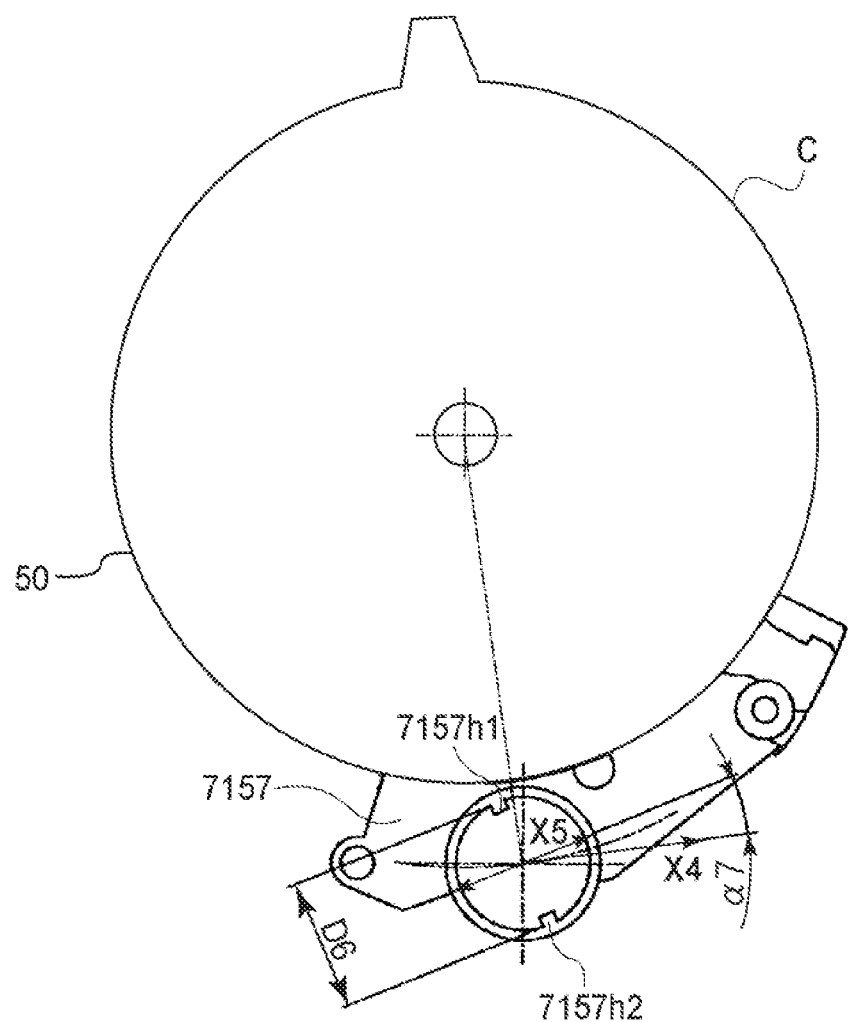
FIG. 47 is a side view of a rotary flange according to an embodiment of the present invention.
Figure 48:
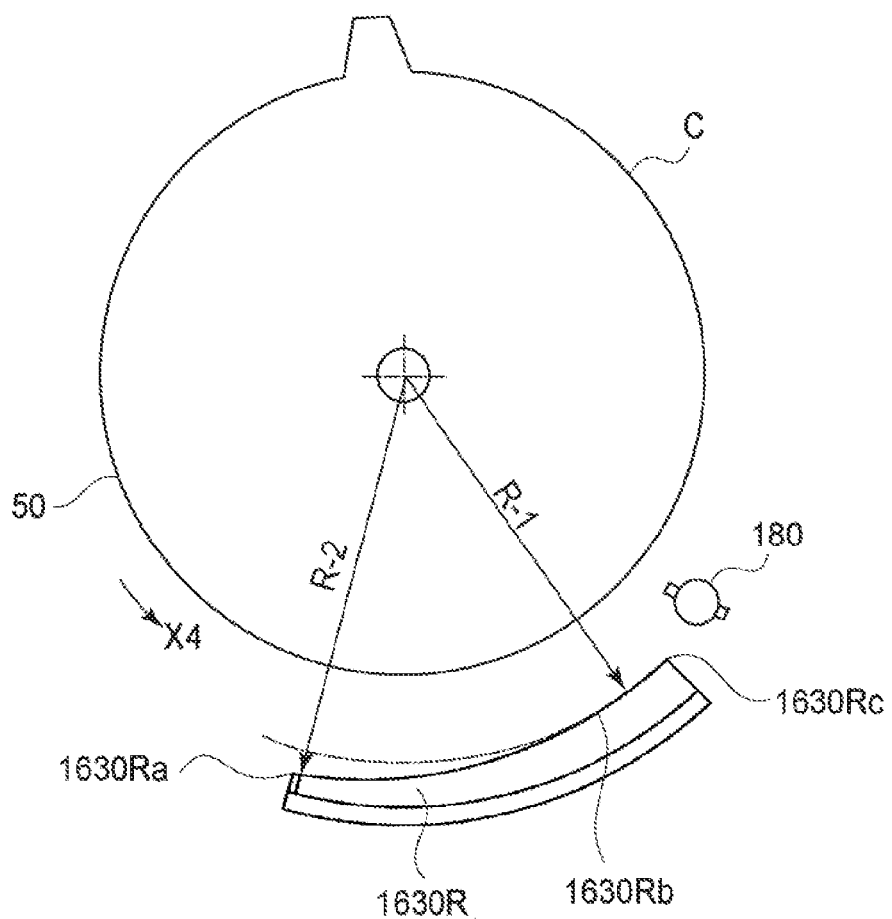
FIG. 48 is a side view of the rotary flange according to the embodiment of the present invention.
Figure 49:
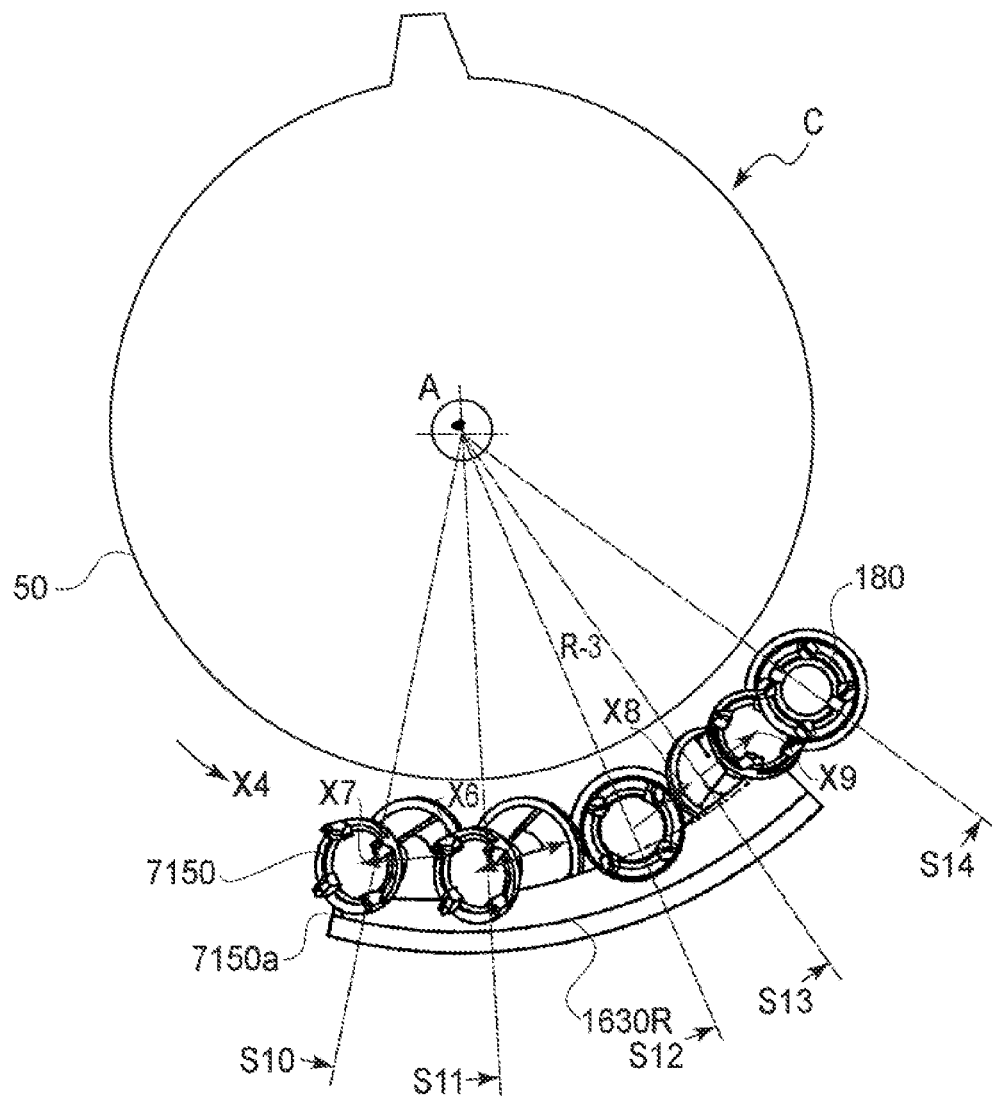
FIG. 49 illustrates a locus of the coupling shown in FIG. 47 according to an embodiment of the present invention.
Figure 50:
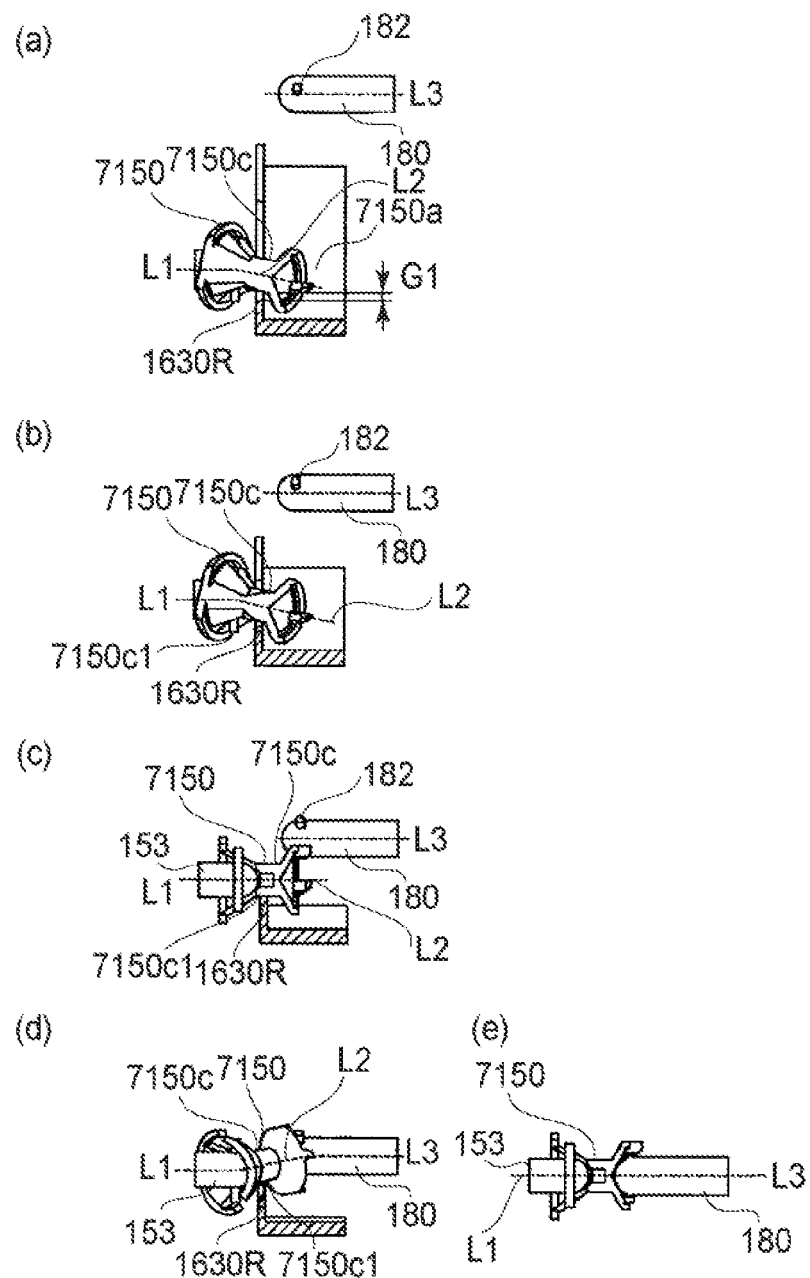
FIG. 50 is a sectional view of the drive shaft and the coupling of FIG. 38 according to an embodiment of the present invention.

FIG. 47 shows a view of supporting member and rotary flange of the driving side, as seen in the direction of the axis L1. FIG. 48 shows a view of the members of the apparatus main assembly, as seen in the direction of the axis L1. FIG. 49 is the same as FIG. 48, however the locus of the coupling is added. FIG. 50 is a sectional view taken along lines S10-S10, S11-S11, S12-S12, S13-S13, S14-S14 in FIG. 49.

First, referring to FIG. 47, the structure for regulating the inclining direction of the coupling 150 will be described. The supporting member 7157 rotates integrally with the rotary C. The member 7157 is provided with regulating portions 7157*h*1 or 7157*h*2 for permitting the inclination, only in said one direction, of the coupling 7150. A distance D6 between these regulating portions is slightly larger than the outer diameter (unshown) of the driving portion 7150*b* of the coupling 7150 to permit the rotation of the coupling 7150. The regulating portions 7157*h*1 and 7157*h*2 are inclined by angle of alpha 7 relative to the rotational direction X4. By this, the coupling 7150 is pivotable to the alpha7 X5 direction with respect to the rotational direction X4.

Referring to FIG. 48, the method for inclining the coupling 7150 will be described. In the present embodiment, a regulation rib 1630R fixed to the driving side 180 is provided. The radius of the surface inside the radial direction of the rib 1630R is gradually reduced toward the downstream portion 1630Rb from the upstream part 1630Ra, R-2 with respect to the rotational direction X4. And, the radius R-1 of this surface is selected so that it contacts and is interfered by the outer periphery 7150*c*1 of the intermediate part 7150*c* of the coupling FIG. 45.

When the coupling 7150 contacts with the regulation rib 1630R, the coupling 7150 is pushed toward the rotation axis of the rotary C. At this time, the coupling 7150 is regulated by the regulating portions 1557*h*1 or 1557*h*2 in the movement direction. For this reason, the coupling 7150 is inclined to the X5 direction.

An increase of the degree of the interference will also increase the inclination of the coupling 7150. The configuration of the regulation rib 1630R is such that before the coupling 7150 engages with the drive shaft 180, the amount of interferences is increased until the inclination angle of the coupling 7150 becomes the engageable angle. In the present embodiment, the section from the position 1630Rb to the position 1630Rc is located on the same radius positions from the rotation axis of the rotary C. The radius is indicated by R-1.

FIG. 49 illustrates the locus until the coupling 7150 engages with the drive shaft 180 along the guide 1630R with the rotation of the rotary C. A section taken along lines S10-S10-S14-S14 in FIG. 49 is shown in FIG. 50(*a*)-(*e*).

The coupling 7150 enters the region of the regulation rib 1630R in the direction of X4. At this time, the coupling is faced in the direction of X6 which is the substantially advancing direction, is faced in the reverse direction of X7, or is faced in the inbetween direction thereof. Here, the case where the coupling 7150 faces the direction of X7 will be described.

The inclining direction X5 (FIG. 47) of the coupling 7150 is angle alpha 7 relative to the rotational direction X4. In view of this, when the coupling 7150 inclines toward the X7 direction, the driven portion 7150*a* of the coupling outwardly inclines with respect to the radial direction of the rotary C (FIG. 47). The gap G1 is provided between the coupling 7150 and the regulation rib 1630R in the place where it enters the range of the regulation member 1630R.

When the rotation of the rotary C advances to the S11-S11 section, the coupling 7150 and the regulation rib 1630R contact to each other (FIG. 50*b*). The radius of the regulation rib 1630R is reduced gradually. Therefore, a degree of the interference increases with the advancement of the coupling 7150.

In the position of the section S12-S12, the regulation rib 1630R pushes up the coupling 7150, and it is co-axial with the development shaft (FIG. 50*c*). At this time, the motion of the coupling 7150 is regulated by the regulation rib 1630R. In view of this, the coupling 7150 is pivotable only in the X8 direction (only in X6 direction in the cross-sectional position of S10-S10), and cannot be inclined toward the opposite direction X8 thereto.

In the cross-sectional S13-S13 position, the degree of the interference of the coupling relative to the regulation rib 1630R increases. In view of this, the coupling 7150 is pushed up by the rib 1630R, and is forcedly inclined in the direction of X9 (X8 direction in the section S12-S12) (FIG. 50 (*d*)). (pre-engagement angular position).

In this state, the rotary C is rotated until the coupling becomes co-axial with the drive shaft 180 (S14-S14 section position). By this, the coupling 7150 can be engaged with the drive shaft 180 through the operation similar to Embodiment 1 (rotational force transmitting angular position).

Thereafter, after the image formation finishes, the coupling 7150 is disengaged from the drive shaft 180, so that, it is a series of operations are finished (since the disengaging operation is the same as those of the foregoing embodiments, the description is omitted for simplicity). This operation is repeated for every image formation.

In order for the coupling to interfere with the regulation rib, the coupling is contacted to it from the outside with respect to the radial direction, and inclines the coupling thereby. However, it is regulated such that the angle alpha 7 (in FIG. 47 the X5 direction) of the regulating portions 1557*h*1 or 1557*h*2 are line-symmetrical with respect the tangential direction (the X4 direction). By this, the same operation is carried out when the regulation rib 1630R is contacted from the radial inside.

The cartridge does not need to be provided with the mechanism for inclining the coupling by the orientation of the coupling 7150 being regulated by the regulation rib 1630R. By this, the cost reduction of the cartridge can be accomplished.

In this embodiment, the coupling may be assuredly slid along the rib by applying the force to the coupling with the spring and so on.

In addition, it is moved on the guide rib through an intermediate part 7150*c* of the coupling. However, if the inclination of the coupling is possible, it may move on the guide rib through the position other than the intermediate part.

In addition, the present embodiment, Embodiment 2 or Embodiment 3, or Embodiment 4 may be implemented simultaneously, and in such a case, Engagement and disengagement operations of the coupling can be ensured.

Embodiment 6

Figure 51:
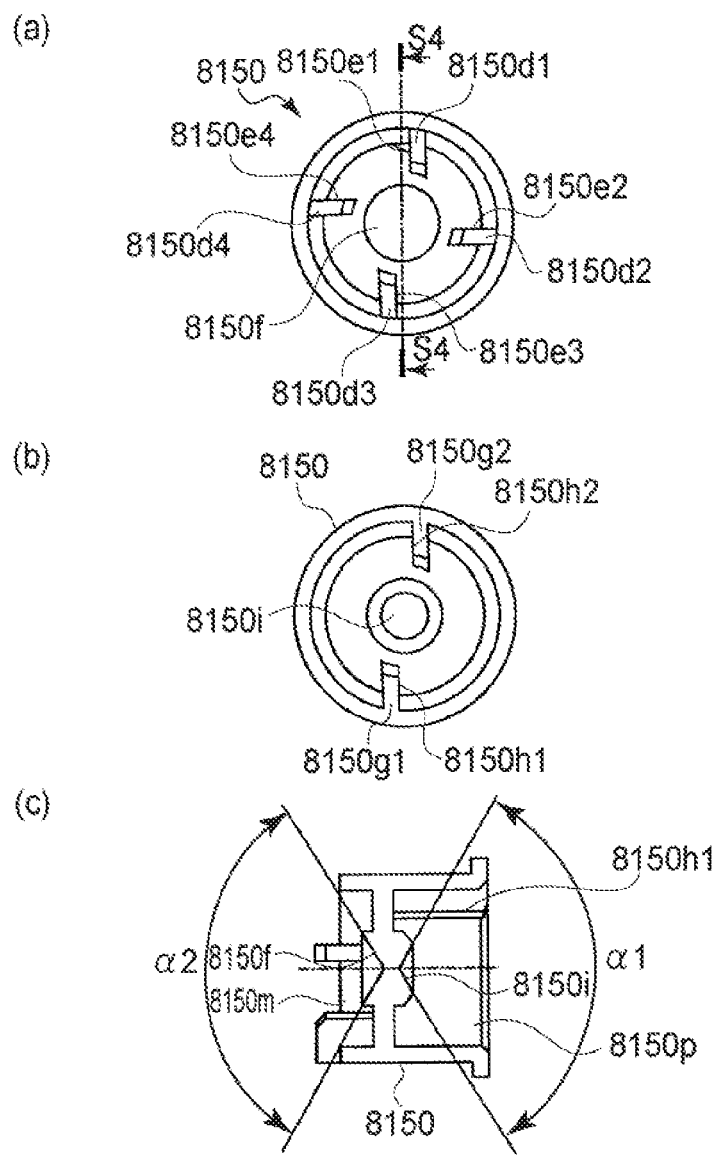
FIG. 51 is an illustration of a coupling according to an embodiment of the present invention.
Figure 52:
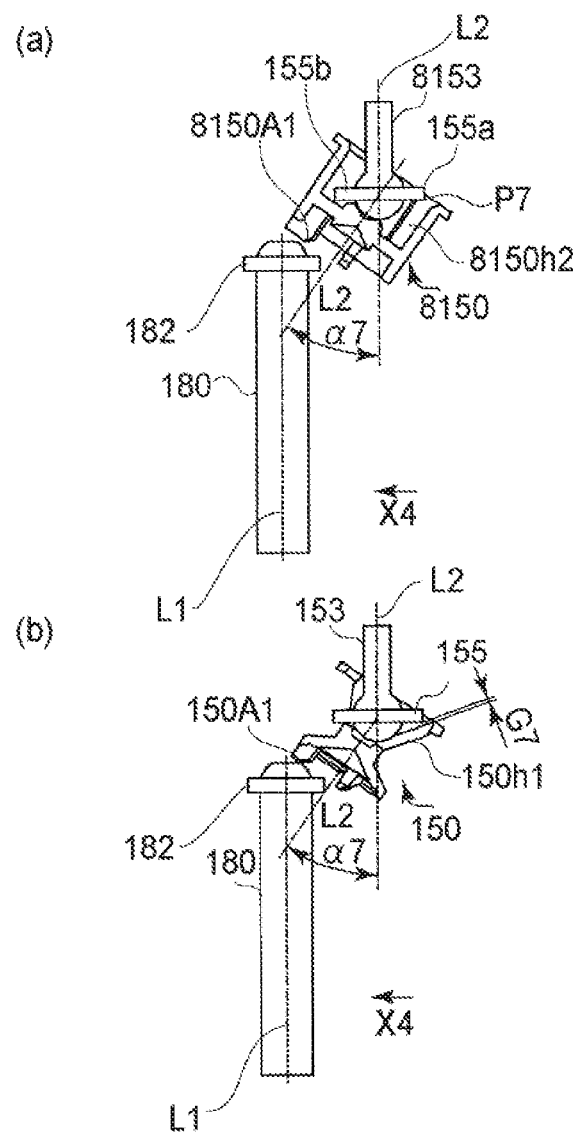
FIG. 52 is a longitudinal sectional view illustrating a state before the engagement between the drive shaft and the coupling concerning an embodiment of the present invention.

Referring to FIG. 51-FIG. 52, the sixth embodiment of the present invention will be described.

In this embodiment, the configuration of another coupling is employed.

FIG. 51 is an illustration of the coupling which is the main constituent-elements of the present embodiment. FIG. 52 is a longitudinal sectional view illustrating engaged state and state before the engagement between drive shaft of the apparatus main assembly and the coupling.

First, referring to FIG. 51, the configuration of the coupling per se will be described. FIG. 51 (*a*) shows a view of the coupling, as seen from the apparatus main assembly side, FIG. 51 (*b*) shows a view of the coupling, as seen from the developing roller side, and FIG. 51 (*c*) is a sectional view taken along S4-S4 in FIG. 51 (*a*).

The coupling 8150 is generally cylindrical. As shown in FIG. 51 (*c*) the coupling 8150 has a drive shaft insertion opening portion 8150*m* and a development shaft insertion opening portion 8150*p* for receiving the rotational force from the drive shaft of the apparatus main assembly. The opening 8150*m* is provided with a tapered driving shaft receiving surface 8150*f*. On the cylindrical inner surface, a plurality of driven projections 8150*d* (8150*d*1 or 8150*d*2 or 8150*d*3, 8150*d*4) in the form of ribs are disposed. In addition, in FIG. 51 (*a*), a rotational force transmitting surface (rotational force receiving portion) 8150*e*1-*e*4 is provided downstream of the projection 8150*d* with respect to the clockwise direction. And, the rotational force (driving force) is transmitted by the contact of the pin 182 of the drive shaft 180 to the transmitting surface 8150*e*1-*e*4 to the coupling 8150.

The opening 8150*p* is provided with a tapered development bearing surface 8150*i* similarly. In addition, the cylindrical inner surface is provided with the rib-like projections 8150*g*1 or 8150*g*2. In addition, in FIG. 50 (*b*) a transmitting surface (rotational force transmitting portion) 8150*h*1 or 8150*h*2 is provided in an upstream position of the development drive standby opening 8150*g*1 or 8150*g*2 with respect to clockwise direction.

Referring to FIG. 52, the description will be made about the engaging operation of the coupling.

FIG. 52 (*a*) is a sectional view illustrating a state before engaging with the drive shaft 180 after the movements of the development shaft 180 and the coupling 8150 in the rotational direction X4. The axis L2 inclines to the angle alpha 7 so that a downstream free end position 8150A1 with respect to the rotational direction X4 can pass the free end portion 180*b*. At this time, The upstream 182*a* and the downstream 182*b* of the pin 182 maintain the engaged state with the transmitting surface (rotational force receiving portion) 8150h1 or 8150h2 (FIG. 51c) of the coupling 8150.

FIG. 52 (b) illustrates the coupling 150 having been described with respect to Embodiment 1, in the orientation the same as FIG. 52 (a). As will be understood from FIG. 52 (b), the axis L2 of the coupling 150 is inclined by the angle alpha 7 similarly to FIG. 52 (a). By this, the engagement between upstream pin 155 and the upstream drive transmission surface 8150h1 is not established with respect to rotational direction X4. In other words, there is a gap of G7 between the pin 155 and the transmitting surface 150h1. On the other hand, in the present embodiment, the coupling 8150 has the contact portions for the rotational force transmission at the two places as shown in FIG. 52 (a). For this reason, the orientation of the coupling is further stabilized.

As has been described hereinbefore, the coupling has a cylindrical shape. By this, even if it is necessary to increase the inclination angle (pre-engagement angular position) of the coupling, the contact portions for the rotational force transmission in the two places are assured. Therefore, the inclination operation of the stabilized coupling can be accomplished.

Since the co-axial rotational force transmission between the drive shaft 180 and the development shaft 153 and the engagement releasing operation between them are the same as that of Embodiment 1, those descriptions are omitted for simplicity.

Embodiment 7

Figure 53:
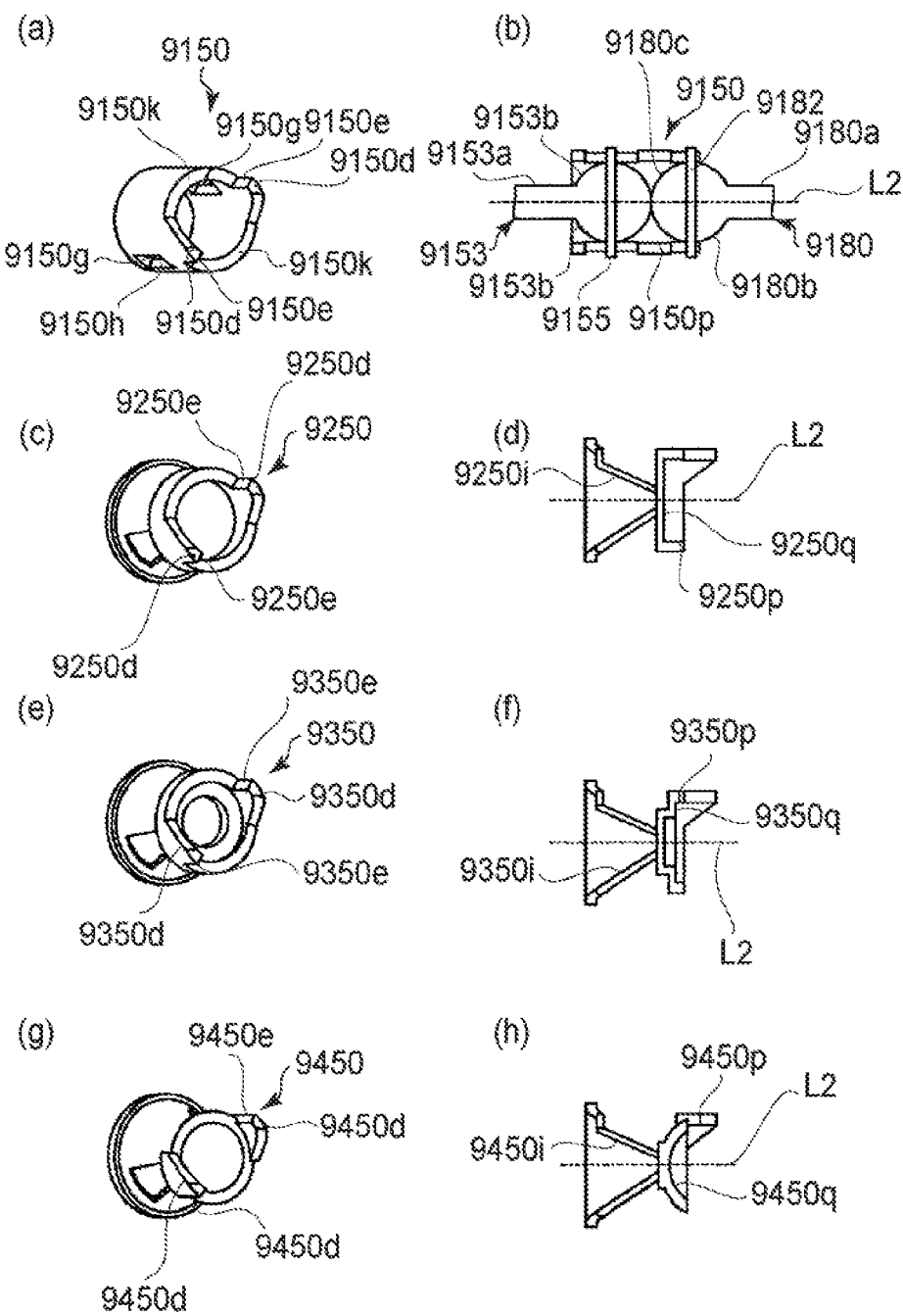
FIG. 53 is a perspective view and a longitudinal sectional view of a coupling according to an embodiment of the present invention.

Referring to FIG. 53, the seventh embodiment of the present invention will be described.

The present embodiment is different from Embodiment 1 in the configuration of the coupling. FIG. 53(a) is a perspective view of a coupling which has a generally cylindrical shape, and FIG. 53 (b) is a sectional view when the coupling mounted to the cartridge engages with a drive shaft.

In FIGS. 53(a) and 53(b), the rotational force is inputted from the main assembly at the righthand side, and the developing roller at the lefthand is driven.

An input side edge of the coupling 9150 is provided with a plurality of driven projections (rotational force receiving portions) 9150d. In this embodiment, they are provided at two positions. Entering portions or entrances 9150k is provided between the drive receiving projections 9150d. The projection 9150d is provided with a rotational force receiving surface (rotational force receiving portion) 9150e. A rotational force transmitting pin (rotational force applying portion) 9182 of the drive shaft 9180 as will be described hereinafter contacts to the rotational force receiving surface 9150e. By this, a rotational force is transmitted to the coupling 9150.

In order to stabilize the torque transmitted to the coupling, a plurality of rotational force receiving surfaces 150e are desirably disposed on the same circumference (on a common circle). By the disposition in this manner, the rotational force transmission radius is constant and the torque transmitted is stabilized. A sudden increase of the torque can be avoided. In addition, from the viewpoint of the stabilization of the drive transmission, the receiving surfaces 9150e are desirably provided on the opposed positions (180 degrees) diametrically. In addition, the number of the receiving surfaces 9150e may be any if the pin 9182 of the drive shaft 9180 can be received by the standing-by portion 9150k. In the present embodiment, the number is two. The rotational force receiving surfaces 9150e may not be on the same circumference, or they may not be disposed diametrically opposed positions.

In addition, the cylinder surface of the coupling 9150 is provided with the standby opening 9150g. In addition, an opening 9150g is provided with the rotational force transmission surface (rotational force transmitting portion) 9150h. The drive transmission pin (rotational force receiving member) 9155 (FIG. 53 (b)) of the development shaft 9153 contacts to this rotational force transmission surface 9150h. By this, the rotational force is transmitted to the developing roller 110 from the main assembly A.

Similarly to the projection 9150d, the rotational force transmission surface 9150h is desirably disposed diametrically opposed on the same circumference.

The configurations of the development shaft 9153 and the drive shaft 9180 will be described (FIG. 53(b)). In Embodiment 1, the cylindrical end is a spherical surface. In this embodiment, however, a diameter of a spherical free end portion 9153b of the end portion is larger than a diameter of a main part 9153a. With this configuration, the left end portion of the coupling 9150 can incline without interference with the major part 9150a. The configuration of the drive shaft 9180 is the same as that of the development shaft 9150 substantially. In other words, the configuration of the free end portion 9180b is the spherical surface, and the diameter thereof is larger than the diameter of the main part 9180a of the cylindrical shape portion. In addition, the pin (rotational force applying portion) 9182 which pierces through the substantial center of the free end portion 9180b which is the spherical surface is provided. The pin 9182 transmits the rotational force to the transmitting surface or rotational force receiving surface 9150e of the coupling 9150.

The development shaft 9150 and the spherical surface of the drive shaft 9180 are in engagement with the inner surface 9150p of the coupling 9150. By this, the relative position between the development shaft 9150 and the coupling 9150 of the drive shaft 9180 is determined. The operation with respect to the mounting and demounting of the coupling 9150 relative to the drive shaft 9180 is the same as Embodiment 1, and therefore, the description thereof is omitted for simplicity.

As has been described hereinbefore, the coupling has the cylindrical shape, and therefore, the position with respect to the direction perpendicular to the direction of the axis L2 of the coupling 9150 can be determined if the coupling is engaged with the shaft.

A modified example of the coupling will be described further. In the configuration of the coupling 9250 shown in FIG. 53 (c), a cylindrical shape and a conical shape are put together. FIG. 53 (d) is a sectional view of the coupling of this modified example. A driven portion 9250a of the coupling 9250 (righthand side in the Figure) has a cylindrical shape, and an inner surface 9250p thereof engages with the spherical surface of the drive shaft 9180. Furthermore, it has the abutment surface 9250q and can effect the positioning with respect to the axial direction between the coupling 9250 and the drive shaft 180. The driving portion 9250b has a conical shape (lefthand side of the Figure), and, similarly to Embodiment 1, the position relative to the development shaft 153 is determined by the development shaft receiving surface 9250i.

The configuration of the coupling 9350 shown in FIG. 53 (e) is a combination of a cylindrical shape and a conical shape. FIG. 53 (f) is a sectional view of this modified example. The driven portion 9350a of the coupling 9350 has a cylindrical shape (righthand side), and the inner surface 9350p thereof engages with the spherical surface of the drive shaft 9180. The positioning in the axial direction of the drive shaft 9180 is effected by abutting the spherical surface 9180c of the drive shaft 9180 to the edge portion 9350q formed between the cylindrical portions having different diameters.

The configuration of the coupling 9450 shown in FIG. 53 (g) is a combination of a spherical surface, a cylindrical shape, and a conical shape. FIG. 53 (h) is a sectional view of this modified example, wherein a driven portion 9450a of the coupling 9450 (righthand side) has a cylindrical shape, and the inner surface 9450p thereof engages with the spherical surface 9450q of the drive shaft. A spherical surface of the drive shaft 180 is contacted to a spherical surface 9450q which is a part of the spherical surface. By this, the position can be determined with respect to the direction of the axis L2. Designated by 9250d, 9350d, 9450d are projections. Designated by 9250e, 9350e and 9450e are rotational force receiving surfaces (rotational force receiving portion).

Embodiment 8

Figure 54:
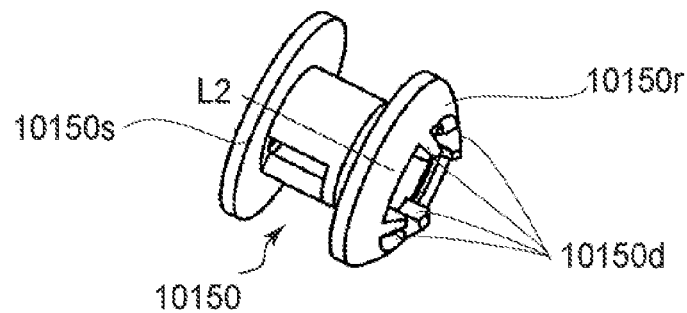
FIG. 54 is a perspective view of a coupling according to an embodiment of the present invention.
Figure 55:
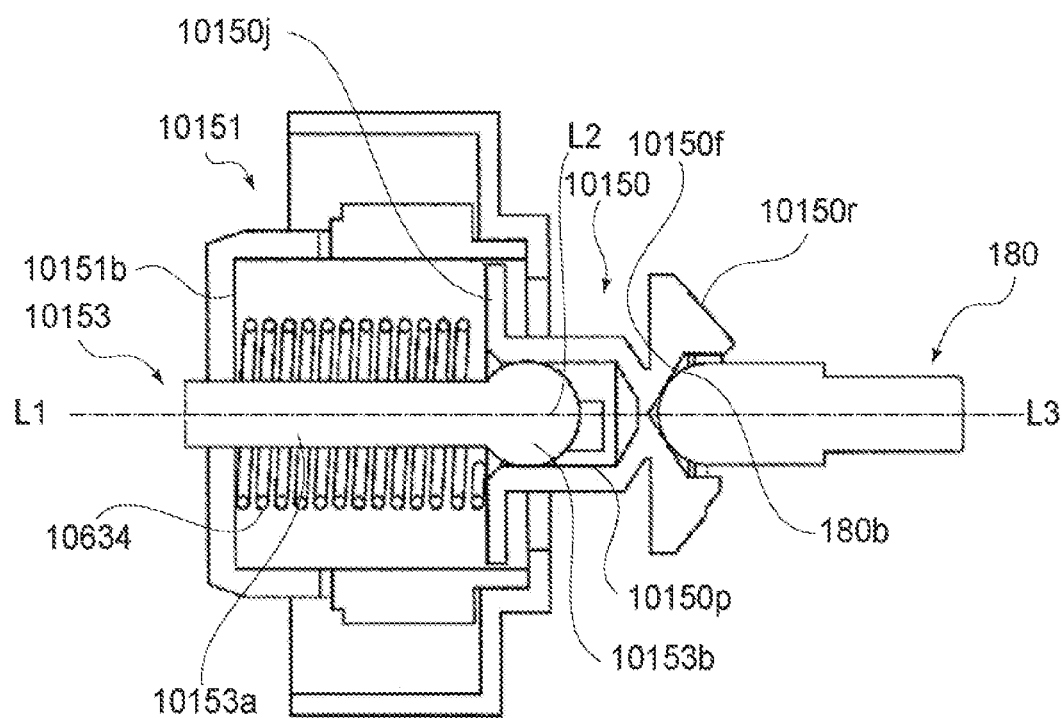
FIG. 55 is a longitudinal sectional view showing an engaged state between the drive shaft and the coupling according to the embodiment of the present invention.
Figure 56:
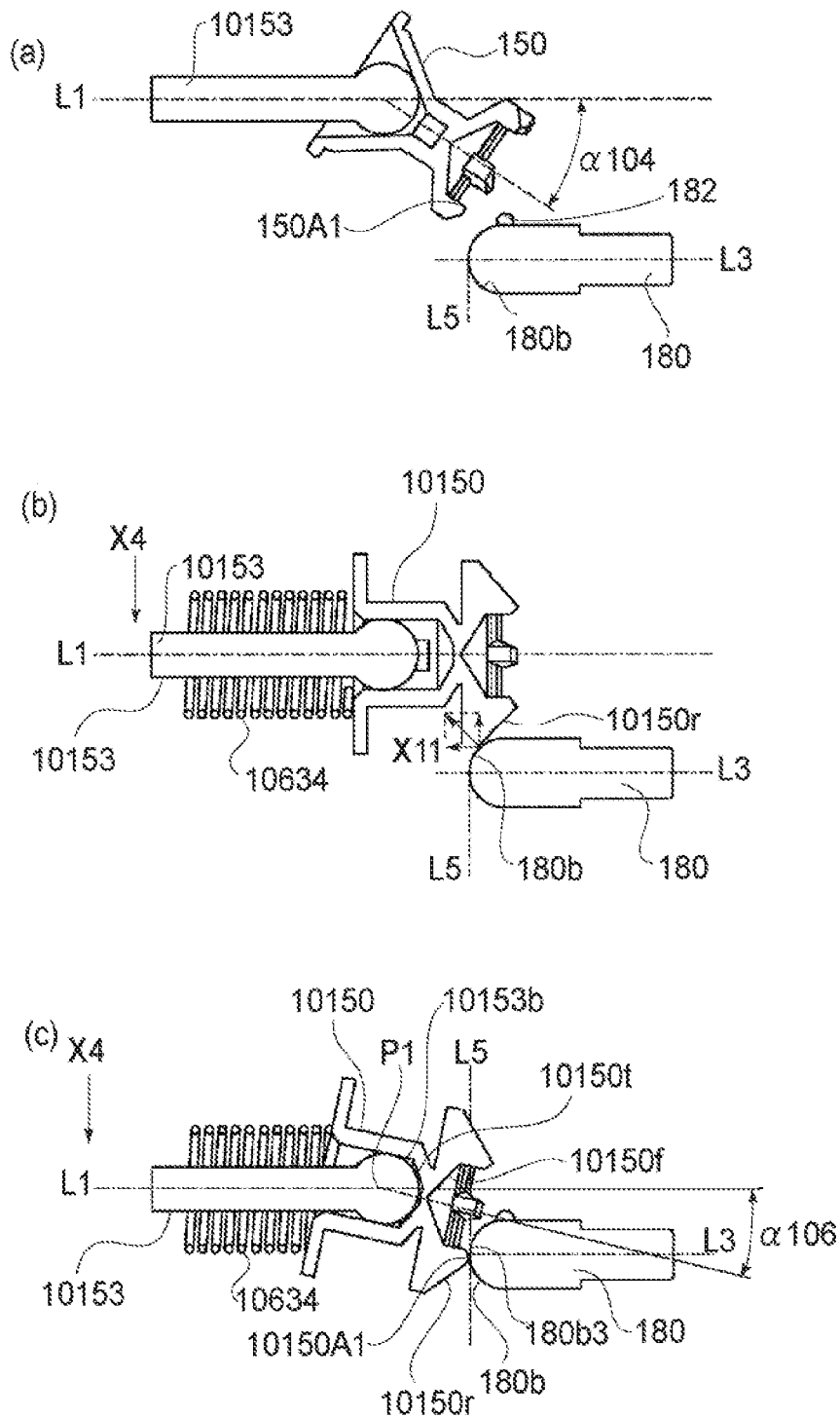
FIG. 56 is a perspective view showing the process of engagement between the drive shaft and the coupling according to the embodiment of the present invention.

Referring to FIG. 54-FIG. 56, the eighth embodiment of the present invention will be described.

The present embodiment is different from Embodiment 1 in the mounting operation relative to the drive shaft of the coupling, and the structure with respect to it. FIG. 54 is a perspective view which illustrates a configuration of a coupling 10150 of the present embodiment. The configuration of the coupling 10150 is a combination of the cylindrical shape and conical shape which have been described in Embodiment 7. In addition, a tapered surface 10150r is provided on the free end side of a coupling 10150. In addition, the surface of an opposite side of the drive receiving projection 10150d with respect to the direction of the axis L1 is provided with an urging force receiving surface 10150s.

Referring to FIG. 55, the structure of the coupling will be described.

An inner surface 10150p and a spherical surface 10153b of a development shaft 10153 of the coupling 10150 are in engagement with each other. An urging member 10634 is interposed between an urging force receiving surface 10150s described in the foregoing and a bottom surface 10151b of a development flange 10151. By this, the coupling 10150 is urged toward the drive shaft 180 when the rotary C is stopped at the predetermined position. In addition, similarly to the foregoing embodiments, a retention rib (unshown) is provided adjacent to the drive shaft 180 on the flange portion 10150j with respect to the direction of the axis L1. By this, the disengagement of the coupling 10150 from the cartridge is prevented. The inner surface 10150p of the coupling 10150 is cylindrical. Therefore, the coupling is mounted to the cartridge B so as to be movable in the direction of the axis L2.

FIG. 56 is for illustrating the orientation of the coupling in the case that the coupling engages with the drive shaft. FIG. 56 (a) is a sectional view of the coupling 150 of Embodiment 1, and FIG. 56 (c) is a sectional view of a coupling 10150 of the present embodiment. And, FIG. 56 (b) is a sectional view before reaching the state of FIG. 56 (c) the rotational direction is shown by X4 and the chain line L5 is a line drawn in parallel with the mounting direction from the free end of the drive shaft 180.

In order for the coupling to engage with the drive shaft 180, the downstream free end position 10150A1 with respect to the rotational X4 direction needs to pass the free end portion 180b3 of the drive shaft 180. In the case of Embodiment 1, the axis L2 inclines by more than angle α104. By this, the coupling moves to the position where the free end position 150A1 does not interfere with the free end portion 180b3 (FIG. 56 (a), pre-engagement angular position).

On the other hand, in the coupling 10150 of the present embodiment, it in the state where it does not be in engagement with the drive shaft 180, the coupling 10150 takes the position nearest to the drive shaft 180 by a restoring (elastic) force of an urging member (elastic member) 10634. In this state, when it moves in the rotational direction X4, a part of the tapered surface 10150r of the coupling 10150 contacts the drive shaft (FIG. 56 (b)). At this time, the force is applied to the tapered surface 10150r in the direction X4, and therefore, the coupling 10150 is retracted in the longitudinal direction X11 by a component force thereof. And, the free end portion 10153b of the development shaft 10153 abuts to an abutting portion 10150t of the coupling 10150. In addition, the coupling 10150 rotates clockwisely about the center P1 of the free end portion 10153b (pre-engagement angular position) of the development shaft. By this, the downstream free end position 10150A1 of the coupling with respect to the rotational direction X4 passes by the free end 180b of the drive shaft 180 (FIG. 56 (c)). When the drive shaft 180 and the development shaft 10153 becomes substantially co-axial, a driving shaft receiving surface 10150f of the coupling 10150 contacts to the free end portion 180b by the elastic force of the urging spring 10634. By this, the coupling becomes in the rotation latency state (FIG. 55). In consideration of an amount of retraction of the coupling 10150, the degree of inclination of the axis L2 can be reduced to α106 (FIG. 56(c)).

At the time of the rotary resume the rotation in said one direction after completion of the image forming operation, the free end portion 180b is forced on the conical shape driving shaft receiving surface 10150f of the coupling 10150 by rotation force of the rotary. The coupling 10150 is pivoted by this force, while retracting toward the direction (opposite to X11 direction) of the axis L2 by this. The coupling 10150 is disengaged (disconnected) from the drive shaft 180.

Embodiment 9

Figure 57:
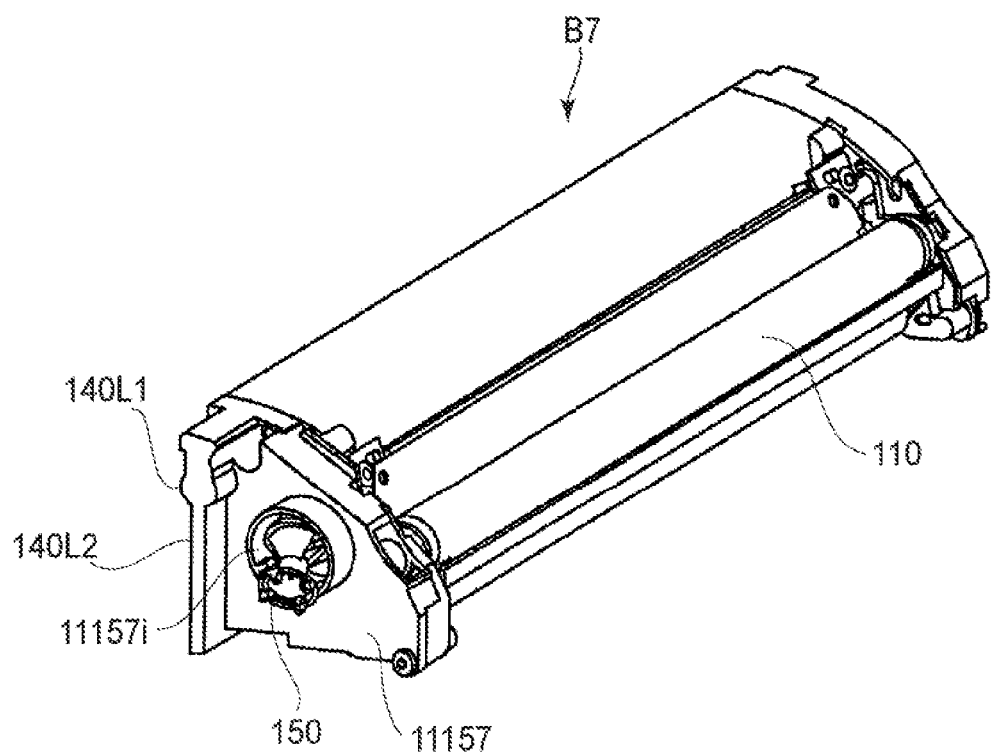
FIG. 57 is a perspective view of a developing cartridge according to an embodiment of the present invention.
Figure 58:
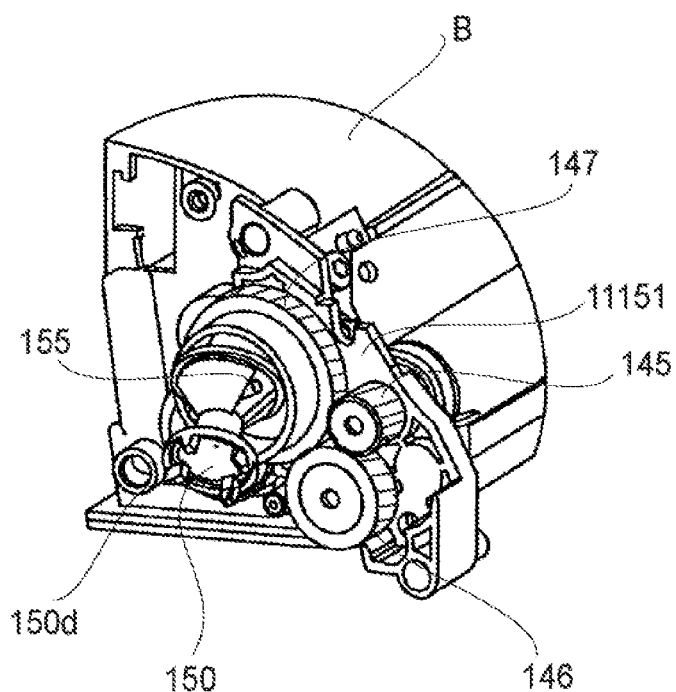
FIG. 58 is a perspective view of the developing cartridge according to the embodiment of the present invention.

Referring to FIG. 57, FIG. 58, and FIG. 59, embodiment 9 will be described.

The present embodiment is different from Embodiment 1 in position (position of the coupling) for inputting the rotational force, and structure for transmitting the rotational force to developing roller and developer supply roller from coupling.

FIG. 57 is a perspective view of the cartridge B. In addition, FIG. 58 is a perspective view illustrating a driving portion of the cartridge B without the side plate. FIG. 59 (a) is a perspective view of a driving input gear, as seen from the driving side. FIG. 59 (b) is a perspective view of a driving input gear, as seen from the non-driving side.

A development gear 145 is provided to the one longitudinal end of a developing roller 110. In addition, a developer supply roller gear 146 is provided to the one longitudinal end of the developer supply roller 115 (FIG. 1). Both the gears are fixed on the roller shafts. By this, the rotational force received by the coupling 150 from the apparatus main assembly A is transmitted to the pin (rotational force receiving portion) 155 and the gear 147. In addition, the rotational force received by the gear 147 is transmitted to the developing roller 110 and the developer supply roller 115 through the gear 145 and the gear 146. The rotational force may be transmitted to the developer stirring member and so on. In addition, the member for transmitting the rotational force may not be a gear, but may be a toothed belt and so on. The driving force transmitting members, such as the gear or the toothed belt, are usable properly.

Referring to FIG. 59, the driving input gear 147 which mounts the coupling 150 swingably will be described. A gear shaft 11153 is fixed by the press-fitting, the bonding, and so on to the inside of the gear. The end 11153b thereof has a spherical configuration, so that it can incline smoothly when the axis L2 inclines. In this embodiment, although the gear shaft 11153 is made of metal, it may be made of resin material integral with the gear 147. In addition, The rotational force transmitting pin (rotational force receiving portion) 155 for receiving the rotational force from the coupling 150 is provided at the free end side of the gear shaft 11153, and it is extended in the direction crossing with the axis of the gear shaft 11153.

The pin 155 is made of the metal and is fixed by the press-fitting, the bonding, and so on to the gear shaft 11153. If the transmission of the rotational force is possible, the position of the pin 155 is satisfactory anywhere. Preferably, the pin 155 penetrates the spherical surface center of the free end portion 11153b of the gear shaft 11153. This is because, with such a structure, even when the angle of deviation exists between the gear shaft 11153 and the axis L2, the rotational force transmission radius is always constant. By this, constant transmission of the rotational force is accomplished. The number of rotational force transmission points may be any, and the person skilled in the art can select it properly. However, in this embodiment, the single pin 155 is employed from the viewpoint of assured transmission of driving torque, and assembling property. And, the pin 155 penetrates the center of the free end spherical surface 11153b. By this, the pin 155 projects in the diametrically opposite-directions from the peripheral surface of the gear shaft 11153. In other words, the rotational force is transmitted at the two places. Here, in this embodiment, although the pin 155 is metal, it may be a product made of resin material integral with the gear shaft 11153 and the gear 147. The gears 145, 146, and 147 are helical gears.

In addition, since the mounting method of the coupling 150 is the same as that of Embodiment 1, the description is omitted.

The gear 147 is provided with a space 147a for receiving the coupling 150 partially, so that it does not interfere with the gear 147, when the coupling 150 swings (the movement, pivoting). The space 147a is provided at the center portion of the gear 147. By this, it is possible to shorten the length of the coupling 150. Furthermore, as for the mounting method of the gear 147, a hole 147b (FIG. 59 (b)) is rotatably supported by the supporting shaft (unshown) of the development bearing 11151 (FIG. 58). In addition, the cylindrical portion 147c is rotatably supported by the inner surface 11157i of the supporting member 11157.

Since the engagement, drive, and disengagement of the coupling by the rotating operation of the rotary C are the same as that of Embodiment 1, the description is omitted.

The means for inclining the axis L2 to the pre-engagement angular position just before the engagement of the coupling to the drive shaft may employ a method of any of the embodiment 2-embodiment 5 described heretofore.

As has been described with respect to the present embodiment, it is not necessary to dispose the coupling 150 to the end co-axial with the developing roller 110. More particularly, according to the embodiment described above, the coupling 150 is provided at the position remote from the axis L1 of the developing roller 110 in the direction perpendicular to the axis L1 of the developing roller 110. And, in the direction of the rotation axis L2, the rotational force transmitting surface (rotational force transmitting portion, and the cartridge side rotational force transmitting portion) 150h are provided in the opposite side from the rotational force receiving surface (rotational force receiving portion) 150e. And, the rotational force received by the rotational force transmitting surface 150h is transmitted to the developing roller 110 through the transmission pin 155 (rotational force receiving portion) and the gears 145 and 147 (driving force transmitting member). By this, the developing roller 110 is rotated by the rotational force received from the main assembly A by the coupling 150.

According to this embodiment, the latitude of the design of the apparatus main assembly A and the cartridge B is improved. This is because, in the cartridge B, the position of the coupling can be properly selected irrespective of the position of the developing roller 110.

In addition, in the apparatus main assembly A, the position of the drive shaft 180 can be properly selected irrespective of the position of the developing roller 110 in the state of the cartridge B mounted to the rotary C.

This is effective in development of commercial products.

Embodiment 10

Referring to FIG. 60-FIG. 69, the tenth embodiment of the present invention will be described.

Figure 60:
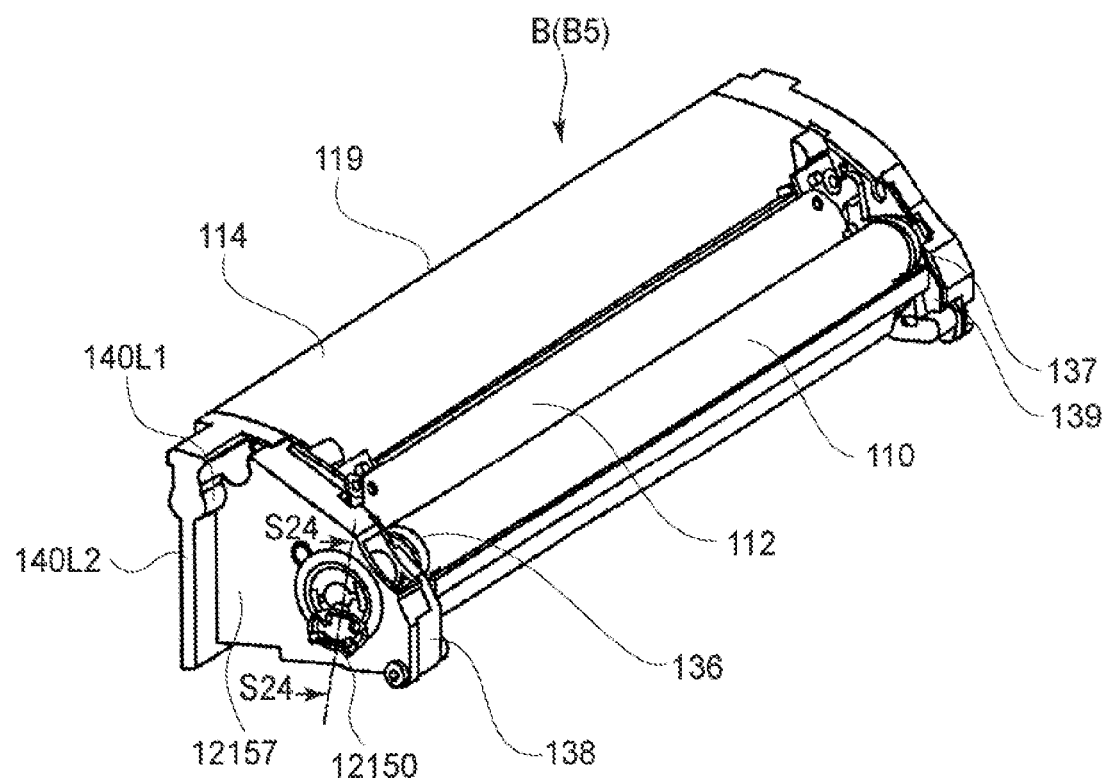
FIG. 60 is a perspective view of a developing cartridge according to an embodiment of the present invention.

FIG. 60 is a perspective view of the cartridge using a coupling 12150 according to the present embodiment. An outer periphery of an outside end of a development supporting member 12157 provided in the driving side functions as the cartridge guides 140L1, 140L2.

The developing cartridge is dismountably mounted to the rotary C by these cartridge guides 140L1, 140L2 and cartridge guide (unshown) provided in the non-driving side.

In this embodiment, the coupling can be integrally handled with the development shaft end member. Here, the development shaft end member is the member mounted to the end of the developing roller, and it has the function of transmitting the rotational force to the other member in the cartridge B.

Figure 61:
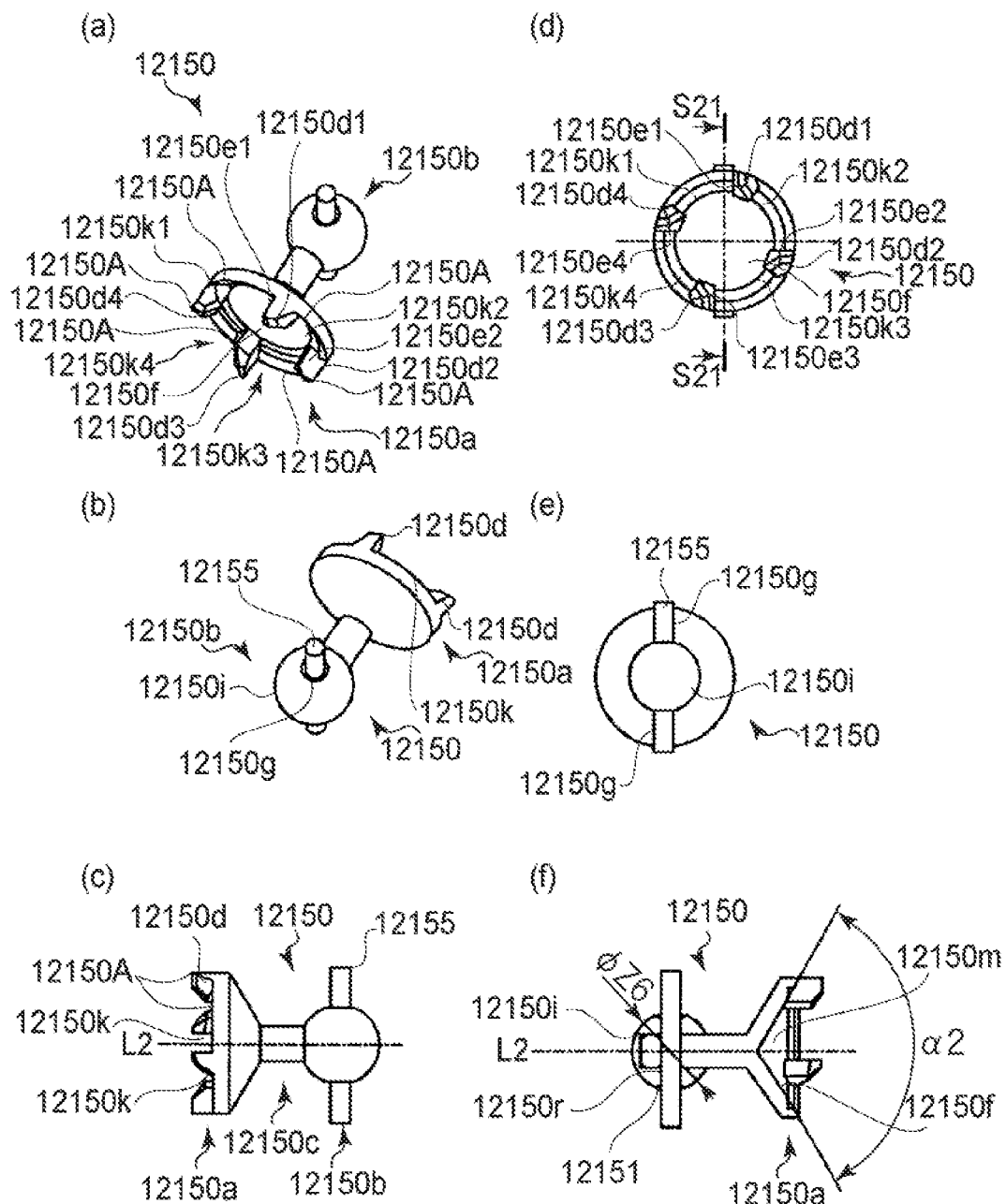
FIG. 61 is a perspective view and a longitudinal sectional view of a coupling according to an embodiment of the present invention.

FIG. 61 (a) is a perspective view of the coupling, as seen from the driving side. It is a perspective view, as seen from the developing roller side of FIG. 61 (b) coupling. FIG. 61 (c) is a side view of the coupling as seen in the direction perpendicular to the direction of the axis L2. In addition, FIG. 61 (d) is a side view of the coupling, as seen from the driving side. FIG. 61 (e) shows a view of the coupling, as seen from the developing roller side. In addition, FIG. 61 (f) is a sectional view taken along a line S21-S21 of FIG. 61 (d).

The coupling 12150 of the present embodiment is engaged with the drive shaft 180 similarly to the coupling 150. To receive the rotational force for rotating the developing roller. In addition, it is disengaged from the drive shaft 180.

The coupling side driven portion 12150a of the present embodiment has the function and structure similar to those of the member 150a, and the coupling side driving portion 12150b has the function and structure similar to the member 150b. In this embodiment, the driving portion 12150b has the spherical driving shaft receiving surface 12150i so as to be able to move among said three angular positions irrespective of the rotation phase of the developing roller 110 (FIG. 61 (a), (b), (c), (f)).

In addition, the intermediate part 12150*c* has the function and structure similar to those of the member 150*c*. In addition, the material and so on is the same as that of the member.

In addition, the opening 12150*m* has the function and structure similar to those of the member 150*m* (FIG. 61 (*f*)).

In addition, the projection 12150*d* (12150*d*1-*d*4) has the function and structure similar to those of the element 150*d* (FIG. 61 (*a*), (*b*), (*c*), (*d*)).

The entrance portion 12150*k* (12150*k*1-*k*4) has the function and structure similar to those of the element 150*k* (FIG. 61 (*a*), (*b*), (*c*), (*d*)).

In addition, the driving portion 12150*b* has the spherical surface so that, it can move between rotational force transmitting angular position and pre-engagement angular position (or disengaging angular position) relative to the axis L1 irrespective of the rotation phase of the developing roller 110 in the cartridge B5. In the illustrated example, the driving portion 12150*b* has a spherical retaining portion 12150*i* concentric with the axis L2. A fixing hole 12150*g* penetrated by a transmission pin 12155 at a position passing through the center of the driving portion 12150*b* is provided.

In this embodiment, the coupling 12150 comprises a driven portion 12150*a*, an intermediate part 12150*c*, and a driving portion 12150*b*. The connection method between them will be described in the drum flange assembly process hereinafter.

Figure 62:
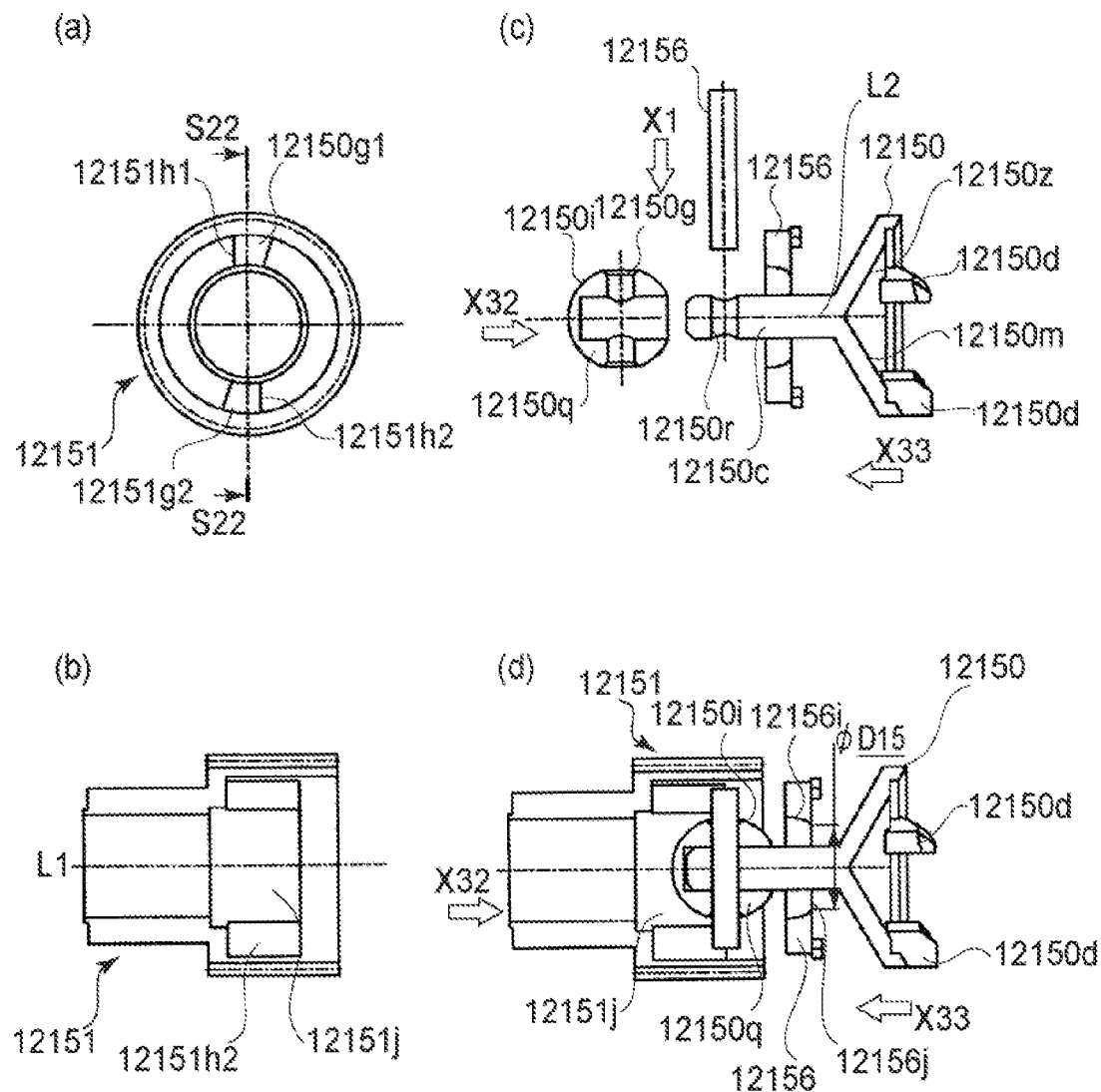
FIG. 62 is an exploded longitudinal section of a coupling and a driving input gear according to an embodiment of the present invention.

Referring to FIG. 62, an example of a development shaft end member 12151 which supports the coupling 12150 will be described. FIG. 62 (*a*) shows a view, as seen from the drive shaft side, and FIG. 62 (*b*) is a sectional view taken along a line S22-S22 in FIG. 62 (*a*).

The opening 12151*g* 1 or 12151*g*2 shown in FIG. 62 (*a*) forms a groove extended in a rotational axis direction of a development shaft end member 12151. At the time of mounting the coupling 12150, the rotational force transmitting pin (rotational force transmitting portion) 12155 enters this opening 12151*g* 1 or 12151*g*2.

The transmission pin 12155 moves inside of the opening 12151*g* 1 or 12151*g*2. By this, irrespective of the rotation phase of the developing roller 110 in the cartridge B5, the coupling 12150 is movable between said three angular positions.

In addition, in FIG. 62 (*a*), rotational force receiving surfaces (rotational force receiving portions) 12151*h* (12151*h* 1 or 12151*h*2) are provided in the clockwise upstream of the opening 12151*g* 1 or 12151*g*2. A side of the transmission pin 12155 of the coupling 12150 contacts to the transmitting surface 12151*h*. By this, the rotational force is transmitted to the developing roller 110. The transmitting surfaces 12151*h*1-12151*h*2 have the surfaces intersected by the rotational direction of the end member 12151. By this, the transmitting surface 12151*h* is pressed to the side of the transmission pin 12155, and rotates about the axis L1 (FIG. 62*b*).

As shown in FIG. 62 (*b*), the end member 12151 is provided with a coupling containing section 12151*j* for accommodating the drive transmitting portion 12150*b* of the coupling 12150.

FIG. 62 (*c*) is a sectional view illustrating the step of assembling the coupling 12150.

As for the driven portion 12150*a* and the intermediate part 12150*c* of the coupling, the retaining member 12156 is inserted into the intermediate part 12150*c*. And, the driven portion 12150*a* and the intermediate part 12150*c* are capped in the direction of the arrow X32 by a positioning member 12150*q* (a driving portion 12150*b*) which has a retaining portion 12150*i*. The pin 12155 penetrates the fixing hole 12150*g* of the positioning member 12150*q*, and the fixing hole 12150*r* of the intermediate part 12150*c*. And, the pin 12155 fixes the positioning member 12150*q* to the intermediate part 12150*c*.

FIG. 62 (*d*) is a sectional view illustrating the step of fixing the coupling 12150 to the end member 12151.

The coupling 12150 is moved in the X33 direction, and the transmission part 12150*b* is inserted in the accommodating portion 12151*j*. The retaining member 12156 is inserted in the direction of an arrow X33 to fix it to the end member 12151. The retaining member 12156 is fixed with play to the positioning member 12150*q*. By this, the coupling 12150 can change the orientation. In this manner, a coupling unit which has the coupling and the end member 12151 integrally is provided.

The retaining portion 12156*i* mounts the coupling 12150 so that it is movable (pivotable) between the rotational force transmitting angular position, the pre-engagement angular position, and the disengaging angular position. In addition, the retaining portion 12156*i* regulates the movement of the coupling 12150 in the direction of the axis L2. In other words, the opening 12156*j* has diameter phi D15 smaller than the diameter of the retaining portion 12150*i*.

Similarly to the projection 12150*d*, the rotational force transmitting surfaces (rotational force transmitting portions) 12150*h* 1 or 12150*h*2 are preferably disposed diametrically opposed on the same circumference.

The coupling and the end member can be integrally treated by the structure as described above. By this, the handling at the time of the assembly is easy, and the improvement of the assembling property can be accomplished.

Figure 63:
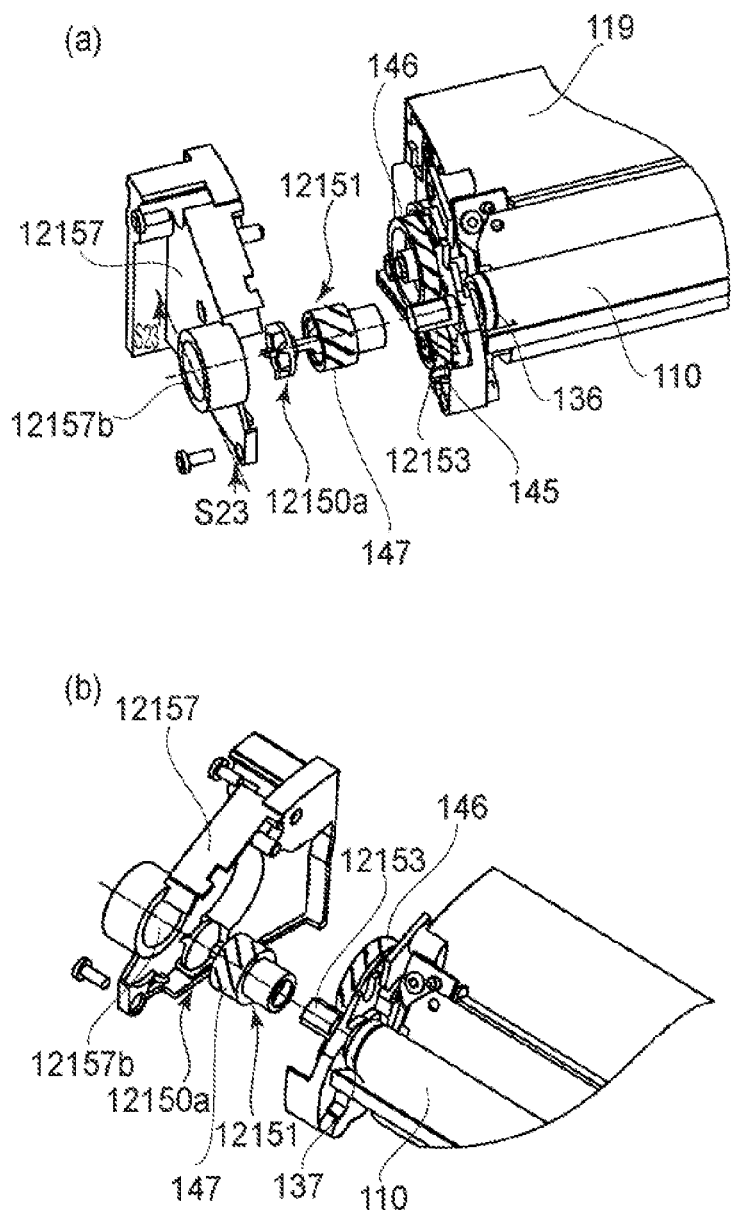
FIG. 63 is an exploded perspective view of the coupling and the bearing member according to the embodiment of the present invention.
Figure 64:
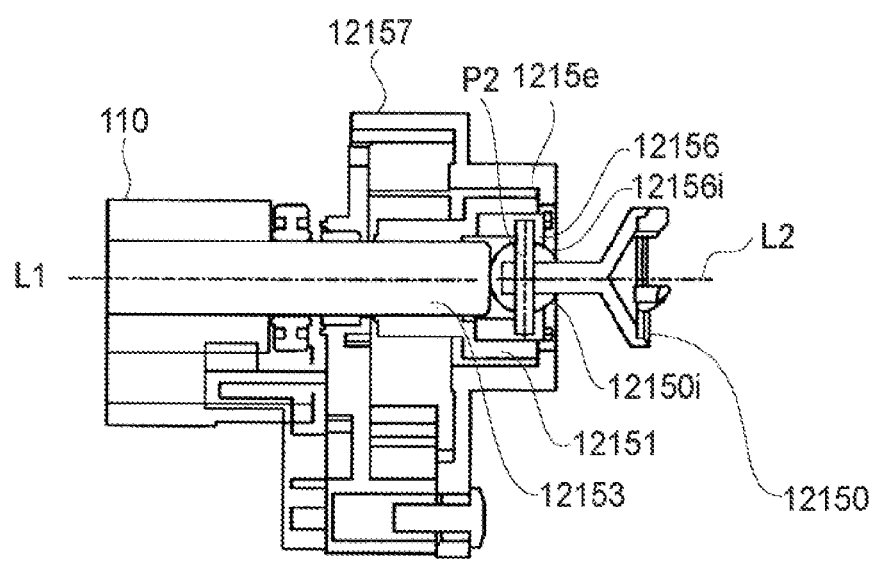
FIG. 64 is a longitudinal sectional view of a developing cartridge according to an embodiment of the present invention.

Referring to FIG. 63 and FIG. 64, the mounting of the cartridge B will be described. FIG. 63 (*a*) is a perspective view of the major part of the cartridge, as seen from the driving side, and FIG. 63 (*b*) is a perspective view thereof, as seen from the non-driving side. In addition, FIG. 64 is a sectional view taken along a line S23-S23 in FIG. 63 (*a*). The developing roller 110 is rotatably mounted on the developing device frame 119.

In the description described above, the coupling 12150 and the end member 12151 are assembled to the coupling unit. And, the unit U10 is mounted to the development shaft 12153 by the side of the end of the developing roller 110 so that the transmission part 12150*a* is exposed. And, the transmission part 12150*a* is assembled through an inner space 12157*b* of the supporting member 12157. By this, the transmission part 12150*a* is exposed through the cartridge.

As shown in FIG. 64, a positioning portion for the developing roller 12110 12157*e* is provided on the supporting member 12157. By this, the end member 12151 is retained assuredly.

Figure 65:
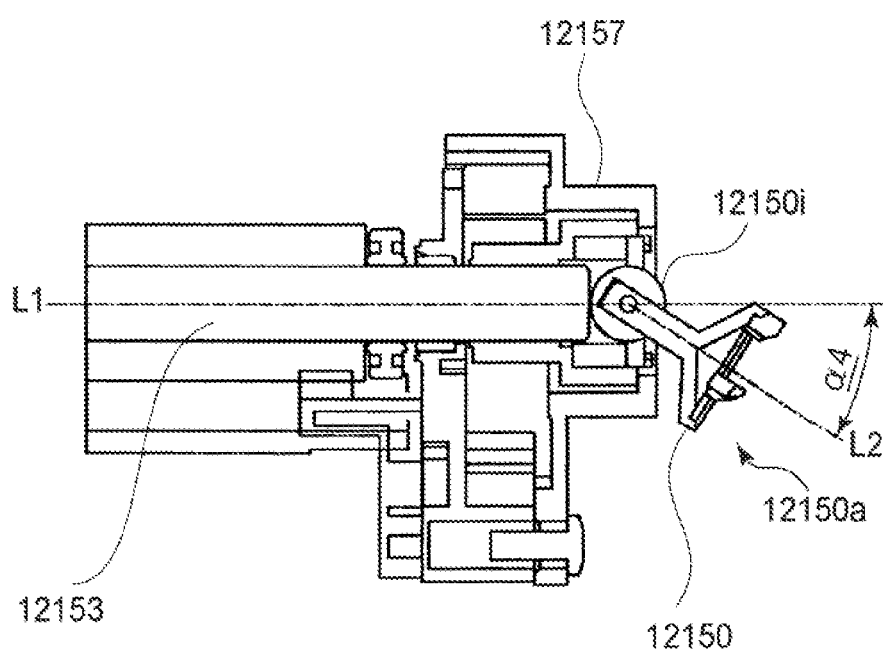
FIG. 65 is a longitudinal sectional view of a developing cartridge according to an embodiment of the present invention.
Figure 66:
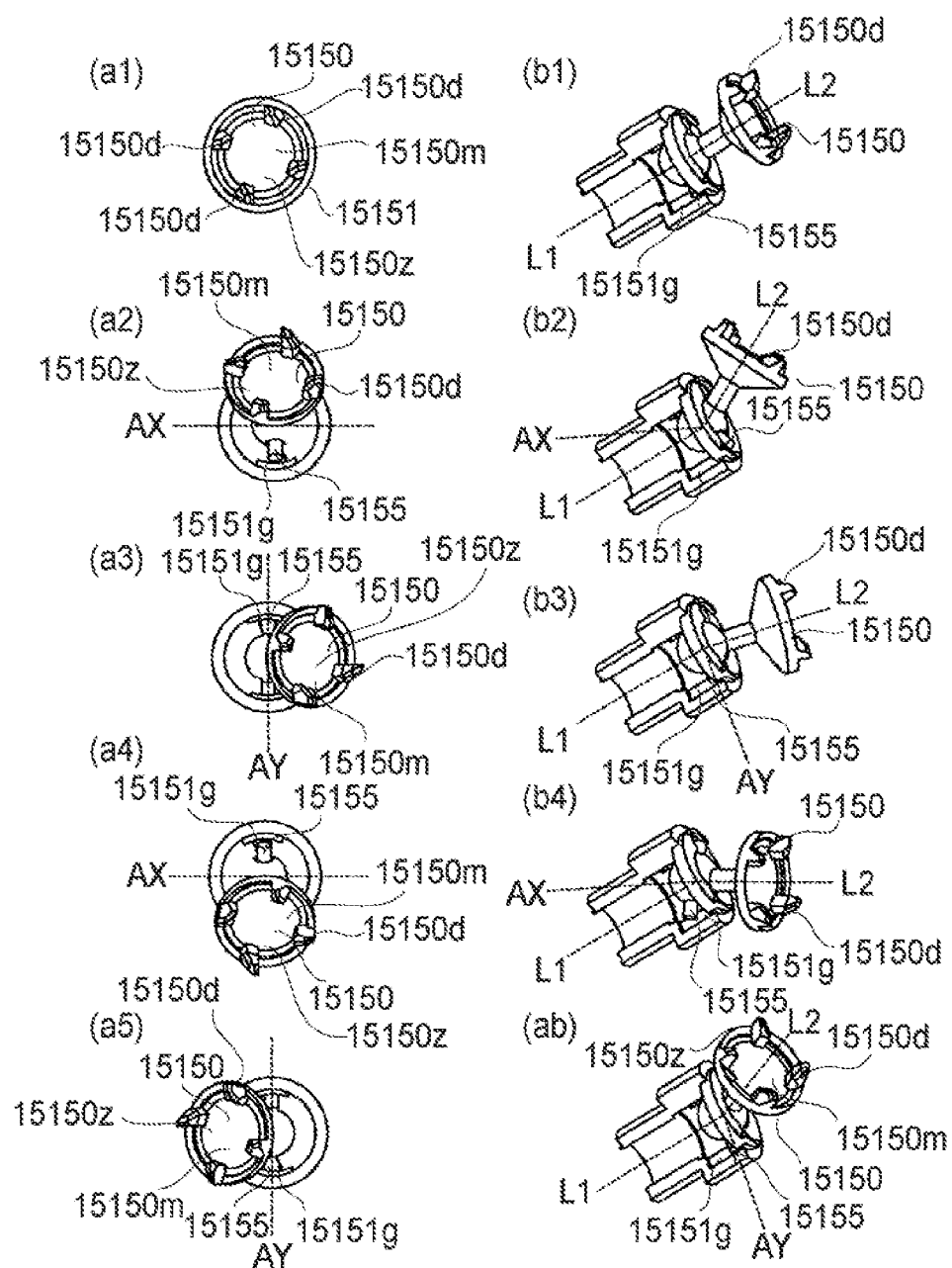
FIG. 66 is a perspective view showing an engaged state of the developing roller gear and the coupling according to the embodiment of the present invention.

Here, as shown in FIG. 66, the axis L2 of the coupling 12150 can incline in any directions relative to the axis L1. FIG. 66(*a*1)-(*a*5) is a view, as seen from the drive shaft (180) side, and FIG. 66(*b*1)-(*b*5) is the perspective view thereof. In FIG. 66 (*a*1) (*b*1), the axis L2 is co-axial with the axis L1. FIG. 65 (*a*2) (*b*2) illustrates the coupling 12150 in the upward inclined state from this state. While the coupling inclines toward the position of the opening 12151*g*, the transmission pin 12155 is moved along the opening 12151*g* (FIG. 66 (*a*2) (*b*2)). As a result, the coupling 12150 is inclined about the axis AX perpendicular to the opening 12151*g*.

In FIG. 66 (*a*3) (*b*3), the coupling 12150 is inclined rightward. Thus, when the coupling inclines in the orthogonal direction of the opening 12151*g*, the pin 12155 rotates inside of the opening 12151*g*. The axis of rotation is the axis line AY of the transmission pin 12155.

The coupling 12150 inclined downward and the coupling inclined leftward are shown in FIGS. 66 (*a*4) (b4) and 66 (*a*5) (b5). The coupling 12150 is inclined about the rotation axis AX, AY.

With respect to the direction different from the inclining direction, and in the midrange, the rotation of the circumference of the axis AX and the rotation of the circumference of AY can combine with each other, so that the inclination is permitted. For example, the directions different from the inclining direction are FIGS. 66 (*a*2), (*a*3), (*a*3), (*a*4), (*a*4), (*a*5), (*a*5), and (*a*2). In this manner, the axis L2 can be inclined in any directions relative to the axis L1. However, the axis L2 does not need to be necessarily pivotable relative to the axis L1 linearly to the predetermined angle in any directions over 360 degrees. In that case, for example, the opening 12151*g* is set slightly wide in the circumferential direction. By such the setting, when the axis L2 inclines relative to the axis L1, the coupling 12150 rotates to a slight degree about the axis L2, even if it is the case where it cannot incline to the predetermined angle linearly. By this, the axis L2 can be inclined to the predetermined angle relative to the axis L1. In other words, the play in the rotational direction of the opening 150*g* can be selected properly by one skilled in the art.

Figure 67:
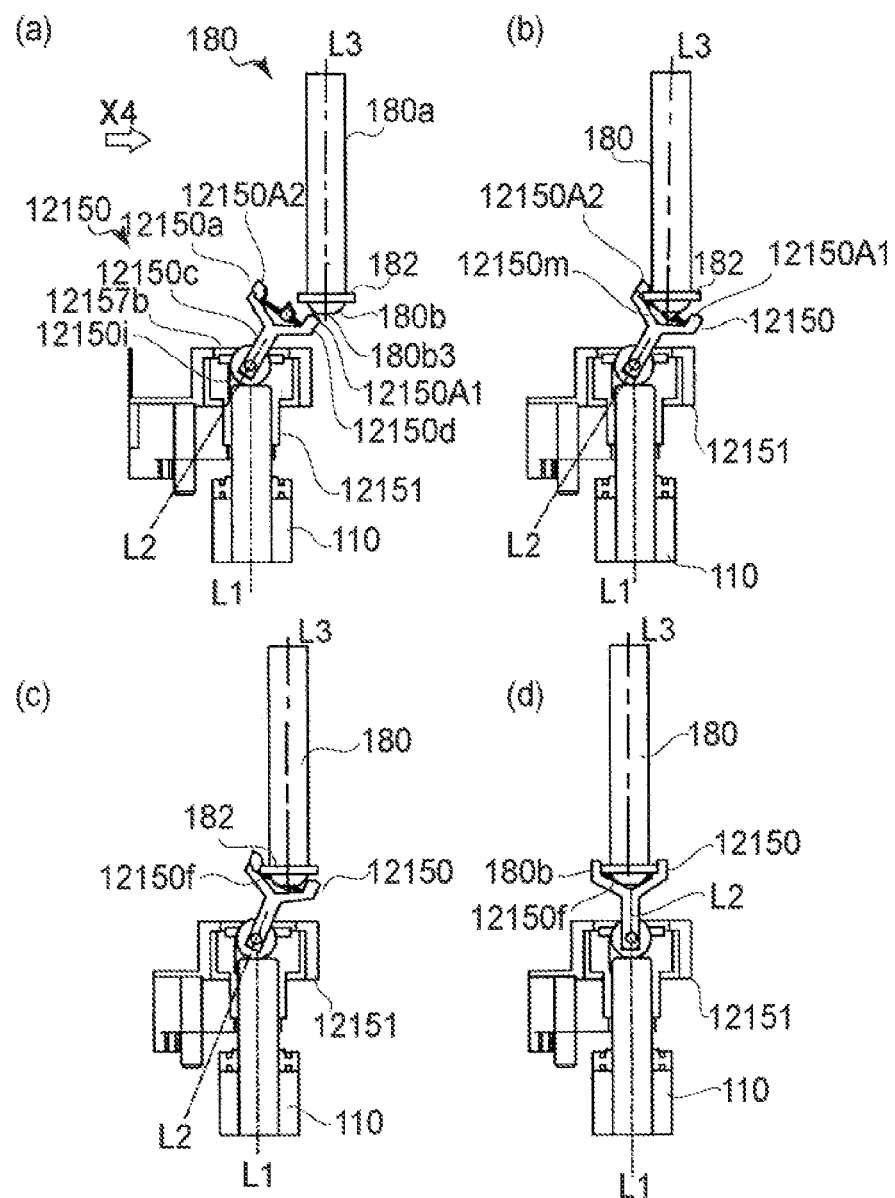
FIG. 67 is a longitudinal sectional view illustrating process of engagement between the coupling and the drive shaft according to the embodiment of the present invention.

As has been described hereinbefore, (FIG. 64), the spherical surface 12150*i* contacts to the retaining portion 12156*i*. For this reason, the rotation axis of the coupling 12150 is on the center P2 of the spherical surface 12150*i*. In other words, the axis L2 is pivotable irrespective of the phase of the end member 12151. In addition, as will be described hereinafter, in order for the coupling 12150 to engage with the drive shaft 180, the axis L2 is inclined to the downstream in the rotational direction X4 relative to the axis L1 just before the engagement. In other words, as shown in FIG. 67, the axis L2 inclines relative to the axis L1, so that the driven portion 12150*a* is the downstream with respect to the rotational direction X4.

FIG. 60 shows the state where the axis L2 is inclined relative to the axis L1. In addition, FIG. 65 is a sectional view taken along a line S24-S24 in FIG. 60.

By the structure described heretofore, the axis L2 in the inclined state shown in FIG. 65 can also become substantially parallel with the axis L1. In addition, the maximum possible inclination angle alpha 4 (FIG. 65) between the axis L1 and the axis L2 is determined so that the range to the position where the driven portion 12150*a* and the intermediate part 12150*c* contact to the end member 12151 or the supporting member 12157 is covered. And, the angle alpha 4 is set to the value required for the mounting and demounting to the apparatus main assembly.

Here, in the case of the present embodiment, the maximum possible inclination angle alpha 4 is 20 degrees-80 degrees.

As has been described with respect to Embodiment 1, immediately before Cartridge B (B5) is determined to the predetermined position of the apparatus main assembly A, or, substantially simultaneously with it being determined to the predetermined position, the coupling 12150 and the drive shaft 180 engage with each other. More particularly, the coupling 12150 and the drive shaft 180 are engaged with each other immediately before or substantially simultaneously with the stoppage of the rotary C.

Referring to FIG. 67, the engaging operation of this coupling 12150 will be described. FIG. 67 is a longitudinal sectional view of the apparatus main assembly A, as seen from the lower part.

In the moving process of the cartridge B7 by the rotary C, the axis L2 of the coupling 12150 inclines beforehand in the pre-engagement angular position to the rotational direction X4 relative to the axis L1 (FIG. 67 (*a*)). In the direction of the axis L1, the downstream free end position 12150A1 with respect to the rotational direction X4 is positioned in the developing roller 12110 direction side beyond the drive shaft free-end 180*b*3 by the inclination of the coupling 12150. In addition, the upstream free end position 12150A2 with respect to the rotational direction X4 is positioned in the pin 182 direction side than the drive shaft free-end 180*b*3 (FIG. 67 (*a*)).

First, the upstream free end position 12150A1 with respect to the rotational direction X4 of the coupling 12150 passes by the drive shaft free-end 180*b*3. A part of coupling (receiving surface 12150*f* and/or projection 12150*d*) which is the cartridge side contact portion contacts to the main assembly side engaging portion (the drive shaft 180 and/or the pin 182), after the passage. The coupling is inclined so that the axis L2 becomes parallel to the axis L1 in response to the rotation of the rotary C (FIG. 67 (*c*)). And, when the developing cartridge B7 finally stops at the predetermined position (developing position) in the apparatus main assembly A (stoppage of the rotation of the rotary), the drive shaft 180 and the developing roller 12110 will become substantially co-axial with each other. And, the coupling 12150 is moved from the pre-engagement angular position toward the rotational force transmitting angular position where the axis L2 is substantially co-axial with the axis L1. And, the coupling 12150 and the drive shaft 180 are engaged with each other (FIG. 67 (*d*)). The recess 12150*z* of the coupling covers the free end portion 180*b*.

As has been described hereinbefore, the coupling 12150 is mounted for inclining motion relative to the axis L1. More particularly, the coupling 12150 inclines without interfering with the drive shaft 180 in response to the rotating operation of the rotary C. By this, the coupling 12150 can be engaged with the drive shaft 180.

Similarly to embodiment 1, the engaging operation of the coupling 12150 described above can be carried out irrespective of the phase of the drive shaft 180 and the coupling 12150.

In this manner, in this embodiment, the coupling 12150 is mounted to the cartridge B7 for substantial revolvement relative to the developing roller 110.

Figure 68:
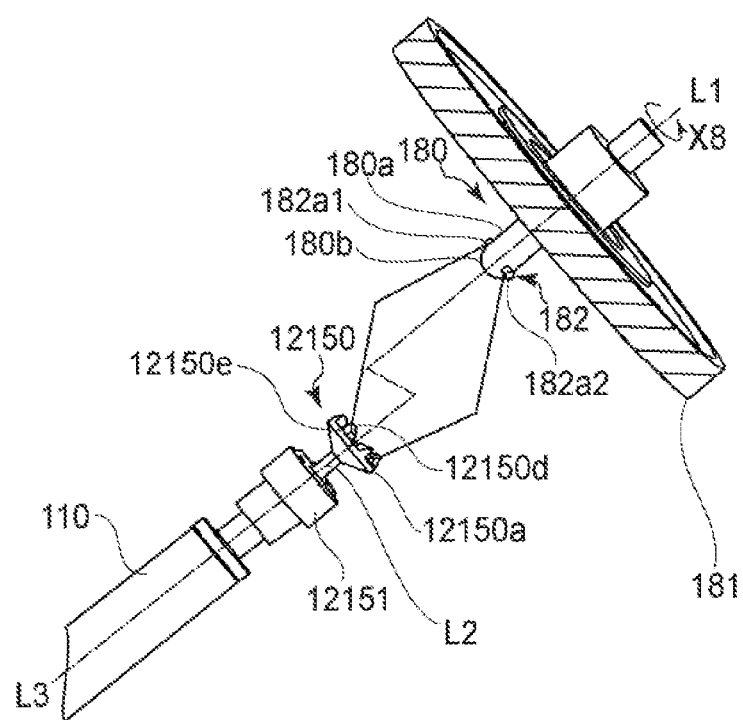
FIG. 68 is a perspective view of the drive shaft and the coupling according to an embodiment of the present invention.

Referring to FIG. 68, the rotational force transmitting operation at the time of rotating the developing roller 110 will be described. The drive shaft 180 rotates with the gear (helical gear) 181 in the direction of X8 in the Figure by the rotational force received from the motor 64 (driving source). The transmission pin 182 integral with the drive shaft 180 contacts to two of the four rotational force receiving surfaces 150*e* of the coupling 12150 to rotate the coupling 12150. Furthermore, as stated in the foregoing, the coupling 12150 is coupled with the developing roller 110 for drive transmission. For this reason, the rotation of the coupling 12150 rotates the developing roller 110 through the end member 12151.

In addition, even if the axis L3 and the axis L1 deviate from the co-axial relations somewhat, the coupling can rotate without applying the large load to the developing roller and the drive shaft because the coupling 12150 inclines slightly.

This is one of the remarkable effects according to an embodiment of the coupling of the present invention.

Figure 69:
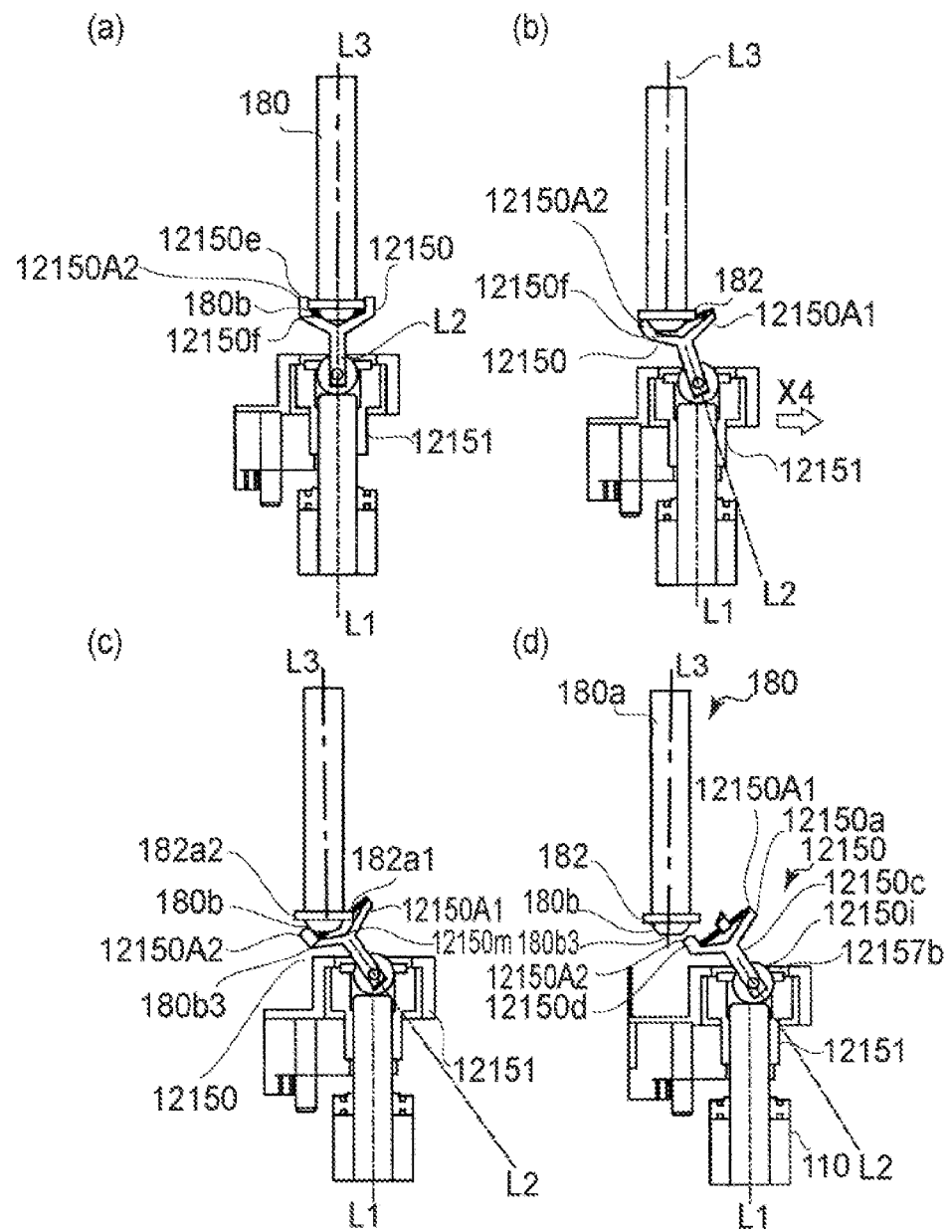
FIG. 69 is a longitudinal sectional view illustrating the process of the disengagement of the coupling from the drive shaft according to the embodiment of the present invention.

Referring to FIG. 69, the description will be made as to operation of the coupling 12150 and so on at the time of the cartridge B (B7) moving to another station by the rotation of the rotary C. FIG. 69 is a longitudinal sectional view of the apparatus main assembly A, as seen from the lower part. First, similarly to embodiment 1, whenever the cartridge B moves from the position (developing position) where opposes to the photosensitive drum, the pin 182 is positioned at any two of the entrance portions 12150k1-12150k4 (FIG. 61).

In the state where the rotary C is at rest at the developing position, the axis L2 of the coupling 12150 is substantially co-axial relative to the axis L1 (rotational force transmitting angular position). When the rotary C further starts the rotation to one direction after termination of the development, The upstream receiving surface 12150f with respect to the rotational direction X4 and/or the projection 12150d of the coupling 12150 contact to free end portion 180b of the drive shaft 180, and/or the pin 182 (FIG. 69a), in response to the movement in the rotational direction X4 of the cartridge B (developing roller 110). And, the axis L2 begins (FIG. 69b) to incline toward the upstream in the rotational direction X4. The inclining direction (pre-engagement angular position) of the coupling at the time of the cartridge B moving this direction to the developing position is the substantially opposite relative to the axis L1. By the rotating operation of this rotary C, the upstream free end portion 12150A2 with respect to the rotational direction X4 moves, while it is in contact with the drive shaft 180 (free end portion 180b). The axis L2 of the coupling 12150 inclines to the position (disengaging angular position) where the upstream free end portion 150A2 reaches to the drive shaft free-end 180b3 (FIG. 69c). And, in this state, the coupling 12150 is passed while it is in contact with the drive shaft free-end 180b3 (FIG. 69d). Thereafter, the cartridge B is completely retracted from the developing position by the rotating operation of the rotary C.

As has been described hereinbefore, the coupling 12150 is mounted for inclining motion relative to the axis L1 to the cartridge B. And, the coupling 12150 is inclined without interfering with the drive shaft in response to the rotational movement of the rotary C. By this, the coupling 12150 can be disengaged from the drive shaft 180.

The coupling 12150 can be integrally handled with the end members (gear and so on) by the structure as described above. For this reason, the assembly operation property is improved.

The structure for inclining the axis L2 of the coupling to the pre-engagement angular position, immediately before the coupling engages with the drive shaft may employ any of the embodiment 2-embodiment 5.

Embodiment 11

Figure 70:
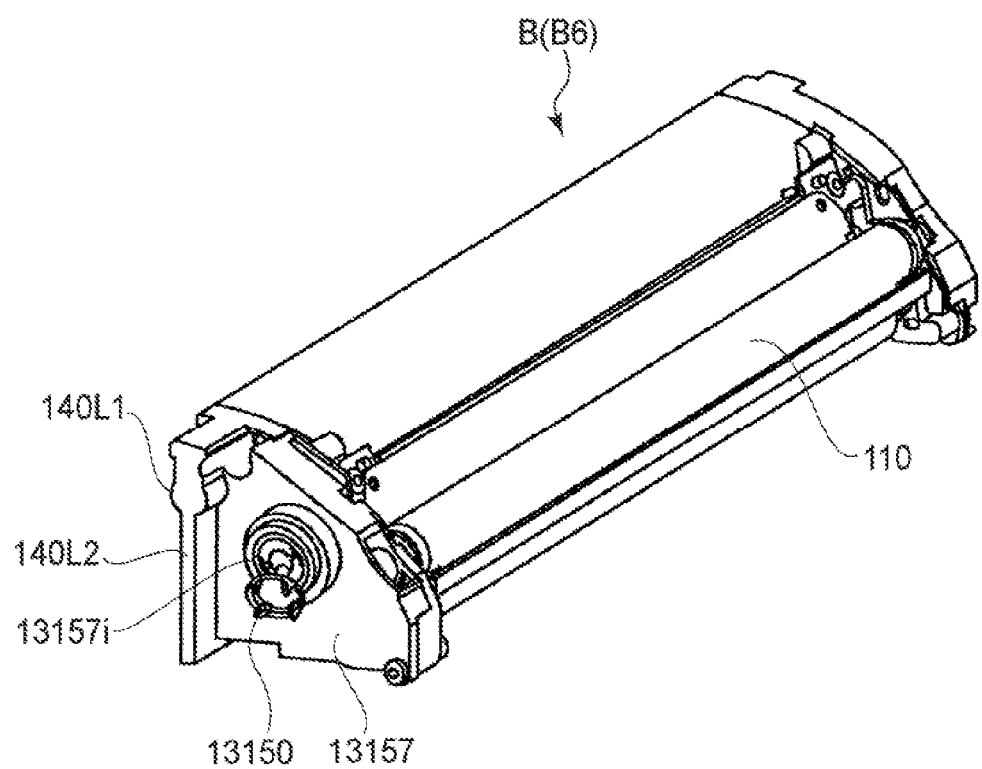
FIG. 70 is a perspective view of a developing cartridge according to an embodiment of the present invention.
Figure 71:
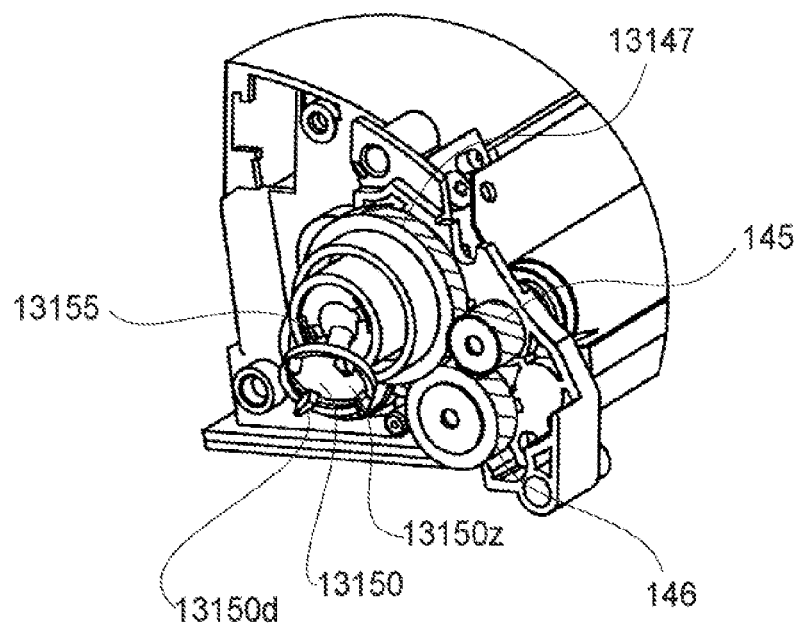
FIG. 71 is a perspective view of a side of a developing cartridge according to the embodiment of the present invention (the side plate of the cartridge is omitted).

Referring to FIG. 70, FIG. 71, and FIG. 72, embodiment 11 will be described.

The present embodiment is different from Embodiment 10 in the position (position of the coupling) which inputs the drive, and the structure which transmits the rotational force to the developing roller and the developer supply roller from the coupling.

FIG. 70 is a perspective view of a cartridge according to the present embodiment. FIG. 71 is a perspective view illustrating a driving portion of the cartridge. FIG. 72 (a) is a perspective view of a driving input gear, as seen from the driving side. FIG. 72 (b) is a perspective view of the driving input gear, as seen from the non-driving side.

The development gear 145 and the feed roller gear 146 are disposed at the drive lateral end portions of the developing roller 110 and the feed roller 115 (FIG. 1), respectively. The gears 145 and 146 are fixed to the shaft. The rotational force received by the coupling 13150 from the apparatus main assembly A is transmitted through the gear to the other rotating members (the developing roller 110, the developer supply roller 115, the toner stirring (unshown), and so on) of cartridge B (B6).

A driving input gear 13147 which supports the coupling 13150 will be described.

As shown in FIG. 71, the gear 13147 is rotatably provided at the position for engagement with the development gear 145 and the feed roller gear 146. The gear 13147 has the coupling containing section 13147j similar to the end member 12151 described in Embodiment 10 (FIG. 72 (a)). The coupling 13150 is pivotably retained by a retaining member 13156 on the gear 13147.

Further, the supporting member 13157 and the inclination regulation member 13157i are mounted to the cartridge B (FIG. 70).

The supporting member 13157 is provided with the hole and the inner surface 13157i thereof engages with the gear 13147. Since the engagement, drive, and disengagement of the coupling by the rotating operation of the rotary are the same as that of Embodiment 10, the description is omitted for simplicity.

In addition, The structure for inclining the axis L2 of the coupling to the pre-engagement angular position, immediately before the coupling engages with the drive shaft may employ any of that of the embodiment 2-embodiment 5.

As has been described hereinbefore, it is not necessary to dispose the coupling at the end co-axial with the developing roller. According to this embodiment, the latitude in the design of the image forming device body and the cartridge can be improved. According to this embodiment, the effects similar to Embodiment 9 are provided.

Embodiment 12

Figure 73:
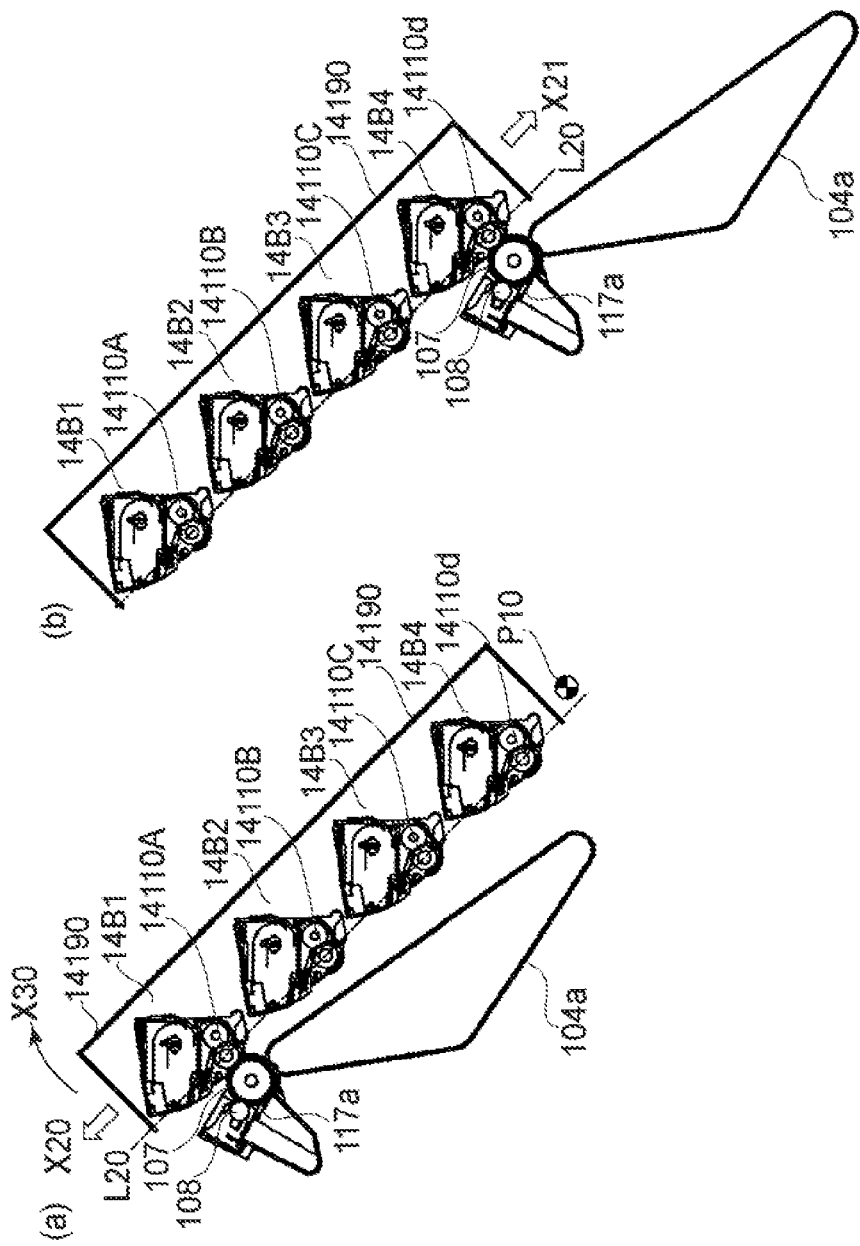
FIG. 73 is a side view of the apparatus main assembly according to the embodiment of the present invention.
Figure 74:
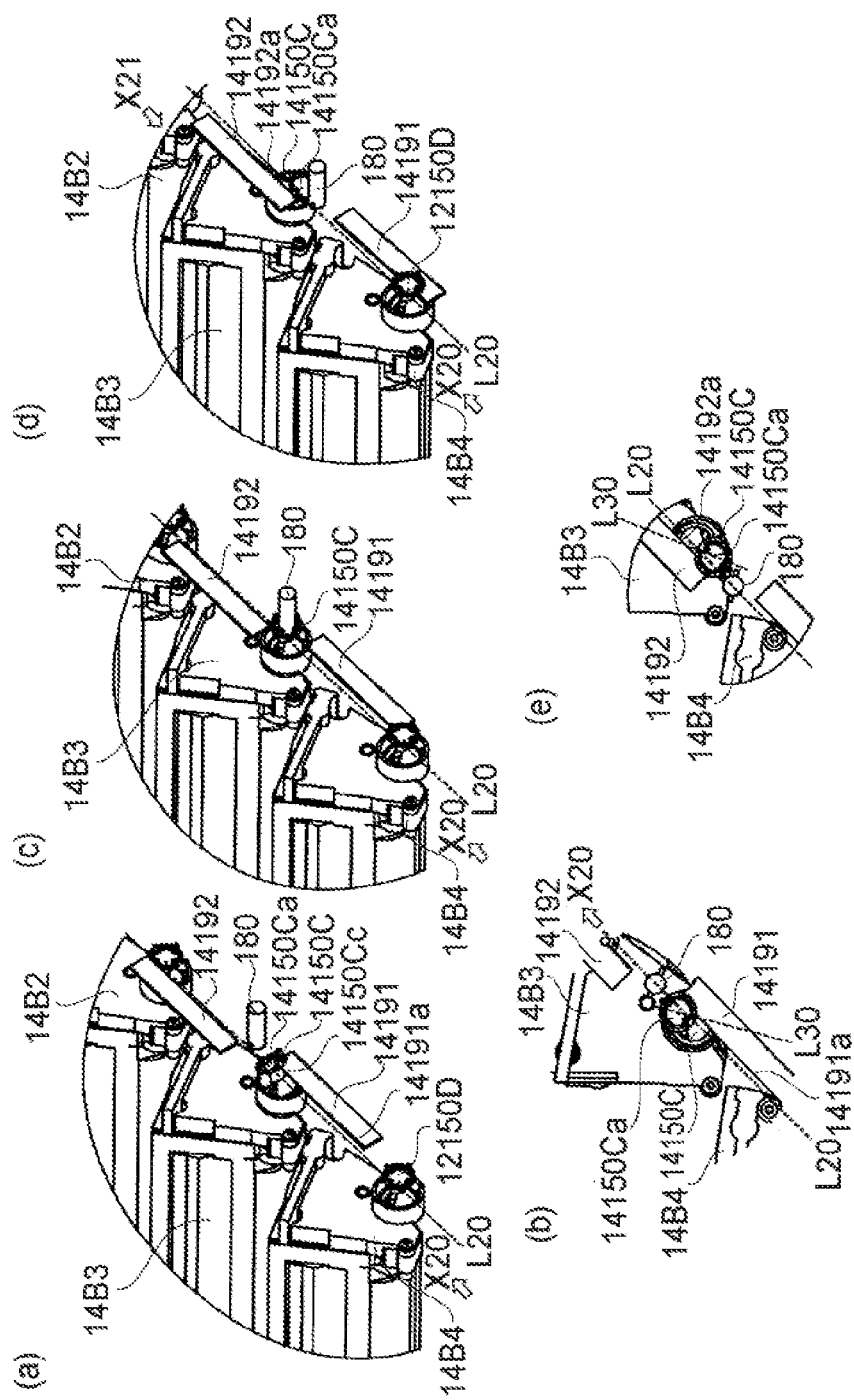
FIG. 74 is a side view of an apparatus main assembly according to an embodiment of the present invention.

Embodiment 12 will be described with reference to FIGS. 73 and 74.

In the above-described Embodiments, the case of using the rotation selecting mechanism (rotary) as the moving member for the developing device (cartridge B) is described. In this embodiment, another moving member will be described.

FIGS. 73(a) and 73(b) are sectional views showing a cartridge supporting member for supporting four cartridges B (14B1 to 14B4). FIGS. 74(a) to 74(e) are perspective views and side views showing processes for engaging and disengaging a coupling with respect to a driving shaft.

Referring to FIGS. 73(a) and 73(b), the respective cartridges B (14B1 to 14B4) are laterally arranged in cross section in a cartridge supporting member 14190 and are detachably mounted to the cartridge supporting member 14190. FIG. 73(a) is a schematic view showing a state in which a first color cartridge 14B1 is located at a portion opposite to a photosensitive drum 107 and is capable of performing development with respect to the photosensitive drum 107. When the cartridge 14B1 completes the development, the supporting member 14190 moves in an X20 direction, so that an adjacent (second) color cartridge 14B2 is located at the opposing portion (developing position) with respect to the photosensitive drum 107. Incidentally, a developer image formed on the photosensitive drum 107 is transferred onto a transfer belt 104a. These operations are repeated for each of the colors. Finally, as shown in FIG. 73(b), a fourth color cartridge 14B4 is moved to the opposing portion with respect to the photosensitive drum 107, so that four color developer images are transferred onto the transfer belt. Then, the developer images are transferred from the transfer belt onto a recording material S and are fixed on the recording material S.

Incidentally, each of the cartridges 14 is moved in a direction substantially perpendicular to a direction of the axial line L3 of the driving shaft 180 by the movement of the supporting member 14190 in one direction.

As a result, a color image is formed on the recording material S.

When a series of the color image formation is completed, the supporting member 14190 is moved in the X21 direction to be returned to an initial position (the state of FIG. 73(a)).

Next, with reference to FIGS. 74(a) to 74(e), steps of connecting and disconnecting the coupling with respect to the driving shaft by the movement of the supporting member will be described. Representatively, connection and disconnection of the cartridge 14B3 with respect to a coupling 14150C will be described. FIG. 74(a) is a perspective view showing a state of the coupling 14150C immediately before connection to the driving shaft 180 and FIG. 74(b) is a side view thereof. FIG. 74(c) is a perspective view showing a state in which the coupling is connected to the driving shaft and placed in a driving force transmittable condition. FIG. 74(d) is a perspective view showing a disconnected state of the coupling from the driving shaft and FIG. 74(e) is a side view thereof.

In this embodiment, as a means for including the axial line L2, the constitution described in Embodiment 5 is used. That is, a regulation rib 14191 provided to the apparatus main assembly is disposed along a lower side of a line L20 through which a coupling 14150C passes and upstream from the driving shaft 180 with respect to a movement direction X20. Further, similarly as in Embodiment 6, a distance between a top surface 14191a of the regulation rib and the coupling 14150C is set to be smaller when the coupling 14150C comes closer to the driving shaft 180. Further, as shown in FIG. 74(b), an inclination direction of an axial line L is regulated so that a driven portion (portion to be driven) 14150Ca is directed upwardly with respect to the line L20 (the inclination direction is indicated by a line L30).

Here, when development with the cartridge 14B2 is completed, the supporting member is horizontally moved in one direction. By this movement, the cartridge 14B3 is moved toward a predetermined position. During its process, an intermediate portion 14150Cc contacts the top surface 14191a. At this time, as described in Embodiment 6, the driven portion 14150Ca is directed toward the driving shaft 180 (the pre-engagement angular position) (the state of FIG. 74(a)). Thereafter, similarly as in the above-mentioned description, the coupling 14150C engages with the driving shaft 180 (the rotating force transmitting angular position) (the state of FIG. 74(c)). Then, when image formation with the cartridge 14B3 is completed, the cartridge 14B3 is moved in the X20 direction. The coupling 14150C is disengaged from the driving shaft 180 (disengagement angular position) (the state of FIG. 74(d)). Details are the same as those described above, thus being omitted.

As described above, the developments with all the couplings are completed, the supporting member 14190 is returned to the initial position (the state of FIG. 74(b)). An operation during a process thereof will be described. The coupling of each of the cartridges is required to pass through the driving shaft 180. For this reason, the coupling is, similarly as during the development, moved from the pre-engagement angular position to the disengagement angular position through the rotating force transmitting angular position. For this purpose, it is necessary to employ a constitution for inclining the axial line L2. As shown in FIG. 74(d), a regulation rib 14192 similar to that descried in Embodiment 6 is disposed along the upper side of the line L20 through which the coupling 14150C passes. The rib 14192 is disposed upstream from the driving shaft 180 with respect to the movement direction X21. Further, the distance between the regulation rib 14192 and the line L20 is set similarly as in the case of the regulation rib 14192. That is, the regulation rib 14191 and the regulation rib 14192 are set in a point-symmetry relationship with respect to the center of the driving shaft 180. Incidentally, as shown in FIG. 74(e), a regulation direction of the coupling 14150C is not changed. For this reason, the coupling 14150C is also moved, at the initial stage (X21 direction), from the pre-engagement angular position to the disengagement angular position through the rotating force transmitting angular position by the same operation as during the image formation (development) (during the movement in the X20 direction). During this operation, the coupling 14150C passes through the driving shaft 180 and then is returned to the initial position.

In this embodiment, the cartridge is detachably supported with respect to the image forming apparatus. During replacement of the cartridge, as shown in FIG. 74(a), the supporting member 14190 is rotationally moved in the X30 direction. By this rotational movement, the user moves each of the cartridges 14B1 to 14B4 to a replaceable position. Incidentally, in this embodiment, the movement direction of the developing cartridge is obliquely upward but may also be an opposite direction and the developing cartridge may be disposed so as to be movable in other directions.

In the foregoing description, the image formation (development) is effected when the cartridge is moved in one direction but is not effected when the cartridge is moved other directions. However, the present invention is not limited thereto. For example, when the cartridge is moved in other directions, the image formation may be effected.

Embodiment 13

Embodiment 13 will be described with reference to FIG. 75.

In the foregoing description, the cartridge detachably mountable the apparatus main assembly A is described. In this embodiment, such an image forming apparatus that the developing device as the developing apparatus is fixed to an apparatus main assembly and image formation is effected by real time supply of the developer. That is, the developing device in this embodiment is mounted to the apparatus main assembly A by the user but is not demounted. The developing device in this embodiment is a fixed-type in which the developing device is fixed to the apparatus main assembly A and is used in a fixed state. Maintenance is performed by a service person.

FIG. 75 is a sectional view of the apparatus main assembly.

As shown in FIG. 75, a rotary C2 includes four color developing devices 15A, 15B, 15C and 15D mounted therein. The rotary C2 further includes developer bottles 16A, 16B, 16C and 16D each for supplying a developer to an associated developing device. These bottles 16A, 16B, 16C and 16D are detachably mounted to the apparatus main assembly A in a direction perpendicular to the drawing. When the developer in the bottle empties, the bottle is replaced by the user.

By the rotation of the rotary C, each of the developing devices 15A, 15B, 15C and 15D is successively moved to a portion (developing position) opposite to the photosensitive drum 107 and at the opposing portion, a latent image formed on the photosensitive drum 107 is developed. Depending on the movement of each of the developing devices to the opposing portion, the coupling member (not shown) provided to the developing device is engaged with the driving shaft provided to the apparatus main assembly (not shown). Thereafter, when the image formation is completed, the cartridge (not shown) is disengaged from the driving shaft. This operation is similar to that in Embodiment 1 and the like, so that description thereof is omitted.

As described above, even in the case of drive switching of the developing device fixed to the apparatus main assembly, the operation can be performed similarly as in the cases of Embodiments described above.

Embodiment 14

Figure 76:
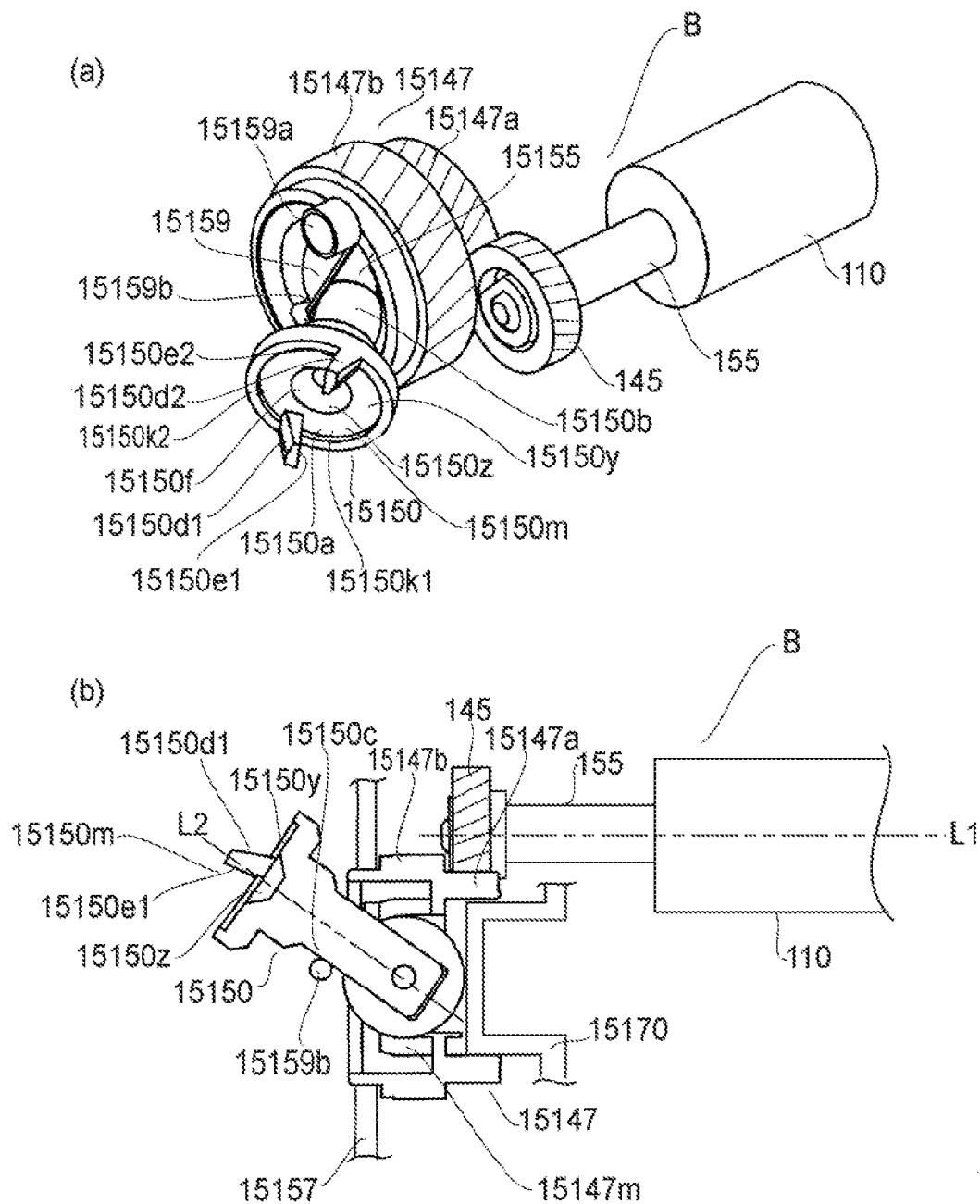
FIG. 76 is a perspective view and a longitudinal sectional view illustrating the coupling according to an embodiment of the present invention.
Figure 77:
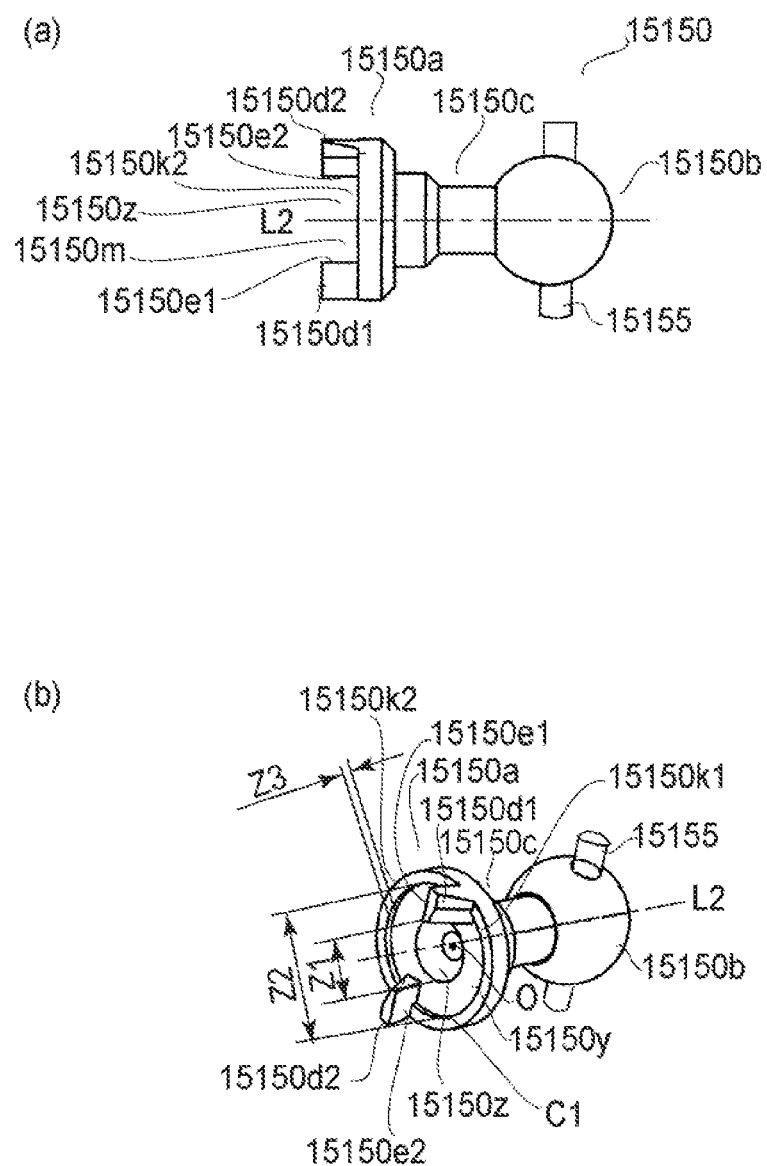
FIG. 77 is a side view and a perspective view of a coupling according to an embodiment of the present invention.
Figure 78:
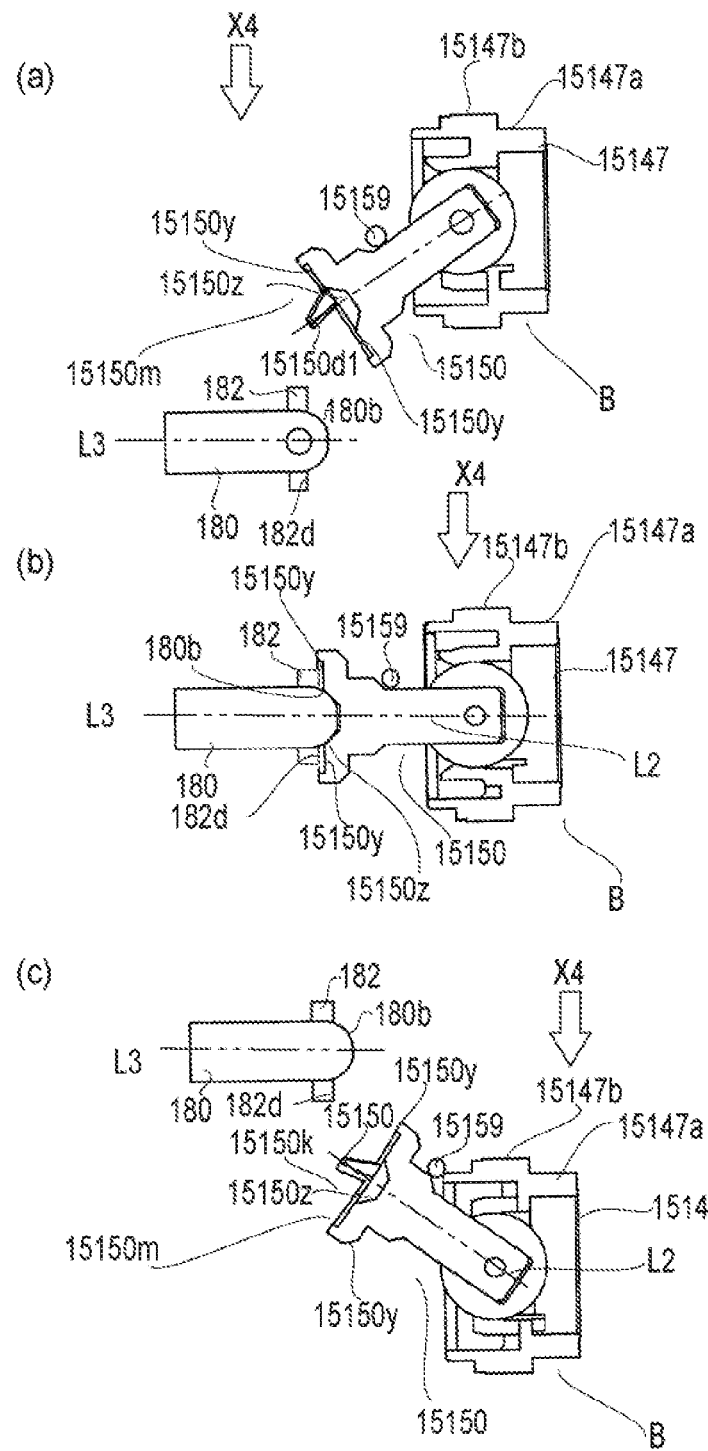
FIG. 78 is a longitudinal sectional view illustrating the process of engagement and process of disengagement between the drive shaft and the coupling according to the embodiment of the present invention.

Referring to FIG. 76, FIG. 77, and FIG. 78, embodiment 14 will be described.

These embodiments differ from Embodiment 11 in the configuration of the coupling, and provision of the elastic material for maintaining the coupling at the pre-engagement angular position.

FIG. 76 (*a*) is a perspective view illustrating a part of cartridge B. FIG. 76 (*b*) and FIG. 76 (*a*) are sectional views taken along a line extended in the inclining direction of the axis of the coupling through the center of the driving input gear (the member which mounts the driving input gear is also illustrated). FIG. 77 (*a*) is a side view of the coupling alone. FIG. 77 (*b*) is a perspective view of the coupling alone. FIG. 78 (*a*) is a sectional view illustrating the state where the coupling (cartridge) is positioned at the pre-engagement angular position. FIG. 78 (*b*) is a sectional view illustrating the state where the coupling (cartridge) is positioned at the rotational force transmitting angular position. FIG. 78 (*c*) is a sectional view illustrating the state where the coupling (cartridge) is positioned at the disengaging angular position. FIGS. 78 (*a*), (*b*), and (*c*) illustrate the positional relations between the coupling 15150 and the drive shaft 180.

As shown in FIG. 76, the development gear 145 is disposed to the end of the developing roller 110. And, the gear 145 is fixed to the shaft 155 of the developing roller 110.

A driving input gear 15147 which mounts the coupling 15150 will be described.

As shown in FIG. 76, the gear 15147 has the gear portion for meshing engagement with the development gear 145 15147*a*, and the gear portion 15147*b* for meshing engagement with the feed roller gear 146 (FIG. 58). And, the gear 15147 is rotatably mounted to the cartridge B by a supporting member 15170 and a supporting member 15157. The supporting member 15170 functions also as the bearing member for the developing roller 110.

By this, the rotational force received by the coupling 15150 from the apparatus main assembly A is transmitted to the developing roller 110 through the pin 15155 (rotational force transmitting portion), the rotational force transmitting surface 12151*h* (FIG. 62 (*a*), (*b*), rotational force receiving portion), the gear 147, and gear 145.

The coupling 15150 is pivotably mounted to the gear 15147 by a retaining portion 15147*m* (movable among said three angular positions). In addition, the coupling 15150 is urged by an urging spring (elastic material) 15159 in order to maintain the pre-engagement angular position. In this embodiment, the spring 15159 is a torsion coil spring. A supporting portion 15159*a* of the spring 15159 is locked by a mounting portion (unshown) provided on the cartridge B. And, an arm portion 15159*b* thereof elastically urges an intermediate part 15150*c* of the coupling. By this, the axis L2 of the coupling 15150 is maintained at the pre-engagement angular position (FIG. 78 (*a*)). In the present embodiment, a spring force (elastic force) of the spring 15159 is 5 g-100 g. If it is below 5 g, the coupling may not incline correctly due to the frictional force and so on. If it is more than 100 g, the contact portion of the spring may be shaved at the time of the rotation of the coupling. However, the spring force other than this range may be employed depending on the conditions, such as the wire diameter and the material of spring, and configuration and material of the coupling. In addition, it is not limited to the torsion coil spring.

More particularly, the spring 15159 (elastic material) elastically urges the coupling 15150. The elastic force thereof is such that it can maintain the coupling 15150 at the pre-engagement angular position, while it permits moving the coupling from the pre-engagement angular position to the rotational force transmitting angular position (FIG. 78 (*b*)), and it permits moving the coupling 15150 from the rotational force transmitting angular position to the disengaging angular position (FIG. 78 (*c*)).

This applies also to the spring (elastic material) 4159 described by the embodiment of the embodiment 3 and so on.

Further, the cartridge B has the inclination regulating portion for regulating the inclining direction of the coupling. Since this structure is the same as that of Embodiment 11, the description is omitted for simplicity.

As shown in FIG. 77, the couplings 15150 differ from the coupling 12150 described in Embodiment 10 in the configuration of the driven portion 15150*a*.

More particularly, an opening 15150*m* of the driven portion 15150*a* is provided with the recess 15150*z* and the flat portion 15150*y*. The recess 15150*z* is contacted to the free end portion 180*b* of the drive shaft 180 (FIG. 78 (*b*)). As shown in FIG. 78, when the coupling 15150 reaches the rotational force transmitting angular position (FIG. 78 (*b*)) through the pre-engagement angular position (FIG. 78 (*a*)), the rotational force of the drive shaft 180 will be transmitted to the coupling 15150 through the pin 182. In this embodiment, not the recess 15150*z* but the drive shaft 180 side is the flat portion 15150*y*. By this, the peripheral part 182*d* (FIG. 78 (*a*), (*b*), (*c*)) and the flat portion 15150*y* of the coupling of the pin 182 can be brought close to each other (FIG. 78 (*b*)).

By this, the lengths of the cartridge B and the apparatus main assembly in the direction of the axis L1, L3 can be shortened. Therefore, the cartridge B and the apparatus main assembly can be downsized.

Here, an inner diameter Z1=phi of the flat portion 15150*y* of the coupling used by this implementation is about 5 mm. In addition, an outer diameter Z2=phi thereof is approx. 11 mm. In addition, a depth Z3=of the flat portion is approx. 0.6 mm. In addition, a depth of the recess 15150*z* of conical shape is approx. 1.5 mm in the top part of conical shape, and the diameter thereof is approx. 5 mm. In addition, a weight of the coupling 15150 is approx. 1.5 g. In this embodiment, the material of the coupling is polyacetal. However, the values of the size and weight are not inevitable, and the person skilled in the art can select them properly.

In addition, in the present embodiment, the projection 15150*d* (15150*d*1, d2) of the coupling is disposed at each of two places. By this, the width measured along the circumference of the entrance portion 150*k* (150*k*1, k2) can be enlarged. Therefore, the entrance of the pin 182 to the entrance portion 150*k* can be smoothed. Although the number of the projections can be selected properly, a plurality of projections are desirable. This is because the rotational force can be transmitted with high precision.

Since the configuration of the coupling other than these and engagement, drive, and disengagement of the coupling by the rotating operation of the rotary are the same as that of those of Embodiment 10, the description is omitted for simplicity.

In addition, the structure for inclining the axis of the coupling to the pre-engagement angular position may employ any of the embodiment 2-embodiment 5.

In addition, in this embodiment, the coupling 15150 is provided at the position remote from the axis L1 in the direction perpendicular to the axis L1 (FIG. 76 (*b*)).

In this embodiment, the coupling is disposed at such a position. For this reason, the latitude in the design of the apparatus main assembly and the cartridge can be improved. When the coupling is disposed co-axially with the axis L1, the position of the coupling will approach the photosensitive drum. For this reason, it is a constraint to the disposition of the coupling, but in the present embodiment, the constraint from the photosensitive drum is mitigable.

As has been described hereinbefore, in this embodiment, the coupling 15150 has a circular flat portion 15150*y* in the free end side. A recess 15150*z* is provided in the center O of the flat portion 15150*y* (circular). The recess 15150*z* has a conical shape which expands toward the free end side thereof. In addition, projections (rotational force receiving portions) 15150*d* are disposed at the edge of the circular flat portion 15150*y* in the position diametrically opposed interposing the center O (two positions). These projections project in the direction of the rotation axis L2 of the coupling. In addition, the pins (rotational force applying portions) 182 project in the directions perpendicular to the axis L3. (ζ) to provide the projections at the two places opposed to each other, respectively. Any one of the rotational force receiving surfaces (rotational force receiving portions) 15150*e* engages with one of the pin projections 182. And, the other one of the rotational force receiving surfaces 15150*e* engages with the other one of the pin projections 182. By this, from the drive shaft 180, the coupling 15150 receives the rotational force and rotates.

Here, according to the embodiments described above, in the structure of moving the cartridge B (developing roller 110) in the direction substantially perpendicular to the direction of the axis L3 of the drive shaft 180 in response to in the movement to the one direction of the rotary C (supporting member 14190), the coupling 150 (1350, 3150, 4150, 5150, 7150, 8150, 9150, 10150, 12150, 13150, 15150 and so on) can accomplish the coupling, the engagement, and the disengaging operation relative to the drive shaft 180. This is accomplished because this coupling can take the next positions as described above 1. The rotational force transmitting angular position for transmitting the rotational force from the apparatus main assembly A to the developing roller 110; 2. this pre-engagement angular position inclined from this rotational force transmitting angular position before this coupling engages with the rotational force applying portion and 3. The disengaging angular position inclined toward the opposite side from the pre-engagement angular position from the rotational force transmitting angular position for the coupling to disengage from drive shaft.

Here, the rotational force transmitting angular position is the angular position of the coupling for transmitting the rotational force for rotating the developing roller 110 to the developing roller 110.

In addition, the pre-engagement angular position is the angular position which is inclined from the rotational force transmitting angular position and which is taken before the drum coupling member engages with the rotational force applying portion.

In addition, the disengaging angular position is the angular position which is inclined toward the opposite side from the pre-engagement angular position from the rotational force transmitting angular position and which permits the disengagement of the coupling from the drive shaft 180.

Here, the meaning "perpendicular substantially" will be described. Here, the description will be made about "perpendicular substantially". Between the cartridge b and the apparatus main assembly A and in order to mount and demount the cartridge B smoothly, small gaps are provided. More specifically and the small gaps are provided between the guide 140R1 and the guide 130R1 with respect to the longitudinal direction, between the guide 140R2 and the guide 130R2 with respect to the longitudinal direction, between the guide 140L1 and the guide 130L1 with respect to the longitudinal direction between, and the guide 140L2 and the guide 130L2 with respect to the longitudinal direction. Therefore, at the time of the mounting and demounting of the cartridge B relative to the apparatus main assembly A and the whole cartridge B can slightly incline within the limits of the gaps. For this reason and the perpendicularity is not meant strictly. However, even in such a case, the present invention is accomplished with the effects thereof. Therefore, the term" perpendicular substantially" covers the case where the cartridge slightly inclines.

Between the cartridge b and the cartridge accommodating portion 130A, small gaps are provided in order to mount and demount the cartridge B smoothly. more specifically and the small gaps are provided between the guide 140R1 or 140R2 and the guide 130R1 with respect to the longitudinal direction, between the guide 140L1 or 140L2 and the guide 130L1 with respect to the longitudinal direction. Therefore, at the time of the mounting and demounting of the cartridge b relative to the accommodating portion 130A and the whole cartridge B can slightly incline within the limits of the gaps. in addition, in addition and a slight positional deviation may occur between the rotary member C (movable member) and the driving shaft. (180) for this reason, the perpendicularity is not meant strictly. however, even in such a case, the present invention is accomplished with the effects thereof. therefore, the term "perpendicular substantially" covers the case where the cartridge slightly inclines.

It has been described that the axis L2 is slantable or inclinable in any direction relative to the axis L1. However, the axis L2 does not necessarily need to be linearly slantable to the predetermined angle in the full range of 360-degree direction in the coupling 150. For example, the opening 150*g* can be selected to be slightly wider in the circumferential direction. By doing so, the time of the axis L2 inclining relative to the axis L1, even if it is the case where it cannot incline to the predetermined angle linearly, the coupling 150 can rotate to a slight degree around the axis L2. Therefore, it can be inclined to the predetermined angle. In other words, the amount of the play in the rotational direction of the opening 150g is selected properly if necessary.

In this manner, the coupling 150 is revolvable or swingable over the full-circumference substantially relative to the axis L1 of the developing roller 110. More particularly, the coupling 150 is pivotable over the full-circumference thereof substantially relative to the drum shaft 153.

Furthermore, as will be understood from the foregoing explanation, the coupling 150 is capable of whirling in and substantially over the circumferential direction of the drum shaft 153. Here, the whirling motion is not a motion with which the coupling itself rotates about the axis L2, but the inclined axis L2 rotates about the axis L1 of the developing roller although the whirling here does not preclude the rotation of the coupling per se about the axis L2 of the coupling 150.

In addition, as has been described hereinbefore, each coupling has the function of transmitting the rotational force to the developing roller 110.

And, each coupling, it has the rotational force reception surface (rotational force receiving portion) 150e (8150e, 9150e, 9250e, 9350e, 9450e, 15150e) for receiving the rotational force from the drive shaft 180 (1180, 1280, 9180) by engaging with the pin (rotational force applying portion) 182 (1182, 9182). In addition, it has the rotational force transmitting surface (rotational force transmitting portion) 150h (1550h, 1450h, 8150h, 9150h, 12150h, 12151h, and so on) which transmits the rotational force received through the rotational force receiving portion 150e to the developing roller 110. The rotational force received by the rotational force transmitting surface 150h is transmitted to the developing roller 110 through the pin (rotational force receiving portion) 155 (1155, 1355, 12155).

And, this coupling moves from this pre-engagement angular position to this rotational force transmitting angular position in response to the movement of cartridge B at the time of the rotary C (supporting member 141190) (movable member) rotating in one direction (movement). By this, this coupling is opposed to this drive shaft. When the rotary C further rotates in said one direction from the position where the coupling opposes to the drive shaft (movement), the coupling moves from the rotational force transmitting angular position to the disengaging angular position in response to the cartridge B moving. By this, the coupling disengages from the drive shaft.

The coupling has the recess 150z (1450z, 1550z, 4150z, 515z0, 15150z, 15150z, and so on) on the rotation axis L2. And, the cartridge B moves in the direction substantially perpendicular to the axis L1 of the developing roller 110 by the rotation of the rotary C in said one direction. In response to this, each coupling moves from the pre-engagement angular position to the rotational force transmitting angular position, so that a part of coupling (downstream free end position 150A1, 1850A1, 4150A1, 5150A1, 8150A1, 12150A1 and so on) which is the downstream portion with respect to the rotational direction of the rotary C is permitted to circumvent the drive shaft. By this, the recess covers the free end of the drive shaft. And, the rotational force receiving portion engages, in the rotational direction of the coupling, with the rotational force applying portion which projects in the direction perpendicular to the axis of the drive shaft in the free end side of the drive shaft. By this, from the drive shaft, the coupling receives the rotational force and rotates. And, the rotary C further moves to said one direction. By this, the cartridge B moves in the direction substantially perpendicular to the axis L1. It responds to this, the coupling is moved to the disengaging angular position, in the rotational direction, from the rotational force transmitting angular position, so that a part of upstream drive shafts of this coupling member (upstream free end position 150A2, 1750A2, 4150A2, 5150A2, 12150A2 and so on) is permitted circumventing the drive shaft. By this, the coupling disengages from the drive shaft.

The rotational force receiving portions (150e, 15150e, and so on) are disposed, respectively on a phantom circle C1 which has a center O on the rotation axis L1 of this each coupling, at the positions diametrically opposed interposing the center O. The forces received by the couplings by this disposition are force couples. For this reason, the couplings can continue rotary motion only with the force couple. In view of this, each coupling can rotate without determining the position of the rotation axis.

The reference numerals in the drawing which do not appear in the specification are the corresponding members in the case that the alphabets thereof are the same.

THE OTHER EMBODIMENTS

In this embodiment, although the rotary rotates in the clockwise direction on the drawing (FIG. 17, for example), it may rotate in the opposite direction.

In addition, the image forming position (developing position) may be another position.

In addition, the rotary of the present embodiment carries the four color developing cartridges. However, the developing cartridge for the black may be fixed and the cartridges for the other three colors may be carried on the rotary.

In addition, in this embodiment, the developing roller is a contact development type and uses an elastic roller, but it may be a metal sleeve which contains a magnet roller employed by the jumping development.

The developing cartridge and the developing device are provided with the developing roller (or developing means including the developing roller) at least. For this reason, for example, the developing cartridge (developing device) is the developing roller. Or, it may be a cartridge which includes integrally the developing means including the developing roller and the cleaning means and which is detachably mountable to the apparatus main assembly, in addition to the type in the embodiment described above further, it may be a cartridge which includes integrally the developing roller (or developing means including the developing roller) and the charging means and which is detachably mountable to the apparatus main assembly.

Further, in addition, in this embodiment, although a laser beam printer is taken as an image forming device, the present invention is not limited to this example. For example, the present invention can be used to the other image forming apparatuses, such as an electrophotographic copying machine, a facsimile device, or a word processor. according to the embodiments described above the engagement and disengagement of the coupling are possible in the direction substantially perpendicular to the axis of the drive shaft provided in the main assembly of the electrophotographic image forming apparatus relative to the drive shaft by the movement in one direction of the movable member (the rotary, for example, the cartridge supporting member, cash drawer).

As has been described hereinbefore, the axis of the coupling can take the different angular positions in the present invention. More particularly, the axis of the coupling can take the pre-engagement angular position, the rotational force transmitting angular position, and the disengaging angular position. The coupling can be engaged with the drive shaft in the direction substantially perpendicular to the axis of the providing-in the main assembly drive shaft by this structure. In addition, the coupling can be disengaged from the drive shaft in the direction substantially perpendicular to the axis of the drive shaft. The present invention can be applied to a developing device, a drum coupling member, and an electrophotographic image forming device.

While the invention has been described with reference to the structures disclosed herein, it is not confined to the details set forth and this application is intended to cover such modifications or changes as may come within the purpose of the improvements or the scope of the following claims.

This application claims priority from Japanese Patent Applications Nos. 076771/2007 and 073685/2008 filed Mar. 23, 2007 and Mar. 21, 2008, respectively which are hereby incorporated by reference.

What is claimed is:

1. An image forming apparatus cartridge comprising:
a casing;
developer contained within the casing;
a developer roller having an axis L1, the developer roller being rotatably supported in the casing to permit rotation about the axis L1;
a developer supplying roller configured to remove developer from a surface of the developer roller and to supply developer to the surface of the developer roller;
a first gear operatively connected to the developer roller;
a second gear in meshing engagement with the first gear;
a third gear operatively connected to the developer supplying roller; and
a coupling member operatively connected to the second gear, the coupling member having an axis L2 about which the coupling member is rotatable and a free end portion for receiving a rotational force, the free end portion including at least two projections that are at least partly outside of the casing, each of the at least two projections being open to the axis L2, the coupling member being operatively connected to the developer roller via the first and second gears in order to transmit the rotational force to the developer roller, and the coupling member being operatively connected to the developer supplying roller via the third gear in order to transmit the rotational force to the developer supplying roller,
wherein the coupling member is movable between (i) a first position in which the axis L2 of the coupling member is substantially parallel to and offset from the axis L1 of the developer roller, (ii) a second position in which the axis L2 of the coupling member is inclined with respect to the position of the axis L2 when the coupling member is in the first position, and (iii) a third position in which the axis L2 of the coupling member is inclined with respect to the position of the axis L2 when the coupling member is in the first position in a direction opposite to the direction the coupling member is inclined when in the second position.

2. The image forming apparatus cartridge of claim 1, wherein, when the coupling member is in the first position, the axis L2 of the coupling member is substantially coaxial with an axis about which the second gear is rotatable.

3. The image forming apparatus cartridge of claim 1, wherein the second gear has a hollow portion, and at least part of the coupling member is positioned within the hollow portion of the second gear.

4. The image forming apparatus cartridge of claim 1, wherein the second gear is operatively connected to the coupling member such that the coupling member can partially rotate about the axis L2 without transmitting a force to the second gear.

5. The image forming apparatus cartridge of claim 1, wherein each projection has a tip, and when the coupling member is in the first position, the tip of each projection is the same distance from the second gear.

6. The image forming apparatus cartridge of claim 1, wherein the coupling member has an outermost surface, and for at least part of the outermost surface, a maximum distance from the axis L2 to the outermost surface along a line perpendicular to the axis L2 increases as the distance along the axis L2 from the second gear increases.

7. The image forming apparatus cartridge of claim 1, wherein the coupling member has an outermost surface, and at least part of the outermost surface tapers inwardly toward the axis L2 as the distance along the axis L2 towards the second gear decreases.

8. The image forming apparatus cartridge of claim 1, wherein an angle at which the axis L2 is inclined when the coupling member is in the second position is different than an angle at which the axis L2 is inclined when the coupling member is in the third position.

9. The image forming apparatus cartridge of claim 1, wherein, when the coupling member is in the second position or the third position, the axis L2 of the coupling member is inclined between 20 degrees to 60 degrees with respect to the position of the axis L2 when the coupling member is in the first position.

10. The image forming apparatus cartridge of claim 1, wherein, in addition to being inclinable, the coupling member is retractable towards inside of the casing.

11. The image forming apparatus cartridge of claim 10, further comprising a spring biasing the coupling member towards outside of the casing.

12. An image forming apparatus cartridge comprising:
a casing;
developer contained within the casing;
a developer roller having an axis L1, the developer roller being rotatably supported in the casing to permit rotation about the axis L1;
a developer supplying roller configured to remove developer from a surface of the developer roller and to supply developer to the surface of the developer roller;
a first gear operatively connected to the developer roller;
a second gear in meshing engagement with the first gear;
a third gear operatively connected to the developer supplying roller; and
a coupling member operatively connected to the second gear, the coupling member having an axis L2 about which the coupling member is rotatable and a free end portion for receiving a rotational force, the free end portion including at least two projections that are at least partly outside of the casing, each of the at least two projections being open to the axis L2, the coupling member being operatively connected to the developer roller via the first and second gears in order to transmit the rotational force to the developer roller, and the coupling member being operatively connected to the developer supplying roller via the third gear in order to transmit the rotational force to the developer supplying roller,
wherein the coupling member is movable between (i) a first position in which the axis L2 of the coupling member is substantially parallel to and offset from the axis L1 of the developer roller and (ii) a second position in which the axis L2 of the coupling member is inclined with respect to the position of the axis L2 when the coupling member is in the first position.

13. The image forming apparatus cartridge of claim 12, wherein, when the coupling member is in the first position, the axis L2 of the coupling member is substantially coaxial with an axis about which the second gear is rotatable.

14. The image forming apparatus cartridge of claim 12, wherein the second gear has a hollow portion, and at least part of the coupling member is positioned within the hollow portion of the second gear.

15. The image forming apparatus cartridge of claim 12, wherein the second gear is operatively connected to the coupling member such that the coupling member can partially rotate about the axis L2 without transmitting a force to the second gear.

16. The image forming apparatus cartridge of claim 12, wherein each projection has a tip, and when the coupling member is in the first position, the tip of each projection is the same distance from the second gear.

17. The image forming apparatus cartridge of claim 12, wherein the coupling member has an outermost surface, and for at least part of the outermost surface, a maximum distance from the axis L2 to the outermost surface along a line perpendicular to the axis L2 increases as the distance along the axis L2 from the second gear increases.

18. The image forming apparatus cartridge of claim 12, wherein the coupling member has an outermost surface, and at least part of the outermost surface tapers inwardly toward the axis L2 as the distance along the axis L2 towards the second gear decreases.

19. The image forming apparatus cartridge of claim 12, wherein, when the coupling member is in the second position, the axis L2 of the coupling member is inclined between 20 degrees to 60 degrees with respect to the position of the axis L2 when the coupling member is in the first position.

20. The image forming apparatus cartridge of claim 12, wherein, in addition to being inclinable, the coupling member is retractable towards inside of the casing.

21. The image forming apparatus cartridge of claim 20, further comprising a spring biasing the coupling member towards outside of the casing.

22. An image forming apparatus cartridge comprising:
a casing;
developer contained within the casing;
a developer roller having an axis L1, the developer roller being rotatably supported in the casing to permit rotation about the axis L1;
a developer supplying roller configured to remove developer from a surface of the developer roller and to supply developer to the surface of the developer roller;
a first gear operatively connected to the developer roller;
a second gear in meshing engagement with the first gear;
a third gear operatively connected to the developer supplying roller; and
a coupling member operatively connected to the second gear, the coupling member having an axis L2 about which the coupling member is rotatable and a free end portion for receiving a rotational force, the free end portion including at least one projection that is at least partly outside of the casing, the at least one projection being open to the axis L2, the coupling member being operatively connected to the developer roller via the first and second gears in order to transmit the rotational force to the developer roller, and the coupling member being operatively connected to the developer supplying roller via the third gear in order to transmit the rotational force to the developer supplying roller, wherein the coupling member is movable between (i) a first position in which the axis L2 of the coupling member is substantially parallel to and offset from the axis L1 of the developer roller, (ii) a second position in which the axis L2 of the coupling member is inclined with respect to the position of the axis L2 when the coupling member is in the first position, and (iii) a third position in which the axis L2 of the coupling member is inclined with respect to the position of the axis L2 when the coupling member is in the first position in a direction opposite to the direction the coupling member is inclined when in the second position.

23. The image forming apparatus cartridge of claim 22, wherein, when the coupling member is in the first position, the axis L2 of the coupling member is substantially coaxial with an axis about which the second gear is rotatable.

24. The image forming apparatus cartridge of claim 22, wherein the second gear has a hollow portion, and at least part of the coupling member is positioned within the hollow portion of the second gear.

25. The image forming apparatus cartridge of claim 22, wherein the second gear is operatively connected to the coupling member such that the coupling member can partially rotate about the axis L2 without transmitting a force to the second gear.

26. The image forming apparatus cartridge of claim 22, wherein the free end portion includes a recess facing away from the second gear.

27. The image forming apparatus cartridge of claim 22, wherein the coupling member has an outermost surface, and for at least part of the outermost surface, a maximum distance from the axis L2 to the outermost surface along a line perpendicular to the axis L2 increases as the distance along the axis L2 from the second gear increases.

28. The image forming apparatus cartridge of claim 22, wherein the coupling member has an outermost surface, and at least part of the outermost surface tapers inwardly toward the axis L2 as the distance along the axis L2 towards the second gear decreases.

29. The image forming apparatus cartridge of claim 22, wherein an angle at which the axis L2 is inclined when the coupling member is in the second position is different than an angle at which the axis L2 is inclined when the coupling member is in the third position.

30. The image forming apparatus cartridge of claim 22, wherein, when the coupling member is in the second position or the third position, the axis L2 of the coupling member is inclined between 20 degrees to 60 degrees with respect to the position of the axis L2 when the coupling member is in the first position.

31. The image forming apparatus cartridge of claim 22, wherein, in addition to being inclinable, the coupling member is retractable towards inside of the casing.

32. The image forming apparatus cartridge of claim 31, further comprising a spring biasing the coupling member towards outside of the casing.

33. An image forming apparatus cartridge comprising:
a casing;
developer contained within the casing;
a developer roller having an axis L1, the developer roller being rotatably supported in the casing to permit rotation about the axis L1;
a developer supplying roller configured to remove developer from a surface of the developer roller and to supply developer to the surface of the developer roller;
a first gear operatively connected to the developer roller;
a second gear in meshing engagement with the first gear;

a third gear operatively connected to the developer supplying roller; and a coupling member operatively connected to the second gear, the coupling member having an axis L2 about which the coupling member is rotatable and a free end portion for receiving a rotational force, the free end portion including at least one projection that is at least partly outside of the casing, the at least one projection being open to the axis L2, the coupling member being operatively connected to the developer roller via the first and second gears in order to transmit the rotational force to the developer roller and operatively connected to the developer supplying roller via the third gear in order to transmit the rotational force to the developer supplying roller, wherein the coupling member is movable between (i) a first position in which the axis L2 of the coupling member is substantially parallel to and offset from the axis L1 of the developer roller and (ii) a second position in which the axis L2 of the coupling member is inclined with respect to the position of the axis L2 when the coupling member is in the first position.

34. The image forming apparatus cartridge of claim 33, wherein, when the coupling member is in the first position, the axis L2 of the coupling member is substantially coaxial with an axis about which the second gear is rotatable.

35. The image forming apparatus cartridge of claim 33, wherein the second gear has a hollow portion, and at least part of the coupling member is positioned within the hollow portion of the second gear.

36. The image forming apparatus cartridge of claim 33, wherein the second gear is operatively connected to the coupling member such that the coupling member can partially rotate about the axis L2 without transmitting a force to the second gear.

37. The image forming apparatus cartridge of claim 33, wherein the free end portion includes a recess facing away from the second gear.

38. The image forming apparatus cartridge of claim 33, wherein the coupling member has an outermost surface, and for at least part of the outermost surface, a maximum distance from the axis L2 to the outermost surface along a line perpendicular to the axis L2 increases as the distance along the axis L2 from the second gear increases.

39. The image forming apparatus cartridge of claim 33, wherein the coupling member has an outermost surface, and at least part of the outermost surface tapers inwardly toward the axis L2 as the distance along the axis L2 towards the second gear decreases.

40. The image forming apparatus cartridge of claim 33, wherein, when the coupling member is in the second position, the axis L2 of the coupling member is inclined between 20 degrees to 60 degrees with respect to the position of the axis L2 when the coupling member is in the first position.

41. The image forming apparatus cartridge of claim 33, wherein, in addition to being inclinable, the coupling member is retractable towards inside of the casing.

42. The image forming apparatus cartridge of claim 41, further comprising a spring biasing the coupling member towards outside of the casing.

\* \* \* \* \*